US008091796B2

(12) United States Patent
Amundson et al.

(10) Patent No.: US 8,091,796 B2
(45) Date of Patent: Jan. 10, 2012

(54) HVAC CONTROLLER THAT SELECTIVELY REPLACES OPERATING INFORMATION ON A DISPLAY WITH SYSTEM STATUS INFORMATION

(75) Inventors: John Amundson, Minneapolis, MN (US); Jeffrey Boll, Brooklyn Park, MN (US)

(73) Assignee: Honeywell International Inc., Morristown, NJ (US)

( * ) Notice: Subject to any disclaimer, the term of this patent is extended or adjusted under 35 U.S.C. 154(b) by 481 days.

(21) Appl. No.: 12/323,179

(22) Filed: Nov. 25, 2008

(65) Prior Publication Data

US 2009/0140062 A1    Jun. 4, 2009

Related U.S. Application Data

(60) Provisional application No. 60/991,626, filed on Nov. 30, 2007.

(51) Int. Cl.
G05D 23/00 (2006.01)
G05B 11/01 (2006.01)
G05B 15/00 (2006.01)
G01M 1/38 (2006.01)

(52) U.S. Cl. ............... 236/94; 700/17; 700/83; 700/276

(58) Field of Classification Search .................... 236/51, 236/94, 47; 165/201; 700/17, 83, 276, 277, 700/278

See application file for complete search history.

(56) References Cited

U.S. PATENT DOCUMENTS

| | | | |
|---|---|---|---|
| 4,079,366 A | 3/1978 | Wong | |
| 4,174,807 A | 11/1979 | Smith et al. | |
| 4,206,872 A | 6/1980 | Levine | |
| 4,224,615 A | 9/1980 | Penz | |
| 4,264,034 A | 4/1981 | Hyltin et al. | |
| 4,296,334 A | 10/1981 | Wong | |
| 4,298,946 A | 11/1981 | Hartsell et al. | |
| 4,308,991 A | 1/1982 | Peinetti et al. | |
| 4,332,352 A | 6/1982 | Jaeger | |
| 4,337,822 A | 7/1982 | Hyltin et al. | |
| 4,337,893 A | 7/1982 | Flanders et al. | |
| 4,373,664 A | 2/1983 | Barker et al. | |
| 4,379,483 A | 4/1983 | Farley | |
| 4,382,544 A | 5/1983 | Stewart | |
| 4,386,649 A | 6/1983 | Hines et al. | |
| 4,388,692 A | 6/1983 | Jones et al. | |
| 4,431,134 A | 2/1984 | Hendricks et al. | |

(Continued)

FOREIGN PATENT DOCUMENTS

DE            3334117         4/1985

(Continued)

OTHER PUBLICATIONS

"CorAccess Systems/In Home," http://web.archive.org/web20011212084427/www.coraccess.com/home.html, 1 page, copyright 2001, printed Aug. 19, 2004.

(Continued)

*Primary Examiner* — Chen Wen Jiang
(74) *Attorney, Agent, or Firm* — Seager, Tufte & Wickhem LLC

(57) ABSTRACT

An HVAC controller is described that is configured to be more intuitive and user friendly to program and operate than convention HVAC controllers. In some instances, the HVAC controller may include a touch screen interface that provides greater flexibility in displaying information to the user and/or soliciting information from the user.

19 Claims, 100 Drawing Sheets

U.S. PATENT DOCUMENTS

| | | | |
|---|---|---|---|
| 4,442,972 A | 4/1984 | Sahay et al. | |
| 4,446,913 A | 5/1984 | Krocker | |
| 4,479,604 A | 10/1984 | Didner | |
| 4,503,471 A | 3/1985 | Hanajima et al. | |
| 4,506,827 A | 3/1985 | Jamieson et al. | |
| 4,556,169 A | 12/1985 | Zervos | |
| 4,606,401 A | 8/1986 | Levine et al. | |
| 4,621,336 A | 11/1986 | Brown | |
| 4,622,544 A | 11/1986 | Bially et al. | |
| 4,628,201 A | 12/1986 | Schmitt | |
| 4,646,964 A | 3/1987 | Parker et al. | |
| 4,717,333 A | 1/1988 | Carignan | |
| 4,725,001 A | 2/1988 | Carney et al. | |
| 4,837,731 A | 6/1989 | Levine et al. | |
| 4,881,686 A | 11/1989 | Mehta | |
| 4,918,439 A | 4/1990 | Wozniak et al. | |
| 4,948,040 A | 8/1990 | Kobayashi et al. | |
| 4,992,779 A | 2/1991 | Sugino et al. | |
| 4,997,029 A | 3/1991 | Otsuka et al. | |
| 5,005,365 A | 4/1991 | Lynch | |
| 5,012,973 A | 5/1991 | Dick et al. | |
| 5,038,851 A | 8/1991 | Mehta | |
| 5,053,752 A | 10/1991 | Epstein et al. | |
| 5,065,813 A | 11/1991 | Berkeley et al. | |
| 5,086,385 A | 2/1992 | Launey et al. | |
| 5,088,645 A | 2/1992 | Bell | |
| 5,140,310 A | 8/1992 | DeLuca et al. | |
| 5,161,606 A | 11/1992 | Berkeley et al. | |
| 5,170,935 A | 12/1992 | Federspiel et al. | |
| 5,172,565 A | 12/1992 | Wruck et al. | |
| 5,181,653 A | 1/1993 | Foster et al. | |
| 5,187,797 A | 2/1993 | Nielsen et al. | |
| 5,230,482 A | 7/1993 | Ratz et al. | |
| 5,238,184 A | 8/1993 | Adams | |
| 5,251,813 A | 10/1993 | Kniepkamp | |
| 5,259,445 A | 11/1993 | Pratt et al. | |
| 5,329,991 A | 7/1994 | Mehta et al. | |
| 5,348,078 A | 9/1994 | Dushane et al. | |
| 5,386,577 A | 1/1995 | Zenda | |
| 5,404,934 A | 4/1995 | Carlson et al. | |
| 5,414,618 A | 5/1995 | Mock et al. | |
| 5,482,209 A | 1/1996 | Cochran et al. | |
| 5,526,422 A | 6/1996 | Keen | |
| 5,537,106 A | 7/1996 | Mitcuhashi | |
| 5,566,879 A | 10/1996 | Longtin | |
| 5,570,837 A | 11/1996 | Brown et al. | |
| 5,673,850 A | 10/1997 | Uptegraph | |
| 5,682,206 A | 10/1997 | Wehmeyer et al. | |
| 5,732,691 A | 3/1998 | Maiello et al. | |
| 5,782,296 A | 7/1998 | Mehta | |
| 5,818,428 A | 10/1998 | Eisenbrandt et al. | |
| 5,873,519 A | 2/1999 | Beilfuss | |
| 5,886,697 A | 3/1999 | Naughton et al. | |
| 5,902,183 A | 5/1999 | D'Souza | |
| 5,915,473 A | 6/1999 | Ganesh et al. | |
| 5,937,942 A | 8/1999 | Bias et al. | |
| 5,947,372 A | 9/1999 | Tiernan | |
| 5,950,709 A | 9/1999 | Krueger et al. | |
| 6,009,355 A | 12/1999 | Obradovich et al. | |
| 6,020,881 A | 2/2000 | Naughton et al. | |
| 6,032,867 A | 3/2000 | Dushane et al. | |
| 6,059,195 A | 5/2000 | Adams et al. | |
| 6,081,197 A | 6/2000 | Garrick et al. | |
| 6,101,824 A | 8/2000 | Meyer et al. | |
| 6,104,963 A | 8/2000 | Cebasek et al. | |
| 6,119,125 A | 9/2000 | Gloudeman et al. | |
| 6,121,875 A | 9/2000 | Hamm et al. | |
| 6,140,987 A | 10/2000 | Stein et al. | |
| 6,141,595 A | 10/2000 | Gloudeman et al. | |
| 6,149,065 A | 11/2000 | White et al. | |
| 6,154,681 A | 11/2000 | Drees et al. | |
| 6,167,316 A | 12/2000 | Gloudeman et al. | |
| 6,192,282 B1 | 2/2001 | Smith et al. | |
| 6,196,467 B1 | 3/2001 | Dushane et al. | |
| 6,208,331 B1 | 3/2001 | Singh et al. | |
| 6,216,956 B1 | 4/2001 | Ehlers et al. | |
| 6,236,326 B1 | 5/2001 | Murphy | |
| 6,259,074 B1 | 7/2001 | Brunner et al. | |
| 6,285,912 B1 | 9/2001 | Ellison et al. | |
| 6,290,140 B1 | 9/2001 | Pesko et al. | |
| 6,315,211 B1 | 11/2001 | Sartain et al. | |
| 6,318,639 B1 | 11/2001 | Toth | |
| 6,330,806 B1 | 12/2001 | Beaverson et al. | |
| 6,344,861 B1 | 2/2002 | Naughton et al. | |
| 6,351,693 B1 | 2/2002 | Monie et al. | |
| 6,398,118 B1 | 6/2002 | Rosen et al. | |
| 6,453,687 B2 | 9/2002 | Sharood et al. | |
| 6,466,132 B1 | 10/2002 | Caronna et al. | |
| 6,478,233 B1 | 11/2002 | Shah | |
| 6,502,758 B2 | 1/2003 | Cottrell | |
| 6,518,953 B1 | 2/2003 | Armstrong | |
| 6,518,957 B1 | 2/2003 | Lehtinen et al. | |
| 6,546,419 B1 | 4/2003 | Humpleman et al. | |
| 6,556,899 B1 | 4/2003 | Harvey et al. | |
| 6,578,770 B1 | 6/2003 | Rosen | |
| 6,580,950 B1 | 6/2003 | Johnson et al. | |
| 6,581,846 B1 | 6/2003 | Rosen | |
| 6,595,430 B1 | 7/2003 | Shah | |
| 6,608,560 B2 | 8/2003 | Abrams | |
| 6,619,555 B2 | 9/2003 | Rosen | |
| 6,621,507 B1 | 9/2003 | Shah | |
| 6,726,112 B1 | 4/2004 | Ho | |
| 6,786,421 B2 | 9/2004 | Rosen | |
| 6,789,739 B2 | 9/2004 | Rosen | |
| 6,868,293 B1 | 3/2005 | Schurr et al. | |
| 7,050,026 B1 | 5/2006 | Rosen | |
| 7,055,759 B2 | 6/2006 | Wacker et al. | |
| 7,083,109 B2 | 8/2006 | Ponchak | |
| 7,152,806 B1 | 12/2006 | Rosen | |
| 7,156,318 B1 | 1/2007 | Rosen | |
| 7,225,054 B2 | 5/2007 | Amundson et al. | |
| 7,232,075 B1 | 6/2007 | Rosen | |
| 2001/0029585 A1 | 10/2001 | Simon et al. | |
| 2001/0042684 A1 | 11/2001 | Essalik et al. | |
| 2001/0052459 A1 | 12/2001 | Essalik et al. | |
| 2002/0005435 A1 | 1/2002 | Cottrell | |
| 2002/0011923 A1 | 1/2002 | Cunningham et al. | |
| 2002/0022991 A1 | 2/2002 | Sharood et al. | |
| 2002/0060701 A1 | 5/2002 | Naughton et al. | |
| 2002/0092779 A1 | 7/2002 | Essalik et al. | |
| 2002/0096572 A1 | 7/2002 | Chene et al. | |
| 2002/0138184 A1 | 9/2002 | Kipersztok et al. | |
| 2002/0173929 A1 | 11/2002 | Seigel | |
| 2003/0000692 A1 | 1/2003 | Takaski et al. | |
| 2003/0014179 A1 | 1/2003 | Szukala et al. | |
| 2003/0033156 A1 | 2/2003 | McCall | |
| 2003/0033230 A1 | 2/2003 | McCall | |
| 2003/0034897 A1 | 2/2003 | Shamoon et al. | |
| 2003/0034898 A1 | 2/2003 | Shamoon et al. | |
| 2003/0074489 A1 | 4/2003 | Steger et al. | |
| 2003/0121652 A1 | 7/2003 | Carey et al. | |
| 2003/0123224 A1 | 7/2003 | LaCroix et al. | |
| 2003/0136135 A1 | 7/2003 | Kim et al. | |
| 2003/0142121 A1 | 7/2003 | Rosen | |
| 2003/0150926 A1 | 8/2003 | Rosen | |
| 2003/0150927 A1 | 8/2003 | Rosen | |
| 2003/0177012 A1 | 9/2003 | Drennan | |
| 2004/0074978 A1 | 4/2004 | Rosen | |
| 2004/0193324 A1 | 9/2004 | Hoog et al. | |
| 2004/0245352 A1 | 12/2004 | Smith | |
| 2004/0262410 A1 | 12/2004 | Hull | |
| 2005/0119794 A1* | 6/2005 | Amundson et al. | 700/276 |
| 2007/0228183 A1* | 10/2007 | Kennedy et al. | 236/1 C |

FOREIGN PATENT DOCUMENTS

| | | |
|---|---|---|
| EP | 0070414 | 1/1983 |
| EP | 0434926 | 8/1995 |
| EP | 0678204 | 3/2000 |
| EP | 0985994 | 3/2000 |
| EP | 1033641 | 9/2000 |
| EP | 1074009 | 7/2001 |
| FR | 2711230 | 4/1995 |
| WO | WO 97/11448 | 3/1997 |
| WO | WO 97/39392 | 10/1997 |
| WO | WO 00/43870 | 7/2000 |
| WO | WO 01/52515 | 7/2001 |
| WO | WO 01/79952 | 10/2001 |

OTHER PUBLICATIONS

"HAI Company Background," http://www.homeauto.com/AboutHAI/abouthai_main.htm, 2 pages, printed Aug. 19, 2004.

"High-tech options take hold in new homes—200-08-28—Dallas Business Journal," http://bizjournals.com/dallas/stories/2000/08/28/focus4, 3 pages, dated Aug. 28, 2000, printed Aug. 19, 2004.

"Home Toys Review—TouchLine", http://www.hometoys.com/htinews/aug99/reviews/touchlinc/touchlinc.htm, 3 pages, dated Aug. 1999, printed Aug. 20, 2004.

"HTI News Release," http://www.hometoys.com/htinews/apr99/releases/ha101.htm, 3 pages, Apr. 1999.

"Mark of Excellence Award Finalist Announced," http://64.233.167.104/search?Q=cache:ciOA2YtYaBIJ:www.hometoys.com/releases/mar. . ., 6 pages, Leopard Touchscreen on p. 2, dated prior to Mar. 4, 2000, printed Aug. 20, 2004.

"Product Review—Philips Pronto Remote Control," http://hometheaterhifi.com/volume_6_2/philipsprontoremotecontrol.html, 5 pages, dated May 1999, printed Aug. 20, 2004.

"RC X10 Automation Forum: Control your Heating and Cooling System with Pronto(1/1)," http://www.remotecentral.com/cgi-bin/mboard/rc-x10/thread.cgi?12, 2 pages, dated Apr. 23, 1999, printed Aug. 20, 2004.

"Spotlight on integrated systems," Custom Builder, V8, N2, p. 66(6), Mar.-Apr. 1993.

"Vantage Expands Controls for Audio/Video, HVAC and Security," http://www.hometoys.com/htinews/aug99/releases/vantage03.htm, 2 pages, dated Aug. 3, 1999, printed Aug. 20, 2004.

ADI, "Leopard User Manual," 93 pages, 2001.

Adicon 2500, "The Automator," 4 pages, Oct.-Dec. 2000.

ADT Security Services, "iCenter Advanced User Interface 8142ADT," Installation and Setup Guide, 4 pages, May 2001; First Sale Feb. 2001.

Aprilaire Electronic Thermostats Models 8344, 8346, 8348, 8363, 8365, 8366 Operating Instructions, 8 pages, 2003.

Aube Technologies, Electronic Thermostat for Heating System Model TH135-01, 5 pages, Aug. 14, 2001.

Aube Technologies, TH140-28 Electronic Programmable Thermostat, Installation Instructions and User Guide, pp. 1-4, Jan. 22, 2004.

AutomatedBuildings.com Article—"Thin Client" Solutions, "Pressure, Air Flow, Temperature, Humidity & Valves," Dwyer Instruments, Inc., 5 pages, printed Sep. 20, 2004.

Blake et al., "Seng 310 Final Project Demo Program" Illustration, 3 pages, Apr. 6, 2001.

Blake et al., "Seng 310 Final Project" Report, dated Apr. 6, 2001.

Blister Pack Insert from a Ritetemp 8082 Touch Screen Thermostat Product, 2 pages, 2002.

Braeburn Model 3000 Owner's Manual, pp. 1-13, 2001.

Braeburn Model 5000 Owners Manual, pp. 1-17, 2001.

BRK Electronics Maximum Protection Plus Ultimate Convenience Smoke Alarm, 24 pages, Sep. 2000.

BRK First Alert, User's Manual, Smoke and Fire Alarms, pp. 1-7, Nov. 2002.

Business Wire, "MicroTouch Specialty Products Group to Capitalize on Growing Market for Low-Cost Digital Matrix Touchscreens," p1174 (2 pages), Jan. 6, 1999.

Cardio Manual, available at http://www.secant.ca/En/Documentation/Cardio2é-Manual.pdf, Cardio Home Automation Inc., 55 pages, printed Sep. 28, 2004.

Cardio, by Secant; http://www.hometoys.com/htinews/apr98/reviews/cardio.htm, "HTINews Review," Feb. 1998, 5 pages, printed Sep. 14, 2004.

Carrier Microelectronic Programmable Thermostat Owner's Manual, pp. 1-24, May 1994.

Carrier TSTATCCRF01 Programmable Digital Tehrmostat, pp. 1-21, prior to Apr. 21, 2005.

Carrier, "Programmable Dual Fuel Thermostat," Installation, Start-Up & Operating Instructions, pp. 1-12, Oct. 1998.

Carrier, "Programmable Thermostats," Installation, Start-Up & Operating Instructions, pp. 1-16, Sep. 1998.

Carrier, "Standard Programmable Thermostat," Homeowner's Manual, pp. 1-8 pages, 1998.

Carrier, "Thermidistat Control," Installation, Start-Up, and Operating Instructions, pp. 1-12, Aug. 1999.

CorAccess, "Companion 6," User Guide, pp. 1-20, Jun. 17, 2002.

Danfoss RT51/51RF & RT52/52RF User Instructions, 2 pages, Jun. 2004.

DeKoven et al., "Designing Collaboration in Consumer Products," 2 pages, 2001.

DeKoven et al., "Measuring Task Models in Designing Intelligent Products," 2 pages, Jan. 13-16, 2002.

Domotique Secant Home Automation—Web Page, available at http://www.secant.ca/En/Company/Default.asp, 1 page, printed Sep. 28, 2004.

Firex Smoke Alarm, Ionization Models AD, ADC Photoelectric Model Pad, 4 pages, prior to Apr. 21, 2005.

Freudenthal et al., "Communication extensive smart home functionality to users of all ages: the design of a mixed-initiative multimodal thermostat-interface," pp. 34-39, Mar. 12-13, 2001.

Gentex Corporation, HD135, 135° Fixed Temperature Heat Detector AC Pwered, 120V, 60Hz With Battery Backup, Installation Instructions—Owner's Information, pp. 1-5, Jun. 1, 1998.

Gentex Corporation, 9000 Series, Photoelectric Type Single Station/Multi-Station Smoke Alarms AC Powered With Battery Backup, Installation Instructions—Owner's Information, pp. 9-1 to 9-6, Jan. 1, 1993.

Honeywell Brivis Deluxe Programmable Thermostat, pp. 1-20, 2002.

Honeywell Brivis T8602C Chronotherm IV Deluxe Programmable Thermostats, Installation Instructions, pp. 1-12, 2002.

Honeywell CT8602C Professional Fuel Saver Thermostat, pp. 1-6, 1995.

Honeywell Electronic Programmable Thermostat, Owner's Guide, pp. 1-20, 2003.

Honeywell Electronic Programmable Thermostats, Installation Instructions, pp. 1-8, 2003.

Honeywell News Release, "Honeywell's New Sysnet Facilities Integration System for Boiler Plant and Combustion Safety Processes," 4 pages, Dec. 15, 1995.

Honeywell T8002 Programmable Thermostat, Installation Instructions, pp. 1-8, 2002.

Honeywell T8602A,B,C,D and TS8602A,C Chronotherm III Fuel Saver Thermostats, Installation Instructions, pp. 1-12, 1995.

Honeywell T8602D Chronotherm IV Deluxe Programmable Thermostats, Installation Instructions, pp. 1-12, 2002.

Honeywell TH8000 Series Programmable Thermostats, Owner's Guide, pp. 1-44, 2004.

Honeywell, "Introduction of the S7350A Honeywell WebPAD Information Appliance," Home and Building Control Bulletin, 2 pages, Aug. 29, 2000; Picture of WebPad Device with touch screen, 1 Page; and screen shots of WebPad Device, 4 pages.

Honeywell, "W7006A Home Controller Gateway User Guide," 31 pages, Jul. 2001.

Honeywell, MagicStat® CT3200 Programmable Thermostat, Installation and Programming Instructions, pp. 1-24, 2001.

http://www.cc.gatech.edu/computing/classes/cs6751_94_fall/groupc/climate-2/node1.html, "Contents," 53 pages, printed Sep. 20, 2004.

http://www.ritetemp.info/rtMenu_13.html, Rite Temp 8082, 8 pages, printed Jun. 20, 2003.

http://www.thermostatsales.com, Robertshaw, "9610 Digital Programmable Thermostat," 3 pages, printed Jun. 17, 2004.

http://www.thermostatsales.com, Robertshaw, "9700 Deluxe Programmable Thermostat" 3 pages, printed Jun. 17, 2004.

http://www.thermostatsales.com, Robertshaw, "9710 Deluxe Programmable Thermostat," 3 pages, printed Jun. 17, 2004.

http://www.thermostatsales.com, Robertshaw, "9720 Deluxe Programmable Thermostat," 3 pages, printed Jun. 17, 2004.

Hunter, "44200/44250," Owner's Manual, 32 pages, prior to Jul. 7, 2004.

Hunter, "44300/44350," Owner's Manual, 35 pages, prior to Jul. 7, 2004.

Hunter, "Auto Saver 550", Owner's Manual Model 44550, 44 pages, prior to Jul. 7, 2004.

Install Guide for Ritetemp Thermostat 8082, 6 pages, 2002.

Invensys™, "9700i 9701i 9715i 9720i Deluxe Programmable Thermostats," User's Manual, pp. 1-28, prior to Jul. 7, 2004.
Lux ELV1 Programmable Line Voltage Thermostat, Installation Instructions, 3 pages, prior to Jul. 7, 2004.
Lux TX500 Series Smart Temp Electronic Thermostat, 3 pages, prior to Jul. 7, 2004.
Lux TX9000 Installation, 3 pages, prior to Apr. 21, 2005.
Lux, "511 Series Smart Temp Electronic Thermostat," Owner's Manual, 3 pages, prior to Jul. 7, 2004.
Lux, "600 Series Smart Temp Electronic Thermostat," Owner's Manual, 3 pages, prior to Jul. 7, 2004.
Lux, "602 Series Multi-Stage Programmable Thermostat," Owner's Manual, 2 pages, prior to Jul. 7, 2004.
Lux, "605/2110 Series Programmable Heat Pump Thermostat," Owner's Manual, 3 pages, prior to Jul. 7, 2004.
Lux, "700/9000 Series Smart Temp Electronic Thermostat," Owner's Manual, 3 pages, prior to Jul. 7, 2004.
Lux, "PSPH521 Series Programmable Heat Pump Thermostat," Owner's Manual, 3 pages, prior to Jul. 7, 2004.
Lux, "TX1500 Series Smart Temp Electronic Thermostat," Owner's Manual, 6 pages, prior to Jul. 7, 2004.
METASYS, "HVAC PRO for Windows User's Manual," 308 pages, 1998.
Operation Manual for Ritetemp Touch Screen Thermostat 8082, 8 pages, 2002.
Proliphix, "Web Enabled IP Thermostats, Intelligent HVAC Control," Proliphix Inc., 2 pages, on or before Aug. 28, 2004.
Proliphix, "Web Enabled IP Thermostats, Ultimate in Energy Efficiency!," Proliphix Inc., 2 pages, on or before Aug. 28, 2004.
Proliphix, Inc., "NT10e & NT20e," 54 pages, on or before Aug. 30, 2005.
Quick Start Guide for Ritetemp Thermostat 8082, 1 page, 2002.
Remote Control Power Requirement for Ritetemp Thermostat 8082, 1 page, 2002.
Ritetemp Operation 8029, 3 pages, Jun. 19, 2002.
Ritetemp Operation 8050, 5 pages, Jun. 26, 2002.
Ritetemp Operation 8085, pp. 1-6, prior to Apr. 21, 2005.
Sealed Unit Parts Co., Inc., Supco & CTC Thermostats . . . loaded with features, designed for value!, 6 pages, prior to Apr. 21, 2005.
Totaline Model P474-1035 Owner's Manual Programmable 5-2 Day Digital Thermostat, pp. 1-21, Apr. 2003.
Totaline Star CPE230RF, Commercial Programmable Thermostat Wireless Transmitter, Owner's Manual, pp. 1-16, Oct. 1998.
Totaline Star P/N P474-0130 Non-Programmable Digital Thermostat Owner's Manual, pp. 1-22, prior to Apr. 21, 2005.
Totaline, "1 For All programmable Digital Thermostat," Owner's Manual P/N P374-1100FM, 23 pages, Nov. 1998.
Totaline, "1 For All Programmable Digital Thermostat," Owner's Manual P/N P474-1050, 21 pages, Nov. 1998.
Totaline, "1 For All Programmable Digital Thermostat," Owner's Manual P/N P374-1100, 24 pages, Apr. 2001.
Totaline, "Intellistat Combination Temperature and Humidity Control," Owner's Manual P/N P374-1600, 25 pages, Jun. 2001.
Totaline, "Programmable Thermostat Configurable for Advanced Heat Pump or Dual Fuel Operation," Owner's Manual P/N P374-1500, 24 pages, Jun. 1999.
Totaline, "Instructions P/N P474-1010", Manual, 2 pages, Dec. 1998.
Totaline, "Programmable Thermostat", Homeowner's Guide, 27 pages, Dec. 1998.
Trouble Shooting Guide for Ritetemp Thermostat 8082, 1 page, 2002.
Visor Handheld User Guide, 280 pages, Copyright 1999-2000.
Warmly Yours, "Model TH111GFCI-P (120 VAC)," Manual, pp. 1-4, prior to Jul. 7, 2004.
White-Rodgers 1F80-224 Programmable Electronic Digital Thermostat, Installation and Operation Instructions, 8 pages, prior to Apr. 21, 2005.
White-Rodgers Comfort-Set III Thermostat, pp. 1-44, prior to Jul. 7, 2004.
White-Rodgers Installation Instructions for Heating & Air Conditioning IF78 Non-Programmable Thermostat, 6 pages, prior to Apr. 21, 2005.
White-Rodgers Installation Instructions for Heating & Air Conditioning IF78 5/2 Day Programmable Thermostat, 7 pages, prior to Jul. 7, 2004.
White-Rodgers, "Installation Instructions for Heating & Air Conditioning IF72 5/2 Day Programmable Heat Pump Thermostat," 8 pages, prior to Jul. 7, 2004.
White-Rodgers, "Comfort-Set 90 Series Thermostat," Manual, pp. 1-24, prior to Jul. 7, 2004.
White-Rodgers, 1F80-240 "(for Heating Only systems) Programmable Electronic Digital Thermostat," Installation and Operation Instructions, 8 pages, prior to Jul. 7, 2004.
White-Rodgers, 1F80-241 "Programmable Electronic Digital Thermostat," Installation and Operation Instructions, 6 pages, prior to Jul. 7, 2004.
White-Rodgers, 1F80-261 "Programmable Electronic Digital Thermostat," Installation and Operation Instructions, 8 pages, prior to Jul. 7, 2004.
White-Rodgers, 1F81-261 "Programmable Electronic Digital Multi-Stage Thermostat," Installation and Operation Instructions, 8 pages, prior to Jul. 7, 2004.
White-Rodgers, 1F82-261 "Programmable Electronic Digital Heat Pump Thermostat," Installation and Operation Instructions, 8 pages, prior to Jul. 7, 2004.
White-Rodgers, Comfort-Set 90 Series Premium, 4 pages, prior to Apr. 21, 2005.
www.icmcontrols.com, Simplecomfort, SC3000 Single Stage Heat/Single Stage Cool or Single Stage Heat Pump/Manual Changeover, 1 page, prior to Jul. 7, 2004.
www.icmcontrols.com, Simplecomfort, SC3001 Single Stage Heat/Single Stage Cool or Single Stage Heat Pump/Manual Changeover, 1 page, prior to Jul. 7, 2004.
www.icmcontrols.com, Simplecomfort, SC3006 Single Stage Heat/Single Stage Cool or Single Stage Heat Pump/Manual Changeover, 1 page, prior to Jul. 7, 2004.
www.icmcontrols.com, Simplecomfort, SC3201 2 Stage Heat Pump Manual Changeover, 1 page, prior to Jul. 7, 2004.
www.icmcontrols.com, Simplecomfort, SC3801 2 Stage Heat/2 Stage Cool 2 Stage Heat Pump/Audio Changeover, 1 page, prior to Jul. 7, 2004.
Lennox, "Network Control Panel (NCP)," User's Manual, 18 pages, Nov. 1999.
AED Electronics, Inc., "Presenting Climatouch the Most Innovative Thermostat in the World!," 2 pages, prior to Nov. 30, 2007.
Climatouch, User Manual, Climatouch CT03TSB Thermostat, Climatouch CT03TSHB Thermostat with Humidity Control, Outdoor UHF Temperature Transmitter 217S31, 19 pages, printed Sep. 15, 2004.
Carrier, "Edge Performance Programmable Owner's Manual," 64 pages, 2007.
Lux, "9000RF Remote Instructions," 2 pages, prior to Nov. 30, 2007.
Totaline, "P/N P374-0431 Thermostat Remote Control and Receiver," Owner's Manual, 11 pages, prior to Nov. 30, 2007.
Totaline, "Wireless Remote Sensor, Model P474-0401-1RF/REC," 2 pages, prior to Nov. 30, 2007.
Totaline, "P474-1100RF, P474-1100REC Wireless Thermostat," 1 page, prior to Nov. 30, 2007.
Totaline, "Wireless Programmable Digital Thermostat," Owner's Manual P474-1100RF, 21 pages, 2000.
Honeywell, "Excel Building Supervisor-Integrated R7044 and FS90 Ver. 2.0," Operator Manual, 70 pages, Apr. 1995.
Trane, "System Programming, Tracer Summit Version 14, BMTW-SVP01D-EN," 623 pages, 2002.

* cited by examiner

HVAC CONTROLLER THAT SELECTIVELY REPLACES OPERATING INFORMATION ON A DISPLAY WITH SYSTEM STATUS INFORMATION

PRIORITY

This application claims priority under 35 U.S.C. §119 to U.S. Provisional Application having Ser. No. 60/991,626 entitled "HVAC CONTROLLER" filed Nov. 30, 2007, the entirety of which is incorporated herein by reference.

TECHNICAL FIELD

The disclosure relates generally to HVAC controllers.

BACKGROUND

Heating, ventilation, and/or air conditioning (HVAC) systems are often used to control the comfort level within a building or other structure. Many HVAC controllers include a controller that activates and deactivates one or more HVAC components of the HVAC system to affect and control one or more environmental conditions within the building. These environmental conditions can include, but are not limited to, temperature, humidity, and/or ventilation. In many cases, such HVAC controller may include, or have access to, one or more sensors, and may use parameters provided by the one or more sensors to control the one or more HVAC components to achieve desired programmed or set environmental conditions. Because of the increased complexity of such modern HVAC controllers, programming and/or operating such devices can be considered difficult and/or confusing, particularly for novice and/or non-technical users. Thus, there is a need for HVAC controllers that are more intuitive and user friendly to program and operate.

SUMMARY

This disclosure relates to HVAC controllers that are configured to be more intuitive and user friendly to program and operate. In some instances, the disclosure relates to HVAC controllers that include a touch screen interface that provides greater flexibility in displaying information to the user and/or soliciting information from the user, although this is not required.

The above summary is not intended to describe each and every disclosed embodiment or every implementation of the disclosure. The Description that follows more particularly exemplifies the various illustrative embodiments.

BRIEF DESCRIPTION OF THE FIGURES

The following description should be read with reference to the drawings, in which like elements in different drawings are numbered in like fashion. The drawings, which are not necessarily to scale, depict selected embodiments and are not intended to limit the scope of the disclosure. The disclosure may be more completely understood in consideration of the following detailed description of various embodiments in connection with the accompanying drawings, in which.

Figure 1:
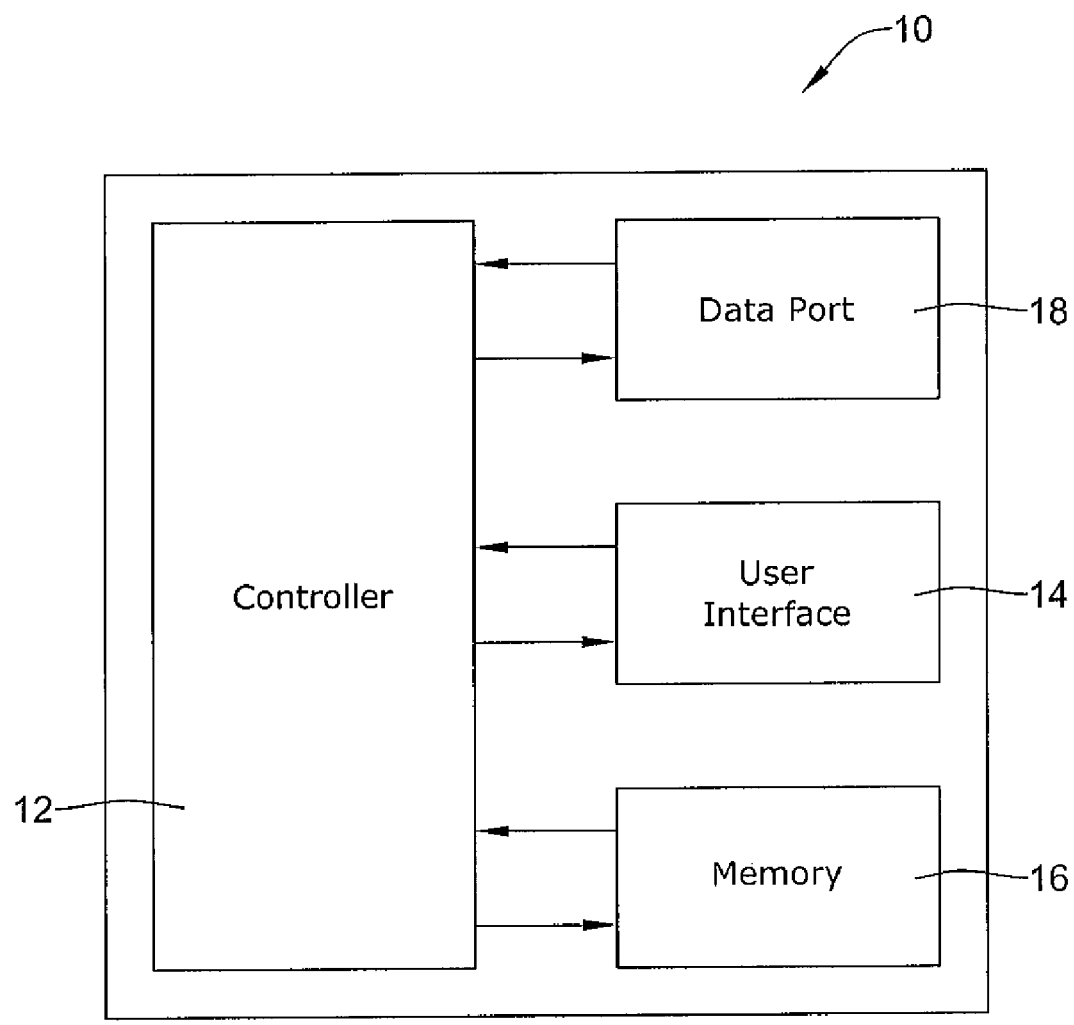
FIG. 1 is a schematic view of an illustrative but non-limiting HVAC controller.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DESCRIPTION

Generally, the disclosure pertains to simplified interfaces for controllers having programming capabilities. These controllers can be used in a variety of systems such as, for example, HVAC systems, water heater systems, water softener systems, sprinkler systems, security systems, lighting systems, and the like. The Figures depict HVAC controllers. While the present invention is not so limited, an appreciation of various aspects of the invention will be gained through a discussion of the examples provided below.

FIG. 1 is a schematic view of an illustrative HVAC controller 10. In some cases, HVAC controller 10 may be considered to be a thermostat, but this is not required. HVAC controller 10 includes a processor or controller 12 and a user interface 14. Controller 12 may be adapted to operate in accordance with an algorithm that controls or at least partially controls one or more components of an HVAC system. In some instances, the algorithm may include a number of operating parameters. Examples of components that may be controlled by controller 12 include one or more of a furnace, a boiler for hot water heat or steam heat, a heat pump, an air conditioning unit, a humidifier, a dehumidifier, an air exchanger, an air cleaner, and the like. Controller 12 may, for example, operate in accordance with an algorithm that provides temperature set points, starting and/or ending times, and the like.

User interface 14 may be any suitable interface that permits controller 12 to display and/or solicit information as well as permitting a user to enter data such as temperature set points, humidity set points, starting times, ending times, and the like. In some cases, user interface 14 may include a display and a distinct keypad. A display may be any suitable alphanumeric display. In some instances, a display may include or may be a liquid crystal display (LCD). If desired, user interface 14 may be a touch screen LCD panel that functions as both display and keypad. In some instances, a touch screen LCD panel may be adapted to solicit values for a number of operating parameters and/or to receive said values.

HVAC controller 10 may include a memory block 16 that may be considered as being electrically connected to controller 12. Memory block 16 may be used to store any desired information, such as the aforementioned control algorithm, set points, and the like. Controller 12 may store information within memory block 16 and may subsequently retrieve the stored information. Memory block 16 may be any suitable type of storage device, such as RAM, ROM, EPROM, a flash drive, a hard drive, and the like.

In some cases, as illustrated, HVAC controller 10 may include a data port 18. Data port 18 may be configured to communicate with controller 12 and may, if desired, be used to either upload information to controller 12 or to download information from controller 12. Information that can be uploaded or downloaded may include values of operating parameters. In some instances, data port 18 may be used to upload a previously-created thermostat configuration into HVAC controller 10, thereby hastening the programming process. In some cases, data port 18 may be used to download a thermostat configuration that has been created using HVAC controller 10, so that the thermostat configuration may be used in other thermostats. In some cases, data port 18 may be used to upload and/or download information pertaining to an HVAC dealer or contractor.

Data port 18 may be a wireless port such as a Bluetooth™ port or any other wireless protocol. In some cases, data port 18 may be a wired port such as a serial port, a parallel port, a CAT5 port, a USB (universal serial bus) port, or the like. In some instances, data port 18 may be a USB port and may be used to download and/or upload information from a USB flash drive. Other storage devices may also be employed, as desired.

Figure 2:
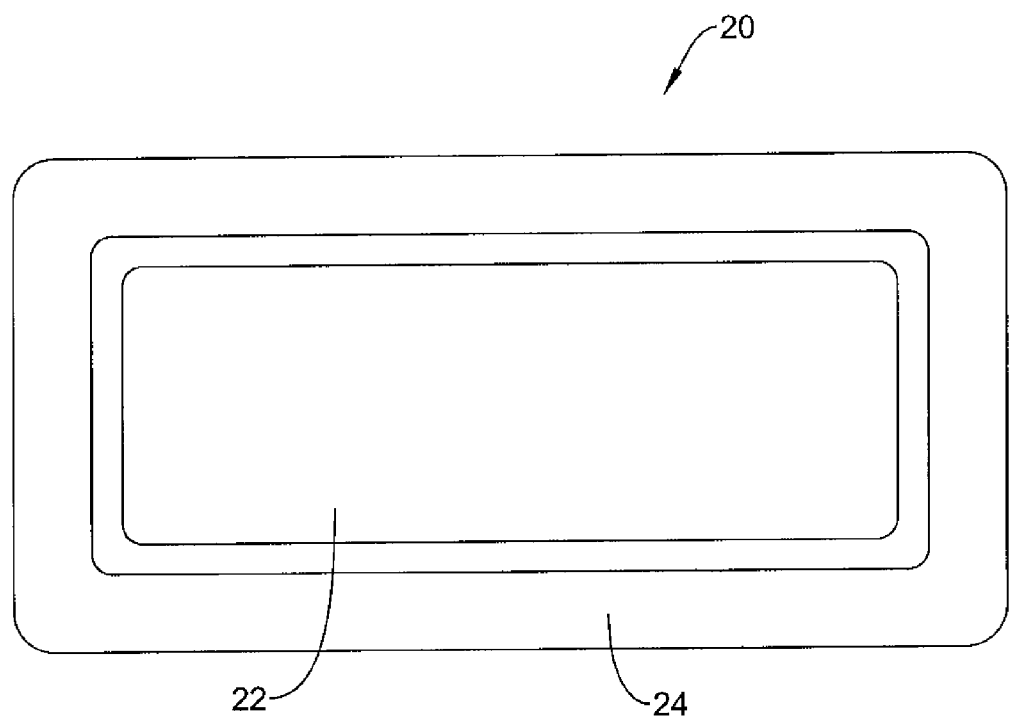
FIG. 2 is a front view of an illustrative but non-limiting HVAC controller.

FIG. 2 is a front view of an illustrative HVAC controller 20. In some cases, HVAC controller 20 may represent a manifestation of HVAC controller 10 (FIG. 1), but this is not required. HVAC controller 20 includes a display 22 that is disposed within a housing 24. In some cases, display 22 may be a touch screen LCD display. If desired, display 22 may be a dot matrix touch screen LCD display. A dot matrix touch screen LCD display is a touch screen LCD that permits images such as letters, numbers, graphics, and the like to be displayed anywhere on the LCD, rather than being confined to predetermined locations such as is the case with a fixed segment LCD. Housing 24 may be formed of any suitable material, such as a polymeric material.

In some cases, HVAC controller 20 may be configured to provide substantial display and/or programming functionality. FIGS. 3 through 15 provide examples of home screens that may be displayed by HVAC controller 20. In some cases, home screens may include screens that can be accessed by a top level navigational menu. In some cases, a home screen may be a screen that is displayed by HVAC controller 20 as a default display, or when no other data entry is underway. A home screen may, if desired, display one or more parameters relating to environmental conditions such as indoor and/or outdoor temperature and/or humidity, expected weather conditions, and/or the status of any equipment that is at least partially controlled by HVAC controller 20.

Figure 3:
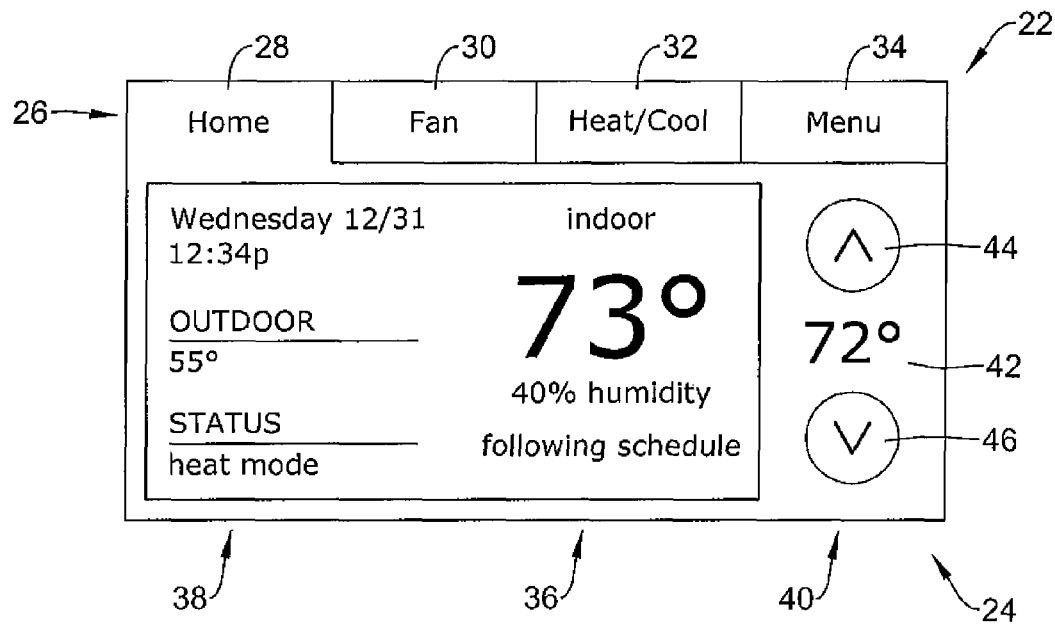
FIGS. 3 through 17 provide illustrative but non-limiting examples of home screens that may be displayed upon the HVAC controllers of FIGS. 1 and 2.

In FIG. 3, HVAC controller 20 is displaying on display 22 a home screen 24 that includes a navigational bar 26 that may be considered as providing top level navigation. In some cases, if desired, navigation bar 26 may include one or more of a HOME button 28, a FAN button 30, a HEAT/COOL button 32 and/or a MENU button 34. The function of each button within navigational bar 26 will be demonstrated, in turn. FIG. 3 is an example of a screen that may be displayed after a user has pushed HOME button 28.

In some cases, home screen 24 may be considered as having two or more regions. For example, home screen 24 may include a first region 36 and a second region 38. In some instances, first region 36 may be considered as displaying or otherwise providing primary information while second region 38 may be considered as displaying or otherwise providing secondary information. In some cases, primary information may be information that is considered to be more important, more interesting and/or more useful than secondary information. To illustrate, first region 36 may display one or more of a current temperature reading, a current indoor humidity, a schedule status, and the like. Second region 38 may display one or more of a date and time, an outdoor temperature reading, an outdoor humidity reading, an equipment status, and the like.

Home screen 24 may also include a third region 40 that may be used for displaying and/or adjusting a parameter value such as a parameter that is displayed within first region 36 of home screen 24. In some cases, for example, third region 40 may include a parameter 42, an up arrow 44 and a down arrow 46. The value of parameter 42 may be increased or decreased using, as necessary, up arrow 44 and/or down arrow 46.

As illustrated, second region 38 may refer to a left-hand section of home screen 24, third region 40 may refer to a right-hand section of home screen 24 and first region 36 may refer to a center section of home screen 24 that is between second region 38 and third region 40. In some instances, however, one or more of first region 36, second region 38 and/or third region 40 may instead be aligned vertically above or below the other regions within home screen 24, as desired.

Figure 4:
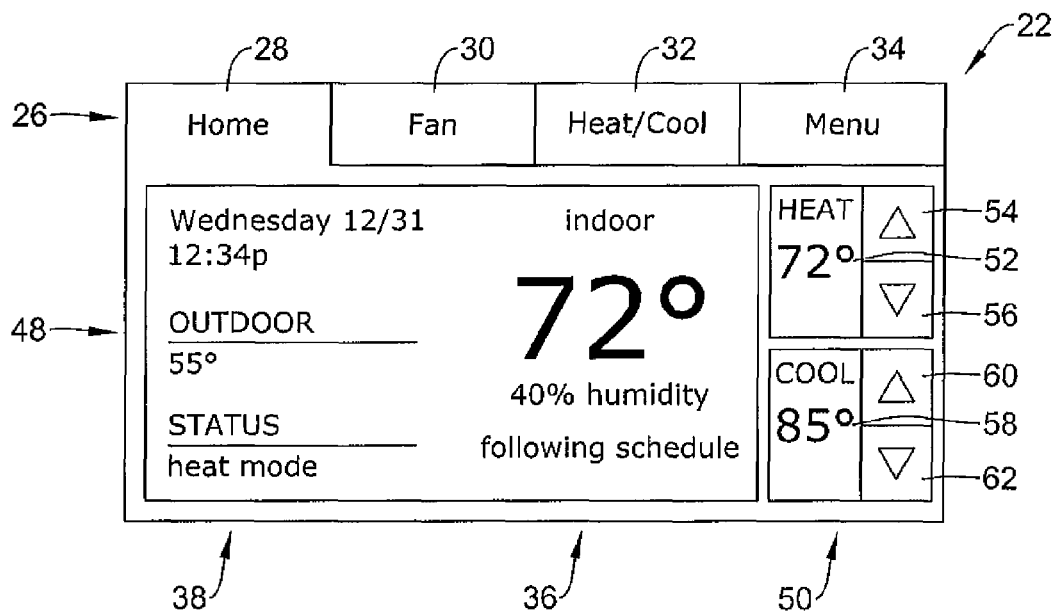

In FIG. 4, HVAC controller 20 is displaying on display 22 a home screen 48 that is similar in many ways to home screen 24 (FIG. 3). Home screen 48, however, includes a third region 50 that may be used to display and/or adjust two different parameter values. For example, third region 50 may, as illustrated, display both a heating temperature set point and a cooling temperature set point, but this is not required. Third region 50 may include a first parameter 52, a first up arrow 54 and a first down arrow 56. Third region 50 may include a second parameter 58, a second up arrow 60 and a second down arrow 62. First parameter 52 may be adjusted up or down using first up arrow 54 and/or first down arrow 56, as appropriate. Second parameter 58 may be adjusted up or down using second up arrow 60 and/or second down arrow 62, as desired.

Figure 5:
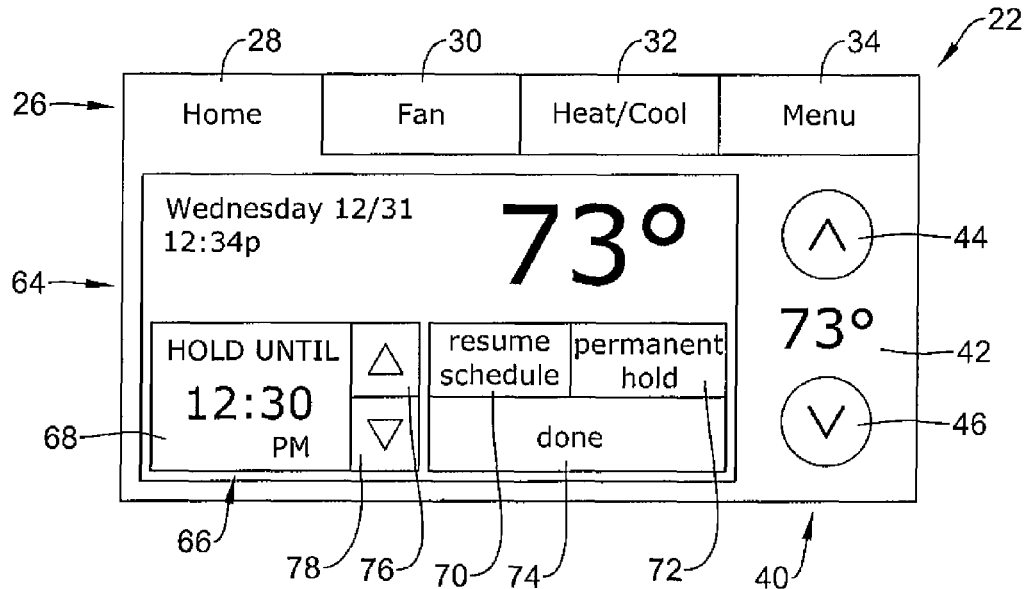

In some instances, pressing up arrow 44 and/or down arrow 46 (FIG. 3) may cause HVAC controller 20 to display on display 22 a home screen 64 as shown in FIG. 5. Home screen 64 may, as illustrated, include a hold bar 66 that is displayed along a portion of display 22. Hold bar 66 may include one or more of an adjustable time button 68, a resume schedule button 70, a permanent hold button 72 and a done button 74. The adjustable time button 68 may include an up arrow 76 and a down arrow 78. A user may adjust an ending time for a temperature hold by pressing up arrow 76 and/or down arrow 78, as appropriate. If a user changes their mind, and wishes to instead return to the programmed schedule, they may do so simply by pressing resume schedule button 70. Once they have adjusted the ending time as desired, they may press done button 74.

Figure 6:
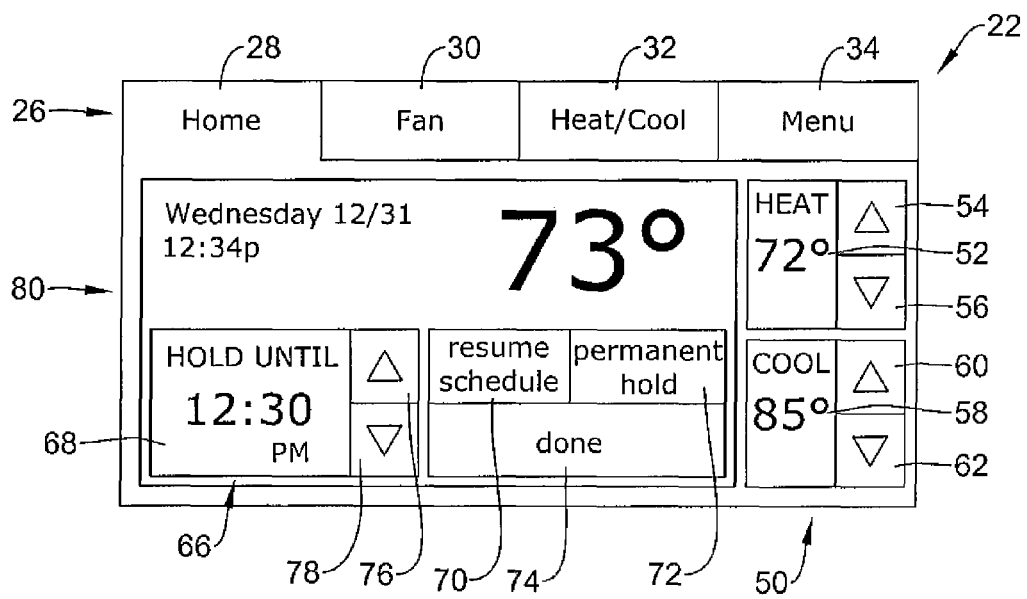

FIG. 6 is similar to FIG. 5, but includes third region 50 as originally discussed with respect to FIG. 4. FIG. 6 shows a home screen 80 that might be displayed by HVAC controller if a user has pressed or one or more of first up arrow 54, first down arrow 56, second up arrow 60 and/or second down arrow 62 to adjust a temperature set point.

Figure 7:
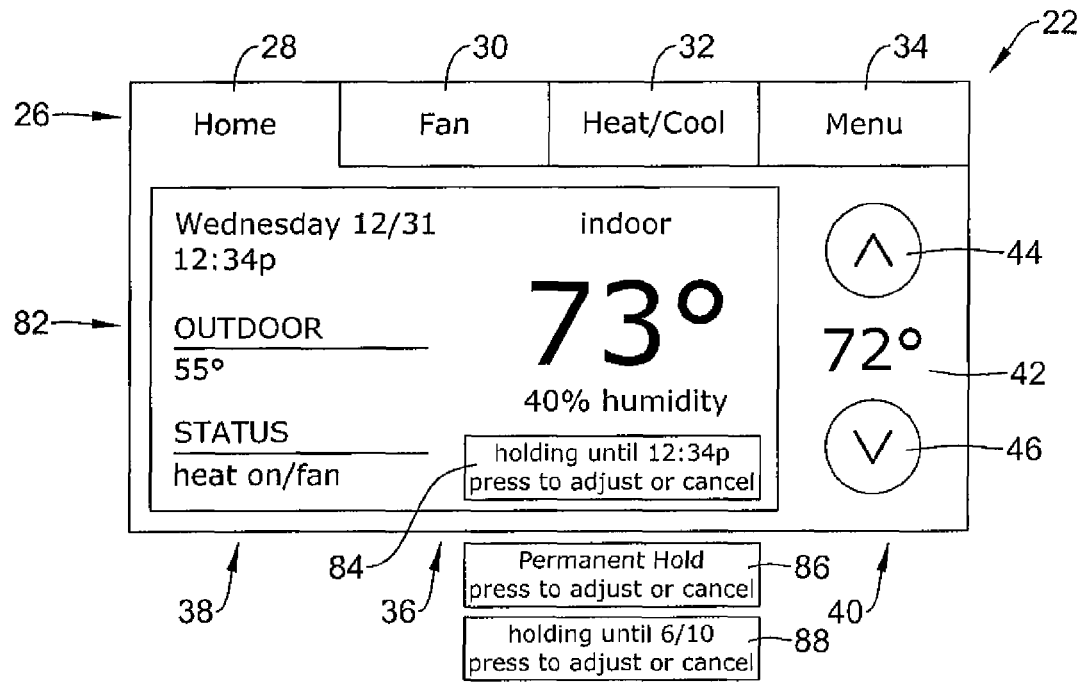

Returning briefly to FIG. 5, if a user presses done button 74, HVAC controller 20 may display on display 22 a home screen 82, as shown in FIG. 7. Home screen 82 may include first region 36, second region 38 and third region 40 as discussed with respect to FIG. 3. However, first region 36 may include a hold status button 84 that displays an ending time for the temporary temperature schedule as well as providing the user with a way to adjust the temporary temperature schedule. If the user had instead pressed permanent hold button 72 (FIG. 5), HVAC controller 22 may instead display a permanent hold status button 86 in place of hold status button 84. In some cases, HVAC controller 20 may permit a user to set a temporary temperature schedule that lasts longer than 24 hours and thus HVAC controller 20 may instead display a hold status button 88 in place of hold status button 84 or permanent hold status button 86.

Figure 8:
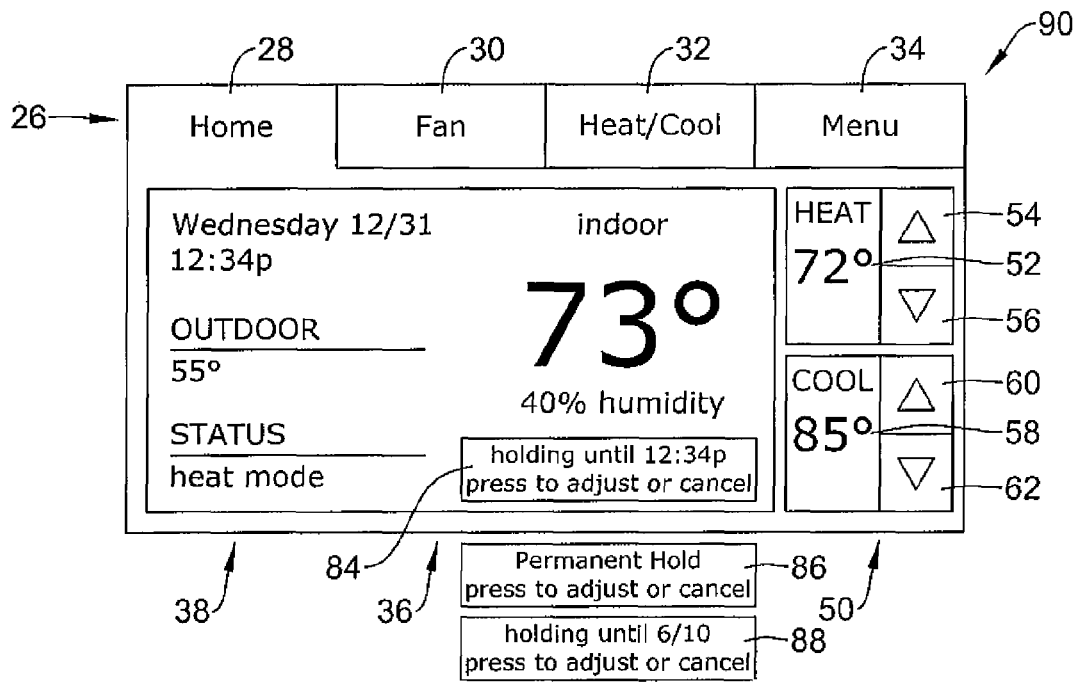

FIG. 8 is similar to FIG. 7, but includes third region 50 as originally discussed with respect to FIG. 4. FIG. 8 shows a home screen 90 that might be displayed by HVAC controller if a user has pressed or one or more of first up arrow 54, first down arrow 56, second up arrow 60 and/or second down arrow 62 to adjust a temperature set point.

Figure 9:
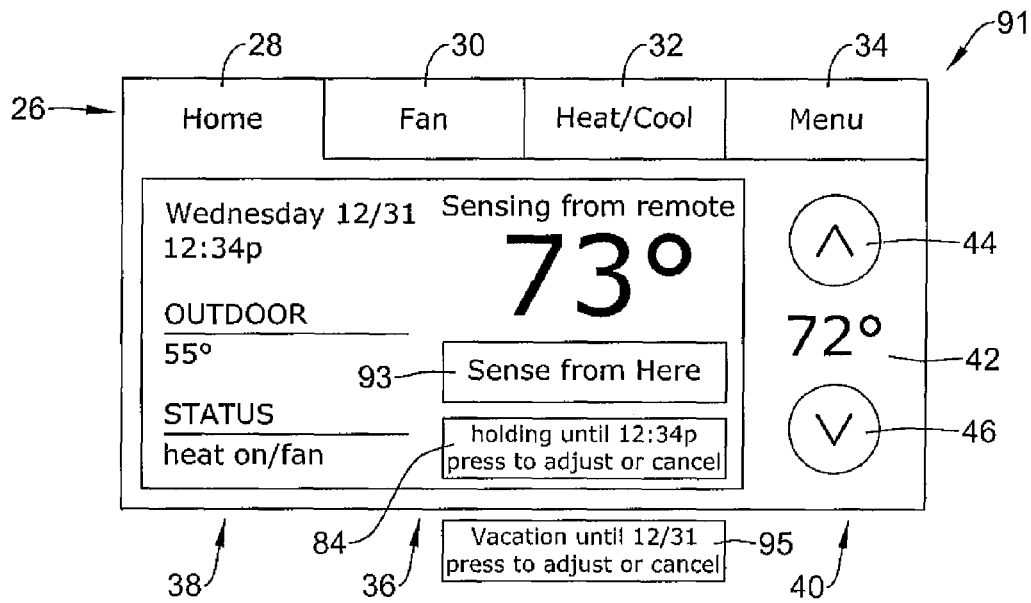

FIG. 9 shows an illustrative home screen 91 that in some ways is similar to home screen 82 (FIG. 7), but accounts for HVAC controller 20 cooperating with a remote control. One such remote control is described in U.S. Provisional Patent Application No. 60/991,674 filed Nov. 30, 2007, entitled "REMOTE CONTROL UNIT FOR HVAC SYSTEM", which application is hereby incorporated by reference herein. In some cases, a remote control may be used to control one or more of a variety of different functions of HVAC controller 20. In some instances, for example, HVAC controller 20 may be configured to either sense ambient temperature at HVAC controller 20 using an internal thermal sensor and/or to use a temperature reading from a thermal sensor that may be present within the remote control.

Home screen 91 as illustrated shows that HVAC controller 20 is using a temperature reading from the remote control, as indicated by the text "Sensing from remote" displayed within first region 36 of display 22. An individual may instead wish to instruct HVAC controller 20 to use the internal thermal sensor (or a remote sensor located near HVAC controller 20 and communicating wirelessly therewith). A Sense from Here button 93 provides the individual with the opportunity to instruct HVAC controller 20 to use its internal thermal sensor. In some cases, if HVAC controller 20 is using its own thermal sensor, home screen 91 may include a "Sense from Remote" button (not illustrated) and/or the remote control may include a button that permits the homeowner to instead sense the temperature from the remote. A Vacation button 95, as will be discussed further with respect to subsequent Figures, permits a homeowner to view and/or modify temporary vacation-related scheduling.

In some instances, HVAC controller 20 may display a first image within first region 36 of display 22 and a second image within second region 38. The first image may include a first set of information while the second image may include a second set of information. A third image that may include information pertaining to one or more HVAC system status conditions may temporarily replace the second image otherwise displayed within second region 38. In some instances, the first image, the second image and the third image may all be displayed on a home screen. In some cases, displaying the third image in place of the second image may not impact the display of the first image.

In some cases, the first set of information displayed within first region 36 may include current indoor temperature, a temperature set point, an indoor humidity reading and schedule information. The second information displayed within second region 38 may, for example, include one or more of date, a time, an equipment status and an outdoor weather parameter. HVAC controller 20 may, for example, replace the second image with the third image when HVAC controller 30 detects the occurrence of one or more system status events or conditions.

Figure 10:
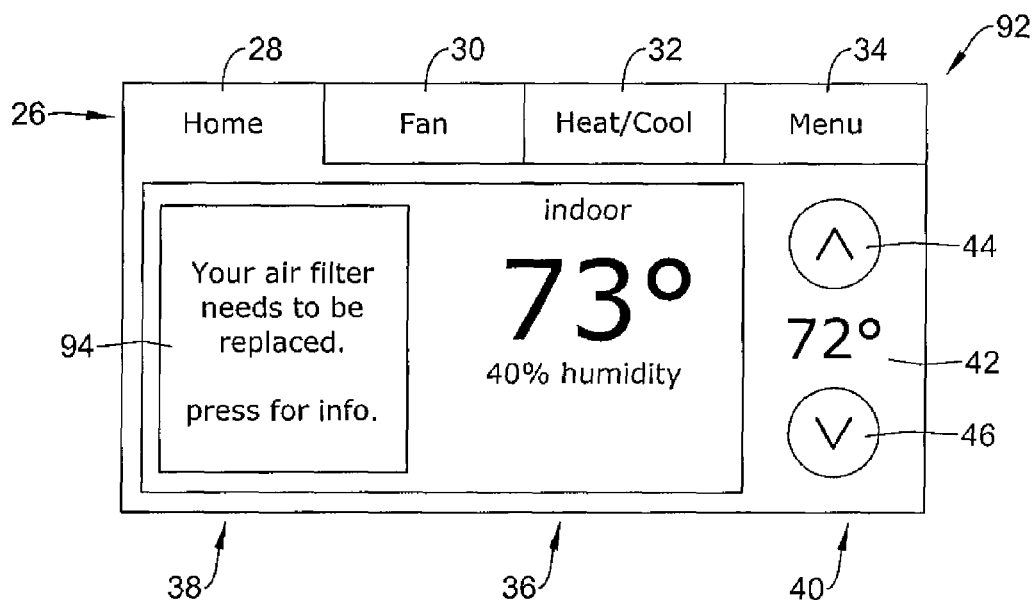

In some instances, HVAC controller 20 may provide messages such as informational messages, equipment status messages, and the like upon at least part of display 22, particularly if home button 28 has been pressed or otherwise chosen or is automatically displayed after, for example, no user interaction is sensed for a period of time (e.g. thirty seconds). FIG. 10 provides an illustrative home screen 92 that includes an information button 94. As illustrated, information button 94 may be displayed within second region 38 and as such does not interfere or otherwise eliminate any information displayed within first region 36.

Home screen 92 includes third region 40 as discussed with respect to FIGS. 3, 5 and 7.

Figure 11:
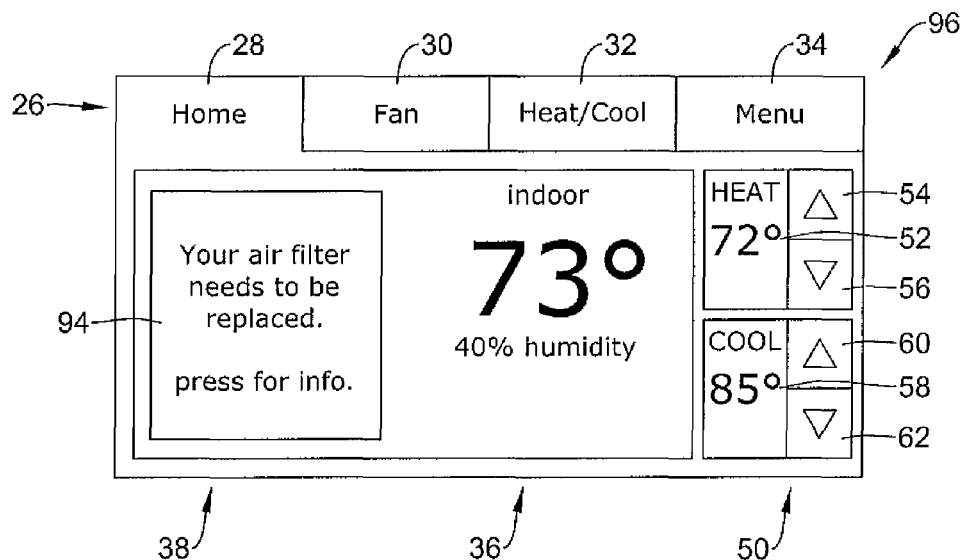

FIG. 11 provides a home screen 96 that includes information button 94 displayed within second region 38, but includes third region 50 as discussed previously with respect to FIGS. 4, 6 and 8. In either case, pressing information button 94 may cause HVAC controller 20 to display further information pertaining to the shorter message displayed within information button 94.

Information button 94 may provide a variety of equipment status messages. An example includes "Your air filter needs to be replaced." Other examples may pertain to humidifier pad replacement, UV light replacement, and other furnace and/or A/C service schedules as appropriate, depending on installed equipment options. FIGS. 10 and 11 show information button 94 displaying the aforementioned message regarding air filter replacement. In some cases, pressing information button 94 (either in FIG. 10 or FIG. 11) will cause HVAC controller 20 to display a screen 100, as shown in FIG. 12.

Figure 12:
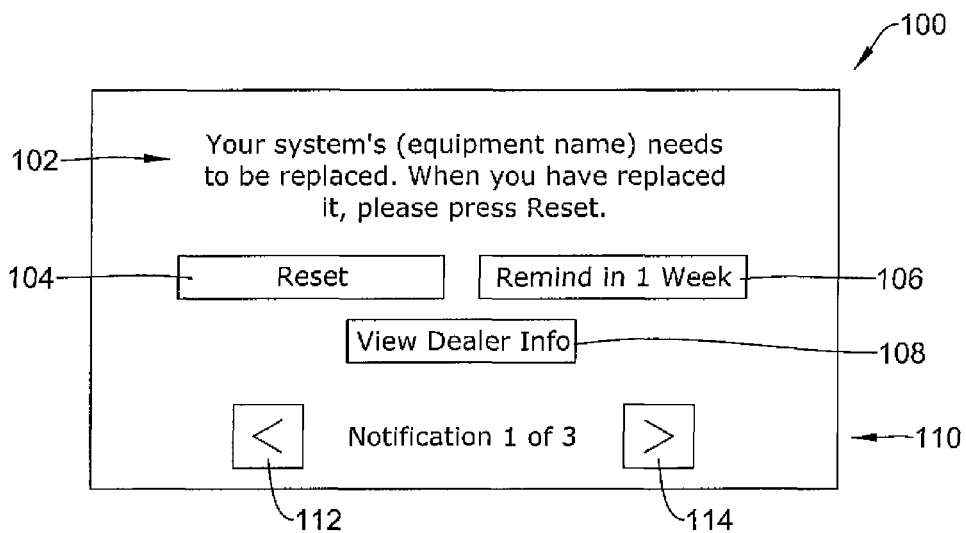

In FIG. 12, screen 100 includes further information pertaining to the equipment status message included on information button 94. Screen 100 includes text 102 that provides the homeowner with information regarding what needs to be done and/or how to do it. As illustrated, text 102 says "Your system's (equipment name) (e.g. air filter) needs to be replaced. When you have replaced it, please press Reset." HVAC controller 20 may fill in the appropriate equipment name, and sometimes provide the appropriate model number and/or appropriate information. The appropriate equipment name, model number and/or other information may reference a current value of a variable that is embedded within the information message, if desired.

Screen 100 includes a Reset button 104, which may be pressed once the appropriate equipment has in fact been replaced. In some cases, home screen 100 may include a Reminder button 106 that provides the homeowner with a period of time sufficient to address the particular issue. For example, Reminder button 106 may temporarily satisfy HVAC controller 20 for a period of time long enough for the homeowner to go to the store and buy the appropriate replacement item such as a new air filter, a new humidifier pad, or the like.

In some cases, home screen 100 may also include a Dealer button 108. When HVAC controller 20 is initially installed, the installer may, if desired and as will be discussed with respect to subsequent Figures, enter information identifying the HVAC contractor. By pressing Dealer button 108, the homeowner may, for example, be provided with a telephone number or email address for the HVAC contractor and thus the homeowner may simply call the HVAC contractor either to order the appropriate replacement item and/or to request that the contractor resolve the issue by obtaining and installing the appropriate replacement item.

In some cases, a "Service Request" button may be provided that sends a message to the identified contractor and requests the contractor to address the issue. HVAC controller 20 may contact the contractor by email message, text message, or the like. The message may, for example, include appropriate part numbers or other diagnostic information so that the contractor can bring the appropriate parts and/or equipment. Of course, HVAC controller 20 would have to be provided with telephone or other Internet access in order to provide this functionality.

In some cases, HVAC controller 20 may have more than one message to display. In these instances, information button 94 may instead display a message such as "There are multiple messages." or something to that effect. In some cases, screen 100 may include a scroll bar 110 or the like that provides information pertaining to how many messages are waiting as well as providing scroll buttons 112 and 114 so that the homeowner or HVAC contractor may scroll through the messages. If there is only one message to display, scroll bar 110 may not be displayed.

In some instances, and as illustrated with respect to subsequent Figures, HVAC controller 20 may display a help button that, if pressed, may cause HVAC controller 20 to display one or more context sensitive help screens that may provide the user with information that is pertinent to one or more displayed operating parameters. In some cases, the help screen may temporarily replace whatever information was being displayed. The help screens, if displayed, may include information pertaining to, for example, operating parameters such as circulating fan operation, system operation, scheduling, humidification and/or dehumidification settings, ventilation settings, maintenance reminders, equipment settings, and the like. In some cases, the help screen may include current values of one or more variables embedded within the help screen message, if desired. The information that is displayed may be context sensitive or dependent upon the operating and/or programming steps that are currently being undertaken by the user.

Figure 13:
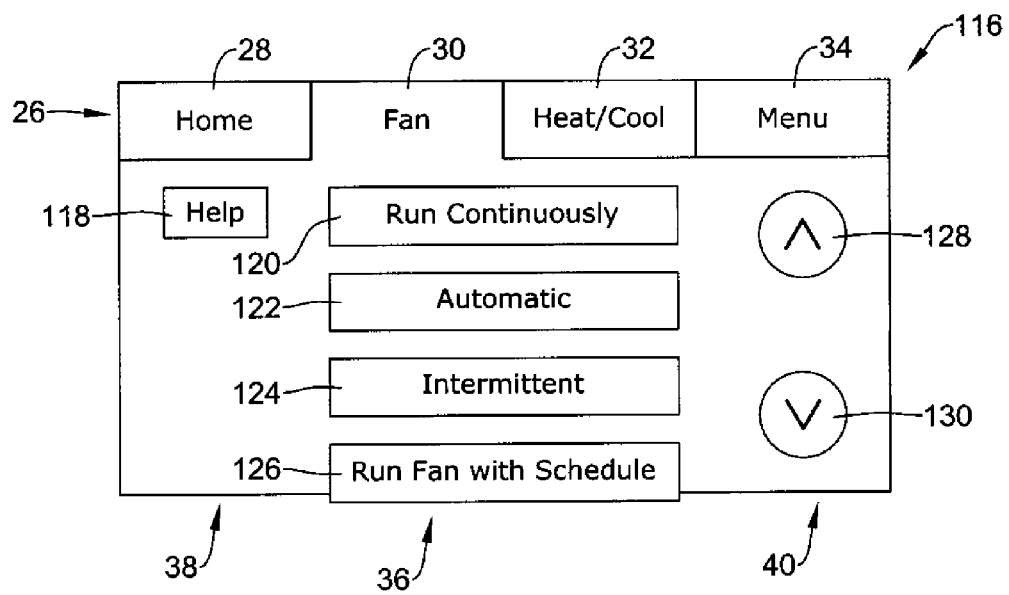

FIG. 13 provides an illustrative home screen 116 that may be displayed if Fan button 30 is pressed. In some cases, a Help button 118 may be displayed within second region 38. By pressing Help button 118, a homeowner or other individual may obtain additional information regarding the choices they are being asked to make. First region 36 may include one or more fan buttons that can be pressed to instruct HVAC controller 20 how to operate the fan present within the HVAC equipment. The fan buttons may include, for example, one or more of a Run Continuously button 120, an Automatic button 122, an Intermittent button 124 and/or a Run Fan with Schedule button 126. As there may be more fan buttons than can be displayed at one time within first region 36, third region 40 may include an up scroll button 128 and a down scroll button 130 in order to scroll through the available fan buttons.

Figure 14:
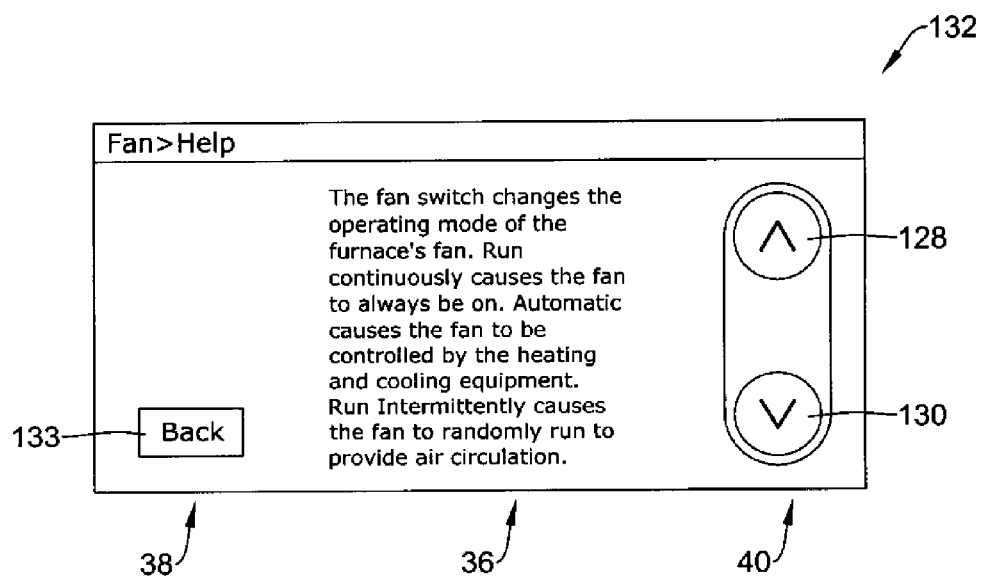

FIG. 14 provides an illustrative help screen 132 that may be provided by HVAC controller 20 if a homeowner or other individual presses Help button 118 within home screen 116 (FIG. 13). Second region 38 may include a Back button 133 that permits an individual to return to the previous screen (e.g. FIG. 13) once they have read and understood the information provided within help screen 132. First region 36 includes textual information providing the individual with information pertaining to the fan choices presented within home screen 116. Third region 40 includes up scroll button 128 and down scroll button 130 in order to scroll up and down through the text provided within first region 36, if necessary.

Figure 15:
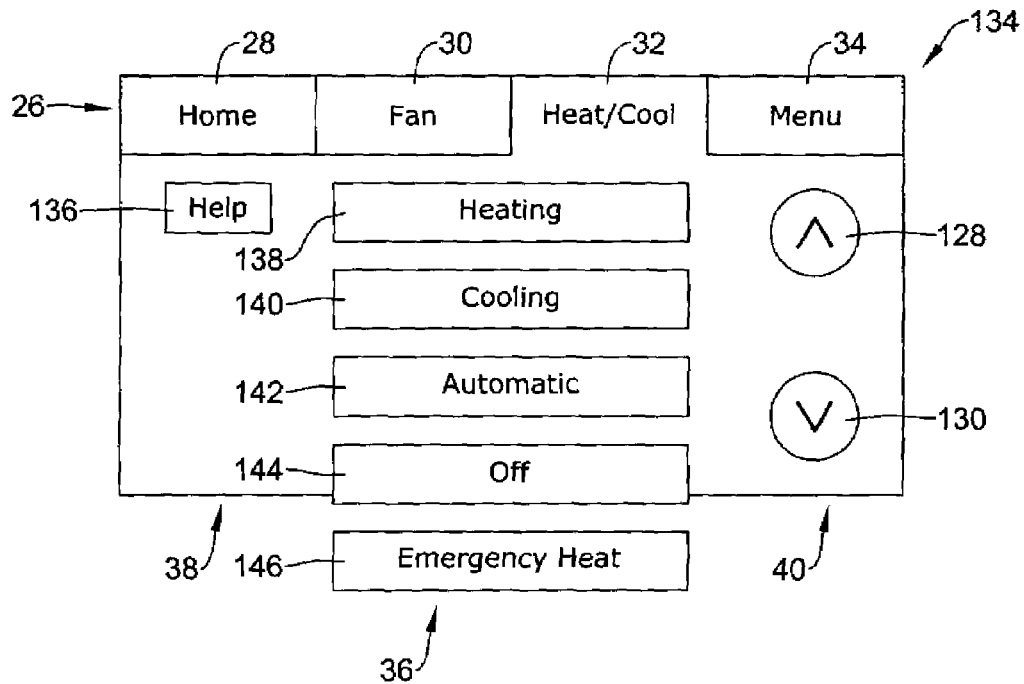

FIG. 15 provides an illustrative home screen 134 that may be displayed if Heat/Cool button 32 is pressed. In some cases, a Help button 136 may be displayed within second region 38. By pressing Help button 136, a homeowner or other individual may obtain additional information regarding the choices they are being asked to make. First region 36 may include one or more selection buttons that can be pressed to instruct HVAC controller 20 how to operate the HVAC equipment. The selection buttons may include, for example, one or more of a Heating button 138, a Cooling button 140, an Automatic button 142, an Off button 144 and/or an Emergency Heat button 146. As there may be more selection buttons than can be displayed at one time within second region 38, third region 40 may include an up scroll button 128 and a down scroll button 130 in order to scroll through the available selection buttons.

Figure 16:
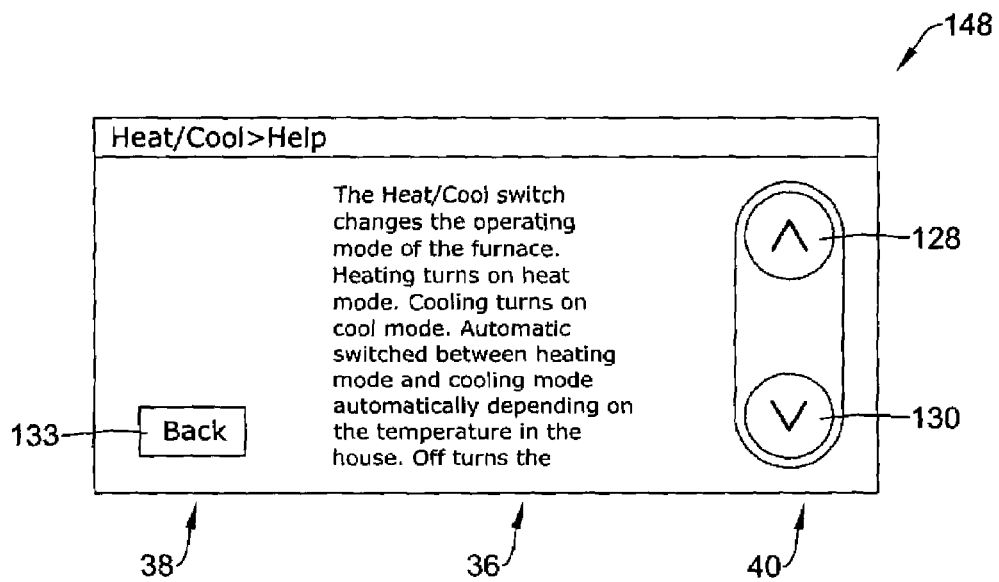

FIG. 16 provides an illustrative help screen 148 that may be provided by HVAC controller 20 if a homeowner or other individual presses Help button 136 within home screen 134 (FIG. 15). Second region 38 may include a Back button 133 that permits an individual to return to the previous screen (e.g. FIG. 15) once they have read and understood the information provided within help screen 132. First region 36 includes textual information providing the individual with information pertaining to the selection choices presented within home screen 116. Third region 40 includes up scroll button 128 and down scroll button 130 in order to scroll up and down through the displayed text.

Figure 17:
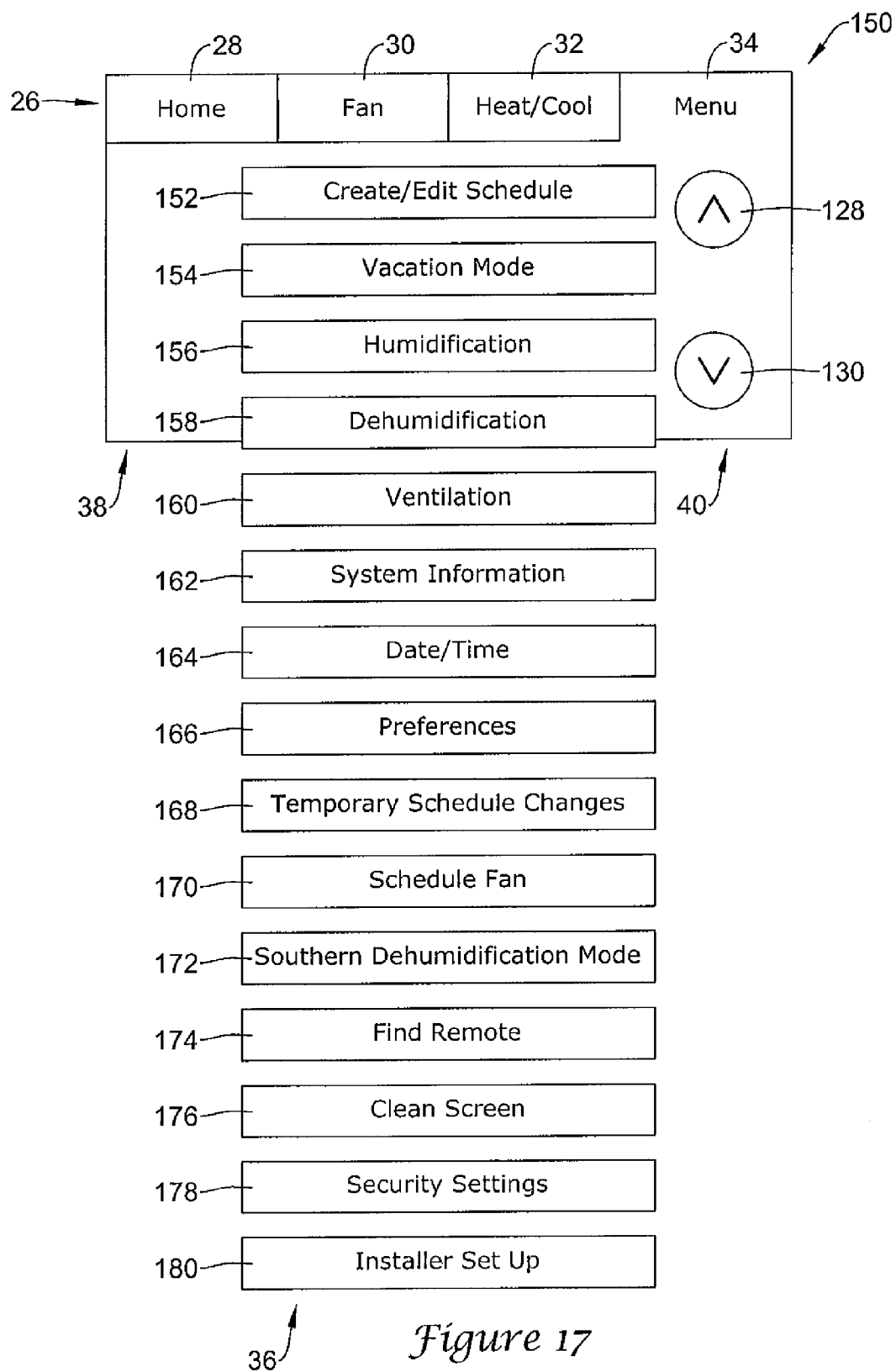

FIG. 17 provides an illustrative home screen 150 that may be displayed if Menu button 34 is pressed. HVAC controller 20 may display a variety of menu items within first region 36 and/or within second region 38. Third region 40 may include up scroll button 128 and down scroll button 130 to scroll up and down the displayed menu items, if necessary. These menu items may permit a homeowner or other individual to set a variety of parameters of HVAC controller 20.

In some cases, home screen 150 may include, for example, one or more of a Create/Edit Schedule button 152, a Vacation Mode button 154, an Humidification button 156, a Dehumidification button 158, a Ventilation button 160, a System Information button 162, a Date/Time button 164, a Preferences button 166, a Temporary Schedule Changes button 168, a Schedule Fan button 170, a Southern Dehumidification Mode button 172, a Find Remote button 174, a Clean Screen button 176, a Security Settings button 178 and/or an Installer Set Up button 180. Subsequent Figures will provide illustrative screens that may be displayed by HVAC controller 20 in response to a homeowner or other individual selecting one or more of these menu items.

Figure 18:
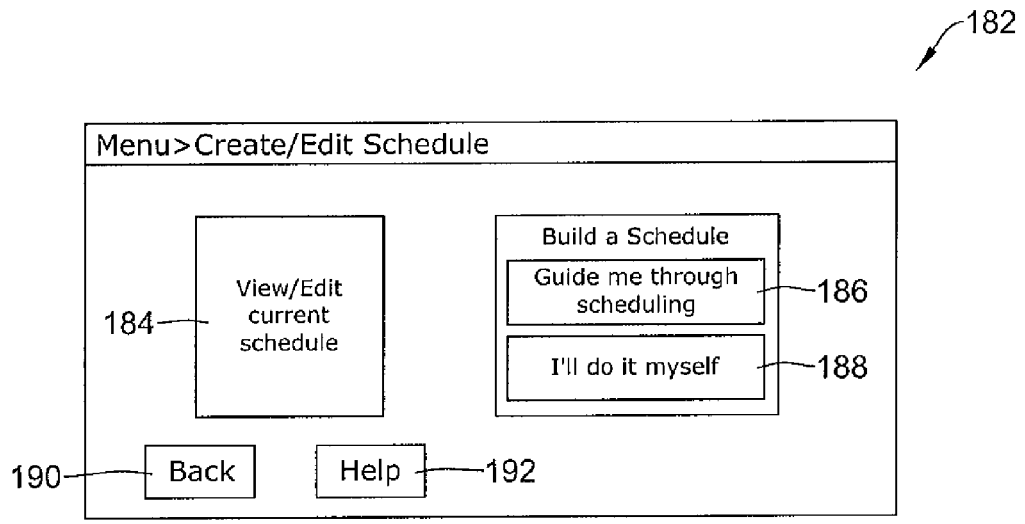
FIGS. 18 through 46 provide illustrative but non-limiting examples of screens pertaining to creating and/or editing a schedule using the HVAC controllers of FIGS. 1 and 2.

FIGS. 18 through 46 provide illustrative but non-limiting examples of screens that may be displayed by HVAC controller 20 pertaining to creating, editing and/or viewing a schedule within HVAC controller 20. In particular, FIG. 18 provides an illustrative screen 182 that may be displayed by HVAC controller 20 in response to someone pressing or otherwise selecting Create/Edit Schedule button 152 (FIG. 16). In some instances, screen 182 provides a user with one or more options as to how they wish to create, edit and/or view a schedule. Screen 182 may include one or more of a View/Edit Current Schedule button 184, a Guide Me Through The Scheduling button 186 and/or an I'll Do It Myself button 188. The functionality of each will be described, in turn. Screen 182 may include a Back button 190 that permits a user to return to a previous screen and/or a Help button 192 that may provide the user with pertinent assistance.

Figure 19:
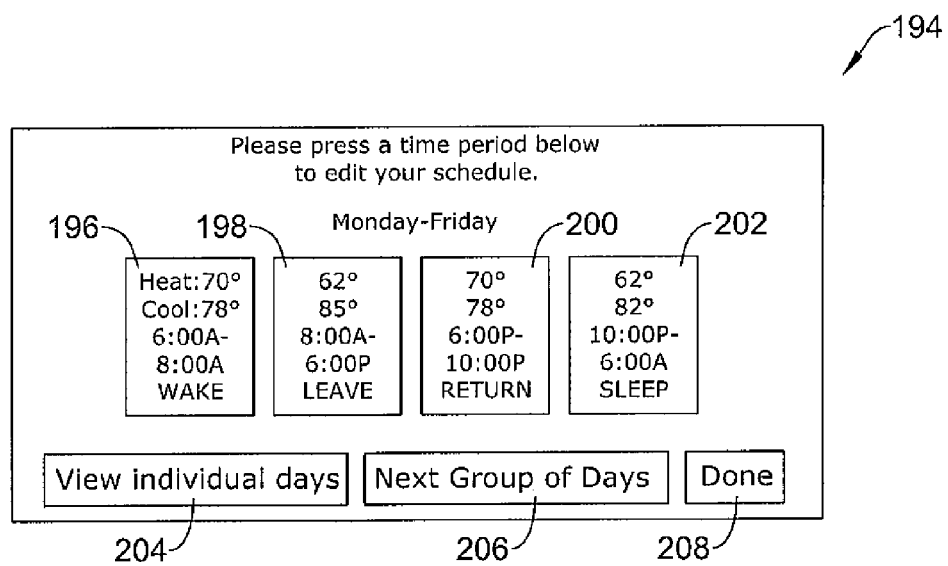

In some cases, pressing View/Edit Current Schedule button 184 may cause HVAC controller 20 to display a screen 194, as shown in FIG. 19. Screen 194 may display time and/or temperature set point information for one or more time periods of one or more days. As illustrated, screen 194 provides heating and cooling temperature set points for the Wake period, the Leave period, the Return period and the Sleep period for weekdays Monday through Friday. In some cases, screen 194 may be considered as including a Wake button 196, a Leave button 198, a Return button 200 and a Sleep button 202. As will be discussed, the heating and/or cooling temperature set points for a particular time period, as well as the starting and/or ending times for a particular time period, may be changed by pressing the appropriate button such as Wake button 196, Leave button 198, Return button 200 and/or Sleep button 202.

In some cases, screen 194 may include a View Individual Day button 204 that permits an individual to view only one day at a time, rather than a group of days. If View Individual Day button 204 is pressed, HVAC controller 20 may display heating and cooling temperature set points for one or more time periods for a single day, and may also display a button (not illustrated) that permits the user to scroll ahead to the next day.

In some instances, as illustrated, screen 194 may include a Next Group of Days button 206. If, for example, the displayed group of days is Monday-Friday, pressing Next Group of Days button 206 may cause HVAC controller 20 to display heating and cooling temperature set points for one or more periods of time for Saturday and/or Sunday. A Done button 208 permits a user to tell HVAC controller 20 that they are done viewing and/or editing the schedule, and HVAC controller 20 may return to a previous screen, if desired. Screen 194 may be considered a schedule review screen because the displayed schedule cannot be changed without touching one of buttons 196-202. Once one of buttons 196-202 are touched, HVAC controller 20 may be considered to be in an edit mode. This may, for example, help the user to know whether changes are being made to the schedule.

Figure 20:
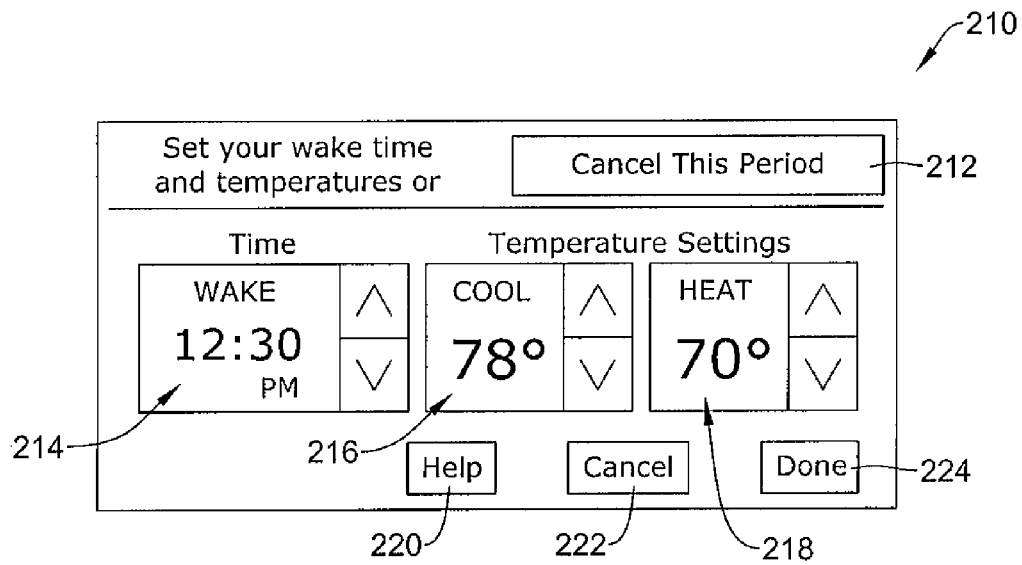

FIG. 20 provides an illustrative screen 210 that may be displayed by HVAC controller 20 if, with reference to screen 194 (FIG. 19), one were to press Wake button 196. Screen 210 may permit a user to change one or more of a start time for the Wake time period, the cooling temperature set point and/or the heating temperature set point for Wake time period. Screen 210 includes a Cancel This Period button 212 that, if pressed, permits the user to return to the previous screen and select a different time period, if desired.

Screen 210 includes a time setting block 214 that may include up and down buttons or other indicia that permit a user to alter the start time displayed within time setting block 214. Screen 210 may include a cooling temperature set point block 216 and/or a heating temperature set point block 218. Each of cooling temperature set point block 216 and heating temperature set point block 218 may include up and down button or other indicia that permit a user to alter the cooling temperature set point and/or the heating temperature set point.

In some instances, screen 210 may include a Help button 220 that may, if pressed, cause HVAC controller 20 to display appropriate information pertaining to instructions, available options, and the like. A Cancel button 222 may permit a user to cancel out of whatever changes they have entered, if any, without saving any changes. A Done button 224 may be pressed to inform HVAC controller 20 that the changes, if any, have been entered and should be saved. In some cases, when Done button 224 is pressed, a message such as "Saving Changes" may be displayed, notifying the user that the changes are being saved.

Returning briefly to FIG. 18, another option for creating, editing and/or viewing a schedule is to press I'll Do It Myself button 188. Pressing this button may cause HVAC controller 20 to display an illustrative screen 226, shown in FIG. 21. Screen 226 includes a Monday button 228, a Tuesday button 230, a Wednesday button 232, a Thursday button 234, a Friday button 236, a Saturday button 238 and a Sunday button 240. One way to select which day or days to view/edit is to press the button or buttons corresponding to the desired days. As illustrated, it can be seen that Monday button 228, Tuesday button 230, Wednesday button 232, Thursday button 234 and Friday button 236 have been pressed.

It will be appreciated that in some instances, there may be a desire to be able to quickly make multiple selections. HVAC controller 20 may, for example, display a first menu that includes one or more quick select touch buttons that may be used to quickly select two or more of a plurality of displayed selection options. In some cases, each of the selection options may have an associated algorithm parameter, and HVAC controller 20 may be configured to permit the user to simultaneously change the associated algorithm parameters for each of the two or more of the plurality of selection options that are selected by pressing one of the one or more quick select touch buttons. In some instances, HVAC controller 20 may display a second menu that permits the user to simultaneously change the associated algorithm parameters for each of the two or more of the plurality of selection options that are selected by pressing one of the one or more quick select touch buttons.

In an illustrative example, HVAC controller 20 may display a first menu that includes a schedule menu, and in this situation each of the plurality of selection options of the schedule menu may correspond to a corresponding day of a week. In some cases, one of the quick select touch buttons may be a WEEKDAY button that, when pressed, selects Monday, Tuesday, Wednesday, Thursday and Friday for scheduling.

Another example is a WEEKEND button that, when pressed, selects Saturday and Sunday for scheduling. Another example is an ALL button that, when pressed, selects all days of the week for scheduling.

In some instances, HVAC controller 20 may display a schedule menu, and each of the plurality of selection options of the schedule menu may correspond to a PERIOD of a day of a week. In another example, one of the quick select touch buttons comprises a wake button that, when pressed, selects the wake period for all or selected days of the week. In another example, one of the quick select touch buttons comprises a leave button that, when pressed, selects the leave period for all or selected days of the week. In another example, one of the quick select touch buttons comprises a return button that, when pressed, selects the return period for all or selected days of the week. In another example, one of the quick select touch buttons comprises a sleep button that, when pressed, selects the sleep period for all or selected days of the week.

Returning to the Figures, in some instances, several days may easily be selected using a quick select button such as a Weekdays button 242, a Weekends button 244 and/or an All button 246. Pressing Weekdays button 242 will cause all five week day buttons to be selected. As noted, Monday through Friday are indicated as having been selected. This may be achieved either by pressing each of the five day buttons or by simply pressing Weekdays button 242. Pressing Weekends button 244 may cause Saturday button 238 and Sunday button 240 to be indicated as having been selected. Pressing All button 246 will cause all seven day buttons to be indicated as having been selected. Selected buttons may be indicated, for example, by graphically making each selected button to appear that it has been depressed. In some instances, selected buttons may be indicated in other ways, such as using bolded text, different colors and the like.

In some cases, HVAC controller 20 may include text that helps the user to understand what is expected of them. For example, screen 226 can be seen to include the text "Select the days of the week to schedule". Messages such as this may help the user navigate through the screens that may be displayed by HVAC controller 20. Screen 226 may include a Cancel button 248 and a Next button 250. Cancel button 248 may be pressed to cancel any changes that have been entered and cause HVAC controller 20 to revert to a previous screen. Next button 250 may be pressed, for example, to move to the next screen.

Figure 21:
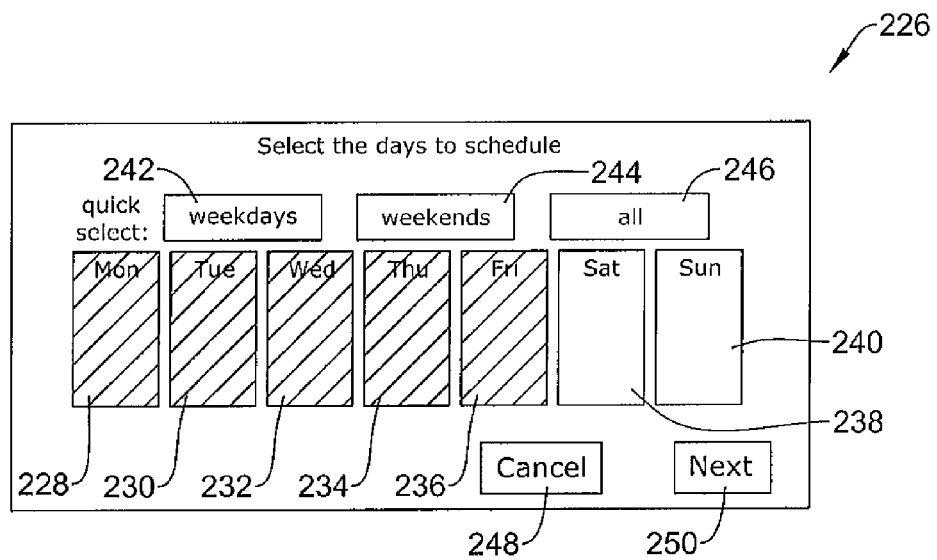
Figure 22:
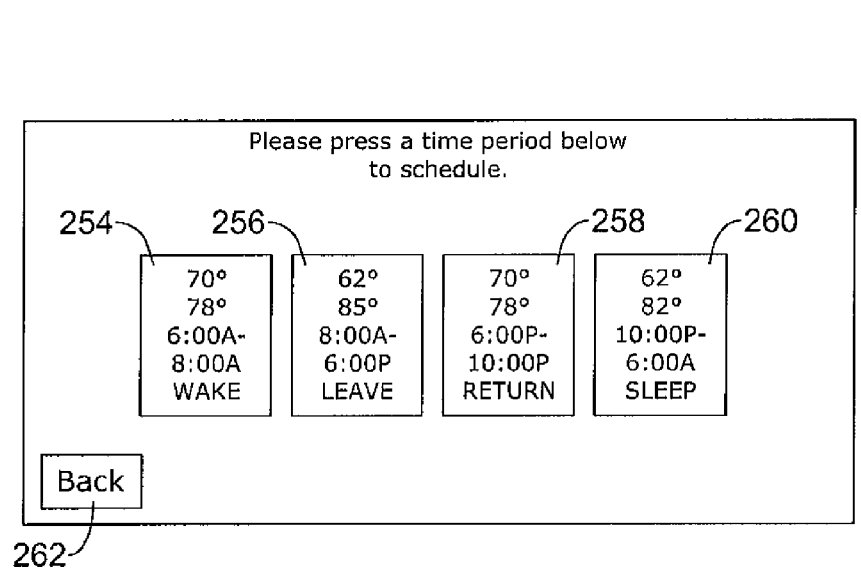

In some cases, pressing Next button 250 (FIG. 21) causes HVAC controller 20 to display an illustrative screen 252, as shown in FIG. 22. Once the day or days have been selected (as discussed with respect to FIG. 21), the user is given the opportunity to select a time period to edit. Screen 252 includes a Wake button 254, a Leave button 256, a Return button 258 and a Sleep button 260. A Back button 262 permits a user to return to a previous screen such as screen 226 (FIG. 21) to, for example, alter the day or days selected. Again, HVAC controller 20 may display text such as "Please press a time period below to schedule" to assist the user in navigation.

Figure 23:
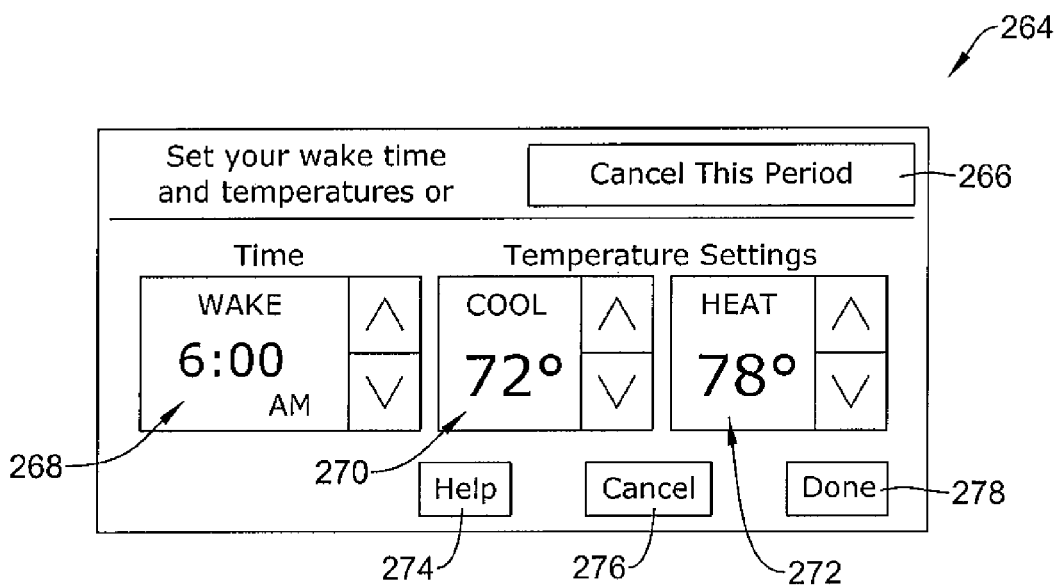

Screen 252 permits the user to edit one or more of the distinct time periods. For example, pressing Wake button 254 may cause HVAC controller 20 to display an illustrative screen 264, as shown in FIG. 23. Screen 264 may permit a user to change one or more of a start time for the Wake time period, the cooling temperature set point and/or the heating temperature set point for Wake time period. Screen 264 includes a Cancel This Period button 266 that, if pressed, permits the user to return to the previous screen and select a different time period, if desired. It can be seen that screen 264 may include helpful text such as "Set your wake time and temperature".

Screen 264 includes a time setting block 268 that may include up and down buttons or other indicia that permit a user to alter the start time displayed within time setting block 268. Screen 264 may include a cooling temperature set point block 270 and/or a heating temperature set point block 272. Each of cooling temperature set point block 270 and heating temperature set point block 272 may include up and down button or other indicia that permit a user to alter the cooling temperature set point and/or the heating temperature set point.

Figure 24:
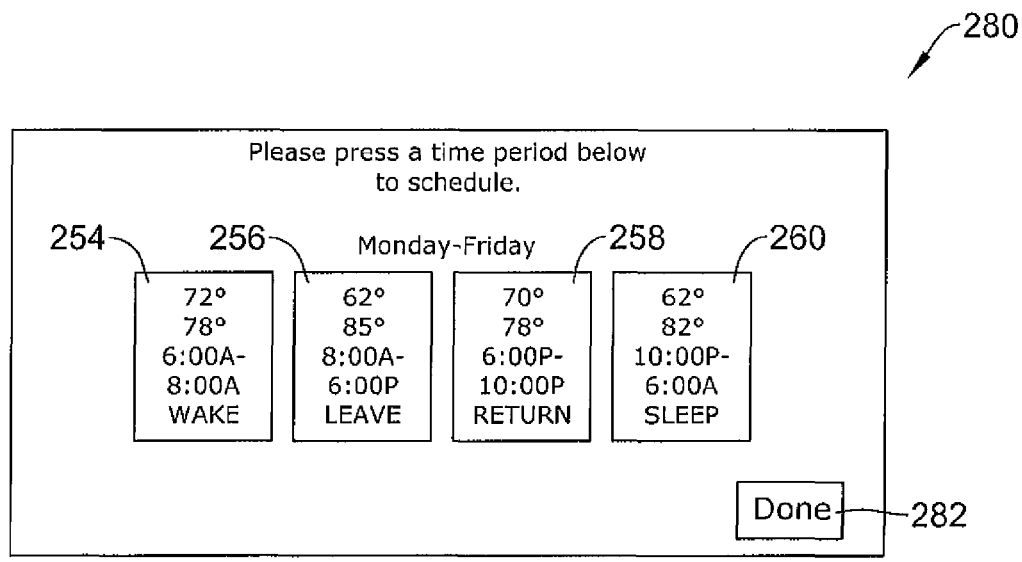

In some instances, screen 264 may include a Help button 274 that may, if pressed, cause HVAC controller 20 to display appropriate information pertaining to instructions, available options, and the like. A Cancel button 276 may permit a user to cancel out of whatever changes they have entered, if any, without saving any changes and/or return to a previous screen. A Next button 278 may be pressed to indicate to HVAC controller 20 that the displayed time period has been edited as desired. If Next button 278 is pressed, HVAC controller 20 may display an illustrative screen 280, as shown in FIG. 24.

Screen 280 is similar to screen 252 (FIG. 23), but includes the changes made to the Wake period made in FIG. 23, and permits a user to select another time period to edit, if desired. However, screen 280 also includes a Done button 282. If the use wishes to edit another time period, they may, one at a time, press one or more of Wake button 254, Leave button 256, Return button 258 and/or Sleep button 260, and may edit the selected time period(s) as discussed with respect to FIG. 23. However, once the user has finished editing the time periods they wish to edit, they may inform HVAC controller 20 that they have finished by pressing Done button 282.

Figure 25:
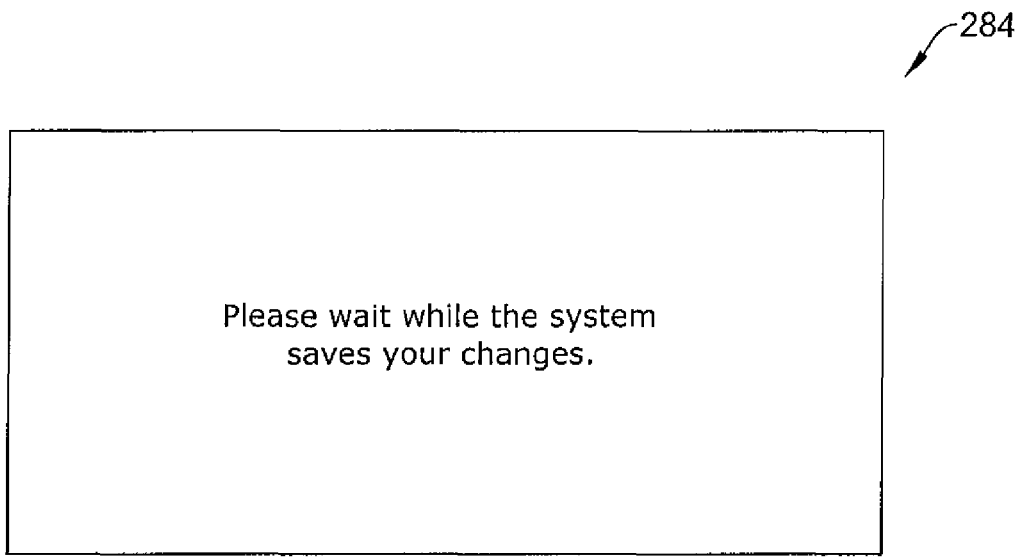

Once the user has pressed Done button 282, HVAC controller 20 may display an illustrative screen 284, which is shown in FIG. 25. In screen 284, HVAC controller 20 may display a message informing the user that HVAC controller 20 is saving the changes that the user has made. HVAC controller may then display an illustrative screen 286 as shown in FIG. 26.

Figure 26:
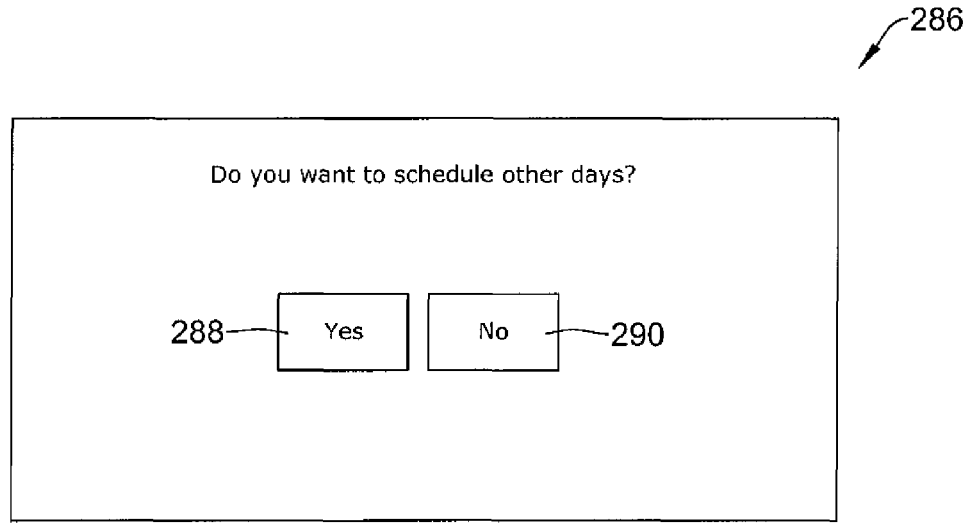
Figure 27:
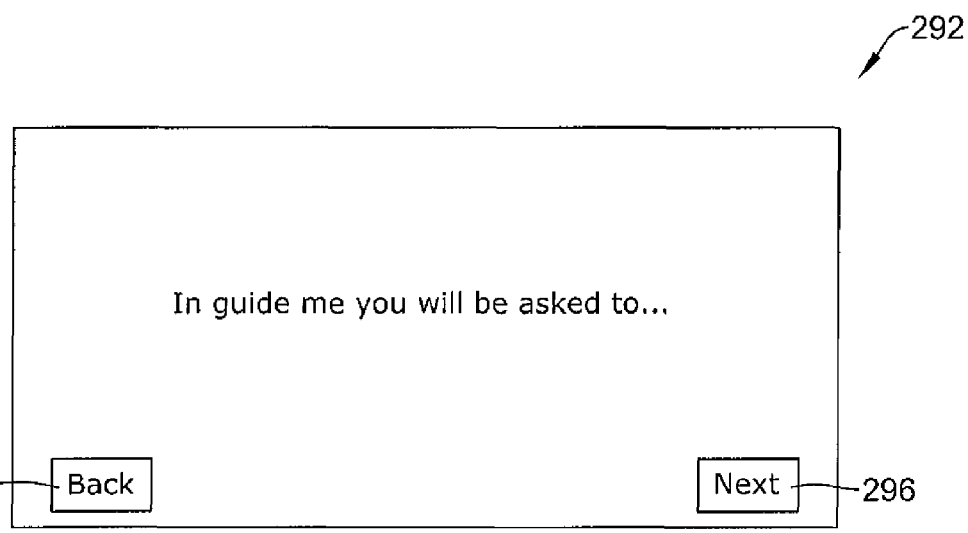

In FIG. 26, screen 286 may include text asking the user if they wish to schedule other days. A Yes button 288 and a No button 290 permits the user to provide their answer. If the user presses No button 290, HVAC controller 20 may revert to screen 182 as seen in FIG. 18. If the user presses Yes button 288, HVAC controller 20 may revert to screen 226 as seen in FIG. 21. In some cases, the days already modified may be indicated by displaying "modified" within the individual day buttons, but this is not required.

Returning briefly to FIG. 18, another option for creating, editing and/or viewing a schedule is to press Guide Me Through Scheduling button 186. Pressing this button may cause HVAC controller 20 to display an illustrative screen 292, shown in FIG. 27. Screen 292 may be considered as an informational screen, as screen 292 provides a text message that informs the user that they will be asked a series of questions regarding their preferred comfort settings. A Back button 294 permits a user to return to a previous screen, if desired, while a Next button 296 permits a user to advance to the next screen.

Figure 28:
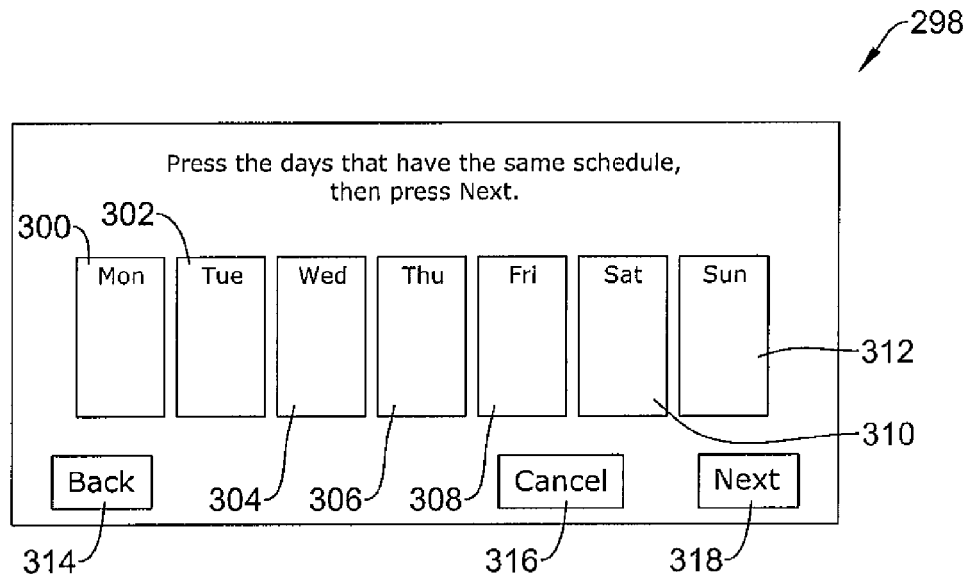

In some instances, once the user has pressed Next button 296, HVAC controller 20 will provide an illustrative screen 298, as shown in FIG. 28. Screen 298 permits the user to select one or more days that will have the same schedule. Screen 298 may include a text message to this effect. In some cases, for example, a user may decide to have the same schedule for Monday through Friday and a different schedule for Saturday and Sunday. Screen 298 includes a Monday button 300, a Tuesday button 302, a Wednesday button 304, a Thursday button 306, a Friday button 308, a Saturday button 310 and a Sunday button 312.

Figure 29:
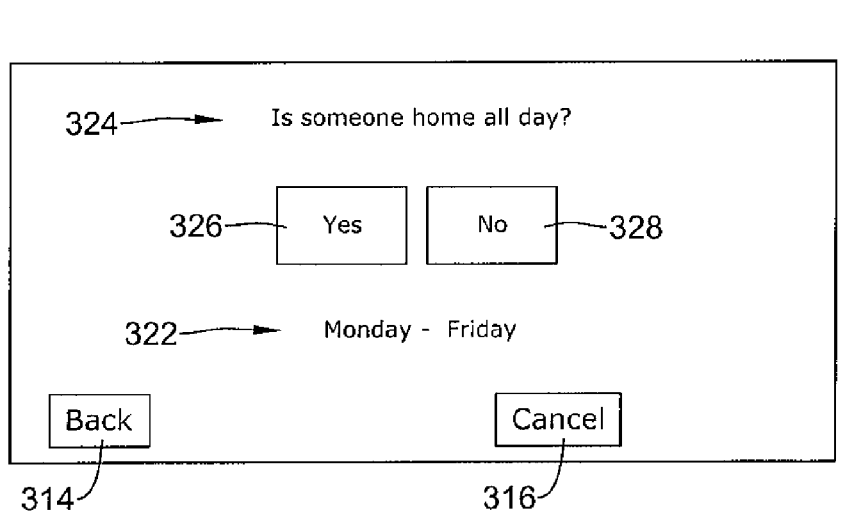
Figure 30:
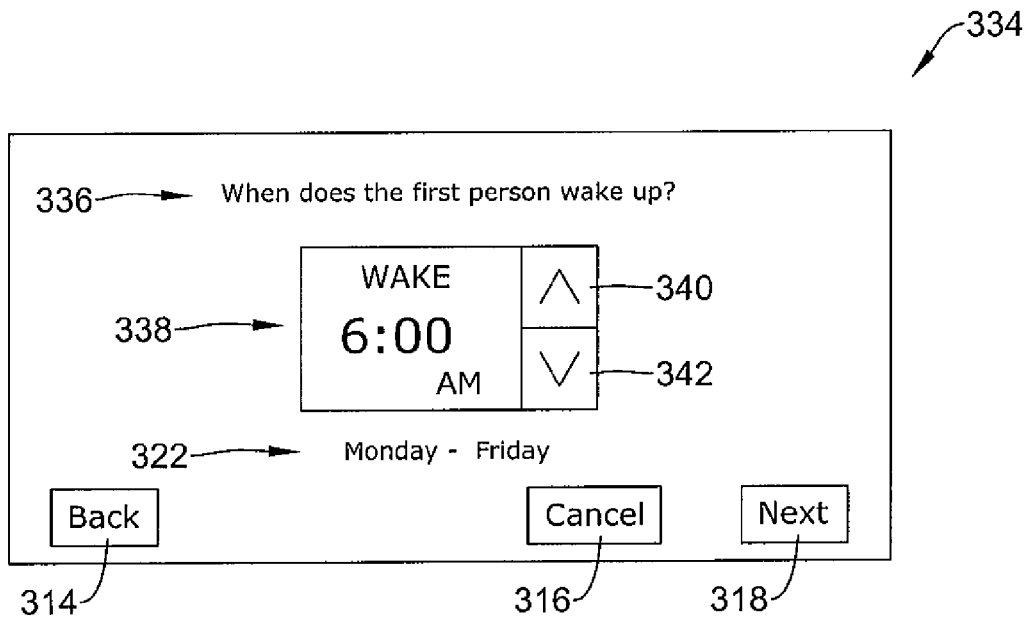

Screen 298 may include a Back button 314 that permits a user to return to a previous screen such as screen 292 (FIG. 27), if desired, while a Cancel button 316 provides the user with an opportunity to revert to a previous screen or exit scheduling entirely. A Next button 318 permits the user to advance to a subsequent screen. In some cases, pressing Next button 318 may cause HVAC controller 20 to display an illustrative screen 320, as seen in FIG. 29.

Screen 320 may be the result of having selected Monday, Tuesday, Wednesday, Thursday and Friday via screen 298 (FIG. 28), as screen 320 includes a text message 322 that reminds the user which day or days have been selected. As shown, text message 322 simply says "Monday-Friday". In some cases, it is considered that text message 322 may list each individual day by full name, by abbreviated name, and the like.

Screen 320 may include an interview question 324, asking if someone is home during the day on the day or days being scheduled. The user may give an answer using either a Yes button 326 or a Not button 328. If someone is home during the day, in some cases HVAC controller 20 may operate in accordance with a Wake time period and a Sleep time period, with the Leave and Return periods rolled into the Wake period or otherwise inactivated, for example. However, if no one is home during the day, HVAC controller 20 will in subsequent screens request scheduling and temperature information for all of the time periods.

For this example, assume the user pressed No button 328. Screen 334 may include an interview question 336, asking what time the first person wakes up. HVAC controller 20 may, in some cases, use this time as the starting point for the Wake time period. Screen 334 includes a time setting block 338 that displays the time period as well as a time at which the first person wakes up. Time setting block 338 includes an Up arrow 340 and a Down arrow 342 that may be used to adjust the time as desired.

Figure 31:
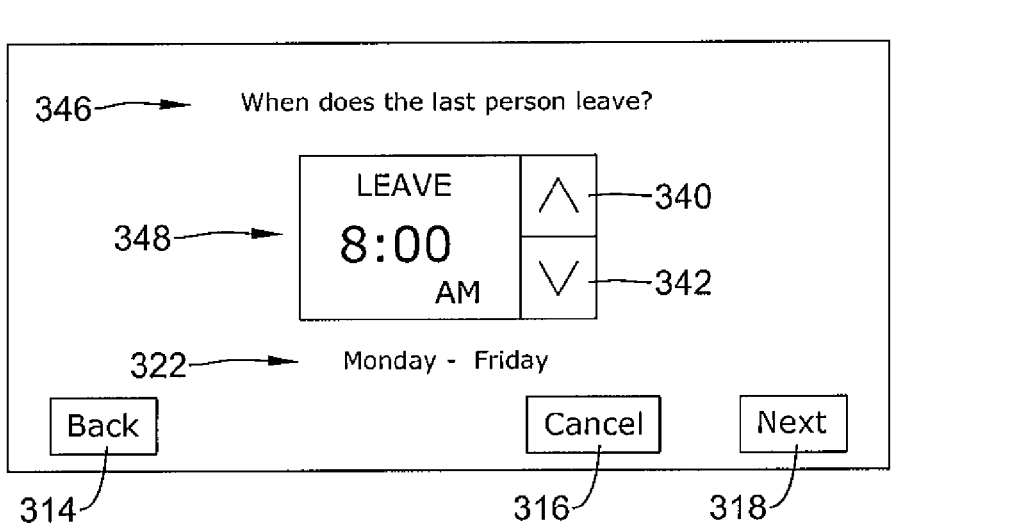

Pressing Next button 318 may cause HVAC controller 20 to display an illustrative screen 344, as seen in FIG. 31. Screen 344 may include an interview question 346, asking what time the last person leaves in the morning. HVAC controller 20 may, in some cases, use this time as the starting point for the Leave time period. Screen 344 includes a time setting block 348 that displays the time period as well as a time at which the last person leaves. Time setting block 348 includes an Up arrow 340 and a Down arrow 342 that may be used to adjust the time as desired.

Figure 32:
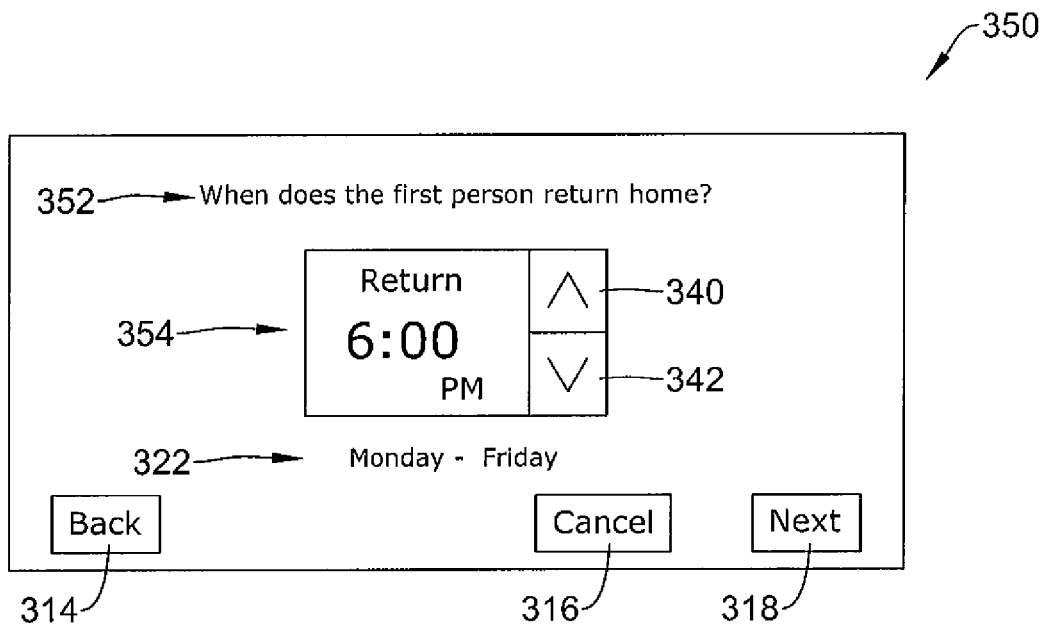

Pressing Next button 318 may cause HVAC controller 20 to display an illustrative screen 350, as seen in FIG. 32. Screen 350 may include an interview question 352, asking what time the first person returns home. HVAC controller 20 may, in some cases, use this time as the starting point for the Return time period. Screen 350 includes a time setting block 354 that displays the time period as well as a time at which the last person leaves. Time setting block 354 includes an Up arrow 340 and a Down arrow 342 that may be used to adjust the time as desired.

Figure 33:
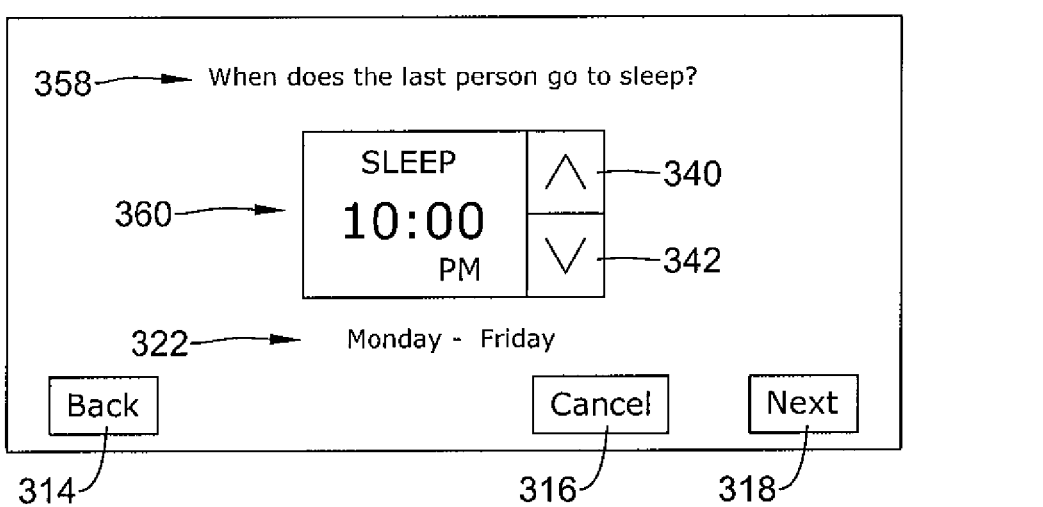

Pressing Next button 318 may cause HVAC controller 20 to display an illustrative screen 356, as seen in FIG. 33. Screen 356 may include an interview question 358, asking what time the last person goes to sleep. HVAC controller 20 may, in some cases, use this time as the starting point for the Sleep time period. Screen 356 includes a time setting block 360 that displays the time period as well as a time at which the last person goes to sleep. Time setting block 360 includes an Up arrow 340 and a Down arrow 342 that may be used to adjust the time as desired.

Figure 34:
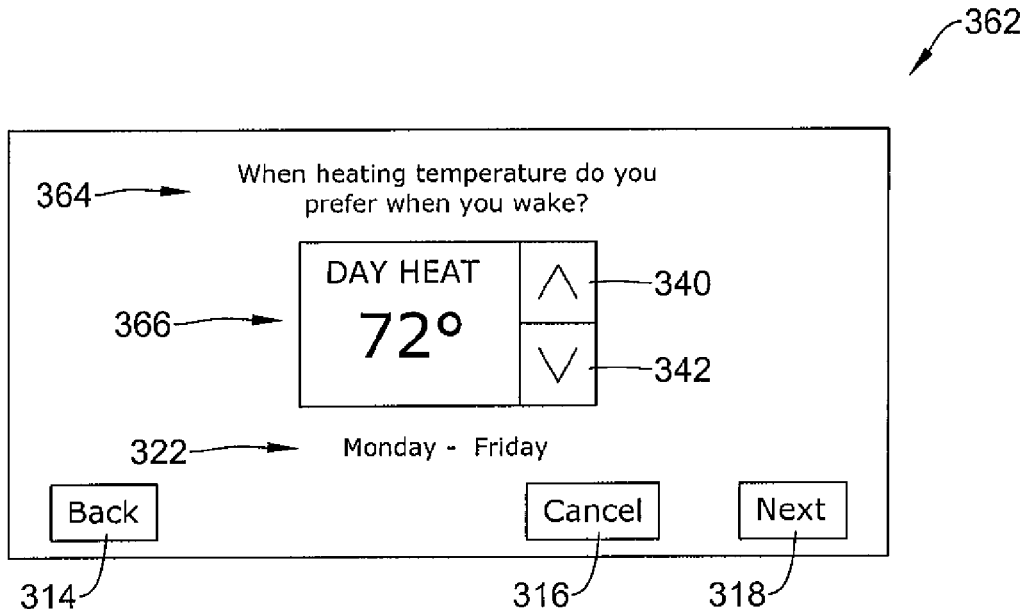

Pressing Next button 318 may cause HVAC controller 20 to display an illustrative screen 362, as seen in FIG. 34. Screen 362 may include an interview question 364, asking what heating temperature is preferred when the user wakes up in the morning. HVAC controller 20 may, in some cases, use this temperature as the heating temperature set point for the Wake period. Screen 362 includes a temperature setting block 366 that displays the time period, a heating temperature set point and an indication of which temperature set point is being set. Temperature setting block 366 includes an Up arrow 340 and a Down arrow 342 that may be used to adjust the temperature as desired.

Figure 35:
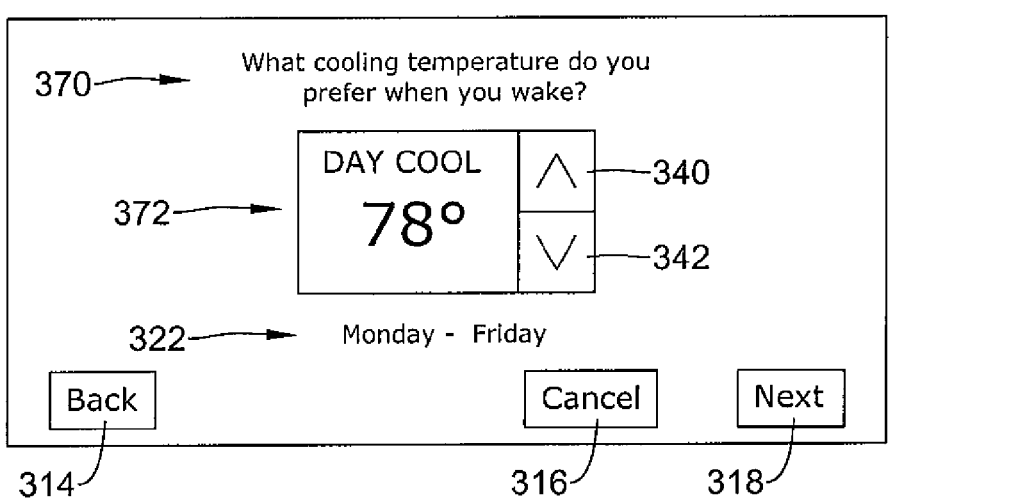

Pressing Next button 318 may cause HVAC controller 20 to display an illustrative screen 368, as seen in FIG. 35. Screen 368 may include an interview question 370, asking what cooling temperature is preferred when the user wakes up in the morning. HVAC controller 20 may, in some cases, use this temperature as the cooling temperature set point for the Wake period. Screen 368 includes a temperature setting block 372 that displays the time period, a cooling temperature set point and an indication of which temperature set point is being set. Temperature setting block 372 includes an Up arrow 340 and a Down arrow 342 that may be used to adjust the temperature as desired.

Figure 36:
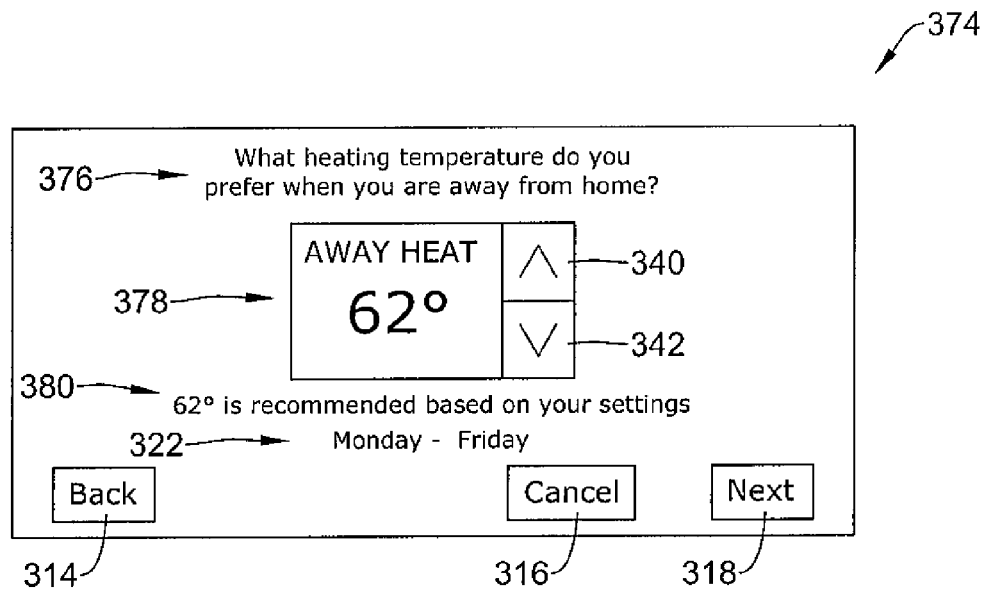

Pressing Next button 318 may cause HVAC controller 20 to display an illustrative screen 374, as seen in FIG. 36. Screen 374 may include an interview question 376, asking what heating temperature is preferred when the user is away from the house. HVAC controller 20 may, in some cases, use this temperature as the heating temperature set point for the Leave period. Screen 374 includes a temperature setting block 378 that displays the time period, a heating temperature set point and an indication of which temperature set point is being set. Temperature setting block 378 includes an Up arrow 340 and a Down arrow 342 that may be used to adjust the temperature as desired. In some cases, screen 374 may include a message 380 providing a suggested heating temperature set point.

Figure 37:
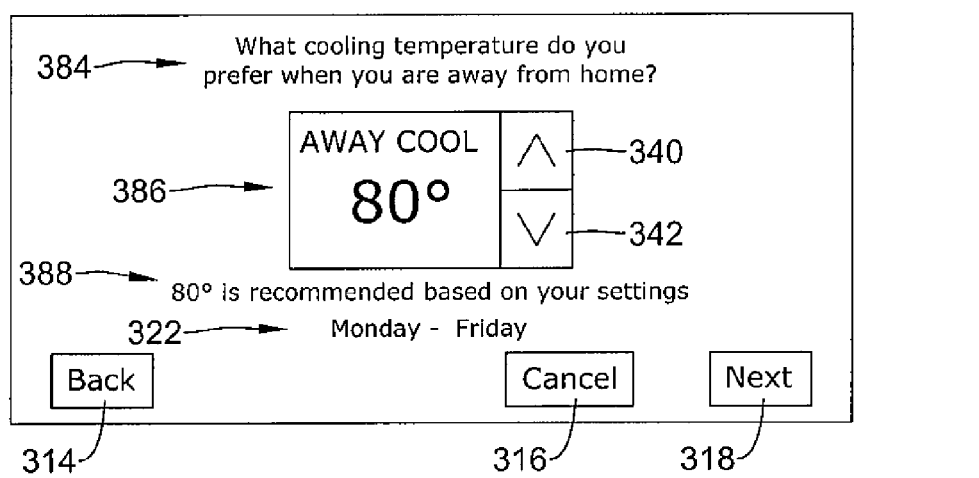

Pressing Next button 318 may cause HVAC controller 20 to display an illustrative screen 382, as seen in FIG. 37. Screen 382 may include an interview question 384, asking what cooling temperature is preferred when the user is away from the house. HVAC controller 20 may, in some cases, use this temperature as the cooling temperature set point for the Leave period. Screen 382 includes a temperature setting block 386 that displays the time period, a cooling temperature set point and an indication of which temperature set point is being set. Temperature setting block 386 includes an Up arrow 340 and a Down arrow 342 that may be used to adjust the temperature as desired. In some cases, screen 382 may include a message 388 providing a suggested cooling temperature set point.

Figure 38:
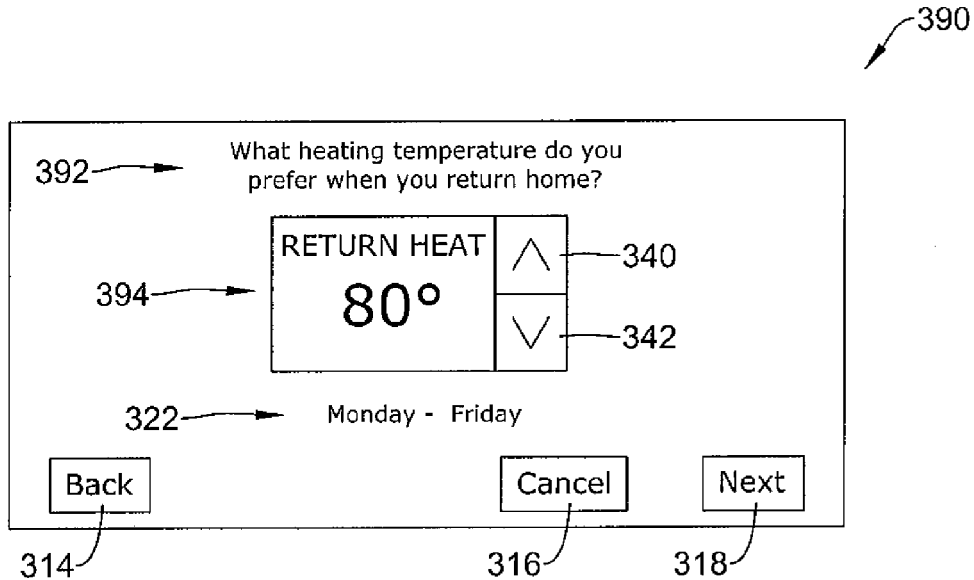

Pressing Next button 318 may cause HVAC controller 20 to display an illustrative screen 390, as seen in FIG. 38. Screen 390 may include an interview question 392, asking what heating temperature is preferred when the user returns home. HVAC controller 20 may, in some cases, use this temperature as the heating temperature set point for the Return period. Screen 390 includes a temperature setting block 394 that displays the time period, a heating temperature set point and an indication of which temperature set point is being set. Temperature setting block 394 includes an Up arrow 340 and a Down arrow 342 that may be used to adjust the temperature as desired.

Figure 39:
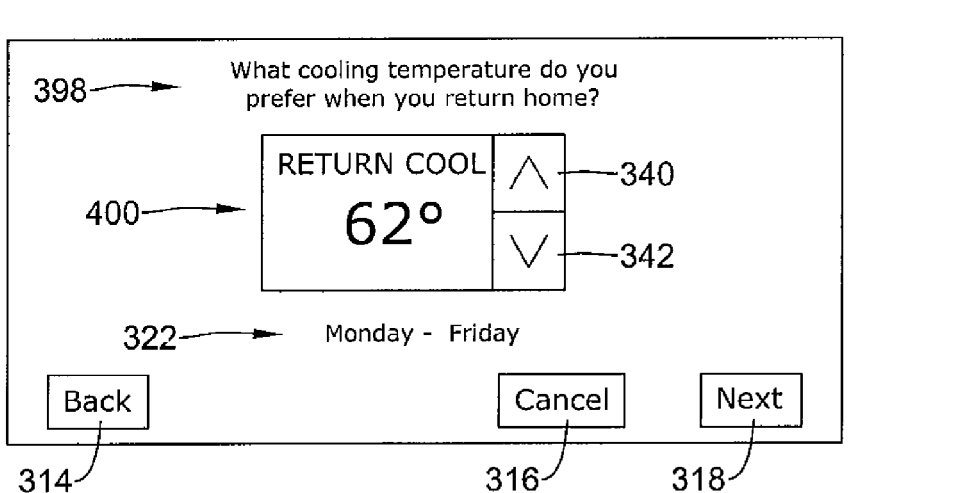

Pressing Next button 318 may cause HVAC controller 20 to display an illustrative screen 396, as seen in FIG. 39. Screen 396 may include an interview question 398, asking what cooling temperature is preferred when the user returns home. HVAC controller 20 may, in some cases, use this temperature as the cooling temperature set point for the Return period. Screen 396 includes a temperature setting block 400 that displays the time period, a cooling temperature set point and an indication of which temperature set point is being set. Temperature setting block 400 includes an Up arrow 340 and a Down arrow 342 that may be used to adjust the temperature as desired.

Figure 40:
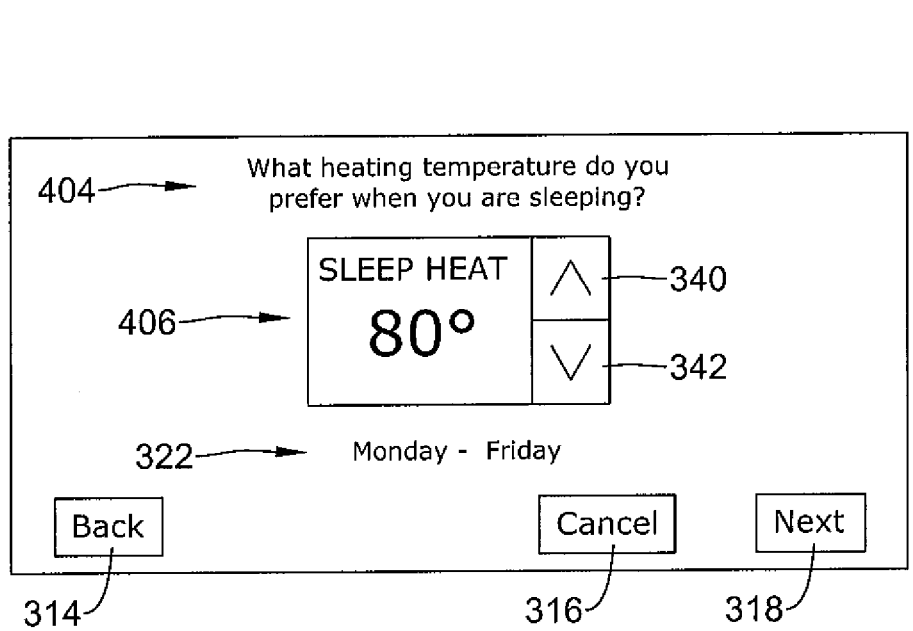

Pressing Next button 318 may cause HVAC controller 20 to display an illustrative screen 402, as seen in FIG. 40. Screen 402 may include an interview question 404, asking what heating temperature is preferred when the user is sleeping. HVAC controller 20 may, in some cases, use this temperature as the heating temperature set point for the Sleep period. Screen 402 includes a temperature setting block 406 that displays the time period, a heating temperature set point and an indication of which temperature set point is being set. Temperature setting block 406 includes an Up arrow 340 and a Down arrow 342 that may be used to adjust the temperature as desired.

Figure 41:
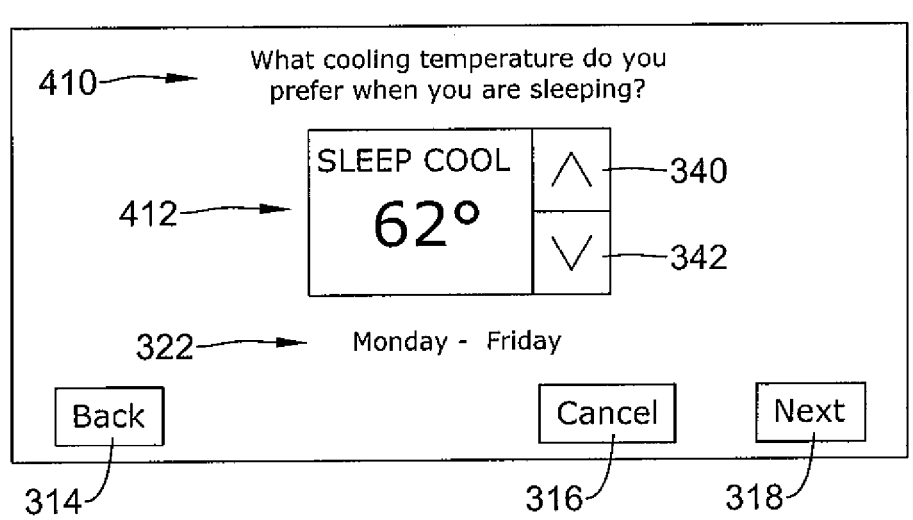

Pressing Next button 318 may cause HVAC controller 20 to display an illustrative screen 408, as seen in FIG. 41. Screen 408 may include an interview question 410, asking what cooling temperature is preferred when the user is sleeping. HVAC controller 20 may, in some cases, use this temperature as the cooling temperature set point for the Sleep period. Screen 408 includes a temperature setting block 412 that displays the time period, a cooling temperature set point and an indication of which temperature set point is being set. Temperature setting block 412 includes an Up arrow 340 and a Down arrow 342 that may be used to adjust the temperature as desired.

Figure 42:
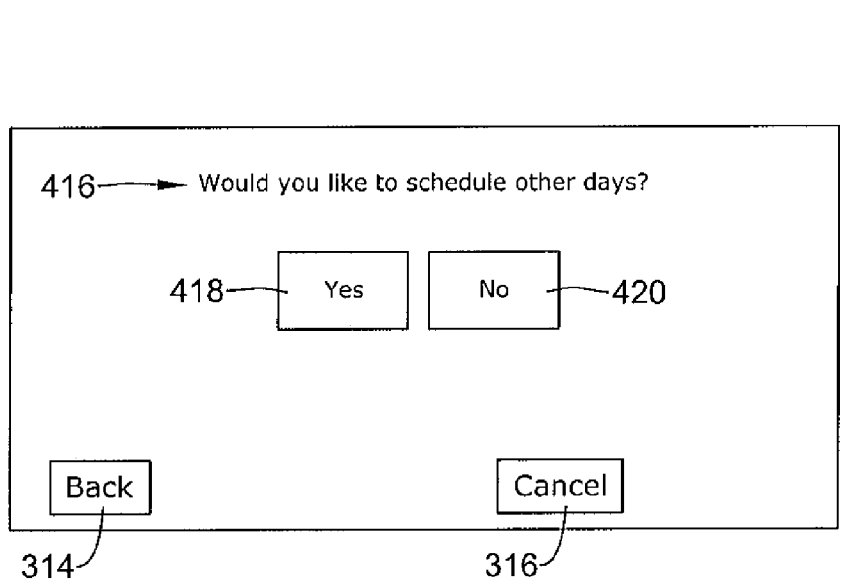

Pressing Next button 318 may cause HVAC controller 20 to display an illustrative screen 414, as seen in FIG. 42. Screen 414 may include a question 416, asking the user if they wish to schedule other days. A Yes button 418 and a No button 420 permit the user to provide an appropriate answer. If the user presses Yes button 418, HVAC controller 20 may revert to screen 298 (FIG. 28) so that the user may select additional days to schedule. In some cases, although this is not required, the day buttons representing the days that have already been scheduled may be labeled as "modified".

Figure 43:
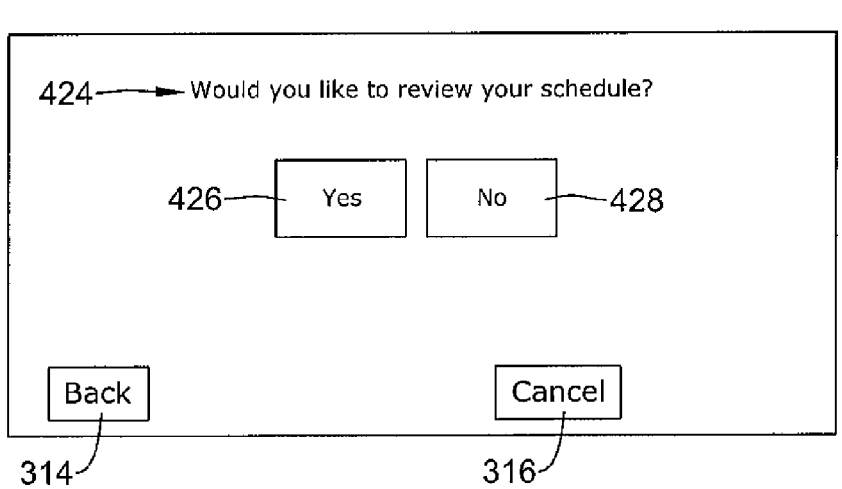
Figure 44:
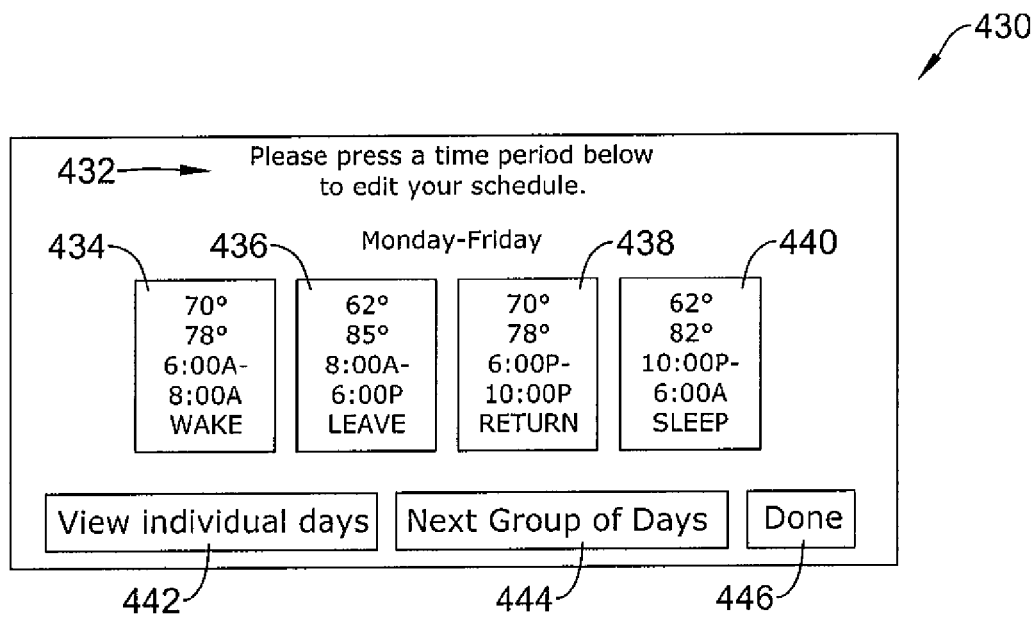

Returning briefly to FIG. 42, if the user presses No button 420, HVAC controller 20 may display an illustrative screen 422, as seen in FIG. 43. Screen 422 may include a question 424, inquiring as to whether or not the user wishes to review their schedule. A Yes button 426 and a No button 428 permit the user to provide an appropriate answer. If the user presses No button 428, HVAC controller 20 may revert to screen 182 (FIG. 18). If the user presses Yes button 426, HVAC controller 20 may display an illustrative screen 430, as shown in FIG. 44.

Screen 430 may include a message 432 instructing the user that they may, if desired, further edit their schedule by pressing one of the time periods. Screen 430 may include a Wake button 434, a Leave button 436, a Return button 438 and a Sleep button 440. Screen 430 may include a View Individual Days button 442 that may, if pressed, instruct HVAC controller 20 to display only a single day at a time. Screen 430 may then include a Next Day button (not illustrated). A Next Group of Days button 444 may, if pressed, instruct HVAC controller 20 to display another group of days. For example, HVAC controller 20 may display Saturday and Sunday. A Done button 446 may, if pressed, inform HVAC controller 20 that the user is finished.

Figure 45:
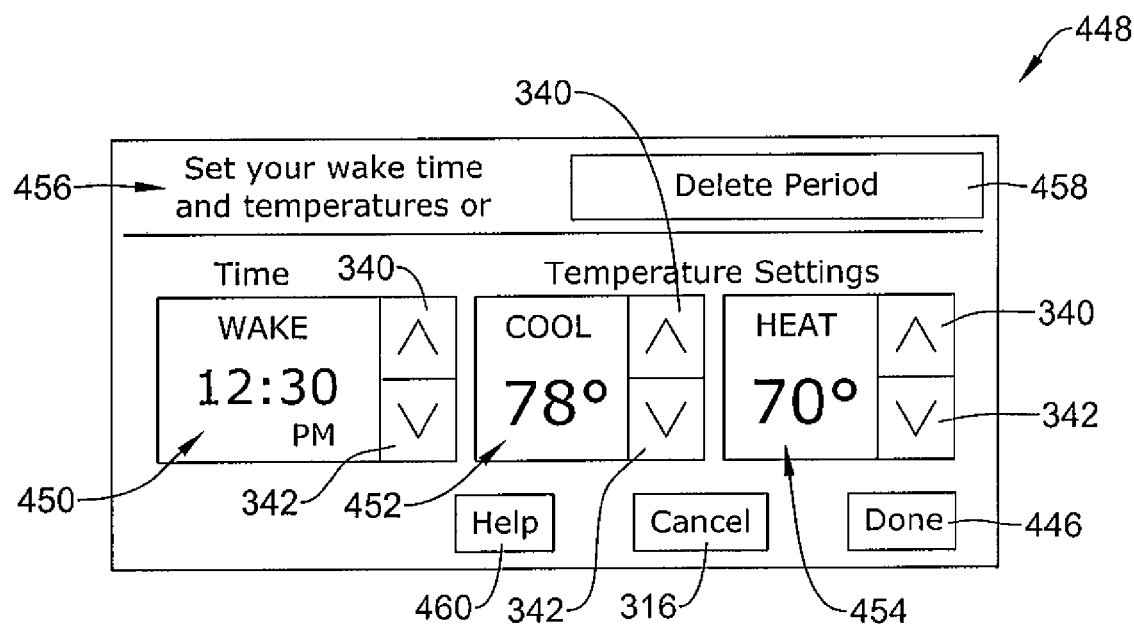

Each of Wake button 434, Leave button 436, Return button 438 and Sleep button 440 may include or otherwise display one or more of period starting time, period heating temperature set point and/or period cooling temperature set point. If the user wishes to edit one of the time periods, they may do so by pressing the desired time period button. For example, pressing Wake button 434 may cause HVAC controller 20 to display an illustrative screen 448, as shown in FIG. 45.

Screen 448 may include one or more of a time block 450, a cooling temperature block 452 and/or a heating temperature block 454. Time block 450 may display a starting time for the Wake period, and may include Up arrow 340 and Down arrow 342 so that the user may adjust the starting time, if desired. Cooling temperature block 452 may display a cooling temperature for the Wake period, and may include Up arrow 340 and Down arrow 342 so that the user may adjust the cooling temperature, if desired. Heating temperature block 454 may display a heating temperature for the Wake period, and may include Up arrow 340 and Down arrow 342 so that the user may adjust the heating temperature, if desired. It will be appreciated that HVAC controller 20 may display a similar screen in response to the user pressing (with respect to FIG. 44), any of Wake button 434, Leave button 436, Return button 438 and Sleep button 440.

In some instances, screen 448 may include text 456 informing the user that they have the opportunity to set the wake time and temperatures (or whichever time period is being displayed as a result of having pressed a particular time period button with respect to screen 430, shown in FIG. 44). The user may have the opportunity to simply delete the displayed time period by pressing a Delete Period button 458. A Help button 460 may be pressed to obtain additional information, selection options, and the like.

Figure 46:
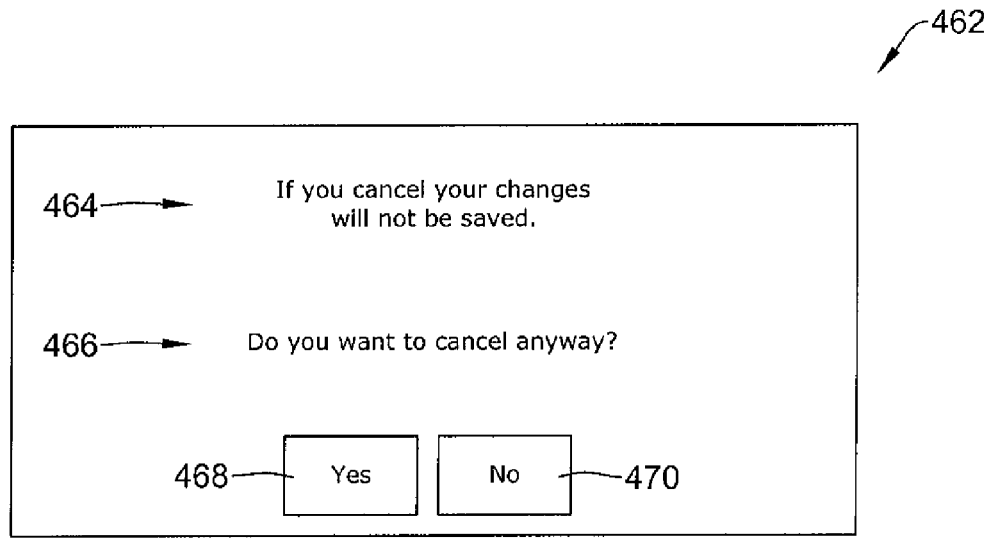

FIG. 46 provides an illustrative screen 462 that may be provided by HVAC controller 20 if, with respect to previous Figures, the user presses Cancel button 316 during some of the scheduling screens. Screen 462 includes text 464 that informs the user that their changes will not be saved if they cancel. An inquiry 466 asks the user to confirm if they wish to cancel, knowing that their changes will not be saved. A Yes button 468 and a No button 470 permit a user to enter their preference.

Figure 47:
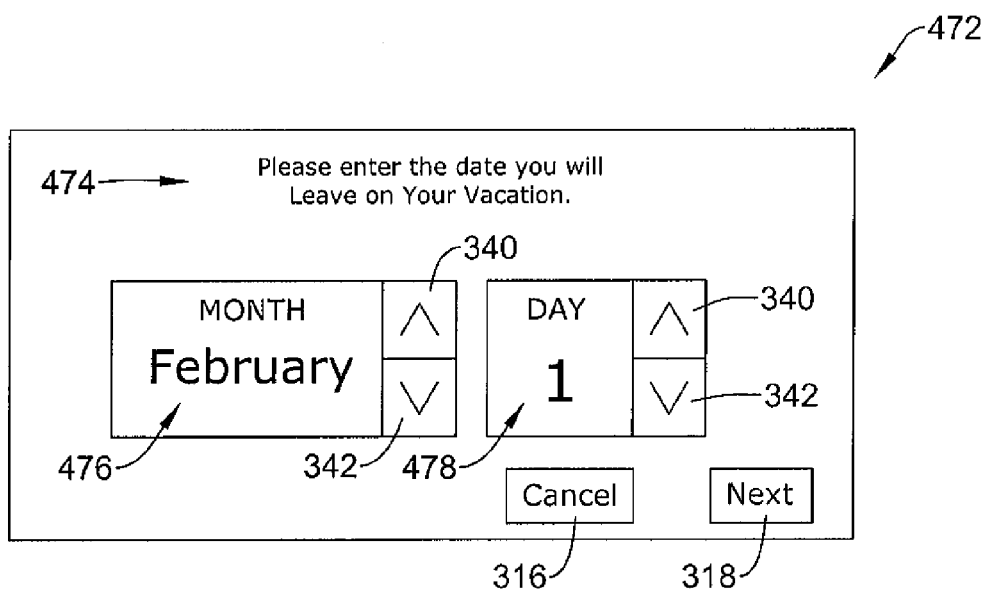
FIGS. 47 through 53 provide illustrative but non-limiting examples of screens pertaining to creating and/or editing a vacation schedule using the HVAC controllers of FIGS. 1 and 2.

FIGS. 47 through 53 provide illustrative but non-limiting examples of screens that may be displayed by HVAC controller 20 pertaining to creating, editing and/or viewing a vacation schedule within HVAC controller 20. In particular, FIG. 47 provides an illustrative screen 472 that may be displayed by HVAC controller 20 in response to someone pressing or otherwise selecting Vacation Mode button 154 (FIG. 17).

Screen 472 may include text 474 that instructs the user to enter the date that they will be leaving on vacation. A Month block 476 displays a month, and Up arrow 340 and/or Down arrow 342 may be used to scroll up and/or down to the desired month. A Date block 478 displays a day of the month that can be adjusted up or down using Up arrow 340 and/or Down arrow 342 as desired. As illustrated, the date is displayed using numbers 1 through 31. In some cases, the corresponding day of the week (Monday, Tuesday, Wednesday, Thursday, Friday, Saturday and Sunday) may also be displayed, but this is not required. Cancel button 316 may, if pressed, cause HVAC controller 20 to revert to screen 150 (FIG. 17).

Figure 48:
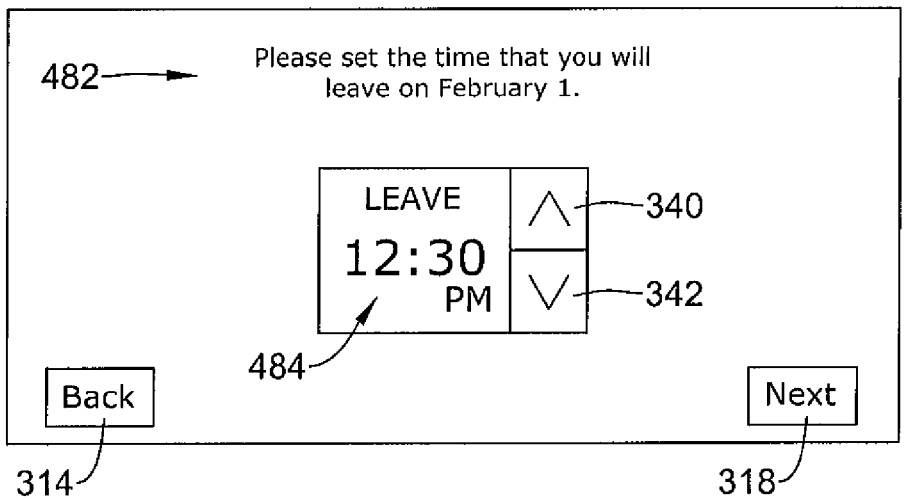

Pressing Next button 318 may cause HVAC controller 20 to display an illustrative screen 480, as shown in FIG. 48. Screen 40 may include text 482 that instructs the user to set the time that they will be leaving on vacation. In some cases, as illustrated, text 482 may reference the date previously set with respect to screen 472 (FIG. 47) but this is not required. A time block 484 displays a departure time that can be adjusted using Up arrow 340 and/or Down arrow 342, as appropriate. Back button 314 permits the user to return to the previous screen, if, for example the date was set incorrectly.

Figure 49:
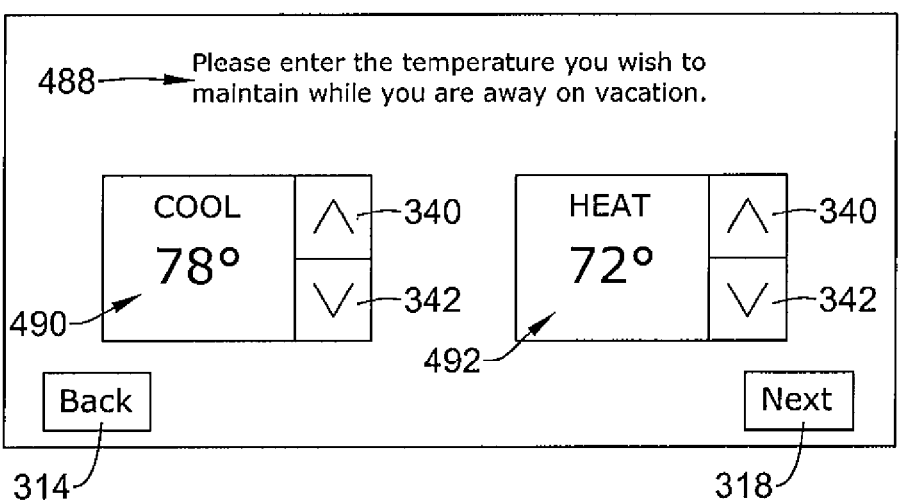

Pressing Next button 318 may cause HVAC controller 20 to display an illustrative screen 486, shown in FIG. 49. In some cases, screen 486 may include text 488 instructing the user to enter a temperature that they want to maintain while they are on vacation. In some instances, as illustrated, screen 486 may include a cooling temperature block 490 displaying a cooling temperature set point and a heating temperature block 492 displaying a heating temperature set point. Cooling temperature block 490 and/or heating temperature block 492 may each independently include UP arrow 340 and Down arrow 342 for adjusting temperature settings as desired. In some cases, screen 486 may instead include only a single temperature block (not illustrated), particularly if the user does not take advantages of the programmability of HVAC controller 20 and instead simply uses HVAC controller 20 to hold a particular constant temperature, or if only a heating system or only a cooling system is included as part of the HVAC system. Back button 314 permits the user to return to the previous screen, if desired.

Figure 50:
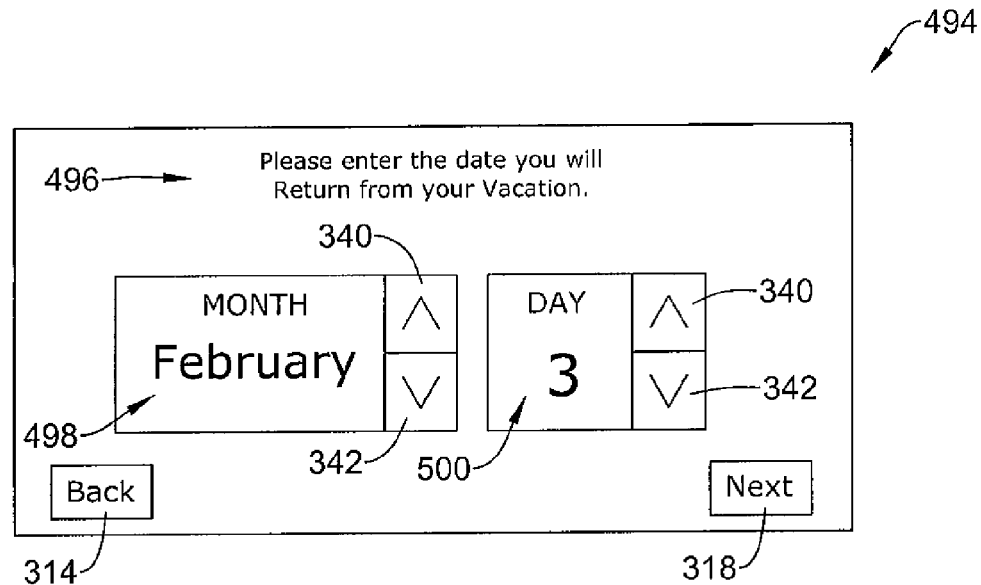

Pressing Next button 318 may cause HVAC controller 20 to display an illustrative screen 494, as shown in FIG. 50. Screen 494 may include text 496 that instructs the user to enter the date that they will be returning from vacation. A Month block 498 displays a month, and Up arrow 340 and/or Down arrow 342 may be used to scroll up and/or down to the desired month. A Date block 500 displays a day of the month that can be adjusted up or down using Up arrow 340 and/or Down arrow 342 as desired.

Figure 51:
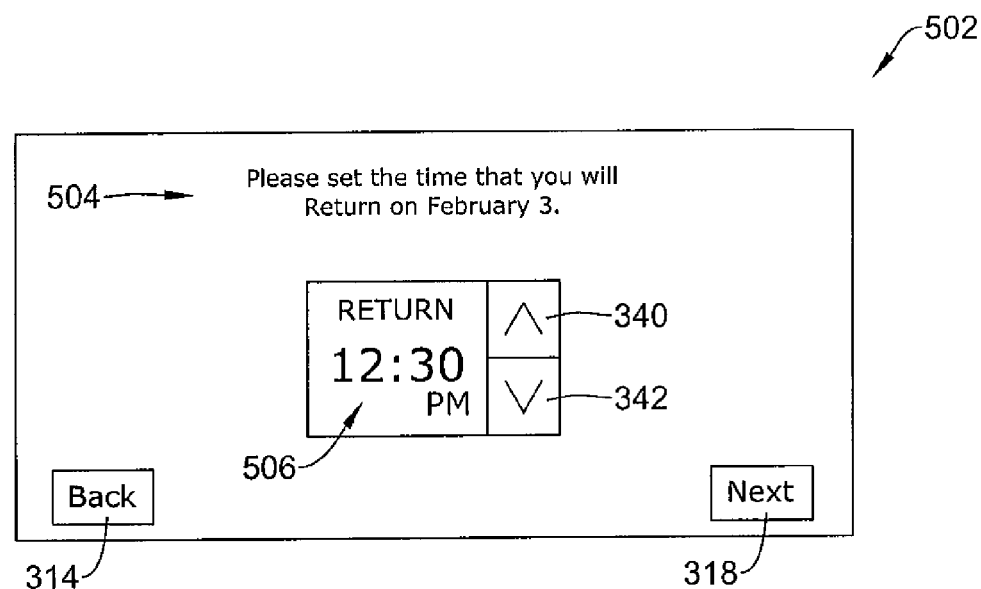

Pressing Next button 318 may cause HVAC controller 20 to display an illustrative screen 502, as shown in FIG. 51. Screen 502 may include text 504 that instructs the user to set the time that they will be returning from vacation. In some cases, as illustrated, text 504 may reference the date previously set with respect to screen 486 (FIG. 49) but this is not required. A time block 506 displays a return time that can be adjusted using Up arrow 340 and/or Down arrow 342, as appropriate. Back button 314 permits the user to return to the previous screen, if, for example the date was set incorrectly.

Figure 52:
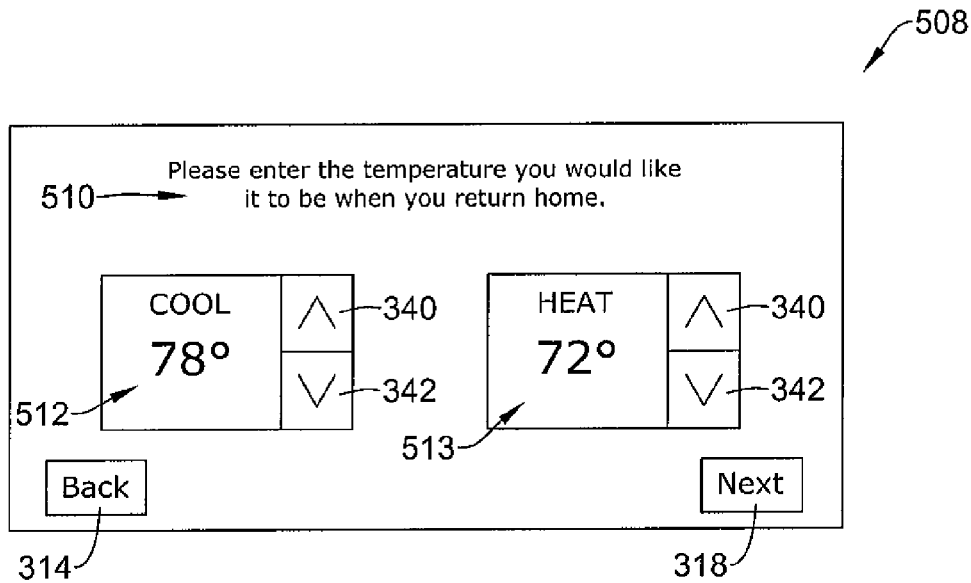

Pressing Next button 318 may cause HVAC controller 20 to display an illustrative screen 508, shown in FIG. 52. In some cases, screen 508 may include text 510 instructing the user to enter a temperature that they want when they return from vacation. In some instances, as illustrated, screen 508 may include a cooling temperature block 512 displaying a cooling temperature set point and a heating temperature block 513 displaying a heating temperature set point. Cooling temperature block 512 and/or heating temperature block 513 may each independently include UP arrow 340 and Down arrow 342 for adjusting temperature settings as desired. In some cases, screen 508 may instead include only a single temperature block (not illustrated), particularly if the user does not take advantages of the programmability of HVAC controller 20 and instead simply uses HVAC controller 20 to hold a particular constant temperature, or if only a heating system or only a cooling system are included as part of the HVAC system. Back button 314 permits the user to return to the previous screen, if desired.

Figure 53:
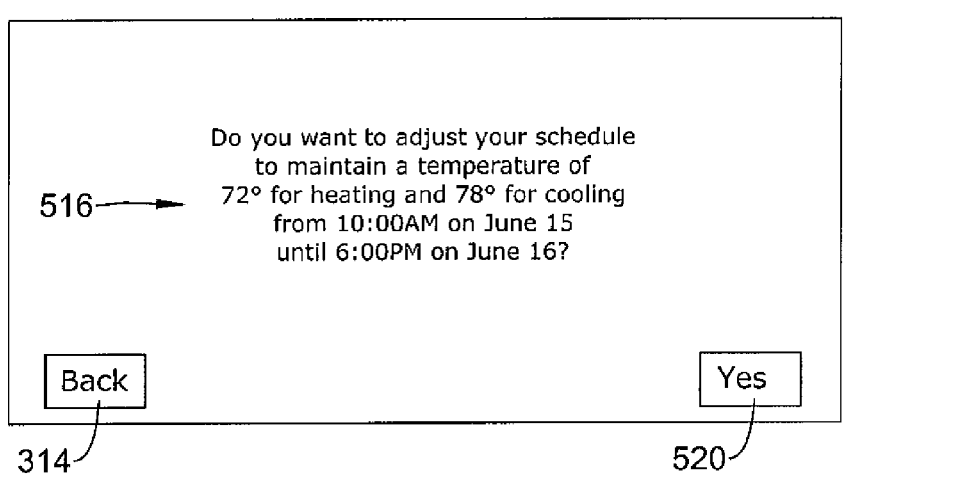

Pressing Next button 318 may cause HVAC controller 20 to display an illustrative screen 514, as shown in FIG. 53. Screen 514 may include text 516 that asks the user to confirm their vacation settings. If there is an error, or the user wishes to make any changes, they may do so by pressing Back button 314 and HVAC controller 20 will provide the appropriate screens to make any necessary changes. If the user agrees with the vacation settings, they may inform HVAC controller 20 thereof by pressing Yes button 520.

Figure 56:
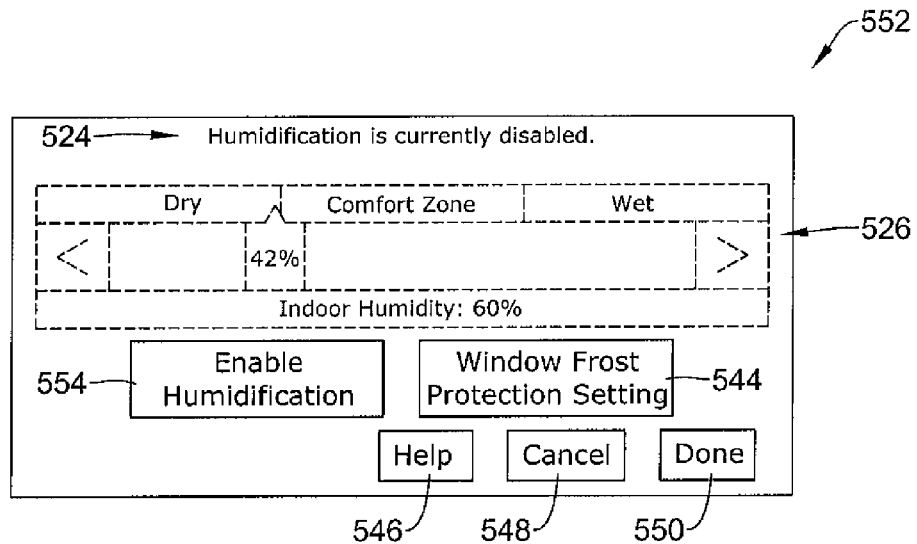
Figure 57:
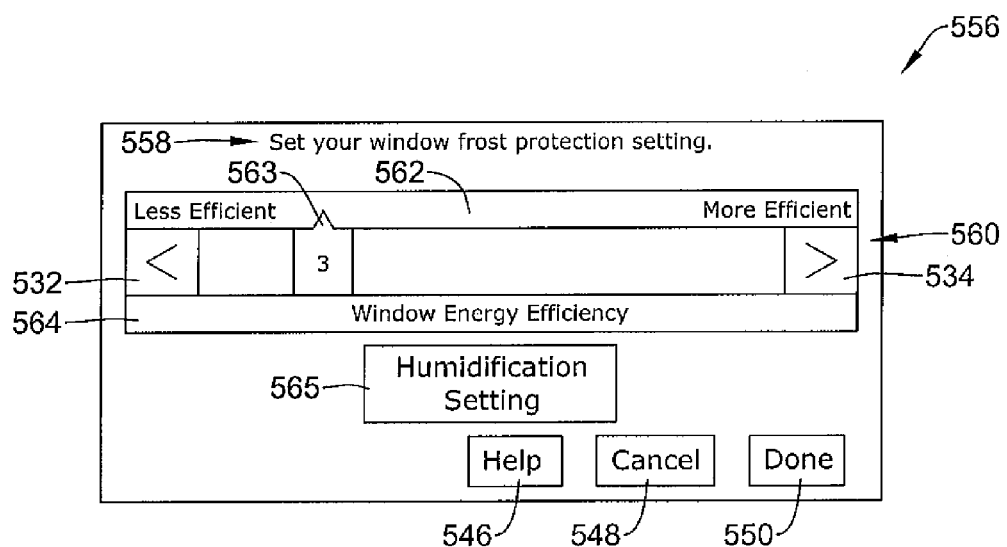
Figure 58:
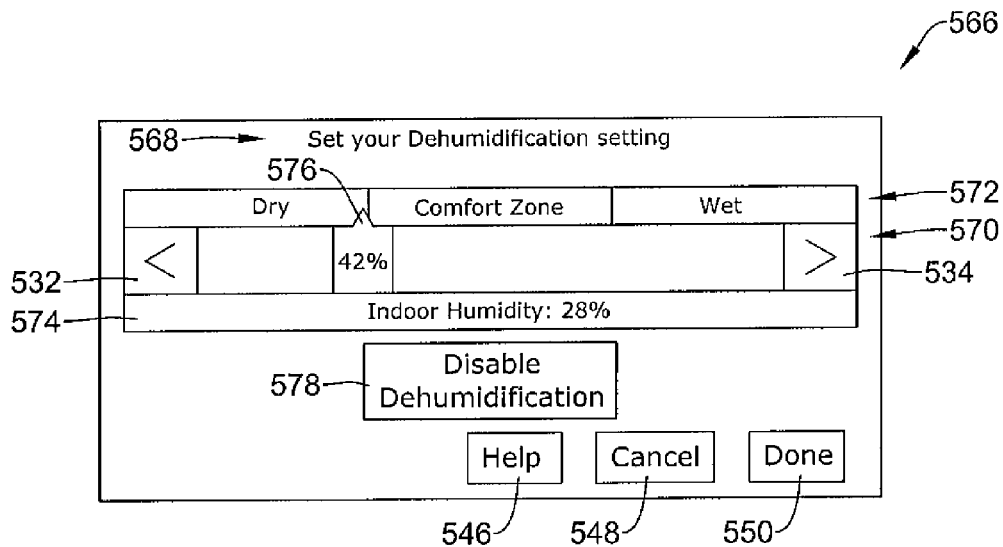
Figure 59:
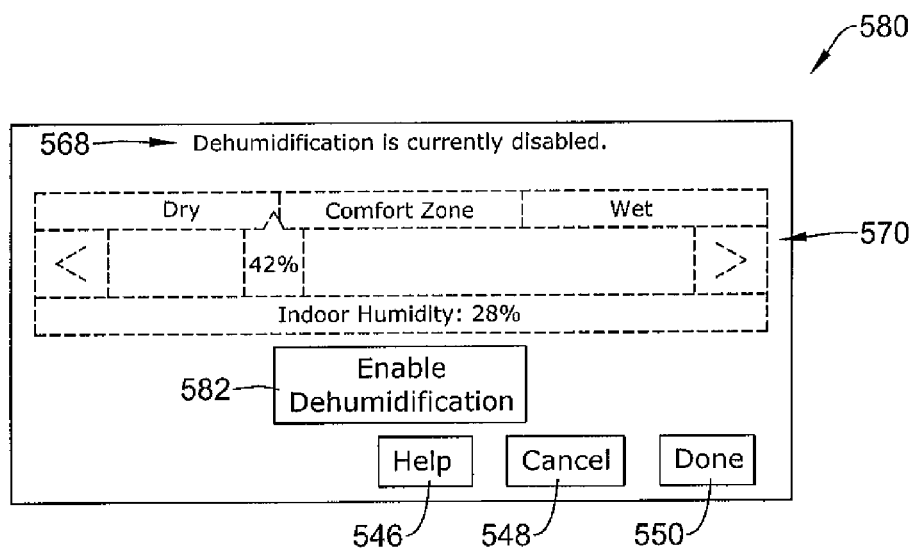
Figure 60:
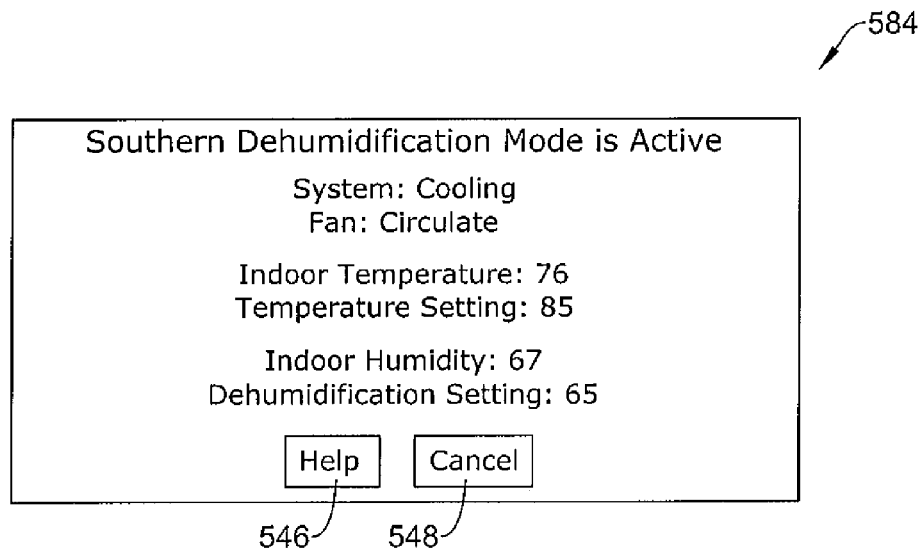

FIGS. 54 through 60 provide illustrative but non-limiting examples of screens that may be displayed by HVAC controller 20 pertaining to changing and/or viewing humidification and dehumidification settings within HVAC controller 20. In particular, FIGS. 54-57 provide illustrative screens that may be displayed by HVAC controller 20 in response to someone pressing or otherwise selecting Humidification button 156 (FIG. 17), FIGS. 58-59 provide illustrative screen that may be displayed by HVAC controller 20 in response to someone pressing or otherwise selecting Dehumidification button 158 (FIG. 17) and FIG. 60 provides an illustrative screen that may be displayed by HVAC controller 20 in response to someone pressing or otherwise selecting Southern Dehumidification Mode button 172 (FIG. 17).

Figure 54:
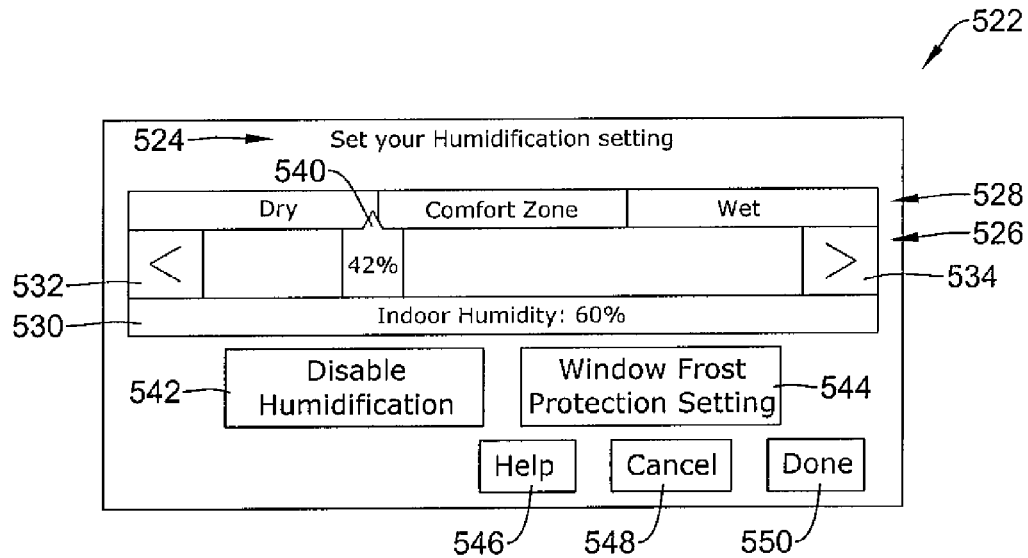
FIGS. 54 through 60 provide illustrative but non-limiting examples of screens pertaining to changing and/or viewing humidification and dehumidification settings using the HVAC controllers of FIGS. 1 and 2.

FIG. 54 provides an illustrative screen 522 that may include text 524 instructing the user to select or set their humidification setting. HVAC controller 20 may, for example, use the humidification setting in controlling a humidifier such as a whole-house humidifier. HVAC controller 20 may, for example, display a parameter adjustment element for use in adjusting an operating parameter such as humidification, the parameter adjustment element may include an indicator that provides a qualitative indication for at least the current setting of the operating parameter.

To illustrate, screen 522 includes a slider bar 526 that has a scale 528, a display 530, a Left arrow 532 and a Right arrow 534. Scale 528 can be seen as including text describing the humidification setting in relative or qualitative terms such as "Dry", "Comfort Zone" and "Wet". These particular terms are merely representative, as other terms may also be used. More generally, scale 528 may provide a qualitative context to a particular humidity value (e.g. 42%) so that a user unfamiliar with humidity values can still choose an appropriate humidity setting.

Figure 55:
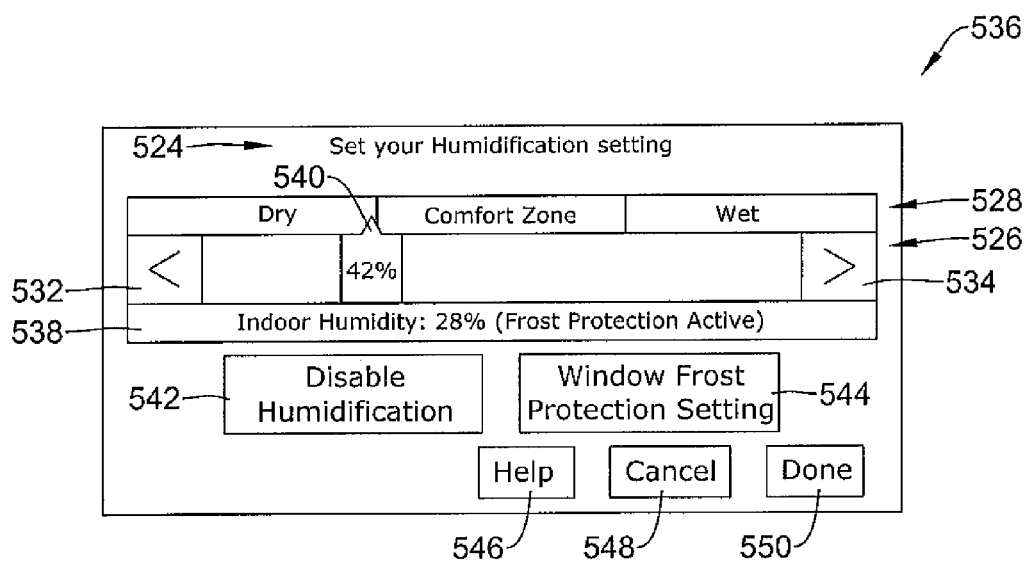

Display 530 may, as illustrated, provide a reminder that it is the indoor humidity setting that is being displayed as well as a current indoor humidity setting or current indoor humidity reading. FIG. 55 provides an illustrative screen 536 having a display 538 that provides a display of the current indoor humidity setting or reading as well as an indication that frost protection has been activated, as will be discussed with respect to subsequent Figures.

Returning to FIG. 54, slider bar 526 may be seen as including an indicator button 540 that may be moved left and/or right using left arrow 532 and/or right arrow 534, as desired. Indicator button 540 may, with respect to scale 528, provide a visual indication of the relative or qualitative humidity setting and may, if desired, include a pointer that interacts with scale 528. Scale 528 may provide upper and/or lower numerical limits for the displayed parameter. In some instances, indicator button 540 may include a numerical representation of the indoor humidity setting.

In some cases, indicator button 540 may move a prescribed distance either left or right in response to the user pressing either left arrow 532 or right arrow 534. In some cases, the distance that indicator button 540 moves may be at least partially a function of how many times left arrow 532 and/or right arrow 534 are pressed. In some instances, the distance that indicator button 540 moves may be at least partially a function of how long left arrow 532 and/or right arrow 534 are held down by the user. In some cases, indicator button 540 may be a touch-sensitive button, and may be moved left or right simply by the user touching indicator button 540 and dragging their finger left or right.

Screen 522 may include a Disable Humidification button 542. In some cases, a user may not wish to provide HVAC controller 20 with humidification settings. For example, in warm climates, the user may not want or need to operate a humidifier such as a whole-house humidifier that is controlled by HVAC controller 20. In some cases, a user's HVAC equipment may not include any humidification equipment. In situations such as these, the user may deactivate this functionality by pressing Disable Humidification button 542. FIG. 56 provides an illustrative screen 552 that is similar to screen 522 (FIG. 54), but shows that HVAC controller 20 has grayed out slider bar 526 as a result of the user having pressed Disable Humidification button 542. It can be seen that text 524 also states that humidification has been disabled. In some cases, screen 552 may include an Enable Humidification button 554.

Returning to FIG. 54, screen 522 may include a Window Frost Protection Setting button 544, as will be discussed with respect to FIGS. 57 and 58. A Help button 546 may, if pressed, provide further information explaining humidification, providing clarification regarding options, and the like. A Cancel button 548, if pressed, may cause HVAC controller 20 to revert to screen 150 (FIG. 17) without saving any changes that may have been made. A Done button 550, if pressed, informs HVAC controller 20 that the humidification setting has been completed, and as a result, may revert to screen 150 (FIG. 17).

Pressing Window Frost Protection Setting button 544 (FIG. 54) may cause HVAC controller 20 to display an illustrative screen 556, as shown in FIG. 57. In some ways, selecting an indoor humidification setting is similar to selecting a window frost protection setting, as the risk of window condensation, particularly in cold weather, is at least partially a function of the indoor air humidity. However, window condensation is also at least partially a function of the efficiency of the windows within the house or other building.

An old, inefficient window such as a single-pane window may present a relatively cold glass surface to the heated atmosphere within the building. Condensation is more likely in this situation. In contrast, a newer, more efficient window such as a double-pane window or even a triple-pane window will present a relatively warmer glass surface to the heated atmosphere within the building. Thus, an efficient window may tolerate a relatively higher indoor humidity without excessive window condensation. It will be recognized, of course, that outdoor temperature may also play a part. In some cases, HVAC controller 20 may be in communication with an exterior temperature sensor and may be programmed to adjust humidity settings and/or window frost protection settings accordingly.

Screen 556 may include text 558 that informs the user that they are to select a setting for window frost protection. Screen 556 includes a slider bar 560 that has a scale 562, a display 564, a left arrow 532 and a right arrow 534. Scale 562 may include text describing the window frost protection setting in relative or qualitative terms such as "Less Efficient" and "More Efficient". It will be recognized that this refers to the relative efficiency of the windows within the building. Display 564 may, as illustrated, provide a reminder that it is the window energy efficiency setting that is being displayed.

Slider bar 560 may be seen as including an indicator button 563 that may be moved left and/or right using left arrow 532 and/or right arrow 534, as desired. Indicator button 563 may, with respect to scale 562, provide a visual indication of the relative or qualitative humidity setting and may, if desired, include a pointer that interacts with scale 562. In some instances, indicator button 563 may include a numerical representation of the window frost protection setting.

Indicator button 563 may be moved using either left arrow 532 or right arrow 534. In some cases, the distance that indicator button 563 moves may be at least partially a function of how many times or for how long left arrow 532 and/or right arrow 534 are pressed. In some cases, indicator button 563 may be a touch-sensitive button, and may be moved left or right simply by the user touching indicator button 563 and dragging their finger left or right. A Humidification Setting button 565 may be pressed if the user wishes to return to screen 522 (FIG. 54) to alter the humidification setting. Cancel button 548, if pressed, may cause HVAC controller 20 to revert to screen 150 (FIG. 17) without saving any changes that may have been made. Done button 550, if pressed, informs HVAC controller 20 that the window frost protection setting has been completed, and as a result, may revert to screen 150 (FIG. 17).

FIG. 58 shows an illustrative screen 566 that may include text 568 instructing the user to select or set their dehumidification setting. HVAC controller 20 may, for example, use the dehumidification setting to control operation of a dehumidifier or an air exchanger. Screen 566 includes a slider bar 570 that has a scale 572, a display 574, a Left arrow 532 and a Right arrow 534. Scale 572 can be seen as including text describing the dehumidification setting in relative or qualitative terms such as "Dry", "Comfort Zone" and "Wet". These particular terms are merely representative, as other terms may also be used. More generally, scale 572 may provide a qualitative context to a particular humidity value (e.g. 42%) so that a user unfamiliar with humidity values can still choose an appropriate dehumidification setting.

Display 574 may, as illustrated, provide the current indoor humidity setting or current indoor humidity reading. Slider bar 570 may be seen as including an indicator button 576 that may be moved left and/or right using left arrow 532 and/or right arrow 534, as desired. Indicator button 576 may, with respect to scale 528, provide a visual indication of the dehumidification setting and may, if desired, include a pointer that interacts with scale 574. In some instances, indicator button 576 may include a numerical representation of the indoor humidity setting.

Indicator button 576 may be moved using either left arrow 532 or right arrow 534. In some cases, the distance that indicator button 576 moves may be at least partially a function of how many times or for how long left arrow 532 and/or right arrow 534 are pressed. In some cases, indicator button 576 may be a touch-sensitive button, and may be moved left or right simply by the user touching indicator button 562 and dragging their finger left or right.

Screen 566 may, as illustrated, include a Disable Dehumidification button 578. Pressing Disable Dehumidification button 578 may cause HVAC controller 20 to display an illustrative screen 580 as shown in FIG. 59. It can be seen that in screen 580, slider bar 570 has been grayed out. Text 568 may also include a message reminding the user that dehumidification has been disabled. The user may wish to disable dehumidification if, for example, their HVAC equipment does not include a dehumidifier or an air exchanger. In some cases, screen 580 may include an Enable Dehumidification button 582.

Returning to FIG. 58, cancel button 548, if pressed, may cause HVAC controller 20 to revert to screen 150 (FIG. 17) without saving any changes that may have been made. Done button 550, if pressed, informs HVAC controller 20 that the dehumidification setting has been completed, and as a result, may revert to screen 150 (FIG. 17).

FIG. 60 shows an illustrative screen 584 that may, for example, be reached by pressing Southern Dehumidification Mode button 172 (FIG. 17). Screen 584 provides the user with settings information pertaining to a southern dehumidification mode. Help button 546 may provide educational or information messages pertaining to the southern dehumidification mode, and/or may discuss possible options. Cancel button 548, if pressed, may cause HVAC controller 20 to revert to screen 150 (FIG. 17).

Figure 61:
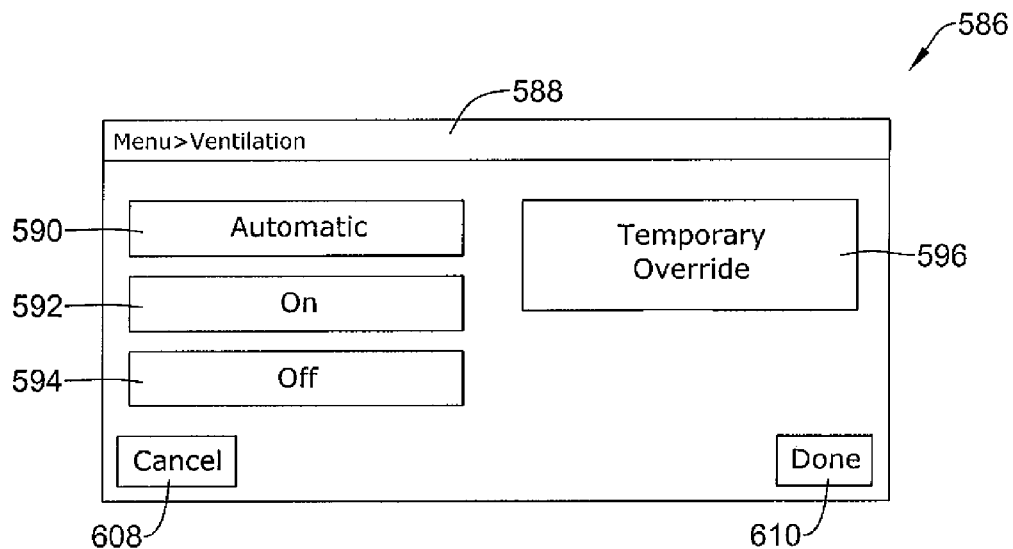
FIGS. 61 through 66 provide illustrative but non-limiting examples of screens pertaining to changing and/or viewing ventilation settings using the HVAC controllers of FIGS. 1 and 2.

FIGS. 61 through 66 provide illustrative but non-limiting examples of screens that may be displayed by HVAC controller 20 pertaining to changing and/or viewing ventilation settings within HVAC controller 20. HVAC controller 20 may use these settings, for example, to control operation of an air exchanger or the like. In particular, FIG. 61 provides an illustrative screen 586 that may be displayed by HVAC controller 20 in response to someone pressing or otherwise selecting Ventilation button 160 (FIG. 16).

Screen 586 may include a menu bar 588 that includes navigational information so that the user may better remember and/or understand where they are within the menu and how they got there. Screen 586 may include one or more of an Automatic button 590, an On button 592 and an Off button 594. If the user presses Automatic button 590, HVAC controller 20 may operate the air exchanger only when, for example, other HVAC equipment such as a forced air furnace or an air conditioner is operating, or perhaps operate the air exchanger in accordance with dehumidification settings. Pressing On button 592 may cause HVAC controller 20 to operate the air exchanger at all times while pressing corresponding Off button 594 may cause HVAC controller 20 to not operate the air exchanger at all.

In some cases, screen 586 may include a Temporary Override button 596. In some cases, a user may want the air exchanger to run constantly for a relatively short period of time. Examples of when this may occur, for example, include a desire to eliminate strong cooking odors or perhaps steam from a hot shower. If the user presses Temporary Override button 596, HVAC controller 20 may display an illustrative screen 598, as shown in FIG. 62.

Screen 598 includes a time block 600 that may be used to enter or edit a length of time for which the air exchanger will operate. Time block 600 may include a numerical display 602 representing a length of time in any appropriate units such as minutes. Up arrow 604 and down arrow 606 may be used, as desired, to increase or decrease the length of time for operating the air exchanger. A Cancel button 608 may, if pressed, cause HVAC controller 20 to revert to a previous screen such as screen 150 (FIG. 17). A Done button 610, if pressed, tells HVAC controller 20 that a desired length of time has been entered, and thus HVAC controller 20 operates the air exchanger continuously for the specified length of time. In some cases, pressing Done button 610 also causes HVAC controller 20 to revert to screen 150 (FIG. 17).

Figure 62:
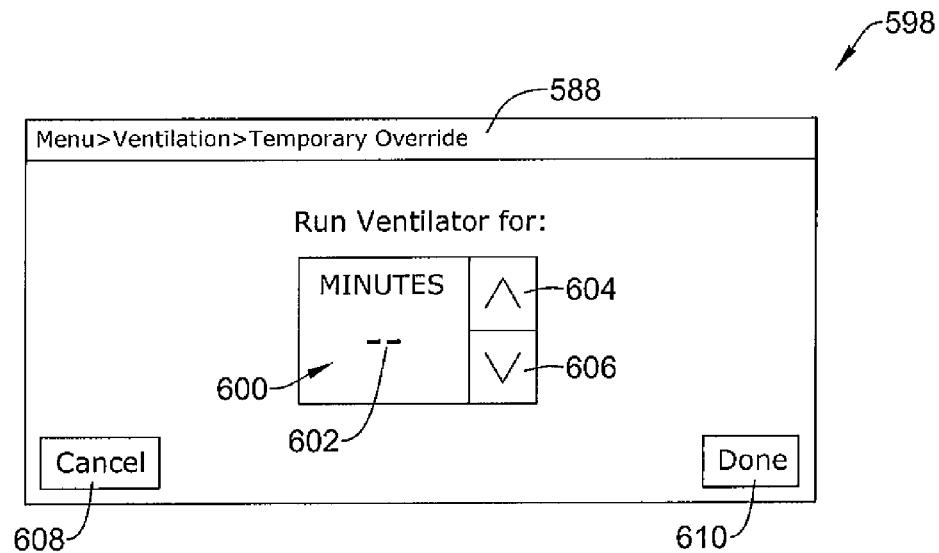
Figure 63:
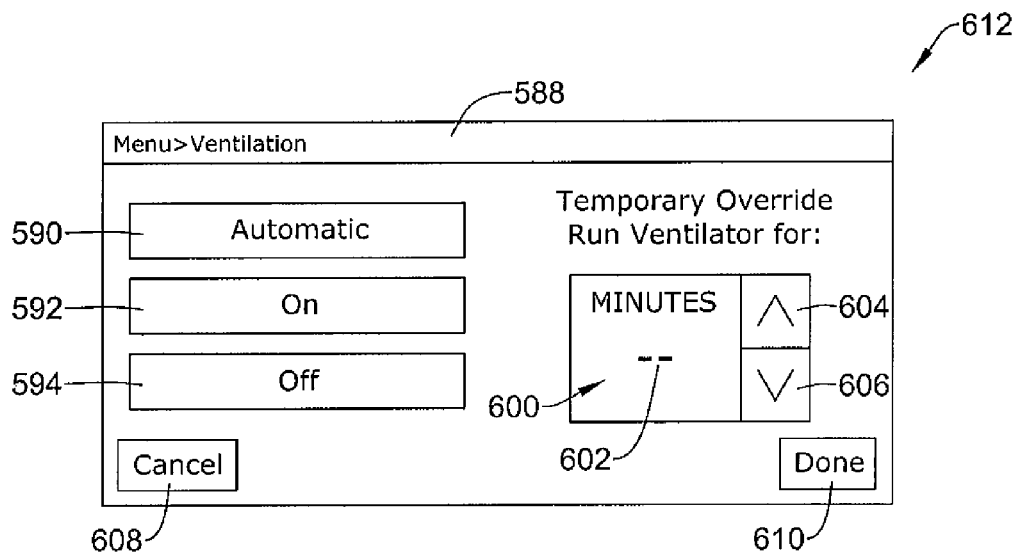

Returning to FIG. 61, it is noted that screen 586 includes Cancel button 608 and Done button 610, as discussed with respect to FIG. 62. In FIG. 61, Temporary Override button 596 was pressed to bring up screen 598 (FIG. 62), with screen 598 including time block 600. In some cases, as seen in illustrative screen 612 (FIG. 63), time block 600 may instead be displayed on the same screen as Automatic button 590, On button 592 and Off button 594, for example.

Figure 64:
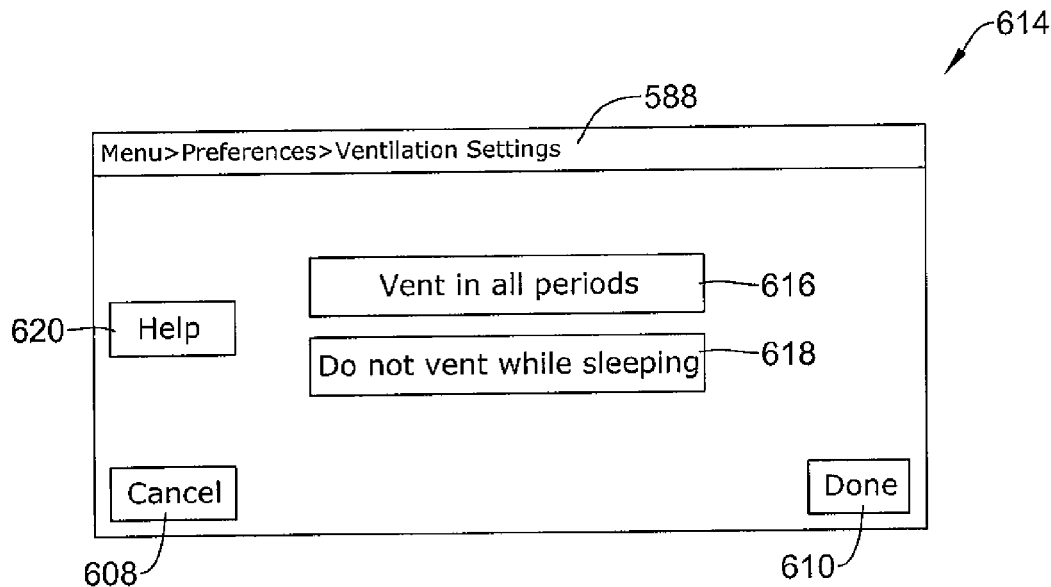

In some cases, a user may wish to set ventilation settings based at least partially on time, or perhaps on particular time periods such as one or more of the Wake, Leave, Return and/or Sleep periods. FIG. 64 provides an illustrative screen 614 that includes a Vent in All Periods button 616 and a Do Not Vent While Sleeping button 618. If the user presses Vent in All Periods button 616, they may be provided an opportunity to set ventilation settings for one or more of the aforementioned time periods. If they press Do Not Vent While Sleeping button 618, they may be given the opportunity to set ventilation settings for one or more the aforementioned time periods absent the Sleep period. In some cases, other options such as a Do Not Vent while Gone button. A Help button 620 may, if pressed, provide the user with more information pertaining to their options.

Figure 65:
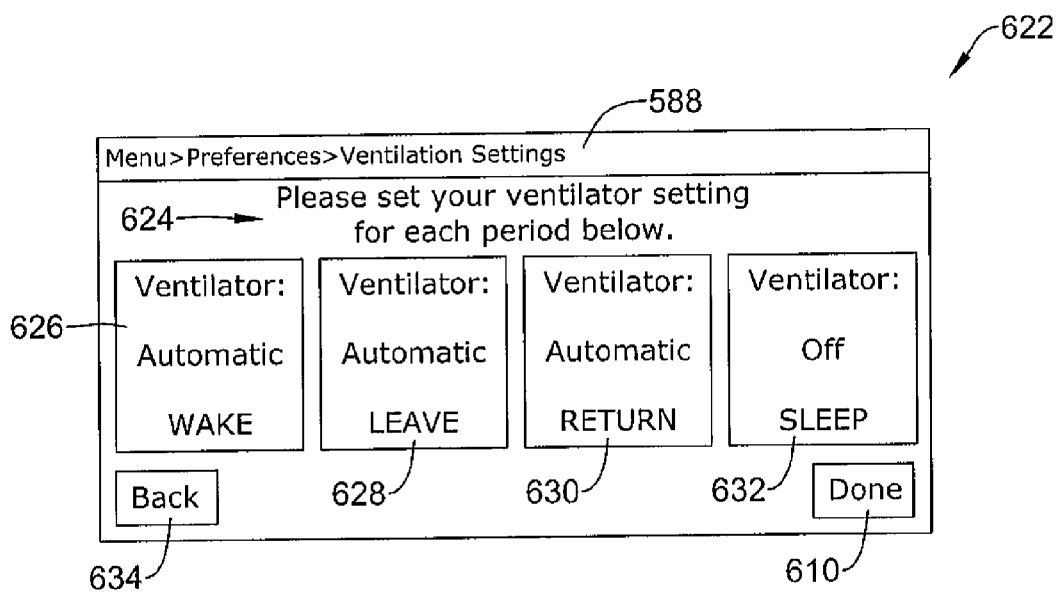

In the illustrative embodiment, pressing one of Vent in All Periods button 616 or Do Not Vent While Sleeping button 618 may cause HVAC controller 20 to display an illustrative screen 622, as shown in FIG. 65. Screen 622 may include text 624 instructing the user to set ventilator settings for each time period shown. Screen 622 may include one or more of a Wake button 626, a Leave button 628, a Return button 630 and a Sleep button 632, each of which may display a current ventilator setting. A Back button 634 permits the user, if desired, to return to a previous screen.

Figure 66:
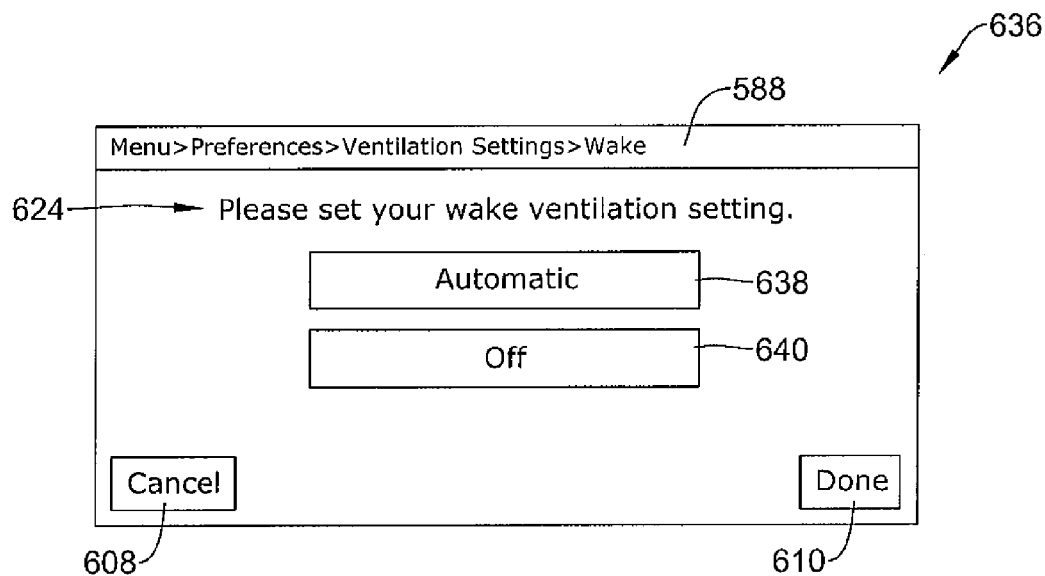

The user may alter the ventilator setting for a particular time period by pressing the corresponding time period button. For example, if the user presses Wake button 626, HVAC controller 20 may display an illustrative screen 636, as shown in FIG. 66. Text 624 may include a message instructing the user to set the ventilation setting for the Wake period. Screen 636 may include an Automatic button 638 and an Off button 640. In some cases, screen 636 may also include an On button (not illustrated). By pressing one of Automatic button 638 and Off button 640, the user may select their desired ventilation setting for the Wake period. The other time periods may be set in a similar manner.

Figure 67:
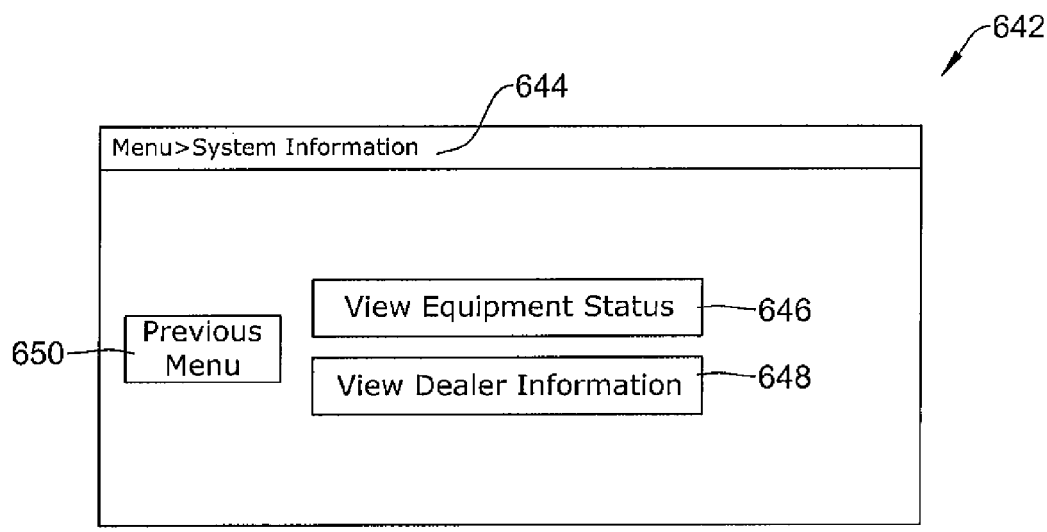
FIGS. 67 through 69 provide illustrative but non-limiting examples of screens pertaining to setting system information using the HVAC controllers of FIGS. 1 and 2.
Figure 68:
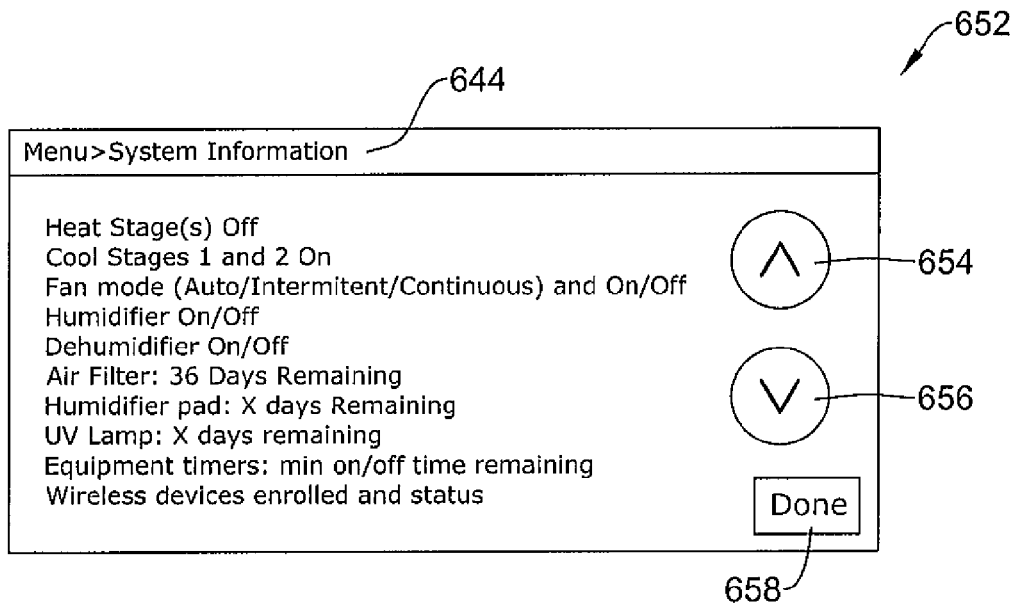
Figure 69:
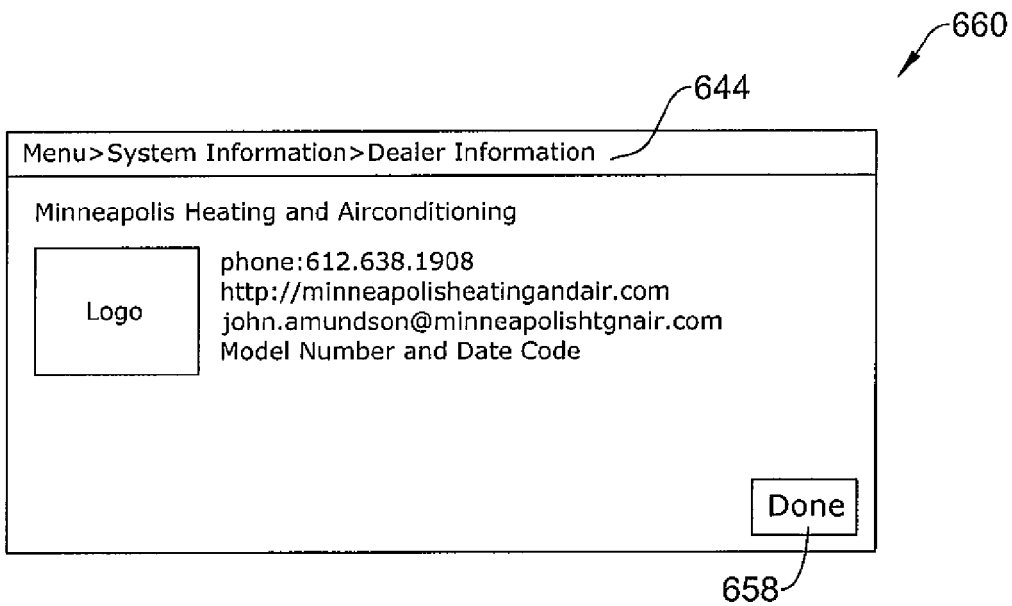

FIGS. 67 through 69 provide illustrative but non-limiting examples of screens that may be displayed by HVAC controller 20 pertaining to viewing system information within HVAC controller 20. In particular, FIG. 67 provides an illustrative screen 642 that may be displayed by HVAC controller 20 in response to someone pressing or otherwise selecting System Information button 162 (FIG. 17) in order to obtain system information such as equipment status, dealer information and the like.

Screen 642 may include a navigational bar 644 that assists the user in navigating through the menus provided by HVAC controller 20. Screen 642 may include one or more of a View Equipment Status button 646 that may be used by the user to view a summary of their equipment status and a View Dealer Information button 648 that may be used by the user to obtain dealer information. The user may want to obtain dealer information, for example, if there is a problem with the HVAC equipment, or perhaps if routine maintenance, filter replacement, and the like is needed. A Previous Menu button 650 may permit the user to return to a previous screen.

Pressing View Equipment Status button 646 may cause HVAC controller 20 to display an illustrative screen 652, as shown in FIG. 68. Navigational bar 644 may, as illustrated, reflect the current relative position within the menu structure. Screen 652 provides information pertaining to one or more of heating status, cooling status, fan mode, humidifier status, dehumidifier status, air filter replacement status, UV lamp replacement status, equipment timers, wireless devices, and such. In some cases, there may be more information to display than fits within screen 652. In some instances, screen 652 may include an Up arrow 654 and a Down arrow 656 so that the user may scroll through the displayed information. A Done button 658 informs HVAC controller 20 that the user is finished, and may cause HVAC controller 20 to revert to a previous screen such as screen 642 (FIG. 67).

Pressing View Dealer Information button 648 may cause HVAC controller 20 to display an illustrative screen 660, as shown in FIG. 69. Navigational bar 644 may, as illustrated, reflect the current relative position within the menu structure. Screen 660 provides contact information such as name, address, telephone number and/or email address for an HVAC contractor that installed and/or services the system, for example. As noted above, the user may wish to contact the dealer if there is a problem or if, for example, they want to order replacement parts such as air filters, humidifier pads, UV lamps and the like.

In some cases, a "Service Request" button may be provided that sends a message to the identified contractor and requests the contractor to address the issue. HVAC controller 20 may contact the contractor by email message, text message, or the like. The message may, for example, include appropriate part numbers or other diagnostic information so that the contractor can bring the appropriate parts and/or equipment. Of course, HVAC controller 20 would have to be provided with telephone or other Internet access in order to provide this functionality.

Figure 70:
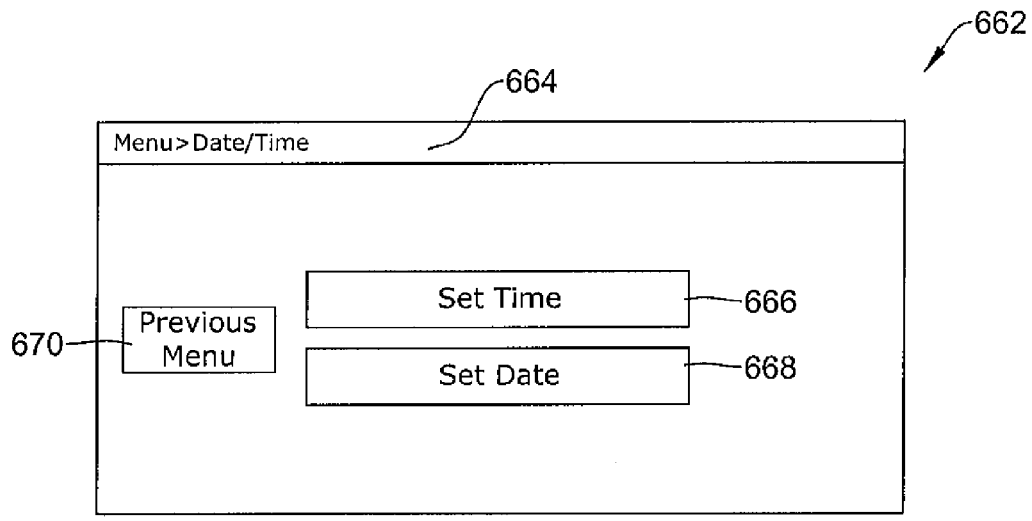
FIGS. 70 through 72 provide illustrative but non-limiting examples of screens pertaining to changing and/or viewing date and time settings using the HVAC controllers of FIGS. 1 and 2.
Figure 71:
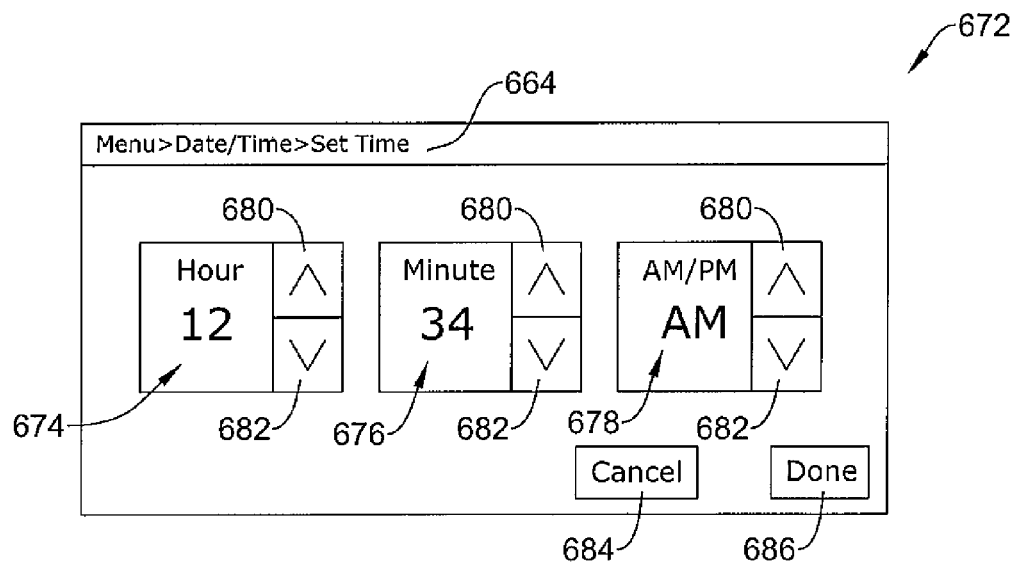
Figure 72:
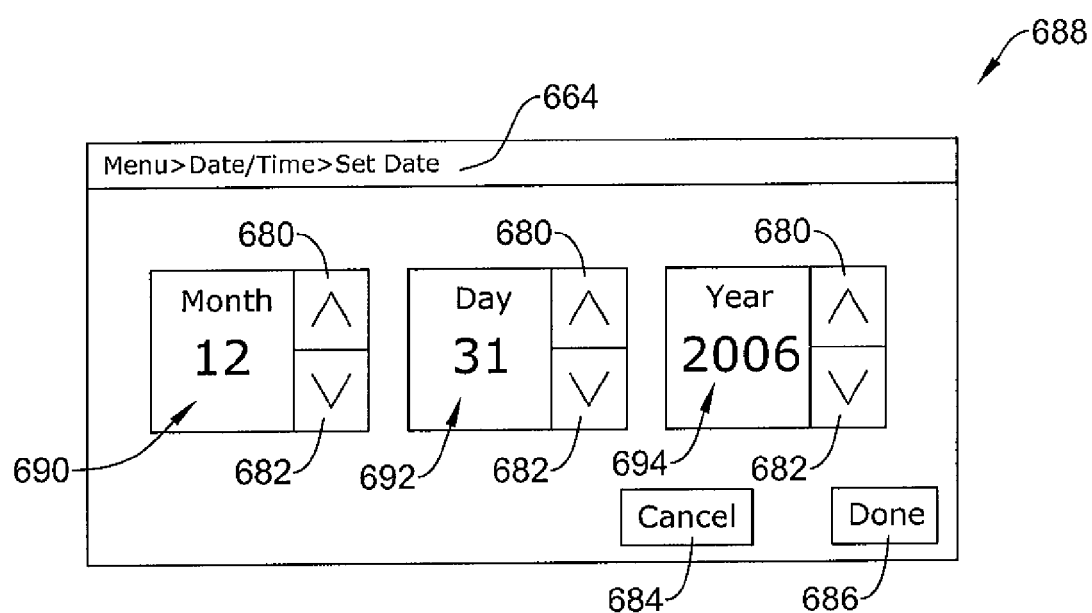

FIGS. 70 through 72 provide illustrative but non-limiting examples of screens that may be displayed by HVAC controller 20 pertaining to viewing and/or changing date and time information within HVAC controller 20. In particular, FIG. 70 provides an illustrative screen 662 that may be displayed by HVAC controller 20 in response to someone pressing or otherwise selecting Date/Time button 164 (FIG. 17) in order to view and/or change date and time information.

Screen 662 may include a navigational bar 664 that informs the user of their current relative position within the menu structure. Screen 662 may include one or more of a Set Time button 666, a Set Date button 668 and a Previous Menu button 670. The user may press Set Time button 666 in order to view or change time settings, or may press Set Date button 668 to view or change date settings. Previous Menu button 670 may cause HVAC controller 20 to revert to a previous screen.

Pressing Set Time button 666 may cause HVAC controller 20 to display an illustrative screen 672, as shown in FIG. 71. Screen 672 may include one or more of a hour block 674, a minute block 676 and an AM/PM block 678. Hour block 674 may display a current hour time setting and may include an Up arrow 680 and a Down arrow 682 that may be used to increase or decrease the current hour time setting, as desired. Minute block 676 may display a current minute time setting that can be increased or decreased using Up arrow 680 and/or Down arrow 682, as appropriate. AM/PM block 678 may display an indication of whether the current time is AM or PM. Up arrow 680 and/or Down arrow 682 may be used to adjust whether the current time is before noon or after noon. A Cancel button 684, if pressed, may cause HVAC controller 20 to revert to a previous screen without saving any changes. A Done button 686 may cause HVAC controller 20 to save any time changes made, and to subsequently revert to screen 662 (FIG. 70).

Pressing Set Date button 668 may cause HVAC controller 20 to display an illustrative screen 688, as shown in FIG. 72. Screen 688 may include one or more of a Month block 690, a Day block 692 and a Year block 694. Month block 690 may display a current month setting that can be adjusted, if desired, using Up arrow 680 and/or Down arrow 682. Day block 692 may display a current day setting that can be adjusted up or down via Up arrow 680 and/or Down arrow 682. Year block 694 may display a current year setting that can be adjusted, if necessary, using Up arrow 680 and Down arrow 682. Cancel button 684, if pressed, may cause HVAC controller 20 to revert to a previous screen without saving any changes. Done button 686 may cause HVAC controller 20 to save any time changes made, and to subsequently revert to screen 662 (FIG. 70).

Figure 73:
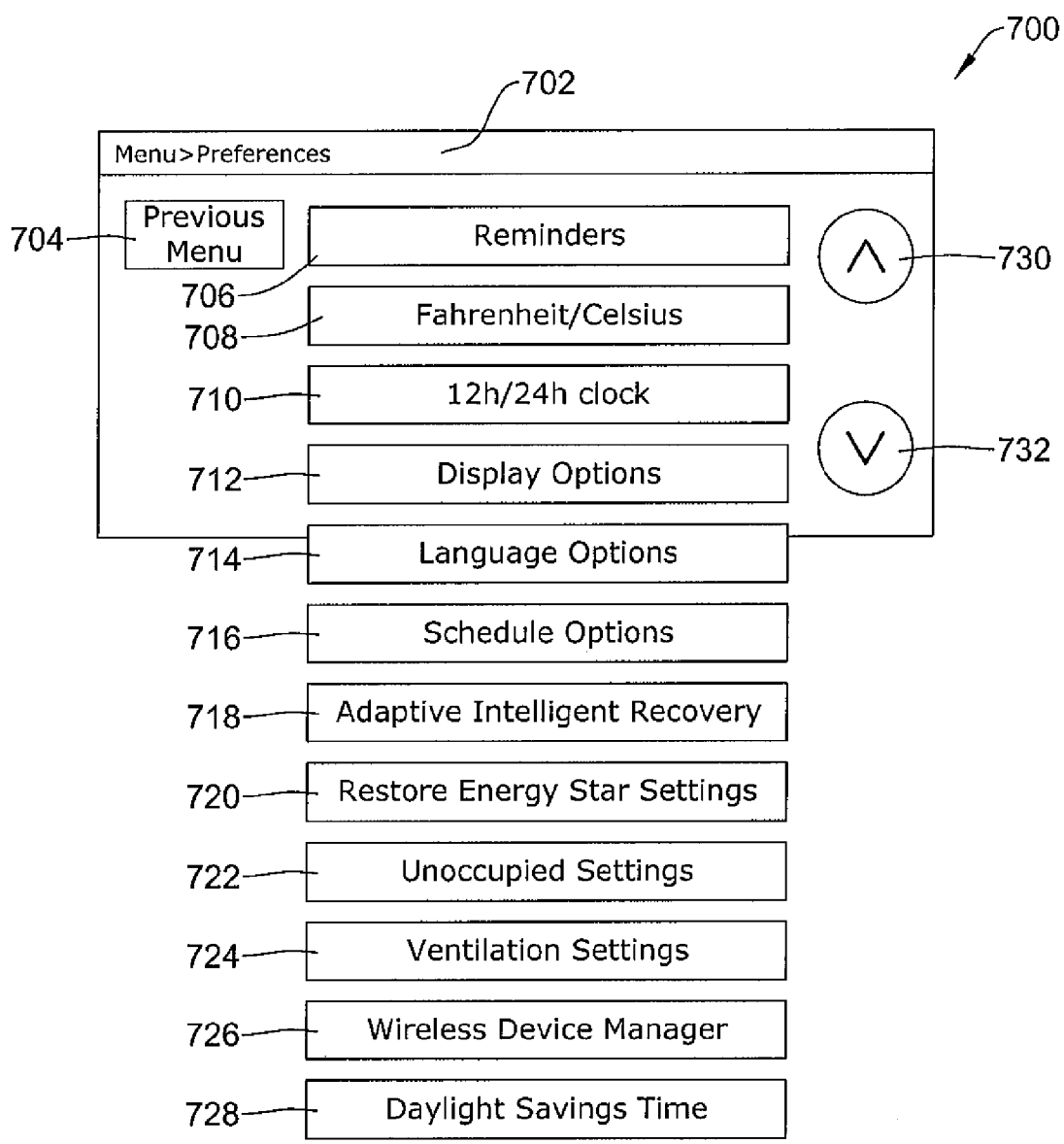
FIGS. 73 through 95 provide illustrative but non-limiting examples of screens pertaining to changing and/or viewing preferences information using the HVAC controllers of FIGS. 1 and 2.

FIGS. 73 through 95 provide illustrative but non-limiting examples of screens that may be displayed by HVAC controller 20 pertaining to viewing and/or changing preferences within HVAC controller 20. In particular, FIG. 73 provides an illustrative screen 700 that may be displayed by HVAC controller 20 in response to someone pressing or otherwise selecting Preferences button 166 (FIG. 17) in order to view and/or change preferences information.

Screen 700 includes a navigational bar 702 that may provide the user with information pertaining to where they are within the menu structure. A Previous Menu button 704 permits the user to, if desired, return to a previous menu. In some cases, pressing Previous Menu button 704 may cause HVAC controller 20 to revert to screen 150 (FIG. 17). Screen 700 may include a number of menu items for which preferences may be selected. In some cases, there may be more menu items than can be displayed at one time on screen 700. Thus, in some cases screen 700 may include an Up arrow button 730 and a Down arrow button 732 so that the user may scroll up and/or down through the menu items. In FIG. 73, various menu items are shown including some that are shown outside of screen 700. It should be understood that this is only illustrative, and that Up arrow button 730 and/or Down arrow button 732 may be used to scroll through these various menu items on screen 700.

In some instances, screen 700 may display one or more of a Reminders button 706, a Fahrenheit/Celsius button 708, a 12 h/24 h Clock button 710, a Display Options button 712, a Language Options button 714, a Schedule Options button 716, an Adaptive Intelligent Recovery button 718, a Restore Energy Star Settings button 720, an Unoccupied Settings button 722, a Ventilation Settings button 724, a Wireless Device Manager button 726 and a Daylight Savings Time button 728.

Figure 74:
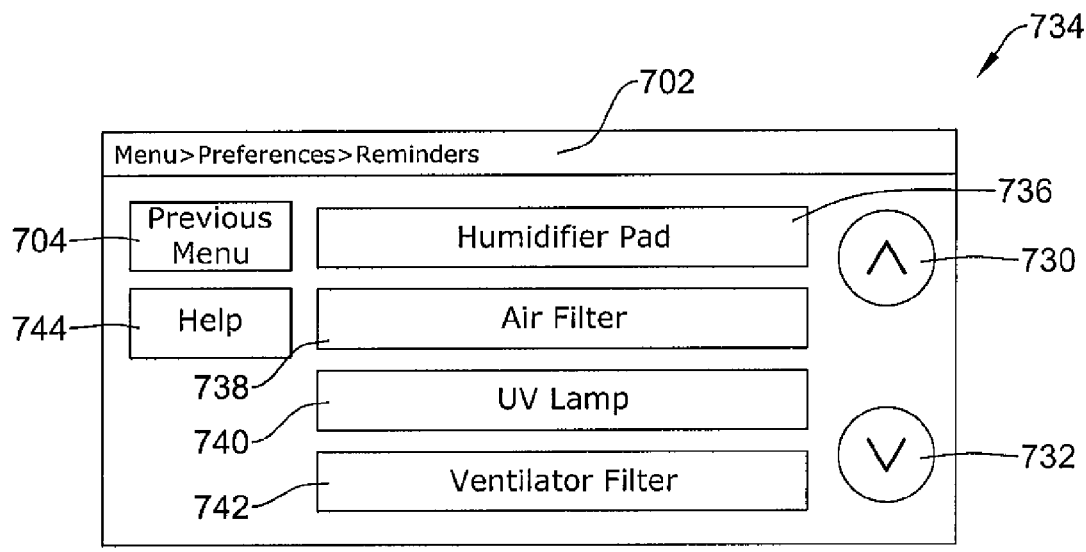

Pressing Reminders button 706 may cause HVAC controller 20 to display an illustrative screen 734, as shown in FIG. 74. Navigational bar 702 may, for example, display information informing the user that they have selected Reminders under Preferences, which is itself a menu item. Screen 734 may include, for example, one or more of a Humidifier Pad button 736, an Air Filter button 738, a UV lamp button 740, and a Ventilator Filter button 742. A Help button 744, if pressed, may provide the user with information describing and/or explaining the options.

Figure 75:
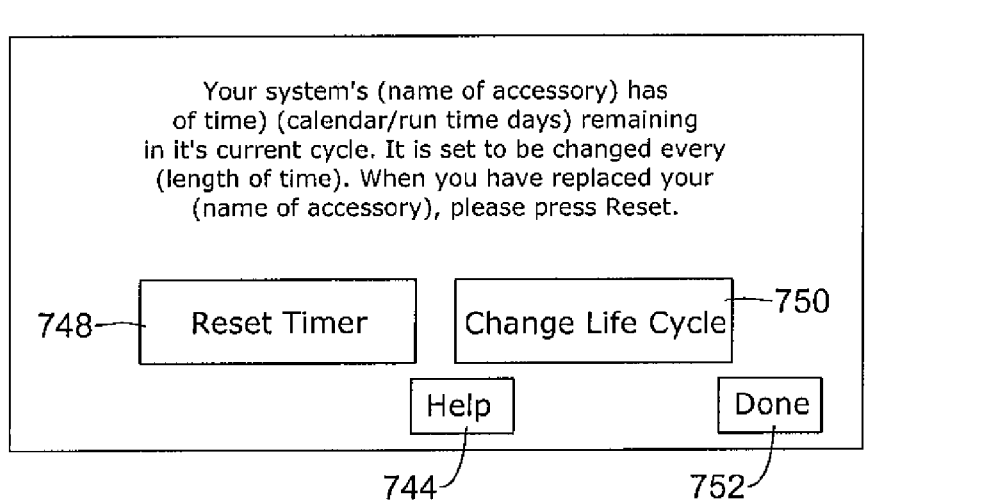

FIG. 75 provides an illustrative screen 746 that may be reached by pressing one of Humidifier Pad button 736, Air Filter button 738, UV lamp button 740, or Ventilator Filter button 742. As shown, screen 746 provides a generic illustration, but it will be recognized that HVAC controller 20 may correctly and properly reference a specific piece of equipment, depending on which menu button was pressed with respect to screen 734 (FIG. 74). For example, if the user pressed Humidifier Pad button 736 one week before the expiration of the time period ascribed to the humidifier pad, screen 746 may state "Your system's humidifier pad has seven days remaining in its current cycle. It is set to be changed every year. When you have replaced your humidifier pad, please press Reset." Similar messages may be displayed pertaining to the air filter, ventilator filter, UV lamp and the like.

Once the user replaces the appropriate piece of equipment, they may reset the timer for that piece of equipment by pressing a Reset Timer button 748. Help button 744 may provide the user with additional information while a Done button 752 may cause HVAC controller 20 to revert to a previous screen such as screen 734 (FIG. 74). In some cases, the user may wish to alter the predetermined time period for a particular piece of equipment. For example, the user may determine that the humidifier pad becomes too dirty and mineral-encrusted when used for an entire year. A Change Life Cycle button 750, if pressed, may permit the user to alter the time period.

Figure 76:
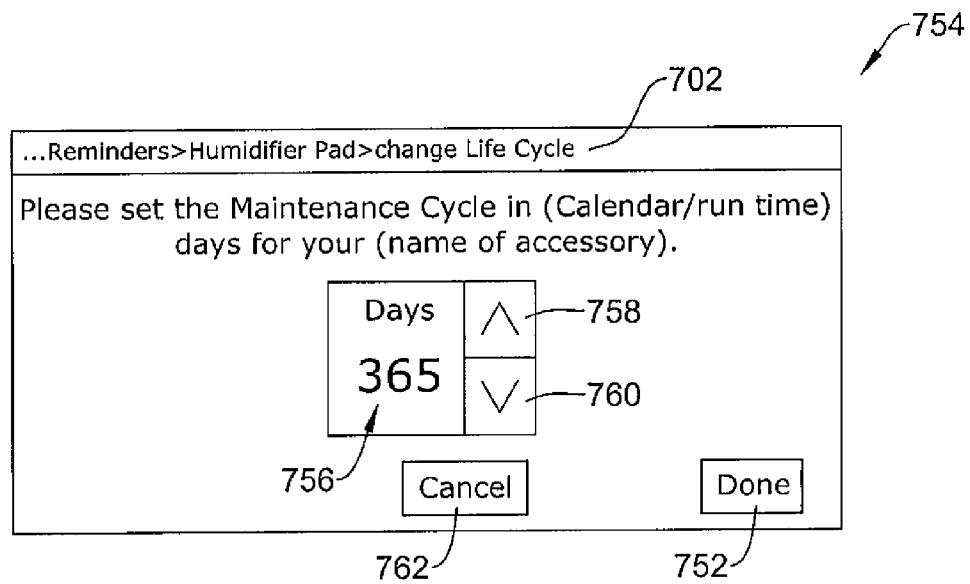

FIG. 76 provides an illustrative screen 754 that may be displayed by HVAC controller 20 when Change Life Cycle button 750 (FIG. 75) is pressed. Again, screen 754 illustrates a generic message that may be customized in accordance with which of Humidifier Pad button 736, Air Filter button 738, UV lamp button 740, or Ventilator Filter button 742 was pressed with respect to screen 734 (FIG. 74). In this particular case, it can be seen via navigational bar 702 that the user is being given a chance to alter the life cycle of the humidifier pad.

Screen 754 may include a timer block 756 that displays a current life cycle as well as whether the life cycle is being displayed in days, weeks, or the like. An Up button 758 may be used to increase the life cycle and a Down button 760 may be used to decrease the life cycle. A Cancel button 762 permits the user to exit screen 754 without making any changes, if desired, while Done button 752 may cause HVAC controller 20 to revert to a previous screen such as screen 734 (FIG. 74).

Figure 77:
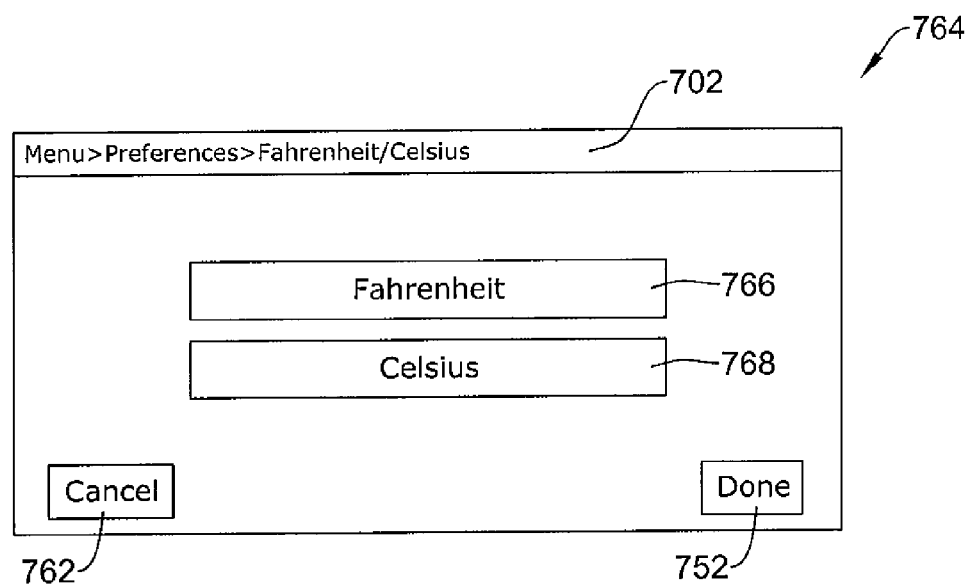

Returning briefly to FIG. 73, pressing Fahrenheit/Celsius button 708 may cause HVAC controller 20 to display an illustrative screen 764, as shown in FIG. 77. Navigational bar 702 provides the user with an indication of where they are within the hierarchical menu structure. Screen 764 includes a Fahrenheit button 766 and a Celsius button 768. If the user wants HVAC controller 20 to display temperatures and temperature set points in degrees Fahrenheit, they may instruct HVAC controller 20 to do so by pressing Fahrenheit button 766. Similarly, if the user wants HVAC controller 20 to display in degrees Celsius, they may instruct HVAC controller 20 to do so by pressing Celsius button 768. The user may cancel out, if desired, using Cancel button 762. Pressing Done button 752 may cause HVAC controller 20 to save any changes made and/or revert to a previous screen.

Figure 78:
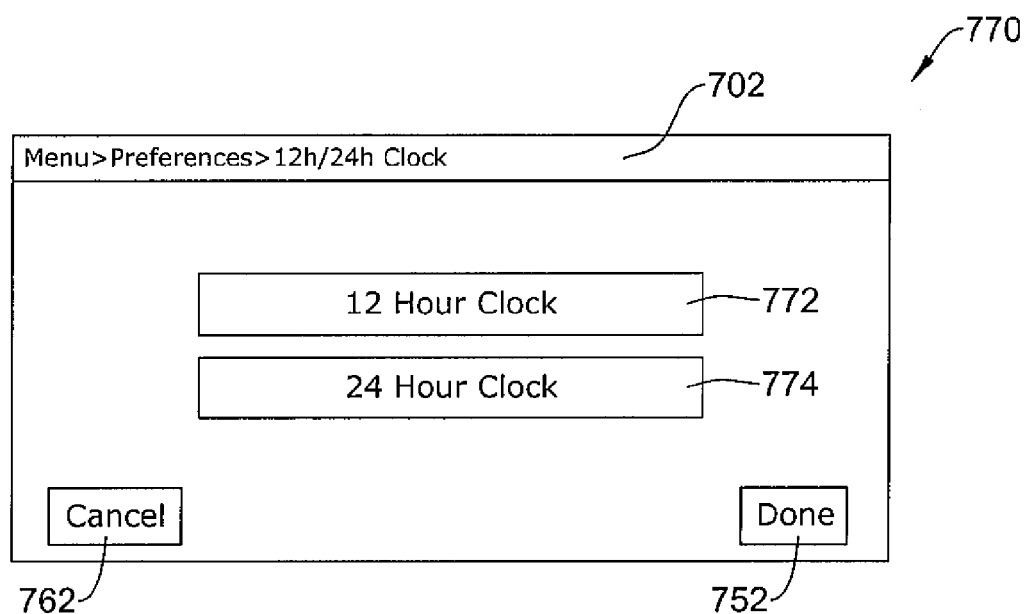

FIG. 78 provides an illustrative screen 770 that may be displayed by HVAC controller 20 as a result of the user pressing 12 h/24 h Clock button 710 (FIG. 73). Navigational bar 702 provides the user with an indication of where they are within the hierarchical menu structure. Screen 770 includes a 12 Hour Clock button 772 and a 24 Hour Clock button 774. If the user wants HVAC controller 20 to display time using numbers 0 through 12, and AM/PM, they may instruct HVAC controller 20 to do so by pressing 12 Hour Clock button 772. If the user wants HVAC controller 20 to display time using numbers 0 through 24, without using AM or PM, they may instruct HVAC controller 20 to do so by pressing 24 Hour Clock button 774. The user may cancel out, if desired, using Cancel button 762. Pressing Done button 752 may cause HVAC controller 20 to save any changes made and/or revert to a previous screen.

Figure 79:
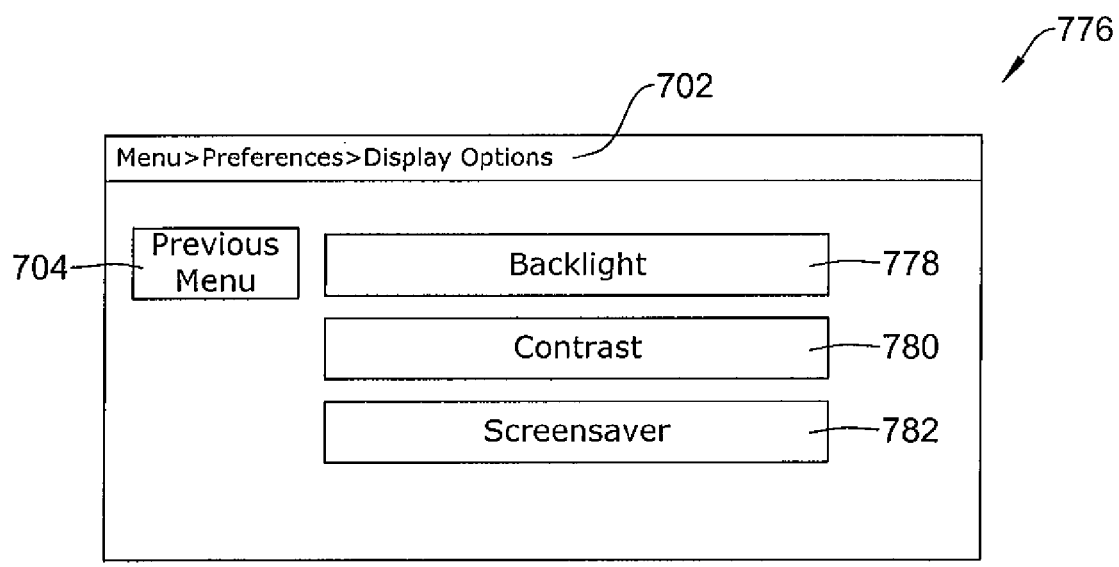

Returning briefly to FIG. 73, if the user presses Display Options button 712, HVAC controller 20 may display an illustrative screen 776, as shown in FIG. 79. Navigational bar 702 provides the user with an indication of where they are within the hierarchical menu structure. Previous Menu button 704 permits the user to revert to a previous screen. Screen 776 may include, for example, one or more a Backlight button 778, a Contrast button 780 and a Screensaver button 782. These are display options that can be customized or otherwise modified by the user.

Figure 80:
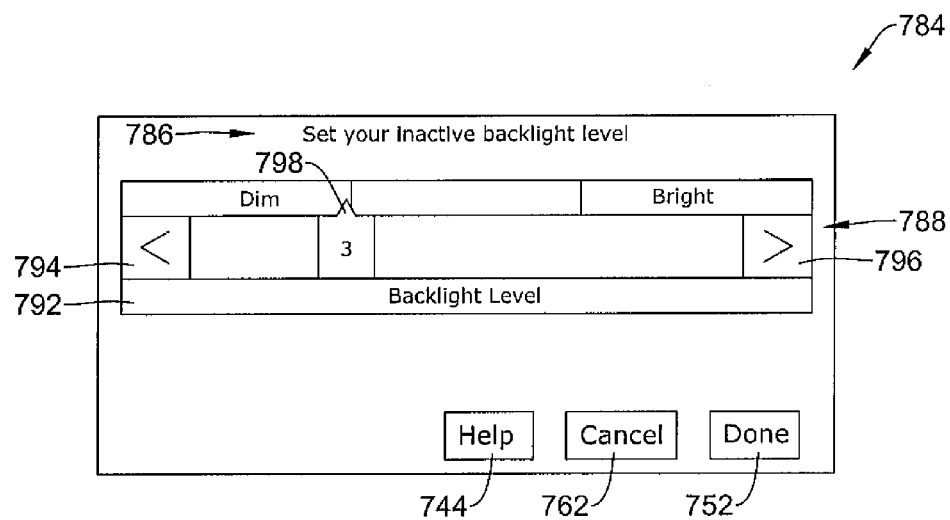

Pressing Backlight button 778 may cause HVAC controller 20 to display an illustrative screen 786, as shown in FIG. 80. Screen 786 may include text 788 that instructs the user to set their inactive backlight level. A slider bar 788 includes a scale 790, a display 792, a Left arrow 794 and a Right arrow 796. Scale 790 may provide relative or qualitative terms such as dim and bright. Display 792 may, as illustrated, provide a reminder that it is the backlight level that is being set. Slider bar 788 includes an indicator 798 that may be moved left and/or right using left arrow 794 and/or right arrow 796, as desired. Indicator button 798 may, with respect to scale 790, provide a visual indication of the relative or qualitative backlight level and may, if desired, include a pointer that interacts with scale 790. In some instances, indicator button 798 may include a numerical representation of the backlight level setting. In some cases, the numerical representation may range from 0 to 10, or perhaps 1 to 10.

In some cases, the distance that indicator button 798 moves may be at least partially a function of how many times or for how long left arrow 794 and/or right arrow 796 are pressed. In some cases, indicator button 798 may be a touch-sensitive button, and may be moved left or right simply by the user touching indicator button 798 and dragging their finger left or right. Help button 744 may provide the user with further information. The user may cancel out, if desired, using Cancel button 762. Pressing Done button 752 may cause HVAC controller 20 to save any changes made and/or revert to a previous screen.

Figure 81:
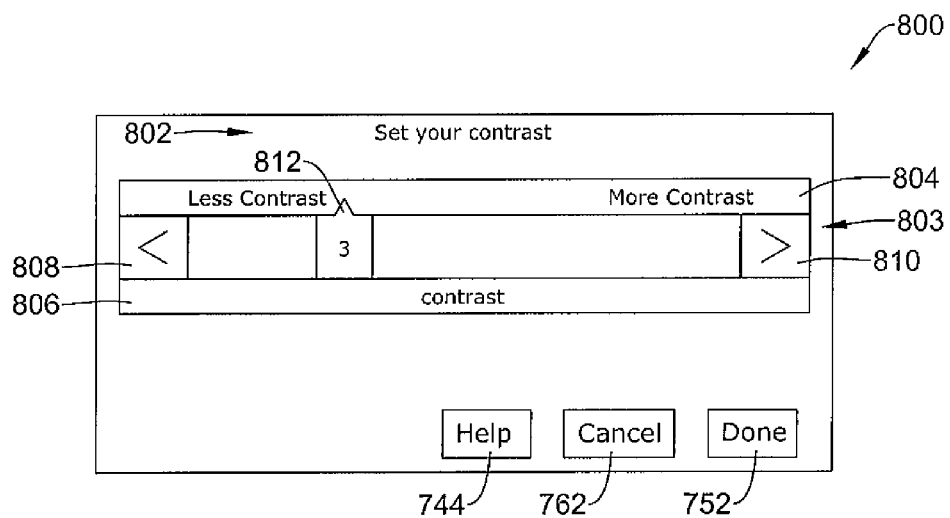

Returning briefly to FIG. 79, pressing Contrast button 780 may cause HVAC controller 20 to display an illustrative screen 800, as shown in FIG. 81. Screen 800 may include text 802 that instructs the user to set their contrast level. A slider bar 803 includes a scale 804, a display 806, a Left arrow 808 and a Right arrow 810. Scale 804 may provide relative or qualitative terms such as less contrast and more contrast. Display 806 may, as illustrated, provide a reminder that it is the contrast level that is being set. Slider bar 803 includes an indicator 812 that may be moved left and/or right using left arrow 808 and/or right arrow 810, as desired. Indicator button 812 may, with respect to scale 804, provide a visual indication of the relative or qualitative backlight level and may, if desired, include a pointer that interacts with scale 804. In some instances, indicator button 812 may include a numerical representation of the contrast level setting.

In some cases, the distance that indicator button 812 moves may be at least partially a function of how many times or for how long left arrow 808 and/or right arrow 810 are pressed. In some cases, indicator button 812 may be a touch-sensitive button, and may be moved left or right simply by the user touching indicator button 812 and dragging their finger left or right. Help button 744 may provide the user with further information. The user may cancel out, if desired, using Cancel button 762. Pressing Done button 752 may cause HVAC controller 20 to save any changes made and/or revert to a previous screen.

Figure 82:
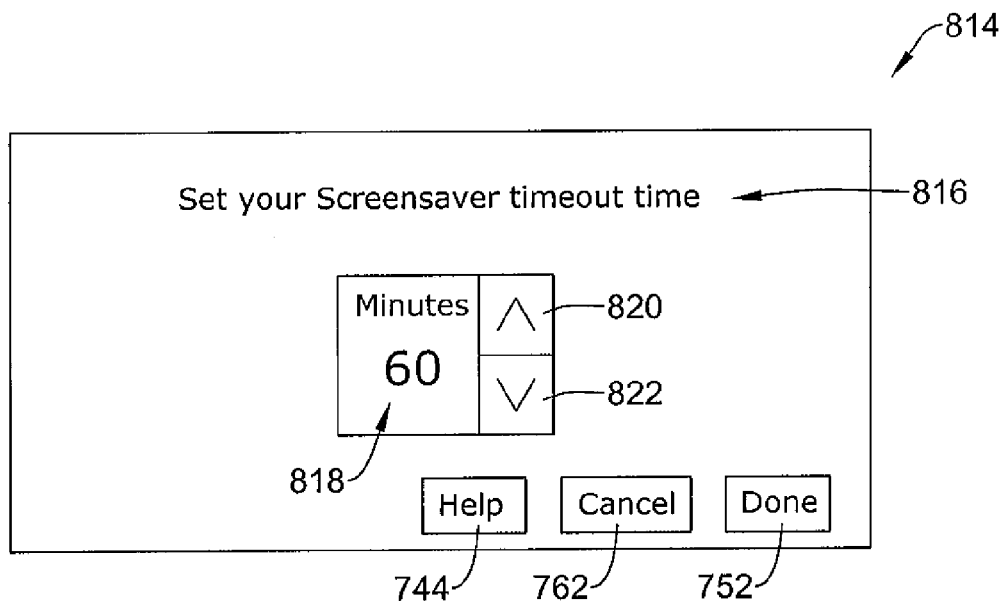

Returning briefly to FIG. 79, pressing Screensaver button 782 may cause HVAC controller 20 to display an illustrative screen 814, as shown in FIG. 82. Screen 814 may include text 816 that instructs the user to set the screensaver timeout time. A timer block 818 may display the current timeout time that may be increased using an Up button 820 and/or may be decreased using a Down button 822. Help button 744 may provide the user with further information. The user may cancel out, if desired, using Cancel button 762. Pressing Done button 752 may cause HVAC controller 20 to save any changes made and/or revert to a previous screen.

In some cases, a Screensaver Select button may be provided, which may allow a user to select a particular screensaver from a list of screen savers for use by HVAC controller 20. In some cases, at least some screen savers may be uploaded into HVAC controller 20 by the user for later selection. In some instances, screen savers may be uploaded using data port 18 (FIG. 1).

Figure 83:
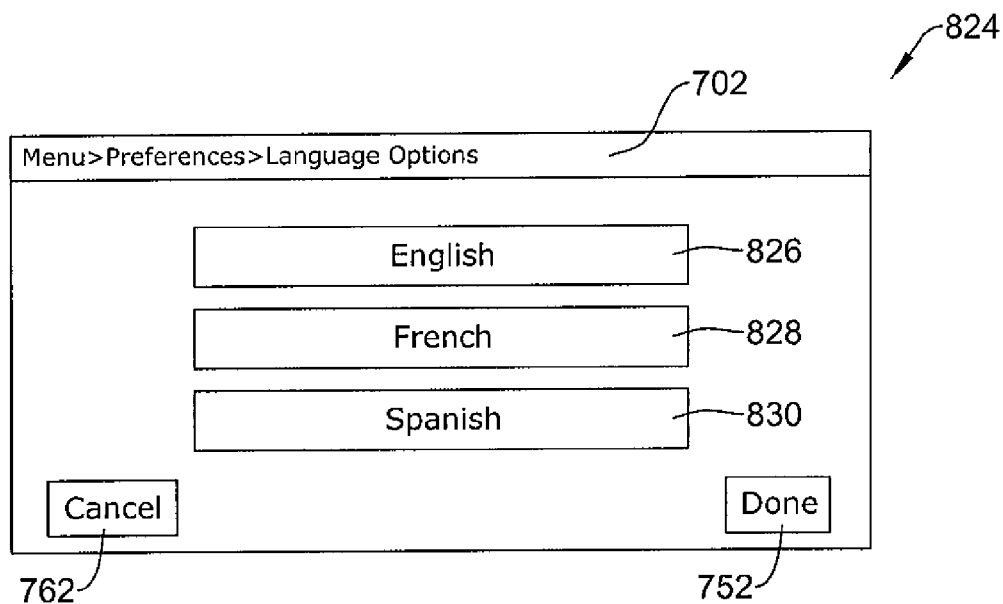

Returning briefly to FIG. 73, pressing Language Options button 714 may cause HVAC controller 20 to display an illustrative screen 824, as shown in FIG. 83. Navigational bar 702 provides the user with an indication of where they are within the hierarchical menu structure. In some instances, HVAC controller 20 may be configured to display text in one or more of several languages. Screen 824 may include one or more of an English button 826, a French button 828 and a Spanish button 830. These buttons are shown for illustrative purposes only as it will be recognized that other languages may be represented either in place of these or in addition to these.

If the user wants HVAC controller 20 to display text using English, they may instruct HVAC controller 20 to do so by pressing English button 826. If the user wants HVAC controller 20 to display text using French, they may instruct HVAC controller 20 to do so by pressing French button 828. HVAC controller 20 may be instructed to display text in Spanish if the user presses Spanish button 830. The user may cancel out, if desired, using Cancel button 762. Pressing Done button 752 may cause HVAC controller 20 to save any changes made and/or revert to a previous screen.

Figure 84:
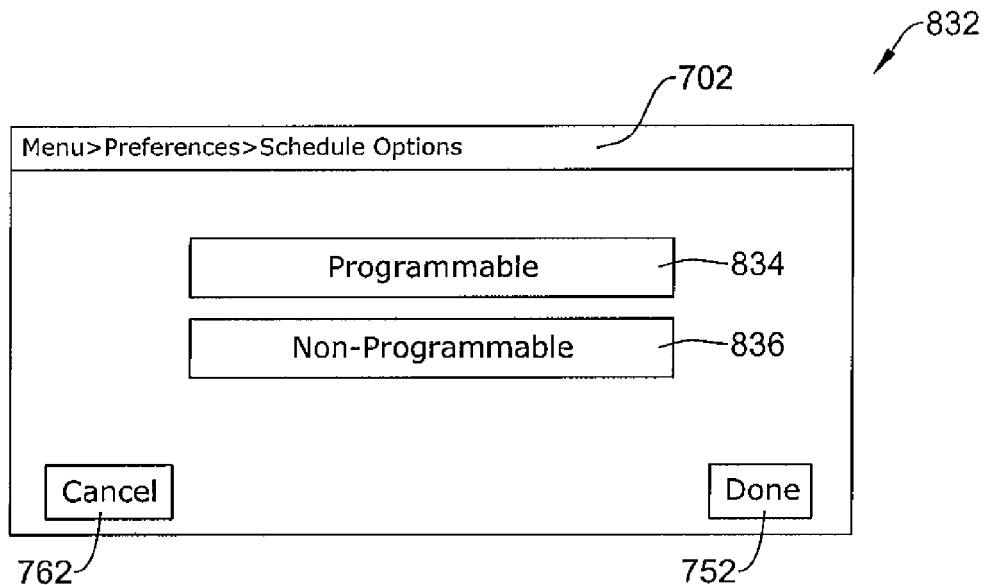

Returning briefly to FIG. 73, pressing Schedule Options button 716 may cause HVAC controller 20 to display an illustrative screen 832, as shown in FIG. 84. Navigational bar 702 provides the user with an indication of where they are within the hierarchical menu structure. In some cases, HVAC controller 20 may be a programmable HVAC controller that may operate in accordance with a predetermined or user-entered or modified schedule. In some instances, HVAC controller 20 may not be a programmable HVAC controller. Screen 832 includes a Programmable button 834 and a Non-Programmable button 836. The user may specify whether HVAC controller 20 is programmable or non-programmable by pressing the appropriate button. The user may cancel out, if desired, using Cancel button 762. Pressing Done button 752 may cause HVAC controller 20 to save any changes made and/or revert to a previous screen.

Figure 85:
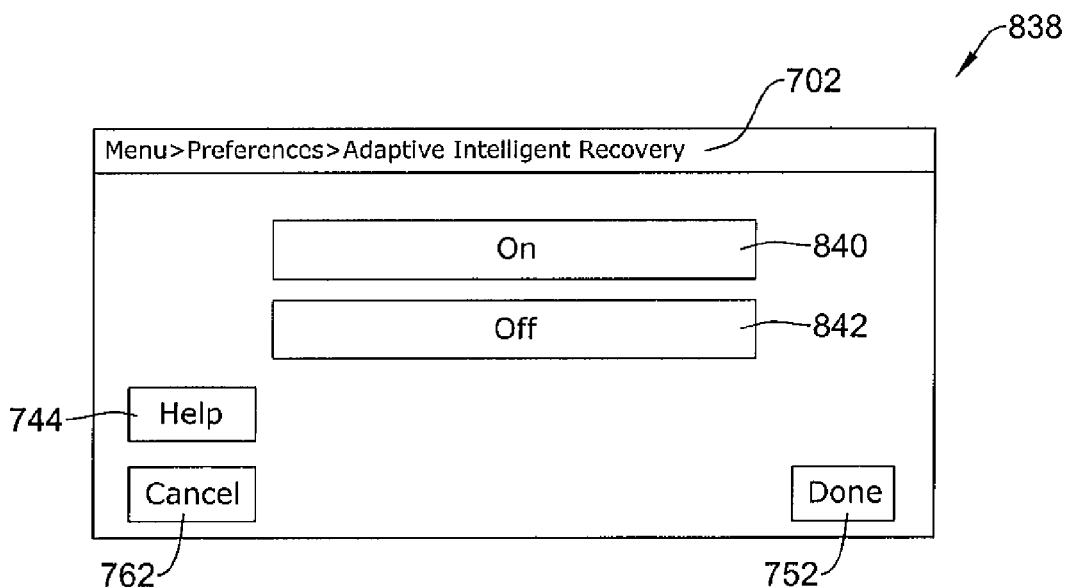

With respect to FIG. 73, pressing Adaptive Intelligent Recovery button 718 may cause HVAC controller 20 to display an illustrative screen 838, as shown in FIG. 85. Navigational bar 702 provides the user with an indication of where they are within the hierarchical menu structure. Screen 838 may include an On button 840 and an Off button 842. Adaptive Intelligent Recovery may be turned on by pressing On button 840 and/or may be turned off by pressing Off button 842. Adaptive Recovery may implement a control algorithm that initiates the HVAC equipment at an appropriate time before a step change in temperature set points (e.g. at a transition between programmable time periods) such that the temperature in the building reaches the new set point at or about the time that the temperature change is set to take place. Help button 744 may provide the user with further information. The user may cancel out, if desired, using Cancel button 762. Pressing Done button 752 may cause HVAC controller 20 to save any changes made and/or revert to a previous screen.

Figure 86:
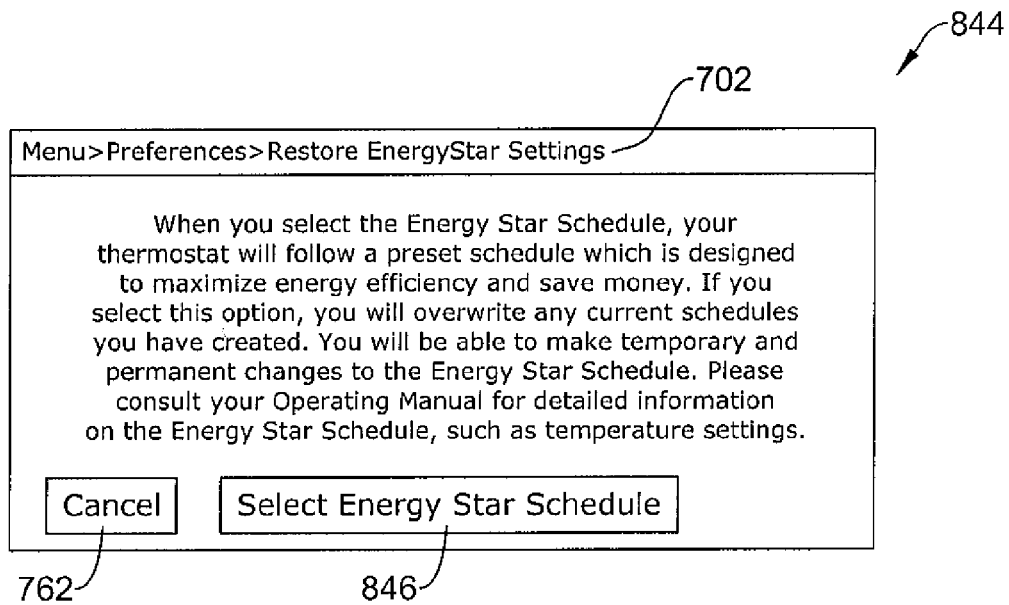

Returning briefly to FIG. 73, pressing Restore Energy Star Settings button 720 may cause HVAC controller 20 to display an illustrative screen 844, as shown in FIG. 86. Navigational bar 702 provides the user with an indication of where they are within the hierarchical menu structure. Screen 844 may, as illustrated, include text giving the user an explanation of what an Energy Star schedule is and what it involves. Screen 844 may include a Select Energy Star Schedule button 846 that, if pressed, may cause HVAC controller 20 to operate in accordance with a predetermined and/or pre-programmed schedule that is designed for energy savings. The Energy Star program may be entered into HVAC controller 20 at the time of its manufacture, for example.

Figure 87:
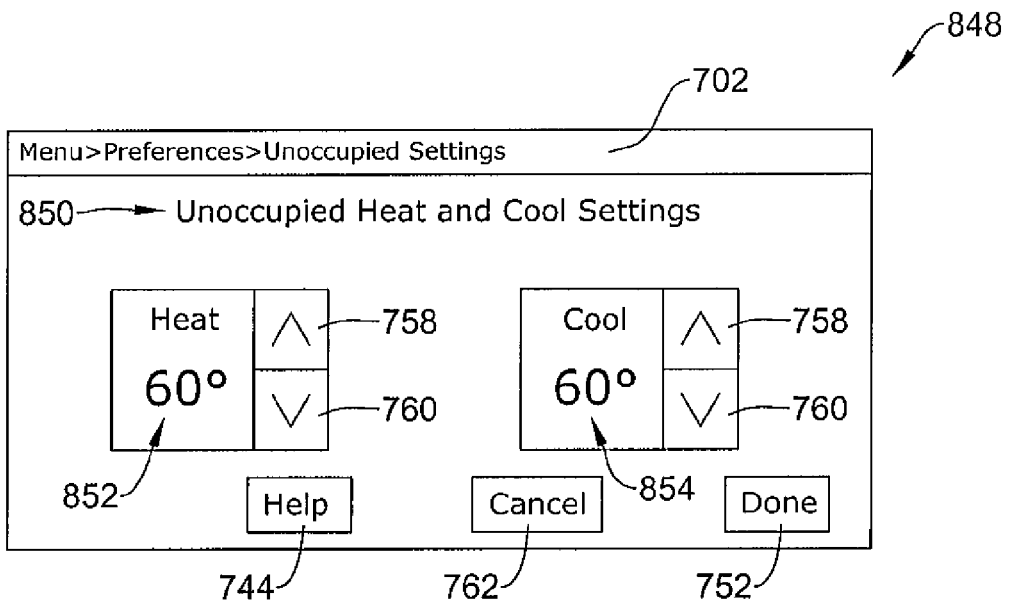

Returning briefly to FIG. 73, pressing Unoccupied Settings button 722 may cause HVAC controller 20 to display an illustrative screen 848, shown in FIG. 87. In some cases, HVAC controller 20 may be programmed or otherwise configured to permit operation of the HVAC equipment in accordance with an unoccupied setting, i.e., anytime the house is temporarily unoccupied. In some cases, this may correspond to the Leave period, or when HVAC controller 20 has been instructed that the house will be temporarily vacant as a result of vacation and the like. In some instances, it is contemplated that HVAC controller 20 may instead include or be in communication with one or more sensors that register whether someone is in the house, and thus may operate in accordance with an unoccupied setting when the house is sensed to be empty.

Navigational bar 702 provides the user with an indication of where they are within the hierarchical menu structure. Screen 848 may include text 850 that informs the user that they are viewing and/or changing the unoccupied heating and cooling temperature set points. Screen 848 may include a heating block 852 and a cooling block 854. Heating block 852 may include a display of the present unoccupied heating temperature set point and may include up arrow 758 and down arrow 760 that can be used to raise or lower the heating temperature set point, as desired. Cooling block 854 may include a display of the present unoccupied cooling temperature set point, which can be raised or lowered using up arrow 758 and/or down arrow 760, as desired.

Figure 88:
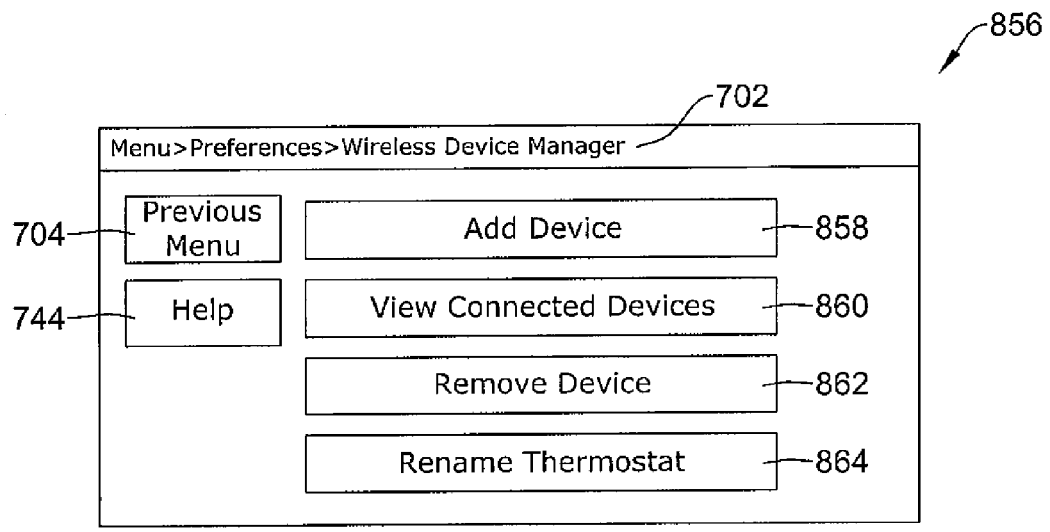

Returning briefly to FIG. 73, pressing Ventilation Settings button 724 may cause HVAC controller to display screen 614, which is shown in FIG. 64 as previously discussed with respect to Ventilation button 160 (FIG. 17). Pressing Wireless Device Manager button 726 (FIG. 73) may cause HVAC controller 20 to display an illustrative screen 856, as shown in FIG. 88. Navigational bar 702 provides the user with an indication of where they are within the hierarchical menu structure. Previous Menu button 704 provides the user with an opportunity to reach a previous screen while Help button 744 may provide the user with additional information and/or guidance. Screen 856 may include, for example, one or more of an Add Device button 858, a View Connected Devices button 860, a Remove Device button 862 and/or a Rename Thermostat button 864. Wireless devices that may communicate with HVAC controller 20 include, for example, exterior temperature sensors, exterior humidity sensors, exterior wind sensors, interior humidity sensors, HVAC equipment, computers, computer networks, and the like.

Figure 89:
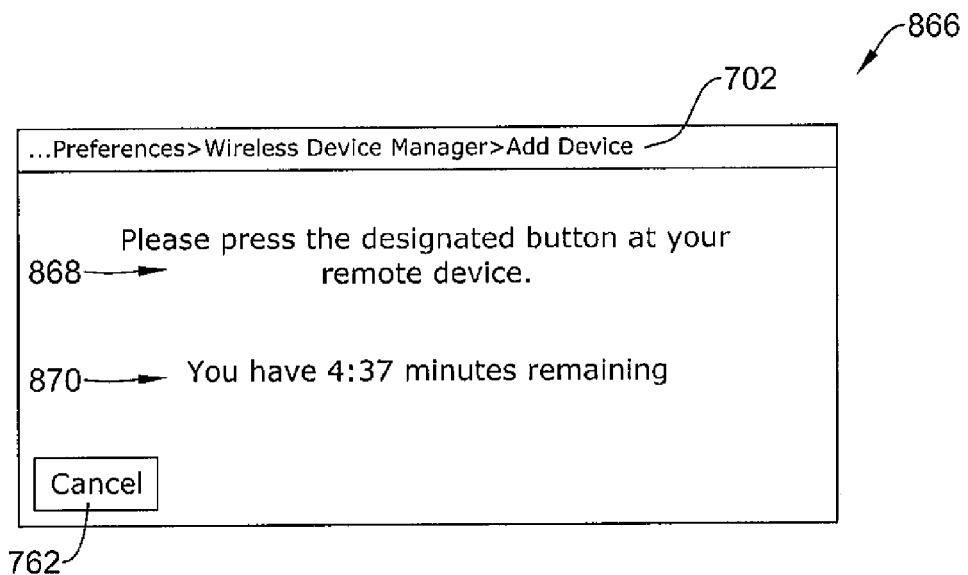

Pressing Add Device button 858 may cause HVAC controller 20 to display an illustrative screen 866, as shown in FIG. 89. Navigational bar 702 provides the user with an indication of where they are within the hierarchical menu structure. In some cases, adding a wireless device entails pressing a particular button on the remote device in order to establish wireless communication between HVAC controller 20 and the remote device. Screen 866 may include text 868 that instructs the user to press the designated button on the remote device. Text 870 may inform the user that they have a limited amount of time to locate the remote device and press the designated button. Cancel button 762, if pressed, may cause HVAC controller 20 to revert to a previous screen such as screen 856 (FIG. 88).

Figure 90:
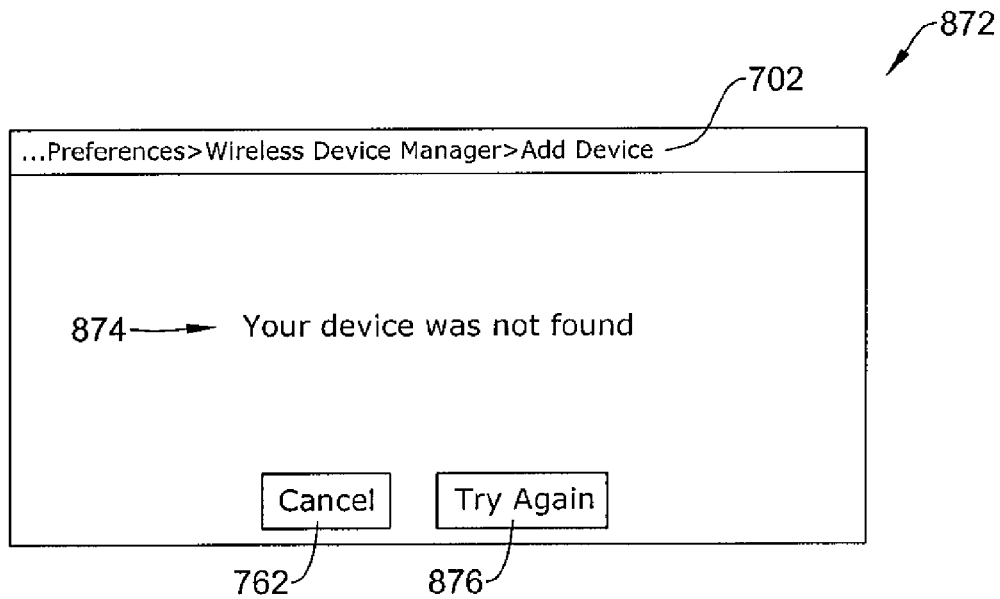

If wireless communication between HVAC controller 20 and the remote device is not successfully established, HVAC controller 20 may display an illustrative screen 872, as shown in FIG. 90. Navigational bar 702 provides the user with an indication of where they are within the hierarchical menu structure. Screen 872 may include text 874 informing the user that the remote device was not found. Pressing Cancel button 762 may cause HVAC controller 20 to revert to a previous screen such as screen 856 (FIG. 88). A Try Again button 876 permits the user to try once again to establish wireless communication between HVAC controller 20 and the wireless device. Pressing Try Again button 876 may cause HVAC controller 20 to revert to screen 866 (FIG. 89).

Figure 91:
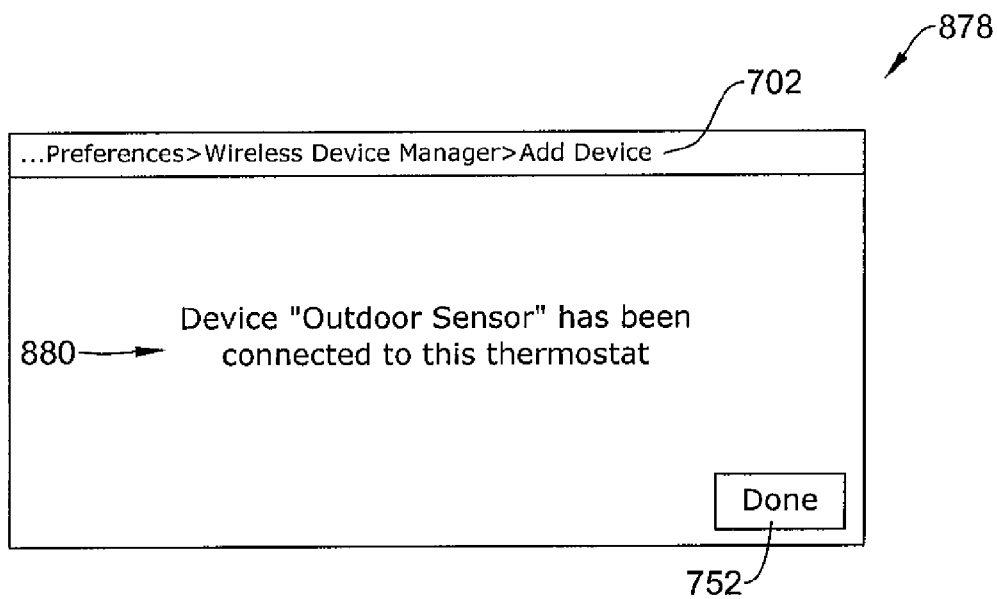

If wireless communication between HVAC controller 20 and the remote device was successfully established, HVAC controller 20 may display an illustrative screen 878, as shown in FIG. 91. Navigational bar 702 provides the user with an indication of where they are within the hierarchical menu structure. Screen 878 may include text 880 informing the user that the remote device has been successfully added. In the illustrated example, the remote device was an Outdoor Sensor. Pressing Done button 752 may cause HVAC controller 20 to revert to screen 856 (FIG. 88).

Figure 92:
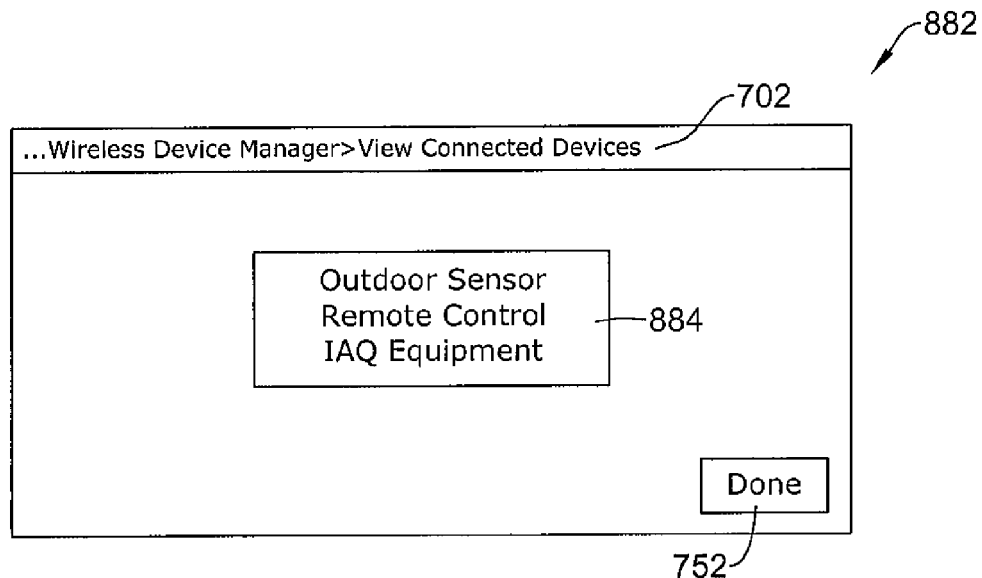

Returning briefly to FIG. 88, pressing View Connected Devices button 860 may cause HVAC controller 20 to display an illustrative screen 882, as shown in FIG. 92. Navigational bar 702 provides the user with an indication of where they are within the hierarchical menu structure. Screen 882 may include a text box 884 that lists the devices that are wirelessly connected to HVAC controller 20. In the illustrated example, HVAC controller 20 is connected wirelessly to an Outdoor Sensor, a Remote Control Unit and IAQ (Indoor Air Quality) equipment. Pressing Done button 752 may cause HVAC controller 20 to revert to screen 856 (Screen 88).

Figure 93:
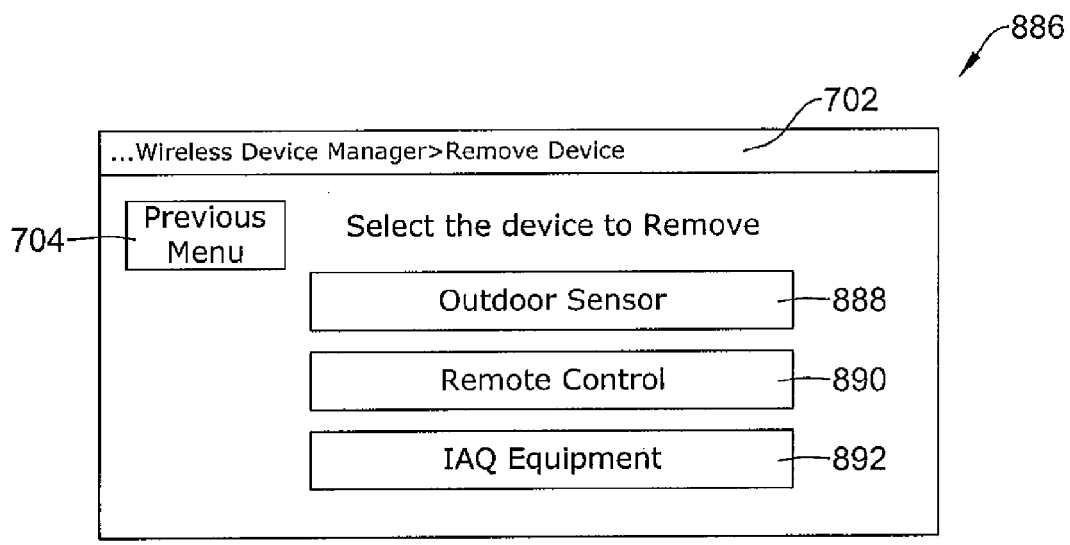

Returning briefly to FIG. 88, pressing Remove Device button 862 may cause HVAC controller 20 to display an illustrative screen 886, as shown in FIG. 93. Previous Menu button 704 may permit the user to return to a previous screen without removing any devices. Navigational bar 702 provides the user with an indication of where they are within the hierarchical menu structure. Screen 886 may include one or more of an Outdoor Sensor button 888, a Remote Control button 890 and an IAQ equipment button 892. The user may remove one of the connected devices by pressing the appropriate button.

Figure 94:
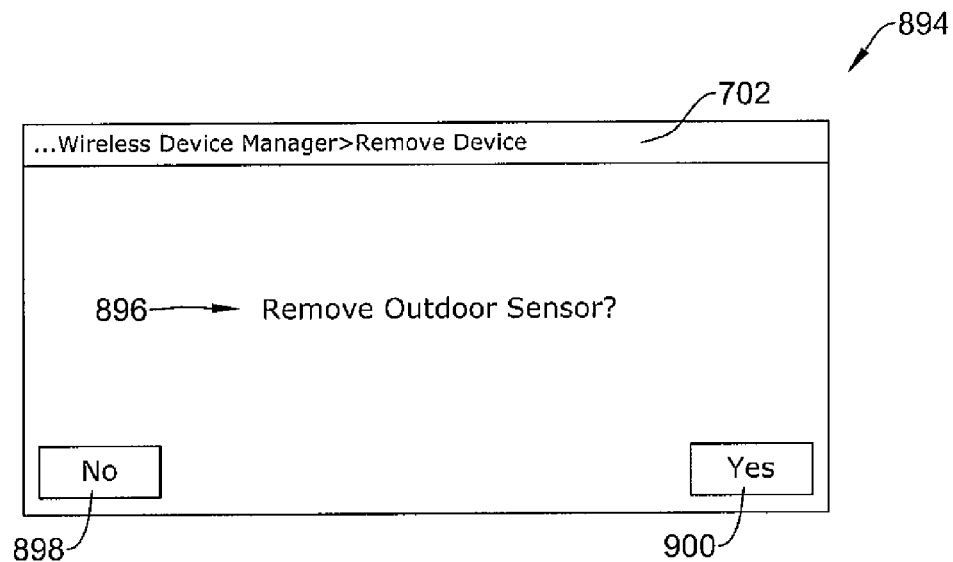

For example, if the user presses Outdoor sensor button 888, HVAC controller 20 may display an illustrative screen 894, as shown in FIG. 94. Navigational bar 702 provides the user with an indication of where they are within the hierarchical menu structure. Screen 894 may include an inquiry 896, asking the user if they want to remove the Outdoor Sensor. A No button 898, if pressed, will cause HVAC controller 20 to revert to screen 886 (FIG. 93) without removing any devices. A Yes button 900, if pressed, will cause HVAC controller 20 to remove, i.e., no longer communicate with, the Outdoor Sensor, and then to revert to screen 856 (FIG. 88).

Figure 95:
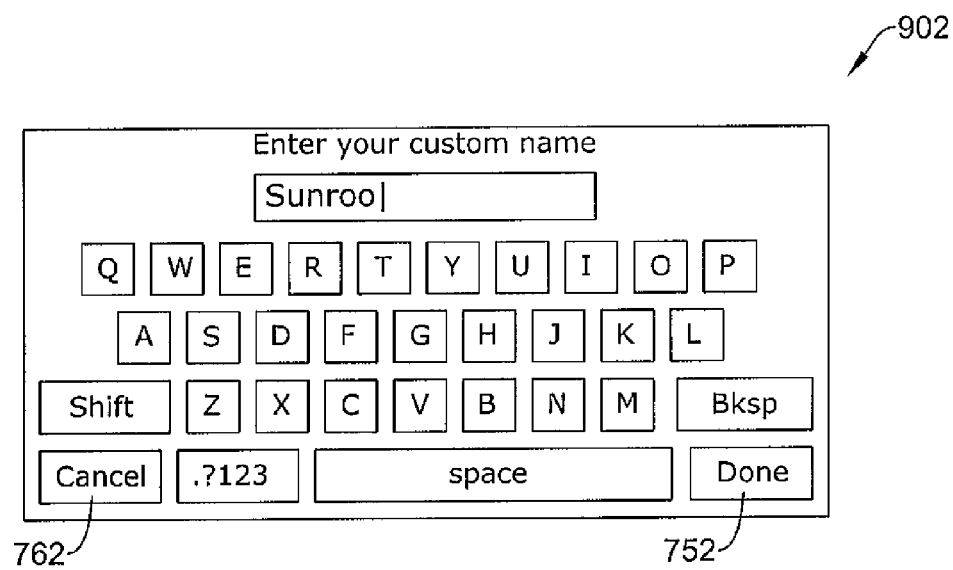

Returning briefly to FIG. 88, pressing Rename Thermostat button 864 may cause HVAC controller 20 to display an illustrative screen 902, as shown in FIG. 95. Screen 902 provides a touch-sensitive QWERTY keyboard that the user may use to enter a new name for HVAC controller 20. Cancel button 762, if pressed, may cause HVAC controller 20 to revert to a previous screen without changing the name of HVAC controller 20. Once the new name has been typed, pressing Done button 752 may cause HVAC controller 20 to save the new name as well as to revert to screen 856 (FIG. 88).

Figure 96:
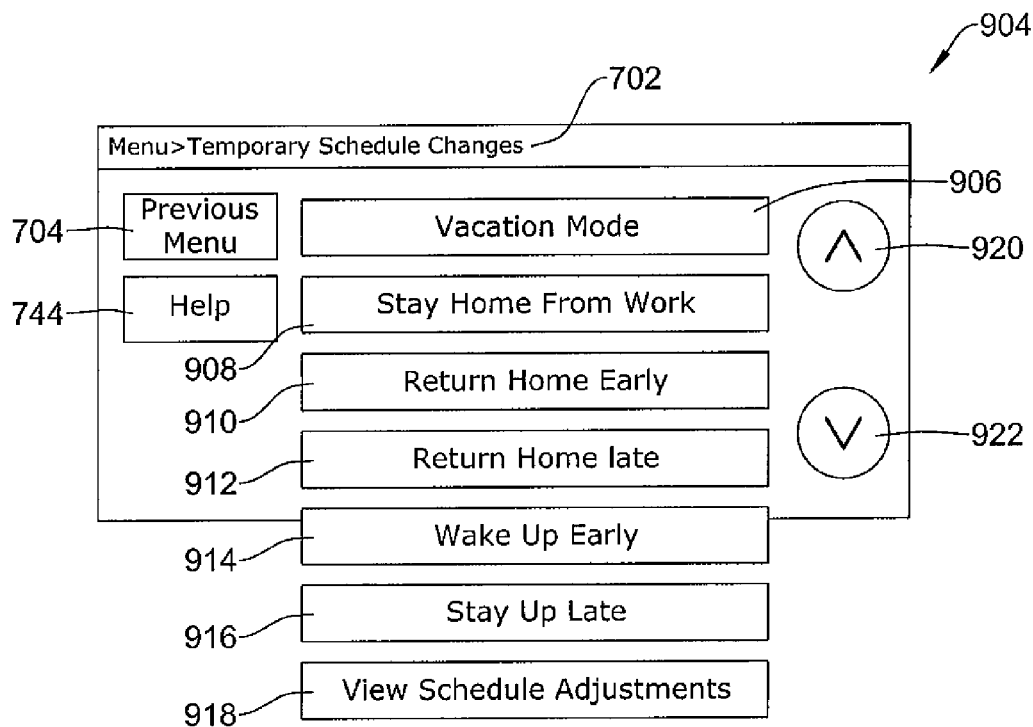
FIGS. 96 through 112 provide illustrative but non-limiting examples of screens pertaining to temporary schedule changes using the HVAC controllers of FIGS. 1 and 2.

FIGS. 96 through 112 provide illustrative but non-limiting examples of screens that may be displayed by HVAC controller 20 pertaining to viewing and/or changing temporary schedule changes within HVAC controller 20. In particular, FIG. 96 provides an illustrative screen 904 that may be displayed by HVAC controller 20 in response to someone pressing or otherwise selecting Temporary Schedule Changes button 168 (FIG. 17) in order to view and/or create temporary schedule changes.

Screen 904 may include Navigational bar 702, which provides the user with an indication of where they are within the hierarchical menu structure. Previous Menu button 704 may permit the user to return to a previous screen while Help button 744 may provide the user with additional information or guidance. Screen 904 may include several schedule adjustment buttons that can be used for temporary schedule changes such as vacations, days off, sick days, sleeping in, staying up late, and the like.

In some instances, screen 904 may include one or more of a Vacation Mode button 906, a Stay Home From Work button 908, a Return Home Early button 910, a Return Home Late button 912, a Wake Up Early button 914, a Stay Up Late button 916 and a View Schedule Adjustments button 918. These are merely illustrative, as additional buttons such as a Sleep In button, a Go To Bed Early button, and the like may also be included even though they are not expressly illustrated herein. In some cases, as illustrated, there may be more schedule adjustment buttons than can be displayed at one time on screen 904. An Up arrow 920 and a Down arrow 922 may be used as desired to scroll up and/or down through the displayed schedule adjustment buttons.

Vacation Mode button 906 may be used to provide HVAC controller 20 with information pertaining to the user's vacation schedule, including vacation start date, return home date, heating and cooling temperature set points during the vacation, and the like. In some cases, pressing Vacation Mode button 906 may bring the user to screen 472 (FIG. 47), much the same as pressing Vacation Mode button 154 (FIG. 17).

Figure 97:
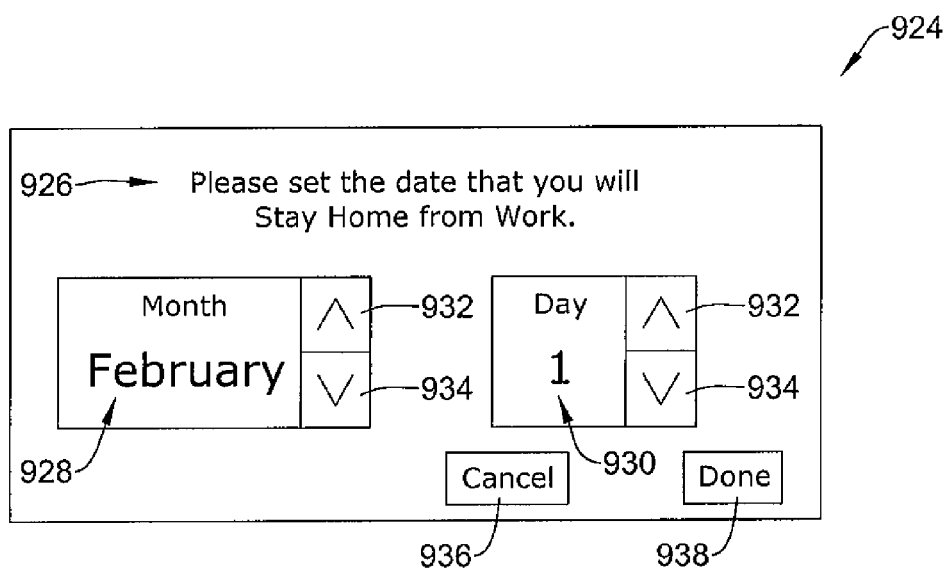

Returning briefly to FIG. 96, pressing Stay Home From Work button 908 may cause HVAC controller 20 to display an illustrative screen 924, as shown in FIG. 97. Screen 924 may include text 926, informing the user that they are to set the date that they plan to stay home from work. Screen 924 includes a month block 928 and a day block 930. Month block 928 may display a month and may include an up arrow 932 and a down arrow 934 that can be used to change the month, if necessary. Day block 930 may display a date or a day of the week, which may be adjusted using up arrow 932 and down arrow 934, as appropriate.

A Cancel button 936, if pressed, may permit the user to exit screen 924 without setting a date for staying home from work. In some cases, HVAC controller 20 may revert to a previous screen such as screen 904 (FIG. 96). A Done button 938 may be used by the user to inform HVAC controller 20 that they have entered the date on which they will be staying home from work. In some instances, pressing Done button 938 may cause HVAC controller 20 to display an illustrative screen 940, as shown in FIG. 98.

Screen 940 may include an inquiry 942, asking the user to conform that they wish to adjust their schedule for the aforementioned date. Screen 940 includes a No button 944 and a Yes button 946 so that the user may provide their answer. If the user presses No button 944, HVAC controller 20 will not save any information pertaining to a schedule adjustment. If the user presses Yes button 946, HVAC controller 20 saves the appropriate information. In either case, HVAC controller 20 may revert to a previous screen such as screen 904 (FIG. 96).

Figures 98, 99:
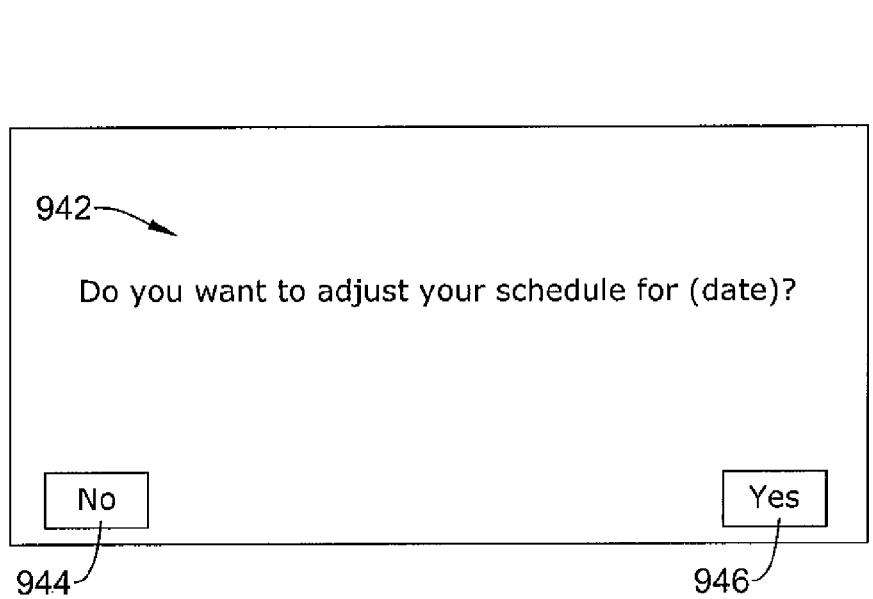

Returning briefly to FIG. 96, pressing Return Home Early button 910 may cause HVAC controller 20 to display an illustrative screen 948, as shown in FIG. 99. Screen 948 may include text 950, instructing the user to set the date that they will be home early. Screen 948 includes month block 928 and day block 930. Month block 928 may display a month that can be adjusted using up arrow 932 and down arrow 934, if necessary. Day block 930 may display a date or a day of the week, which may be adjusted using up arrow 932 and down arrow 934, as appropriate.

Figure 100:
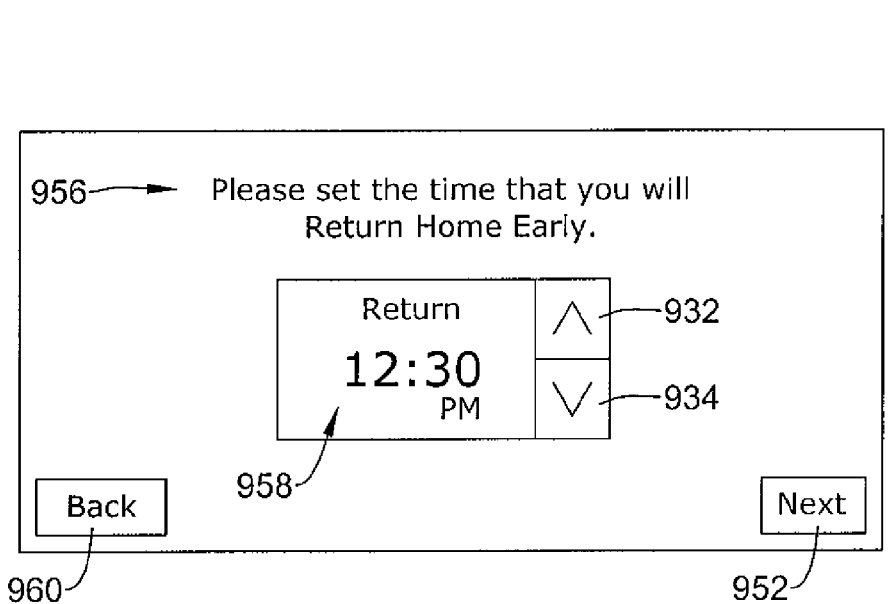

Cancel button 936, if pressed, may permit the user to exit screen 948 without setting a date for returning home early. In some cases, HVAC controller 20 may revert to a previous screen such as screen 904 (FIG. 96). A Next button 952, if pressed, informs HVAC controller 20 that the date has been set, and thus HVAC controller 20 may then display an illustrative screen 954, as shown in FIG. 100. Screen 954 may include text 956 instructing the user that they are to enter the time that they will be returning home early. Screen 954 may include a time block 958 that may display a time that may be adjusted up and/or down using up arrow 932 and/or down arrow 934 as desired. A Back button 960 may be used, for example, if the user wants to return to a previous screen such as screen 948 (FIG. 99).

Figure 101:
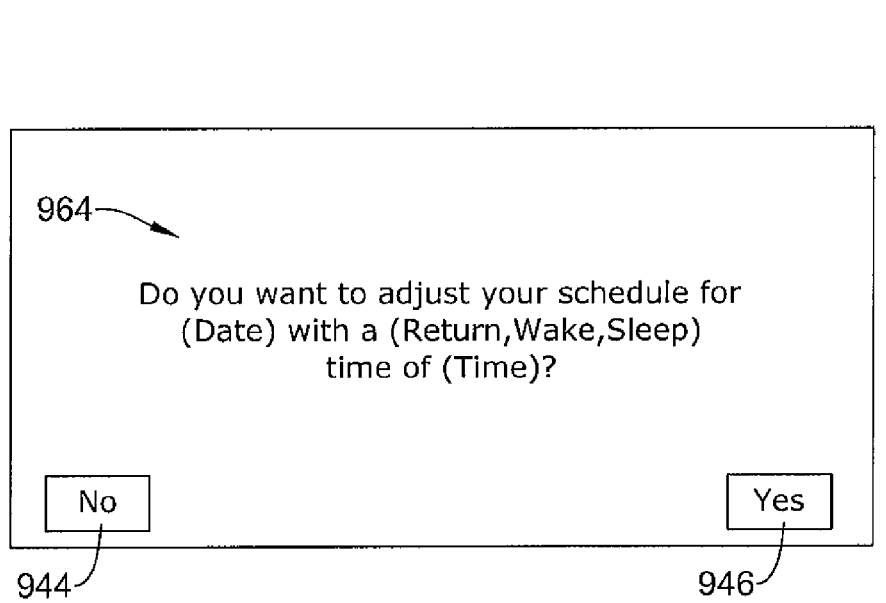

Once the time has been set appropriately, pressing Next button 952 may cause HVAC controller 20 to display an illustrative screen 962, as shown in FIG. 101. Screen 962 may include an inquiry 964, asking the user to confirm their schedule change. In some cases, screen 962 may be displayed when a user presses Next button 952 after setting a date and time for returning home early, waking up early, staying up late, and the like. If the user presses No button 944, HVAC controller 20 will not save any information pertaining to a schedule adjustment. If the user presses Yes button 946, HVAC controller 20 saves the appropriate information. In either case, HVAC controller 20 may revert to a previous screen such as screen 904 (FIG. 96).

Figure 102:
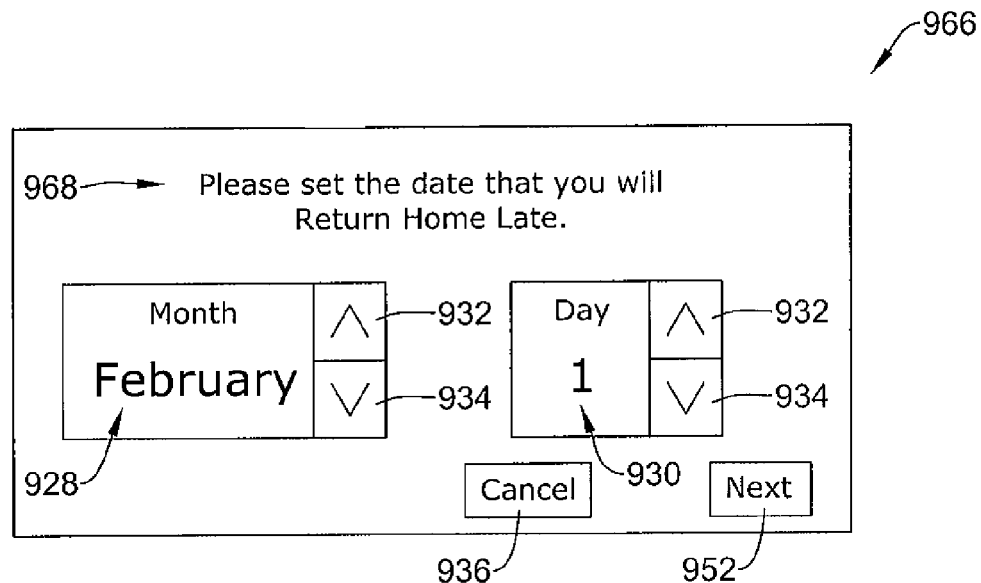

Returning briefly to FIG. 96, pressing Return Home Late button 912 may cause HVAC controller 20 to display an illustrative screen 966, as shown in FIG. 102. Screen 966 may include text 968, instructing the user that they are to set the date that they will be returning home late. Screen 966 includes month block 928 and day block 930. Month block 928 may display a month that can be changed using up arrow 932 and down arrow 934, if necessary. Day block 930 may display a date or a day of the week, which may be adjusted using up arrow 932 and down arrow 934, as appropriate.

Figure 103:
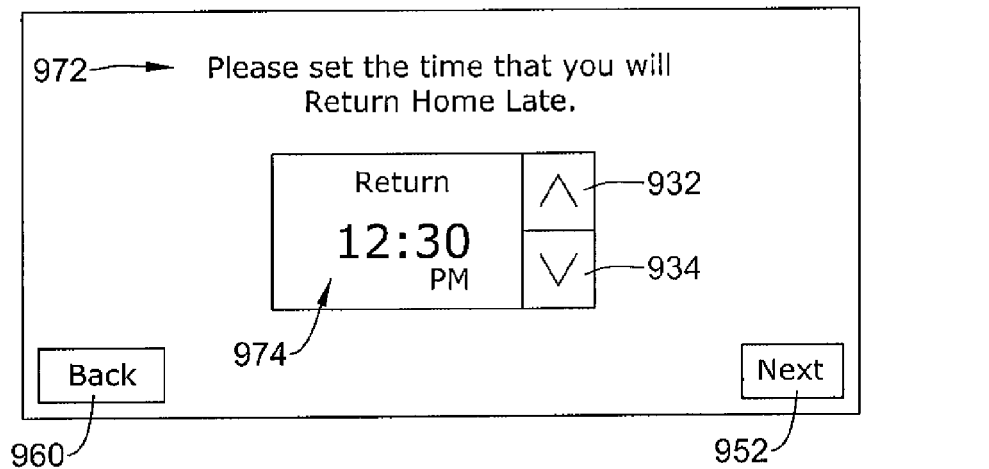

Cancel button 936, if pressed, may permit the user to exit screen 966 without setting a date for returning home late. In some cases, HVAC controller 20 may revert to a previous screen such as screen 904 (FIG. 96). Next button 952, if pressed, informs HVAC controller 20 that the date has been set, and thus HVAC controller 20 may then display an illustrative screen 970, as shown in FIG. 103.

Screen 970 may include text 972 instructing the user that they are to enter the time that they will be returning home late. Screen 970 may include a time block 974 that may display a time that may be adjusted up and/or down using up arrow 932 and/or down arrow 934 as desired. Back button 960 may be used, for example, if the user wants to return to a previous screen such as screen 966 (FIG. 102). Once the time has been set appropriately, pressing Next button 952 may cause HVAC controller 20 to display illustrative screen 962, as shown in FIG. 101 and as previously discussed.

Figure 104:
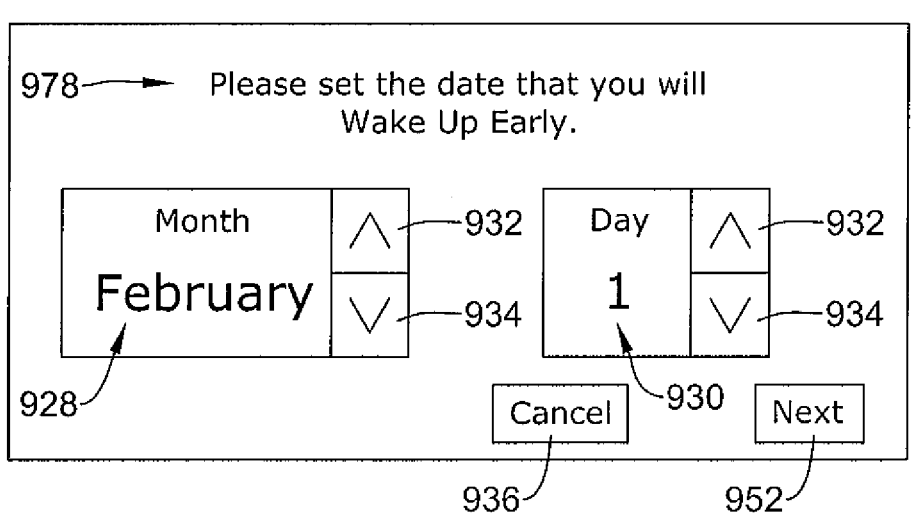

Returning briefly to FIG. 96, pressing Wake Up Early button 914 may cause HVAC controller 20 to display an illustrative screen 976, as shown in FIG. 104. Screen 976 may include text 978, instructing the user that they are to set the date that they will be waking up early. Screen 976 includes month block 928 and day block 930. Month block 928 may display a month that may be adjusted using up arrow 932 and/or down arrow 934, if necessary. Day block 930 may display a date or a day of the week, which may be adjusted using up arrow 932 and down arrow 934, as appropriate.

Figure 105:
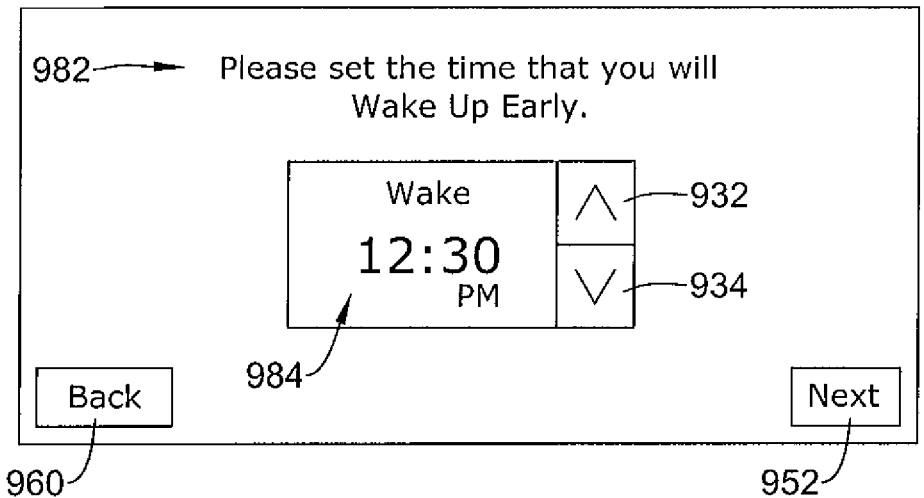

Cancel button 936, if pressed, may permit the user to exit screen 976 without setting a date for waking up early. In some cases, HVAC controller 20 may revert to a previous screen such as screen 904 (FIG. 96). Next button 952, if pressed, informs HVAC controller 20 that the date has been set, and thus HVAC controller 20 may then display an illustrative screen 980, as shown in FIG. 105.

Screen 980 may include text 982 instructing the user that they are to enter the time that they will be waking up early. Screen 980 may include a time block 984 that may display a time that may be adjusted up and/or down using up arrow 932 and/or down arrow 934 as desired. Back button 960 may be used, for example, if the user wants to return to a previous screen such as screen 976 (FIG. 104). Once the time has been set appropriately, pressing Next button 952 may cause HVAC controller 20 to display illustrative screen 962, as shown in FIG. 101 and as previously discussed.

Figure 106:
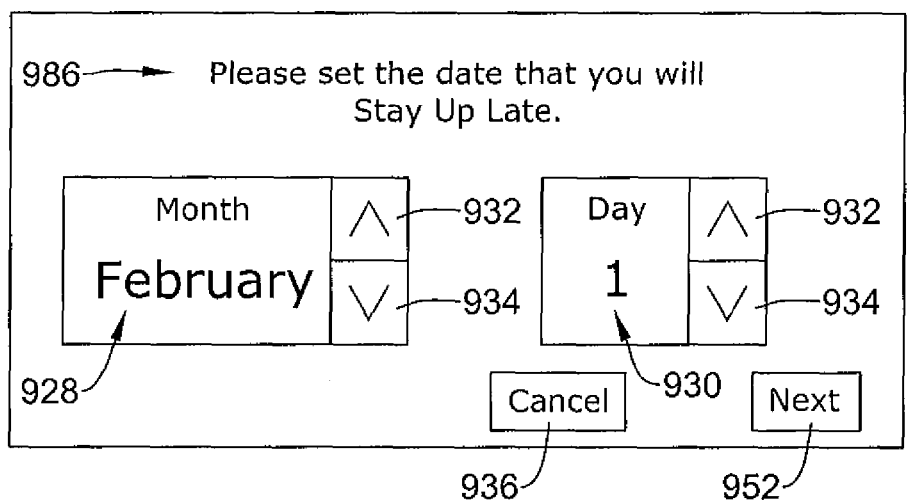

Returning briefly to FIG. 96, pressing Stay Up Late button 916 may cause HVAC controller 20 to display an illustrative screen 984, as shown in FIG. 106. Screen 984 may include text 986, instructing the user that they are to set the date that they will be staying up late. Screen 984 includes month block 928 and day block 930. Month block 928 may display a month that may be adjusted using up arrow 932 and/or down arrow 934, if necessary. Day block 930 may display a date or a day of the week, which may be adjusted using up arrow 932 and down arrow 934, as appropriate.

Figure 107:
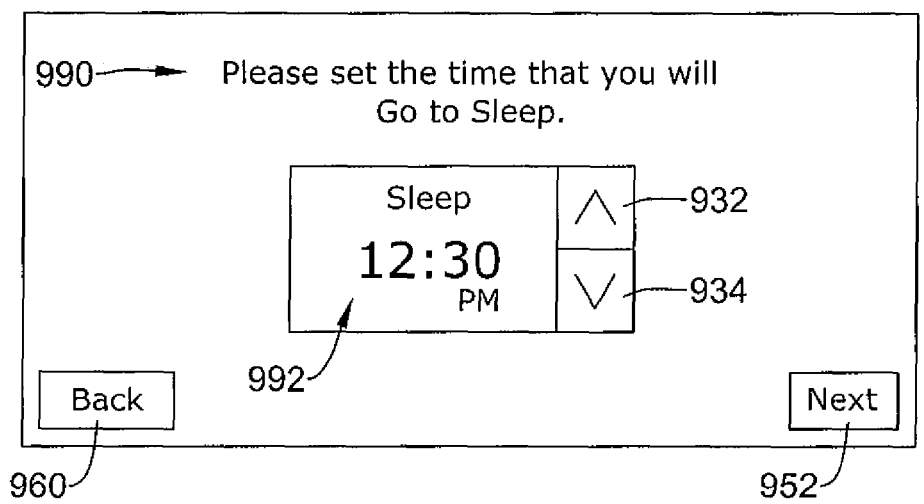

Cancel button 936, if pressed, may permit the user to exit screen 984 without setting a date for staying up late. In some cases, HVAC controller 20 may revert to a previous screen such as screen 904 (FIG. 96). Next button 952, if pressed, informs HVAC controller 20 that the date has been set, and thus HVAC controller 20 may then display an illustrative screen 988, as shown in FIG. 107.

Screen 988 may include text 990 instructing the user that they are to enter the time that they will be staying up late. Screen 988 may include a time block 992 that may display a time that may be adjusted up and/or down using up arrow 932 and/or down arrow 934 as desired. Back button 960 may be used, for example, if the user wants to return to a previous screen such as screen 984 (FIG. 106). Once the time has been set appropriately, pressing Next button 952 may cause HVAC controller 20 to display illustrative screen 962, as shown in FIG. 101 and as previously discussed.

Figures 108, 109:
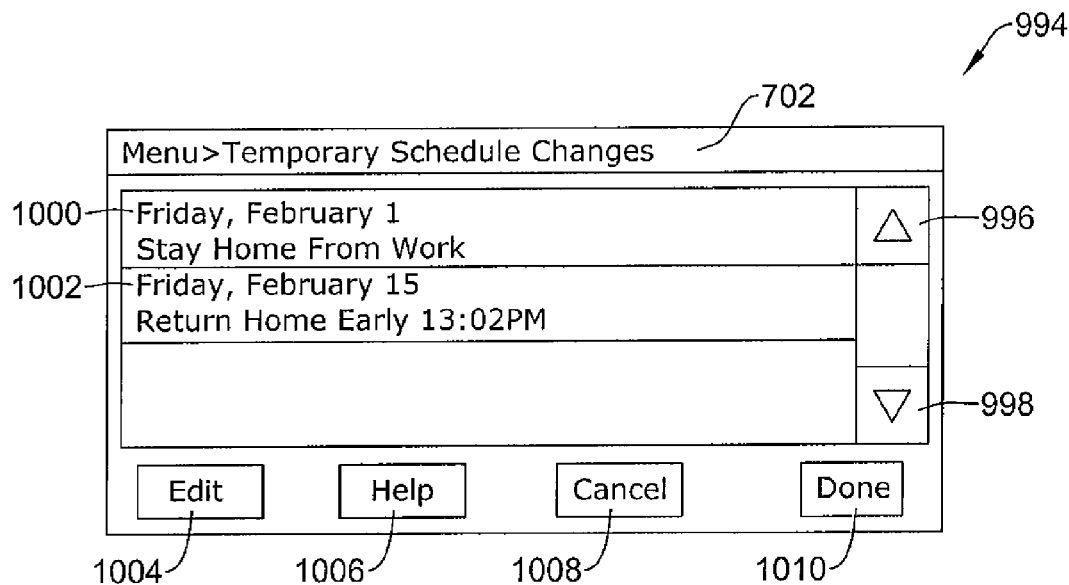

Returning briefly to FIG. 96, pressing View Schedule Adjustments button 918 may cause HVAC controller 20 to display an illustrative screen 994, shown in FIG. 108. Navigational bar 702 provides the user with an indication of where they are within the hierarchical menu structure. Screen 994 may include buttons representing each temporary schedule change that has been saved. In some cases, there may be more such buttons than can be displayed at one time. An Up arrow 996 and a Down arrow 998 may be used to scroll up and/or down through the buttons representing the temporary schedule changes, if necessary.

In the illustrated example, screen 994 includes a first button 1000 and a second button 1002. First button 1000 represents a temporary schedule change in which the user has specified that they will be staying home from work. Second button 1002 represents a temporary schedule change in which the user has specified that they will be coming home from work early. Screen 994 permits the user to not only view their temporary schedule changes, but also to edit and/or delete them, as they wish. Screen 994 includes an Edit button 1004, a Help button 1006, a Cancel button 1008 and a Done button 1010. By pressing one of first button 1000 or second button 1002, the user may be able to either edit or cancel the temporary schedule change represented by the pressed button. Help button 1006, if pressed, may cause HVAC controller 20 to display information providing further assistance and/or guidance. Pressing Done button 1010 may cause HVAC controller 20 to revert to a previous screen such as screen 904 (FIG. 96). It is contemplated that an Add button may also be provided, which when selected, provides a screen similar to that shown in FIG. 96.

For illustrative purposes, assume that second button 1002 has been selected. If the user presses Edit button 1004, HVAC controller 20 may display an illustrative screen 1012, as shown in FIG. 109. Screen 1012 may include text 1014, instructing the user that they are to set the date that they will be returning home early. Screen 1012 may include month block 928 and day block 930. Month block 928 may display a month that can be adjusted using up arrow 932 and down arrow 934, if necessary. Day block 930 may display a date or a day of the week, which may be adjusted using up arrow 932 and down arrow 934, as appropriate. Back button 960 may cause HVAC controller 20 to revert to a previous screen such as screen 994 (FIG. 108).

Figure 110:
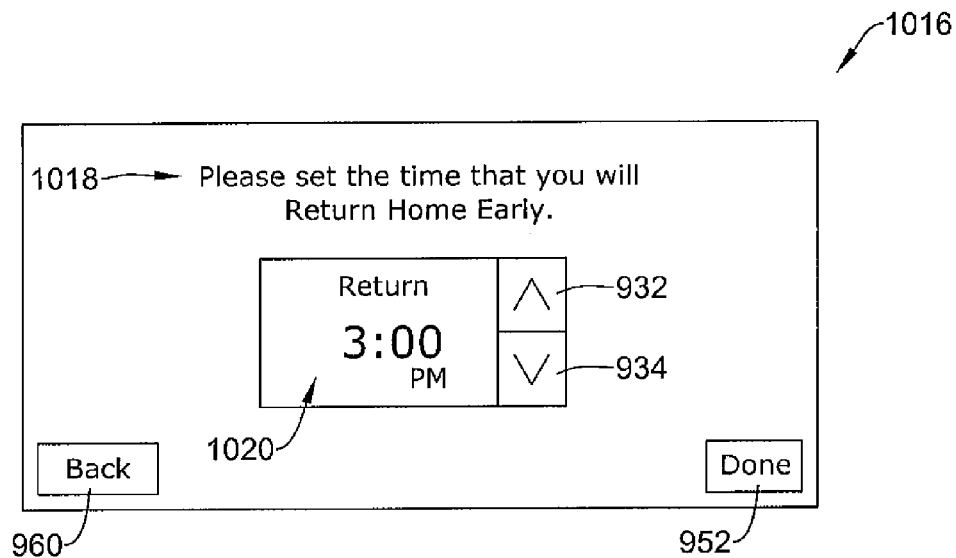

Pressing Next button 952 may cause HVAC controller 20 to display an illustrative screen 1016, as shown in FIG. 110. Screen 1016 may include text 1018, instructing the user that they are to set the time that they will be returning home early. Screen 1012 may include a time block 1020 that displays a time that can be adjusted up or down using up arrow 932 and/or down arrow 934, as desired. Back button 960 may cause HVAC controller 20 to revert to a previous screen such as screen 1012 (FIG. 109).

Figure 111:
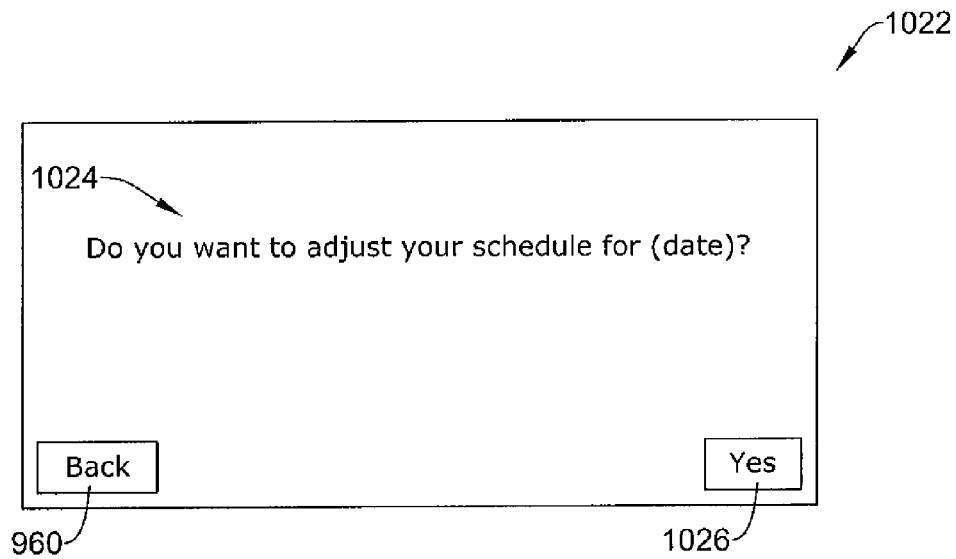

Pressing Done button 952 may cause HVAC controller 20 to display an illustrative screen 1022, as shown in FIG. 111. Screen 1022 may include an inquiry 1024, asking the user to confirm if they wish to save the schedule change or changes they have just made. Pressing Back button 960 may cause HVAC controller 20 to revert to a previous screen such as screen 1012 (FIG. 109) or screen 1016 (FIG. 110) so that the user may have another opportunity to edit the temporary schedule change. A Yes button 1026, if pressed, instructs HVAC controller 20 to save the changes made and to revert to a previous screen such as screen 994 (FIG. 108).

Figure 112:
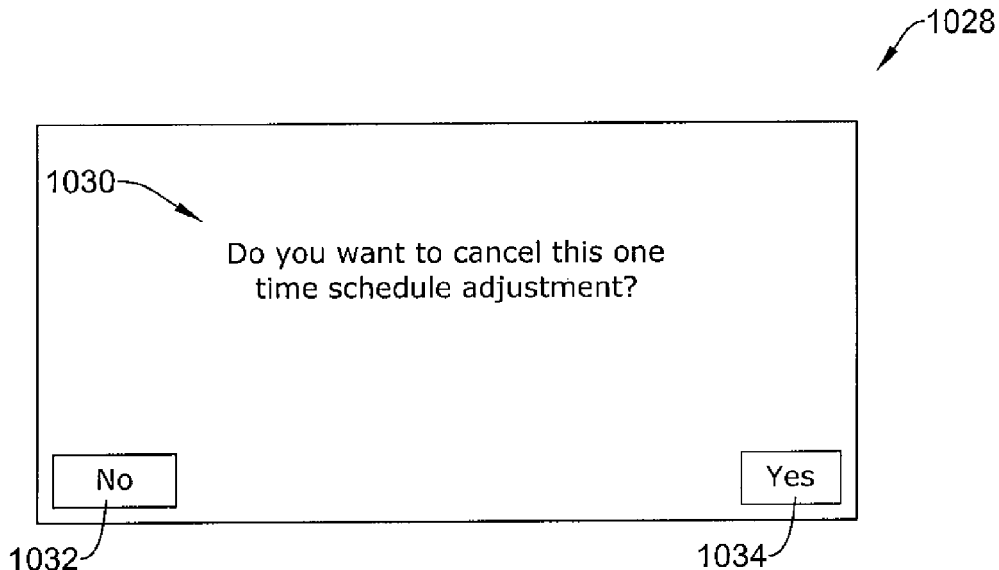

Returning briefly to FIG. 108, pressing Cancel button 1008 may cause HVAC controller 20 to display an illustrative screen 1028, as shown in FIG. 112. Screen 1028 may include an inquiry 1030, asking the user to confirm that they wish to cancel the selected temporary schedule change. A No button 1032 and a Yes button 1034 permit the user to provide their answer. Pressing No button 1032 may cause HVAC controller 20 to retain the temporary schedule change while pressing Yes button may cause HVAC controller 20 delete the temporary schedule change. In either case, HVAC controller 20 may revert to screen 994 (108).

Figure 113:
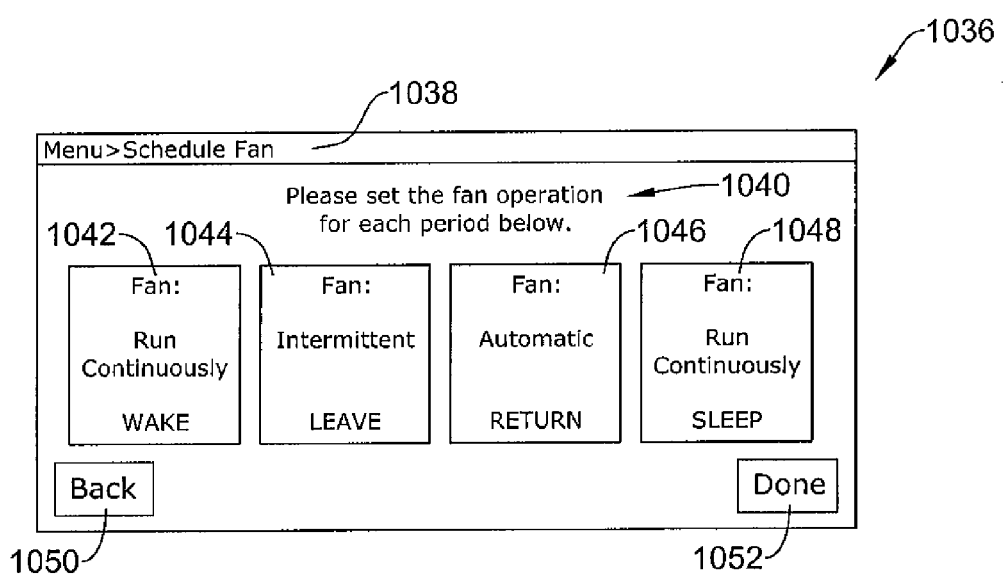
FIGS. 113 through 114 provide illustrative but non-limiting examples of screens pertaining to fan scheduling using the HVAC controllers of FIGS. 1 and 2.
Figure 114:
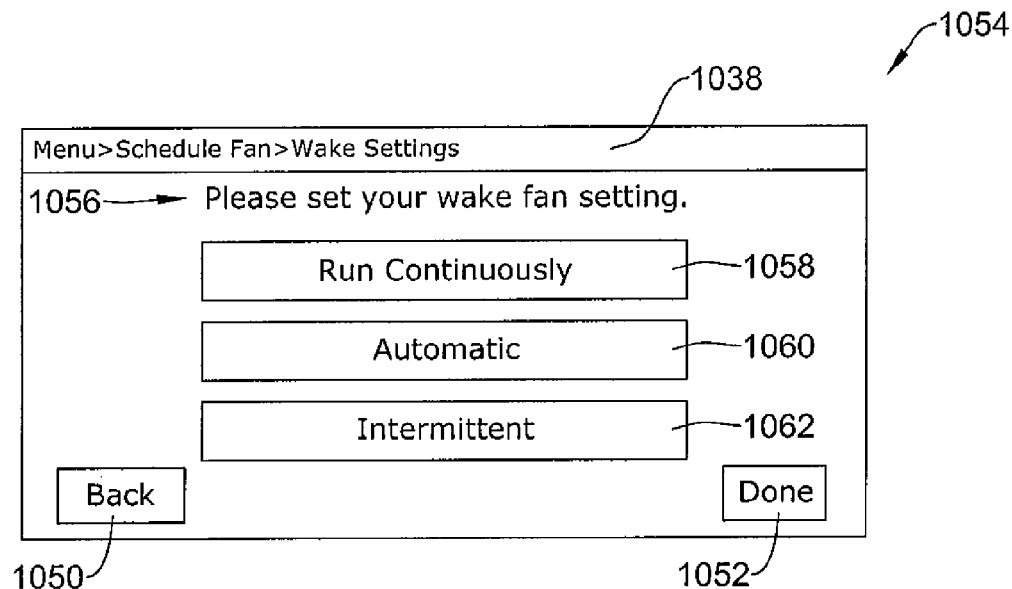

FIGS. 113 through 114 provide illustrative but non-limiting examples of screens that may be displayed by HVAC controller 20 pertaining to viewing and/or changing a fan schedule within HVAC controller 20. In particular, FIG. 113 provides an illustrative screen 1036 that may be displayed by HVAC controller 20 in response to someone pressing or otherwise selecting Schedule Fan button 170 (FIG. 17) in order to view and/or create a fan schedule. Screen 904 may include a Navigational bar 1038, which provides the user with an indication of where they are within the hierarchical menu structure. Text 1040 may instruct the user to set the fan operation schedule for each of the time periods shown.

Screen 1036 may include, for example, one or more of a Wake button 1042, a Leave button 1044, a Return button 1046 and a Sleep button 1048. Each of Wake button 1042, Leave button 1044, Return button 1046 and Sleep button 1048 may display a fan setting for that particular time period. For example, as currently set, screen 1036 shows a Run Continuously setting for the Wake period, an Intermittent setting for the Leave period, an Automatic setting for the Return period and a Run Continuously setting for the Sleep period. A Back button 1050, if pressed, may cause HVAC controller 20 to return to a previous screen without saving any changes to the fan schedule. A Done button 1052, if pressed, may cause HVAC controller 20 to return to a previous screen and to save any changes that were made to the fan schedule. In some cases, HVAC controller 20 may revert to a previous screen such as screen 150 (FIG. 17).

If the user wants to change the fan setting for one of the time periods, they may do so by pressing the appropriate button. For example, pressing Wake button 1042 may cause HVAC controller 20 to display an illustrative screen 1054, as shown in FIG. 114. Screen 1054 may include Navigational bar 1038, which provides the user with an indication of where they are within the hierarchical menu structure. Screen 1054 includes text 1056, instructing the user to set the fan setting for the Wake time period. Screen 1054 includes a Run Continuously button 1058, an Automatic button 1060, and an Intermittent button 1062. Although not illustrated, it is contemplated that screen 1054 may also include a fan setting button that instructs HVAC controller 20 to operate the fan any time the ventilation system (air exchanger) is operating and/or at some other designated time.

By pressing the appropriate fan operation button, the user may instruct HVAC controller 20 how to operate the fan in any particular time period. Pressing Back button 1050 may cause HVAC controller 20 to return to screen 1036 (FIG. 113) without saving any changes while pressing Done button 1052 may cause HVAC controller 20 to save the changes made as well as to revert to a previous screen such as screen 150 (FIG. 17).

Figure 115:
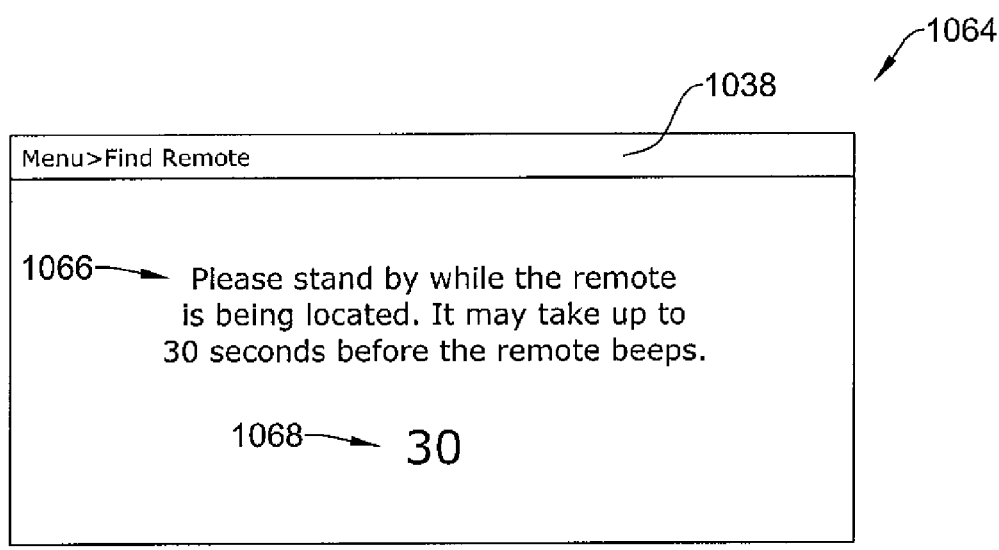
FIG. 115 provides an illustrative but non-limiting example of a screen pertaining to locating a remote control using the HVAC controllers of FIGS. 1 and 2.

FIG. 115 provides an illustrative but non-limiting example of a screen that may be displayed by HVAC controller 20 pertaining to locating a remote control. In particular, FIG. 115 provides an illustrative screen 1064 that may be displayed by HVAC controller 20 in response to someone pressing or otherwise selecting Find Remote button 174 (FIG. 17). Screen 1064 may include a Navigational bar 1038, which provides the user with an indication of where they are within the hierarchical menu structure. Text 1066 may instruct the user to wait while the remote is being located. A timer 1068 provides a countdown for finding the remote. In some cases, the remote control may beep in response to the user pressing Find Remote button 172.

Figure 116:
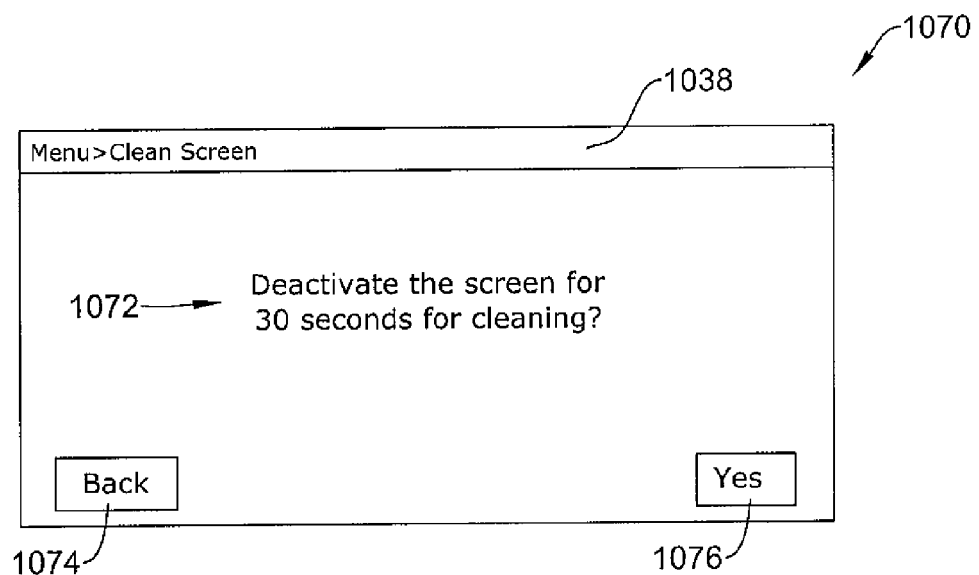
FIGS. 116 through 117 provide illustrative but non-limiting examples of screens pertaining to screen cleaning using the HVAC controllers of FIGS. 1 and 2.
Figure 117:
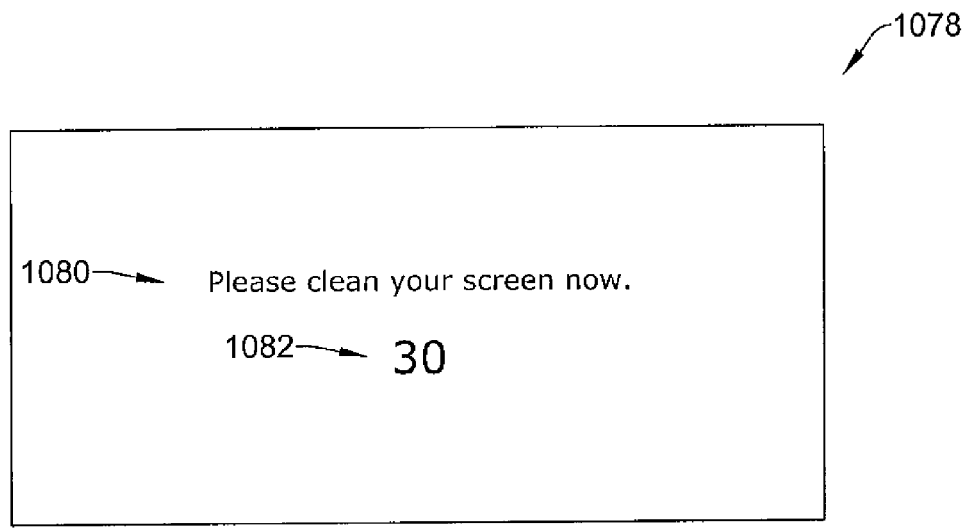

FIGS. 116 through 117 provide illustrative but non-limiting examples of screens that may be displayed by HVAC controller 20 pertaining to screen cleaning. In particular, FIG. 116 provides an illustrative screen 1070 that may be displayed by HVAC controller 20 in response to someone pressing or otherwise selecting Clean Screen button 176 (FIG. 17). Screen 1070 may include Navigational bar 1038, which provides the user with an indication of where they are within the hierarchical menu structure. An inquiry 1072 may ask the user if they want to deactivate the touch screen so that it can be cleaned. If the user presses a Back button 1074, HVAC controller 20 may revert to a previous screen such as screen 150 (FIG. 17).

If the user presses a Yes button 1076, HVAC controller 20 may display an illustrative screen 1078, as shown in FIG. 117. Screen 1078 may include text 1080 instructing the user to proceed with cleaning the screen. In some cases, text 1080 may also provide the user with instructions as to how to clean the screen, what type or kind of cloth and/or cleaner or solvent to use, and the like. A counter 1082 may count backwards from a predetermined time such as 30 seconds so that the user knows when they need to finish cleaning the screen.

Figure 118:
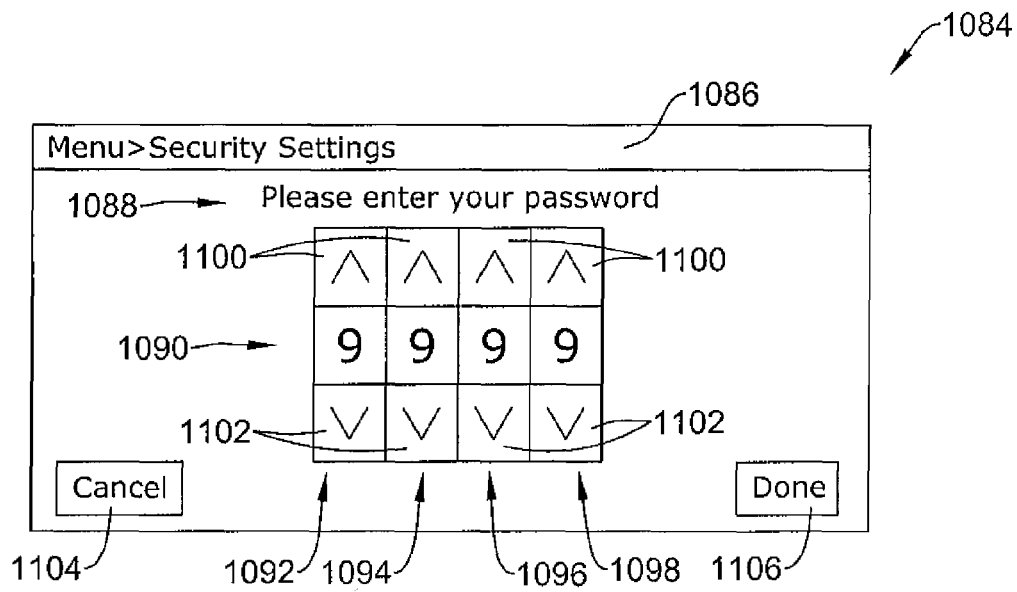
FIGS. 118 through 123 provide illustrative but non-limiting examples of screens pertaining to changing and/or viewing security settings using the HVAC controllers of FIGS. 1 and 2.

FIGS. 118 through 123 provide illustrative but non-limiting examples of screens that may be displayed by HVAC controller 20 pertaining to viewing and/or changing security settings within HVAC controller 20. In particular, FIG. 118 provides an illustrative screen 1084 that may be displayed by HVAC controller 20 in response to someone pressing or otherwise selecting Security Settings button 178 (FIG. 17) in order to view and/or alter security settings. Screen 1084 may include a Navigational bar 1086, which provides the user with an indication of where they are within the hierarchical menu structure. Text 1088 may instruct the user to enter their password.

It should be noted that HVAC controller 20 may display screen 1084 upon the user pressing Security Settings button 178 (FIG. 17) if the user has already created a password. In some cases, if no password has been created, pressing Security Settings button 178 may cause HVAC controller 20 to display a preferences screen as will be discussed with respect to FIG. 120. In some instances, if the user has not already set a password, HVAC controller 20 may default to an initial password such as "9999" which can be entered via screen 1084 so that the user may subsequently set their own password.

Screen 1084 includes a password block 1090 that may be used to enter a password. As illustrated, password block 1090 is configured to accommodate a four digit numerical password. It will be recognized that password block 1090 may easily be configured to accommodate smaller or even larger numerical password, or to include one or more letters of the alphabet. Password block 1090 may be configured to represent a four digit lock tumbler including a first digit location 1092, a second digit location 1094, a third digit location 1096 and a fourth digit location 1098. Each digit location may display a number and may include an up arrow 1100 and a down arrow 1102 that may be used to adjust the displayed number.

Figure 119:
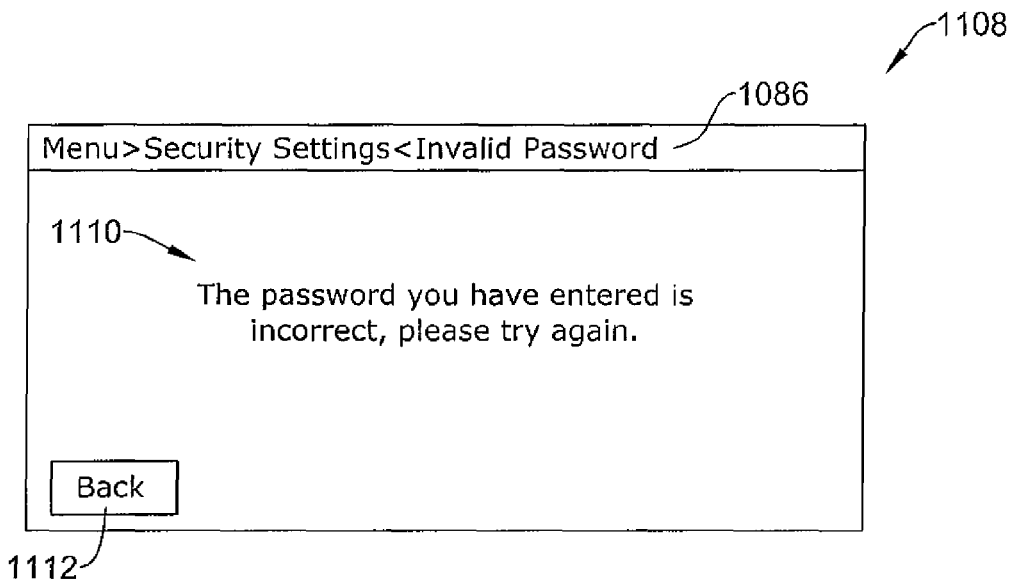

A Cancel button 1104, if pressed, may permit the user to return to a previous screen. A Done button 1106, if pressed, informs HVAC controller 20 that the password has been entered. If the password is not correct, HVAC controller 20 may display an illustrative screen 1108, as shown in FIG. 119. Navigational bar 1086 provides the user with an indication of where they are within the hierarchical menu structure. Screen 1108 may include text 1110, which informs the user that the password was not entered correctly and that they should try again. Pressing a Back button 1112 may cause HVAC controller 20 to revert to a previous screen such as screen 1084 (FIG. 118).

Figure 120:
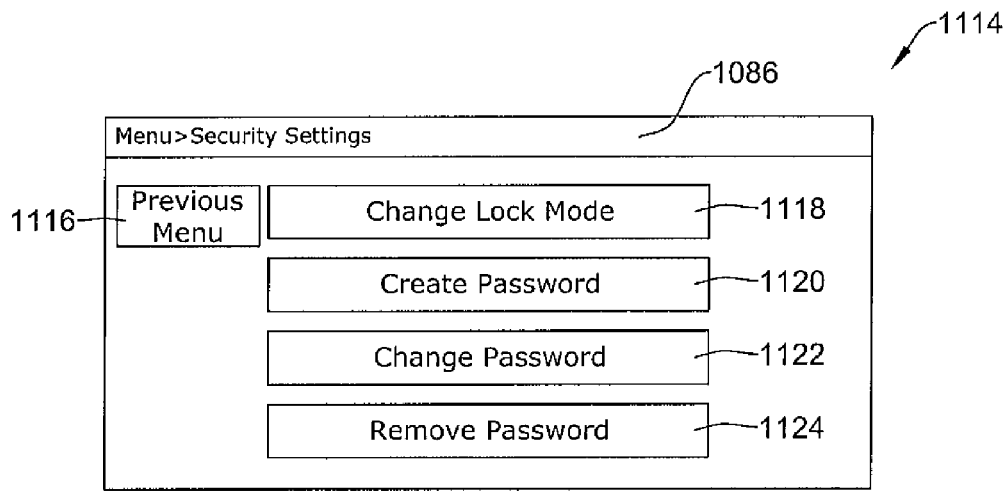

Referring briefly to FIG. 118, if the password was entered correctly, pressing Done button 1106 may cause HVAC controller 20 to display an illustrative screen 1114, as shown in FIG. 120. Navigational bar 1086 provides the user with an indication of where they are within the hierarchical menu structure. A Previous Menu button 1116, if pressed, may cause HVAC controller 20 to revert to a previous screen such as screen 150 (FIG. 17). Screen 1114 may include, for example, one or more of a Change Lock Mode button 1118, a Create Password button 1120, a Change Password button 1122, and a Remove Password button 1124. Screen 1114 may not display all of these buttons at one time. For example, if no password has yet been created, screen 1114 will likely not include Change Password button 1122 or Remove Password button 1124. If a password has already been created, Create Password button 1120 may not be displayed.

Figure 121:
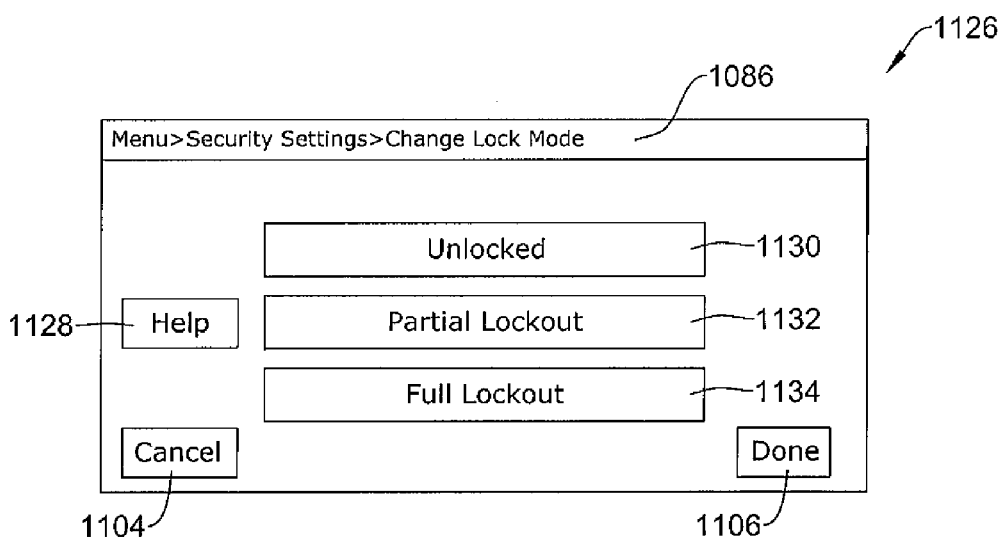

Returning briefly to FIG. 120, pressing Change Lock Mode button 1118 may cause HVAC controller 20 to display an illustrative screen 1126, as shown in FIG. 121. Navigational bar 1086 provides the user with an indication of where they are within the hierarchical menu structure. A Help button 1128 may provide the user with additional guidance or information pertaining to their options. Screen 1126 may include one or more of an Unlocked button 1130, a Partial Lockout button 1132 and a Full Lockout button 1134.

The user may select their desired lock mode by pressing one of Unlocked button 1130, Partial Lockout button 1132 and Full Lockout button 1134. Pressing Cancel button 1104 may cause HVAC controller 20 to discard any selection that may have been made, while pressing Done button 106 may cause HVAC controller 20 to remember any selection that may have been made. In either case, HVAC controller 20 may revert to a previous screen such as screen 1114 (FIG. 120).

In one illustrative embodiment, Full Lockout may require that the user enter a password to make any (or most) changes to the HVAC controller settings. Partial Lockout may require a password to change certain settings, such as system settings. Unlock may not require a password to make any changes.

Figure 122:
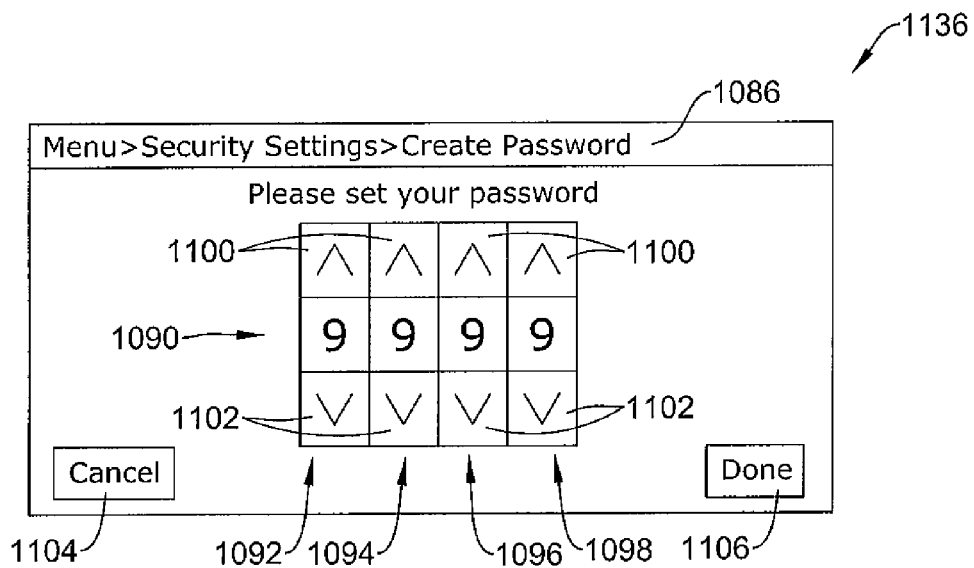

Returning briefly to FIG. 120, pressing Create Password button 1120 may cause HVAC controller 20 to display an illustrative screen 1136, as shown in FIG. 122. As can be seen within Navigational bar 1086, screen 1136 pertains to creating a password. If a password has already been created or if a default password is built into HVAC controller 20, a screen similar to screen 1136 may be reached, for example, by pressing Change Password button (FIG. 120).

Screen 1136 may include Password block 1090, which as discussed above may be configured to represent a four digit lock tumbler including first digit location 1092, second digit location 1094, third digit location 1096 and fourth digit location 1098. Each digit location may display a number and may include up arrow 1100 and down arrow 1102 that may be used to adjust the displayed number. A Cancel button 1104, if pressed, may permit the user to return to a previous screen. A Done button 1106, if pressed, informs HVAC controller 20 that the password has been entered.

Figure 123:
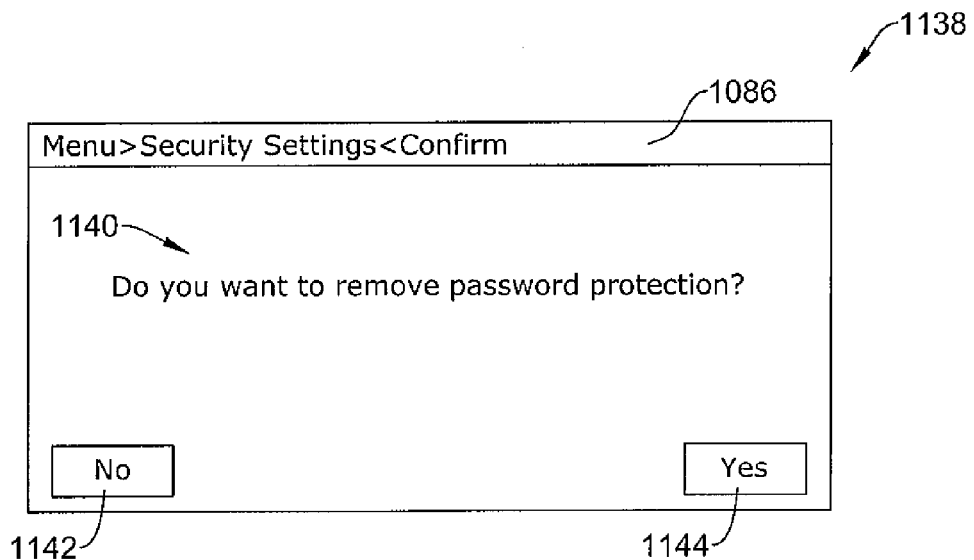

Returning briefly to FIG. 120, if a password has previously been created and thus Remove Password button 1124 is displayed, pressing Remove Password button 1124 may cause HVAC controller 20 to display an illustrative screen 1138, as shown in FIG. 123. Navigational bar 1086 provides the user with an indication of where they are within the hierarchical menu structure. Screen 1138 may include an inquiry 1140, asking the user if they want to remove password protection. A No button 1142 and a Yes button 1144 permit the user to enter their choice. If the user presses No button 1142, the password is retained while if the User presses Yes button 1144, the password is removed. In either case, HVAC controller 20 may revert to a previous screen such as screen 1114 (FIG. 120).

Figure 124:
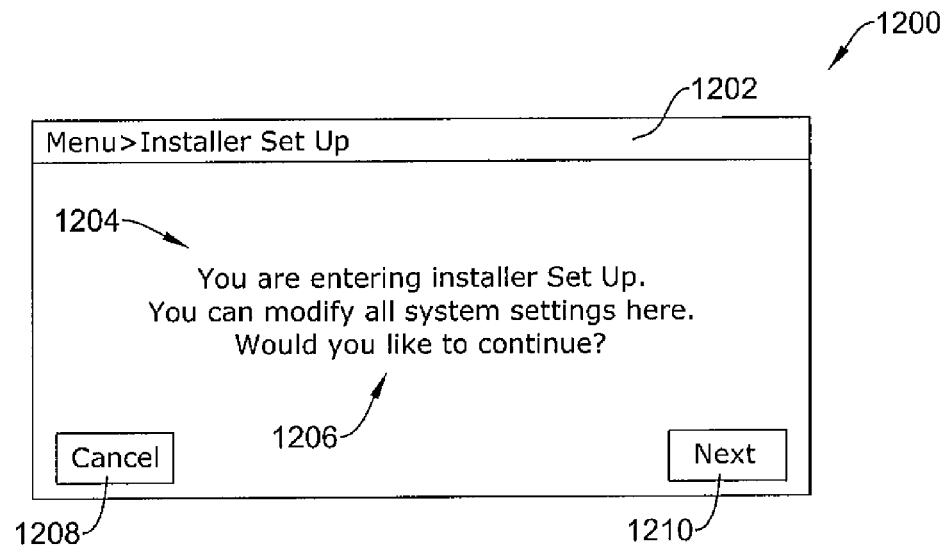
FIGS. 124 through 195 provide illustrative but non-limiting examples of screens pertaining to installer setup of the HVAC controllers of FIGS. 1 and 2.
Figure 195:
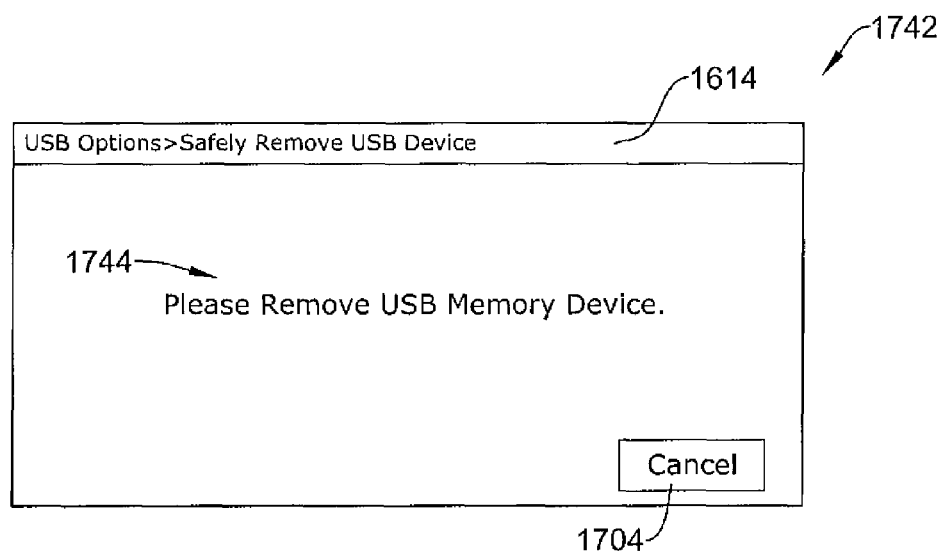

FIGS. 124 through 195 provide illustrative but non-limiting examples of screens that may be displayed by HVAC controller 20 pertaining to installer setup of HVAC controller 20. In particular, FIG. 124 provides an illustrative screen 1200 that may be displayed by HVAC controller 20 in response to someone pressing or otherwise selecting Installer Setup button 180 (FIG. 17) in order to access the installer setup menu. While it is contemplated that a homeowner may access the installer setup, the installer setup menu will likely be accessed by an installer or other HVAC contractor.

Figure 125:
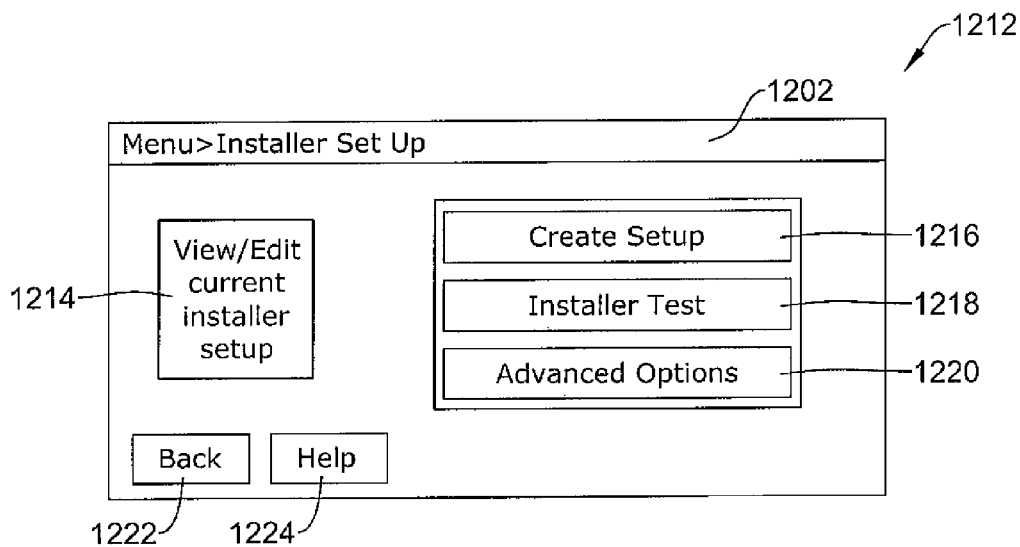

Screen 1200 may include a Navigational bar 1202, which provides the user with an indication of where they are within the hierarchical menu structure. Screen 1200 may include text 1204 instructing the installer that they are entering installer setup. An inquiry 1206 may ask the installer to confirm that they want to continue. If the installer does not want to continue into installer setup, they can return to a previous screen such as screen 150 (FIG. 17) by pressing a Cancel button 1208. However, if they wish to advance into installer setup, they may do so by pressing a Next button 1210, which may cause HVAC controller 20 to display an illustrative screen 1212, as shown in FIG. 125.

Screen 1212 provides an installer, HVAC contractor or other professional the opportunity to create a setup, view or edit a current setup, test the HVAC equipment and/or reach advanced installer setup options. Screen 1212 may include one or more of View/Edit Current Installer Setup button 1214, a Create Setup button 1216, an Installer Test button 1218 and an Advanced Options button 1220. A Back button 1222, if pressed, may cause HVAC controller 20 to revert to a previous screen such as screen 150 (FIG. 17). A Help button 1224 may provide the installer with additional information or guidance pertaining to their options. In some cases, the installer setup may be password protected.

Pressing Create Setup button 1216 may cause HVAC controller 20 to begin an installer setup process. In some case, HVAC controller 20 may display one or more screens (not illustrated) asking the installer to set parameters such as a language in which they want HVAC controller 20 to present questions and in which HVAC controller 20 receives answers. The following screens provide examples of screens that may be displayed by HVAC controller 20 during the installer setup process but they should not be construed as being limiting in any manner. Depending on the particular HVAC equipment that will be controlled by HVAC controller 20, more or fewer screens may be displayed, depending on the circumstances.

Figure 126:
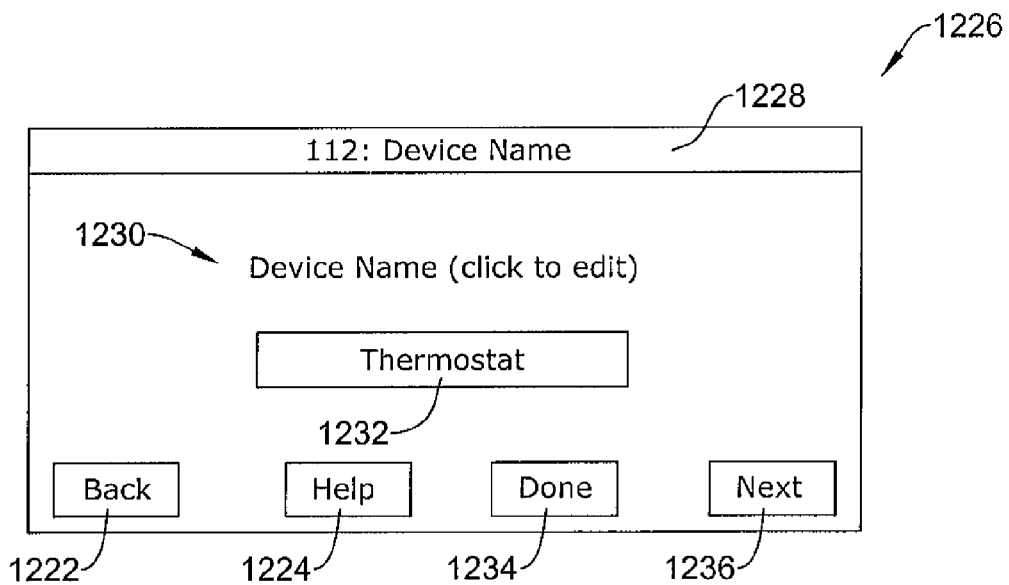

As illustrated, pressing Create Setup button 1216 may cause HVAC controller 20 to display an illustrative screen 1226, as shown in FIG. 126. Screen 1226 may include a banner 1228 that provides the installer with an indication of where they are within the menu structure as well as providing a numerical key. The numerical key may, for example, correspond to known thermostat programming numbers with which an installer may be familiar, although this is not required.

Text 1230 instructs the installer that they are to edit a device name. A Thermostat button 1232 may be pressed to edit the name of the thermostat. In some cases, additional buttons (not illustrated) may be provided, so that the user may edit the names, if desired, of multiple devices. Back button 1222 permits the user to revert to a previous screen while Help button 1224 may provide the installer with additional information or guidance pertaining to their options. A Done button 1234, if pressed, may cause HVAC controller 20 to exit the installer setup process and revert to a previous screen such as screen 1212 (FIG. 125) while Next button 1236 may cause HVAC controller 20 to progress to a subsequent screen within the Create Setup menu.

Figure 127:
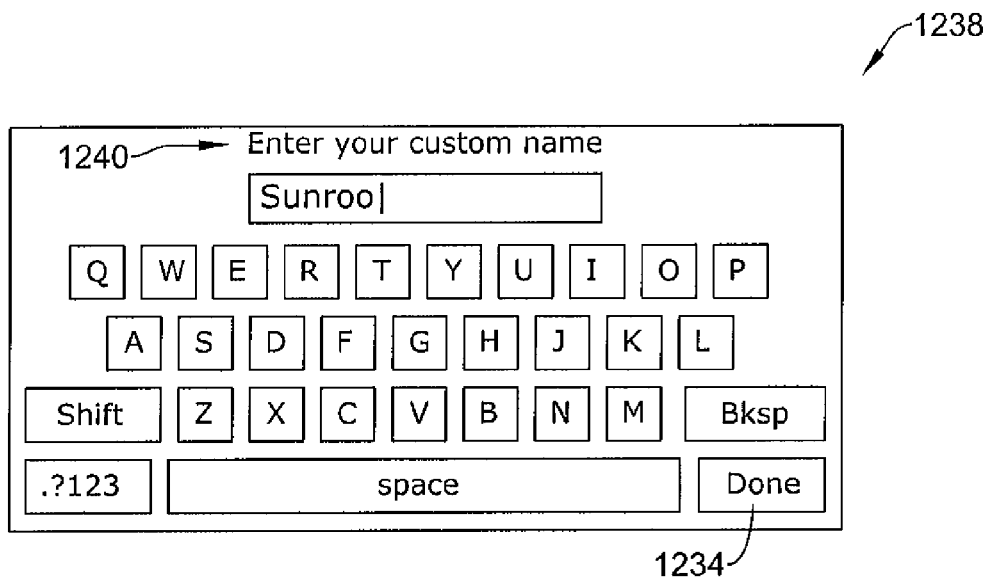
Figure 128:
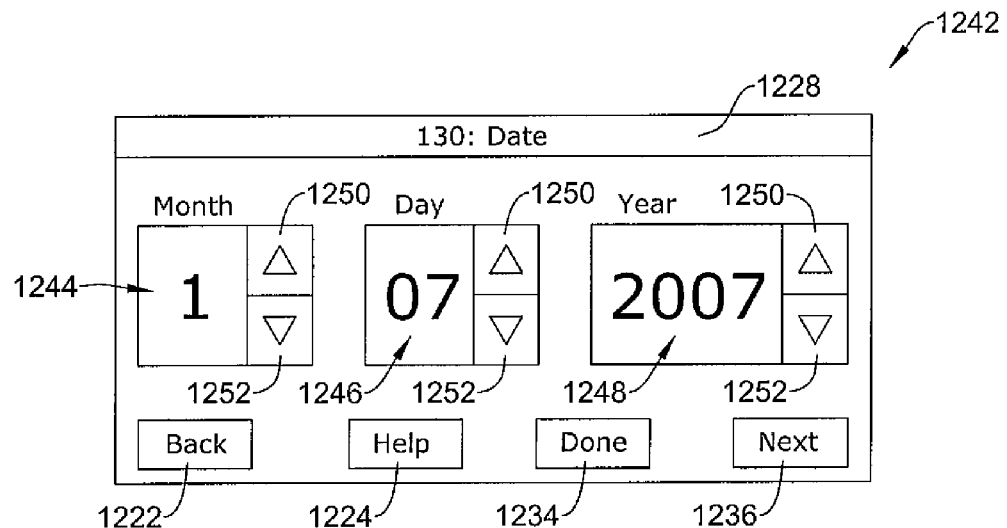

Pressing Thermostat button 1232 may cause HVAC controller 20 to display an illustrative screen 1238, as shown in FIG. 127. Screen 1238 may include text 1240, reminding the installer that they are to enter a name for the device in question. Screen 1238 may provide a touch-sensitive QWERTY keyboard that the installer may use to enter the new name. Done button 1234 may, in this case, instruct HVAC controller 20 to save the newly entered name as well as to proceed to the next screen in the installer setup process. In some instances, pressing Done button 1234 may cause HVAC controller 20 to display an illustrative screen 1242, as shown in FIG. 128.

Screen 1242 may include banner 1228, which as noted above provides the installer with an indication of menu location as well as a reminder that they are to set the date. Screen 1242 may include one or more of a Month block 1244, a Day block 1246 and a Year block 1248. Month block 1244 may display a month and may include an up arrow 1250 and a down arrow 1252 that can be used to change the month, if necessary. Day block 1246 may display a day or a date that can be adjusted using up arrow 1250 and/or down arrow 1252, as desired. Year block 1248 may display a year that can be adjusted using up arrow 1250 and/or down arrow 1252, as appropriate.

Figure 129:
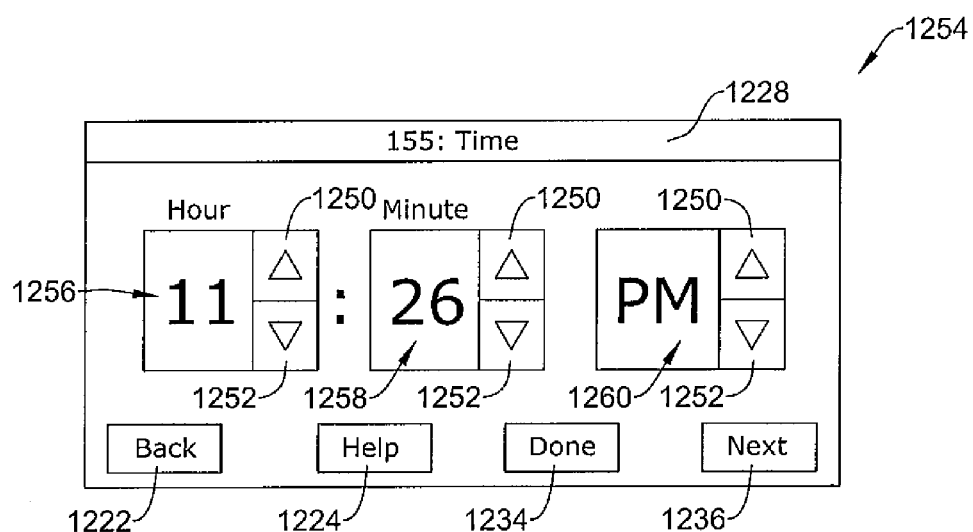

Back button 1222 permits the installer to revert to a previous screen while Help button 1224 may provide the installer with additional information or guidance pertaining to their options. Done button 1234, if pressed, may cause HVAC controller 20 to exit the installer setup process and revert to a previous screen such as screen 1212 (FIG. 125), while Next button 1236 may cause HVAC controller 20 to progress to a subsequent screen within the Create Setup menu. In some cases, pressing Next button 1236 may cause HVAC controller 20 to display an illustrative screen 1254, as shown in FIG. 129.

Screen 1254 may include banner 1228, which as noted provides the installer with an indication of menu location as well as a reminder that they are to set the time. Screen 1254 may include one or more of a Hour block 1256, a Minute block 1258 and an AM/PM block 1260. Hour block 1256 may display a current hour time setting that may be adjusted using up arrow 1250 and/or down arrow 1252, as desired. Minute block 1258 may display a current minute time setting that can be increased or decreased using up arrow 1250 and/or down arrow 1252, as appropriate. AM/PM block 1260 may display an indication of whether the current time is AM or PM. Up arrow 1250 and/or down arrow 1252 may be used to adjust whether the current time is before noon or after noon.

Back button 1222 permits the installer to revert to a previous screen while Help button 1224 may provide the installer with additional information or guidance pertaining to their options. Done button 1234, if pressed, may cause HVAC controller 20 to exit the installer setup process and revert to a previous screen such as screen 1212 (FIG. 125), while Next button 1236 may cause HVAC controller 20 to progress to a subsequent screen within the Create Setup menu.

Figure 130:
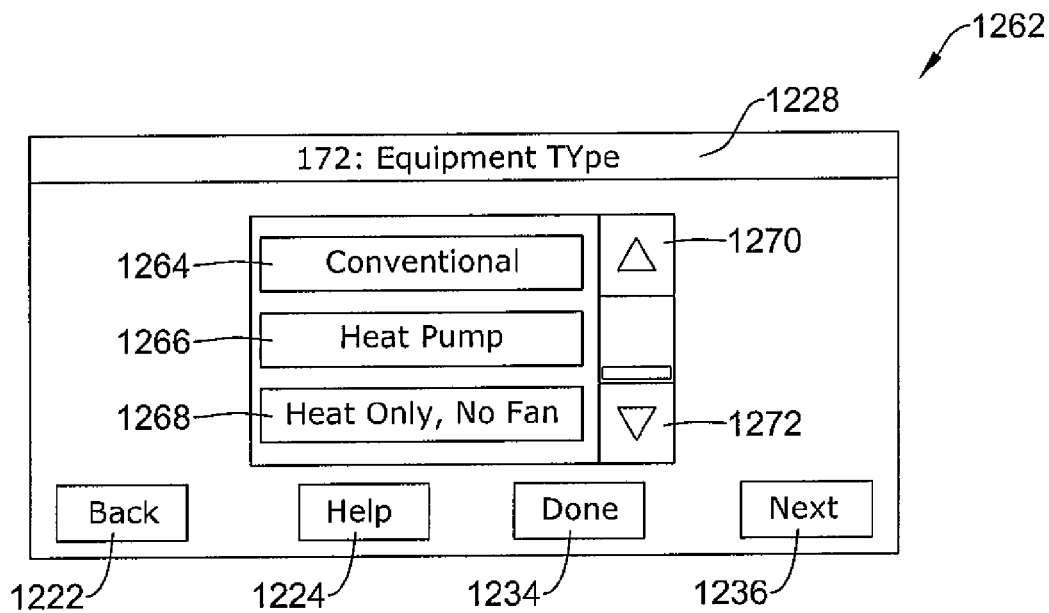

In some cases, pressing Next button 1236 may cause HVAC controller 20 to display an illustrative screen 1262, as shown in FIG. 130. Screen 1262 may include banner 1228, which provides the installer with an indication of menu location. Screen 1262 may permit the installer to specify equipment type. In some cases, screen 1262 may include one or more of a Conventional button 1264, a Heat Pump button 1266 and a Heat Only, No Fan button 1268. The installer may instruct HVAC controller 20 which type of equipment is or will be controlled by HVAC controller 20 by pressing the appropriate equipment button. While only three equipment buttons are shown, it will be appreciated that in some instances there may be more equipment buttons than can be displayed at one time. Screen 1262 may, therefore, include an Up button 1270 and a Down button 1272 that can be used to scroll up and/or down through the displayed equipment buttons.

Back button 1222 permits the installer to revert to a previous screen, while Help button 1224 may provide the installer with additional information or guidance pertaining to their options. Done button 1234, if pressed, may cause HVAC controller 20 to exit the installer setup process and revert to a previous screen such as screen 1212 (FIG. 125) while Next button 1236 may cause HVAC controller 20 to progress to a subsequent screen within the Create Setup menu.

Figure 131:
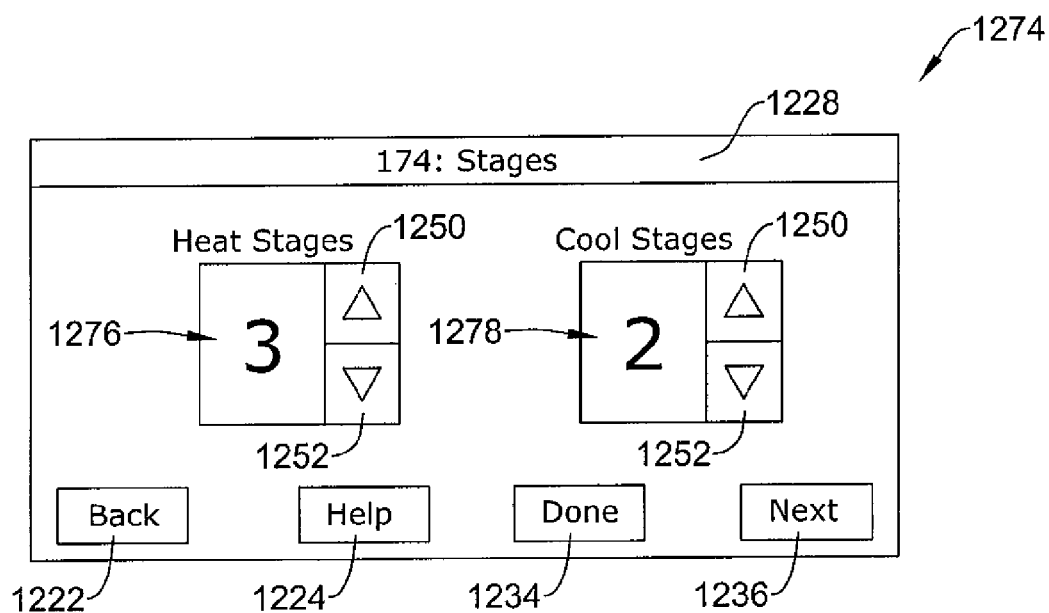

In some cases, pressing Next button 1236 may cause HVAC controller 20 to display an illustrative screen 1274, as shown in FIG. 131. Screen 1274 may include banner 1228, which provides the installer with an indication of menu location and in this case informs the installer that they are to provide data pertaining to the number of heating stages and the number of cooling stages. Screen 1274 may include one or both of a Heat Stages block 1276 and a Cool Stages block 1278. Heat Stages block 1276 may display a number of heating stages that can be increased or decreased using up arrow 1250 and/or down arrow 1252, as desired. Cool Stages block 1278 may display a number of cooling stages that can be increased or decreased using up arrow 1250 and/or down arrow 1252, as desired. HVAC controller 20 may be intelligent enough so that only options relevant to the equipment that is installed are provided in the menu. For example, if a single stage heat source is to be used, the Heat Stages block 1276 may not be provided or may be grayed out.

In some instances, HVAC controller 20 may be considered as displaying a first setup parameter in conjunction with a first descriptive text and a second, possibly related, setup parameter in conjunction with a second descriptive text. For example, and with respect to screen 1274, a first setup parameter may be the number of heating stages, and the first descriptive text may be the text "Heat Stages" displayed immediately above Heat Stages block 1276. A second setup parameter may be the number of cooling stages, and the second descriptive text may be the text "Cooling Stages" displayed immediately above Cool Stages block 1278.

These related parameters may be organized into a common setup category and displayed on the same screen 1274. The number of heating stages and the number of cooling stages, while applicable to different HVAC equipment, are related to a common setup category as to they both specify the number of stages. Grouping and displaying such related parameters into common setup category clusters on the display is believed to make the setup process more intuitive and efficient for the installer. Example common setup categories can include, for example, number of stages of an HVAC system, indoor air quality equipment parameters, heat pump lockout temperatures, humidity control parameters, ventilation parameters, cycles per hour (CPH) parameters, temperature set point stop limits, minimum off times, minimum on times, extended fan on times, display temperature offsets, and/or any other category as desired.

Back button 1222 permits the installer to revert to a previous screen while Help button 1224 may provide the installer with additional information or guidance pertaining to their options. Done button 1234, if pressed, may cause HVAC controller 20 to exit the installer setup process and revert to a previous screen such as screen 1212 (FIG. 125) while Next button 1236 may cause HVAC controller 20 to progress to a subsequent screen within the Create Setup menu.

Figure 132:
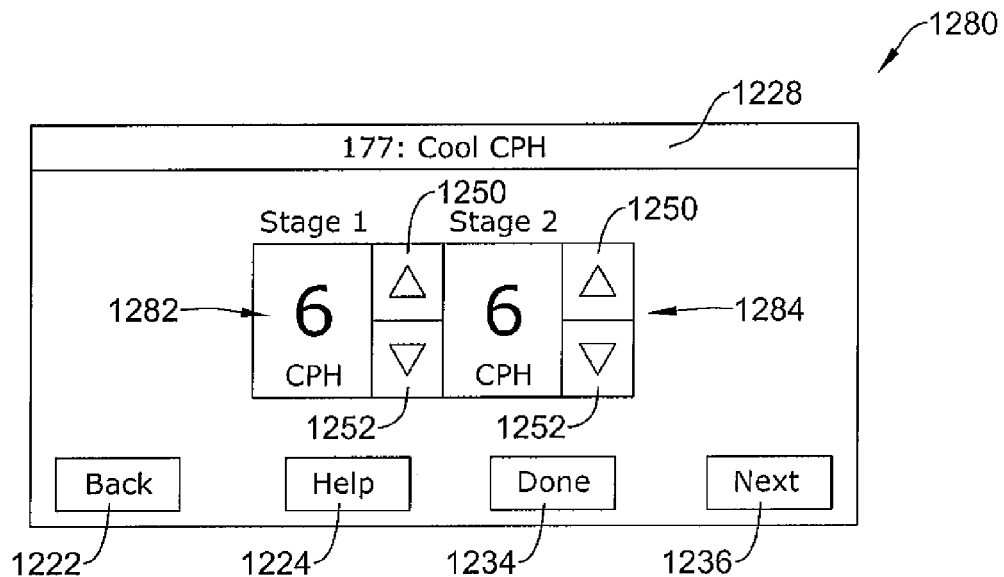

In some cases, pressing Next button 1236 may cause HVAC controller 20 to display an illustrative screen 1280, as shown in FIG. 132. Screen 1280 may include banner 1228, which provides the installer with an indication of menu location and in this case informs the installer that they are to provide data pertaining to the number of cycles per hour while cooling. Screen 1280 may include one or more of a Stage 1 block 1282 and a Stage 2 block 1284.

In the illustrative embodiment, Stage 1 block 1282 may display a number of cycles per hour for first stage cooling, which can be adjusted using up arrow 1250 and/or down arrow 1252, as desired. Stage 2 block 1284 may display a number of cycles per hour for second stage cooling, which can be adjusted using up arrow 1250 and/or down arrow 1252, as desired. In some cases, and as specified with respect to screen 1274 (FIG. 131), there may be more than two cooling stages, or perhaps less than two cooling stages, and screen 1280 may accommodate this.

As noted above, HVAC controller 20 may be considered as displaying a first setup parameter in conjunction with a first descriptive text and a second, possibly related, setup parameter in conjunction with a second descriptive text. For example, and with respect to screen 1280, a first setup parameter may be the number of cycles per hour for the first cooling stage, and the first descriptive text may be the text "Stage 1" displayed immediately above Stage 1 block 1282. A second setup parameter may be the number of cycles per hour for the second cooling stage, and the second descriptive text may be the text "Stage 2" displayed immediately above Stage 2 block 1284. These related parameters may be grouped into a common setup category and displayed on the same screen 1280.

Back button 1222 permits the installer to revert to a previous screen while Help button 1224 may provide the installer with additional information or guidance pertaining to their options. Done button 1234, if pressed, may cause HVAC controller 20 to exit the installer setup process and revert to a previous screen such as screen 1212 (FIG. 125) while Next button 1236 may cause HVAC controller 20 to progress to a subsequent screen within the Create Setup menu.

Figure 133:
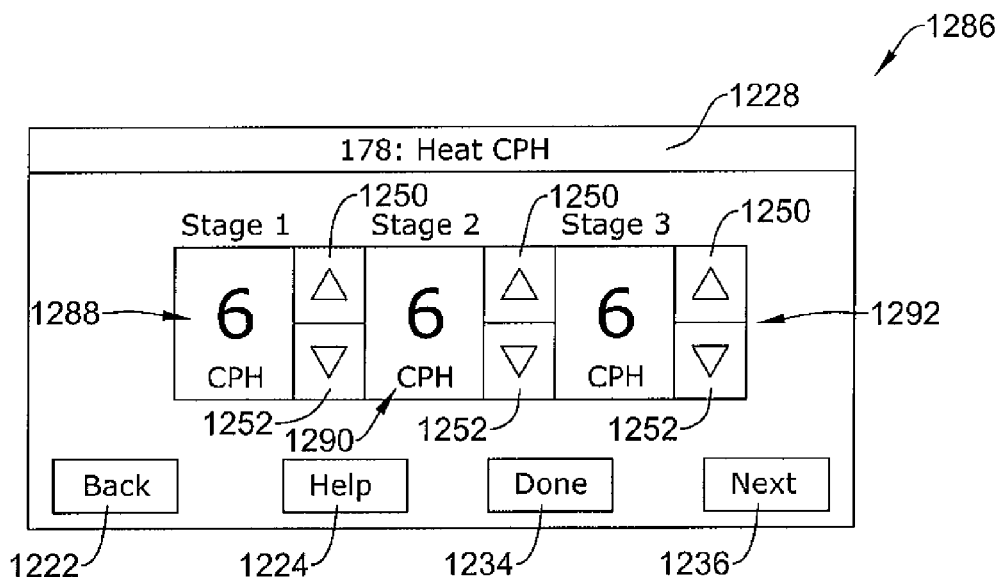

In some cases, pressing Next button 1236 may cause HVAC controller 20 to display an illustrative screen 1286, as shown in FIG. 133. Screen 1286 may include banner 1228, which provides the installer with an indication of menu location and in this case informs the installer that they are to provide data pertaining to the number of cycles per hour while heating. Screen 1286 may include one or more of a Stage 1 block 1288, a Stage 2 block 1290 and a Stage 3 block 1292.

In the illustrative embodiment, Stage 1 block 1288 may display a number of cycles per hour for first stage heating, which can be adjusted using up arrow 1250 and/or down arrow 1252, as desired. Stage 2 block 1290 may display a number of cycles per hour for second stage heating, which can be adjusted using up arrow 1250 and/or down arrow 1252, as desired. Stage 3 block 1292 may display a number of cycles per hour for third stage heating, which can be adjusted using up arrow 1250 and/or down arrow 1252, as appropriate. In some cases, and as specified with respect to screen 1274 (FIG. 131), there may be more than three heating stages, or perhaps less than three heating stages, and screen 1286 may accommodate this.

As noted above, HVAC controller 20 may be considered as displaying a first setup parameter in conjunction with a first descriptive text and a second, possibly related, setup parameter in conjunction with a second descriptive text. For example, and with respect to screen 1286, a first setup parameter may be the number of cycles per hour for the first heating stage, and the first descriptive text may be the text "Stage 1" displayed immediately above Stage 1 block 1288. A second setup parameter may be the number of cycles per hour for the second heating stage, and the second descriptive text may be the text "Stage 2" displayed immediately above Stage 2 block 1290. These related parameters may organized into a common setup category and displayed on the same screen 1286.

Back button 1222 permits the installer to revert to a previous screen while Help button 1224 may provide the installer with additional information or guidance pertaining to their options. Done button 1234, if pressed, may cause HVAC controller 20 to exit the installer setup process and revert to a previous screen such as screen 1212 (FIG. 125) while Next button 1236 may cause HVAC controller 20 to progress to a subsequent screen within the Create Setup menu.

Figure 134:
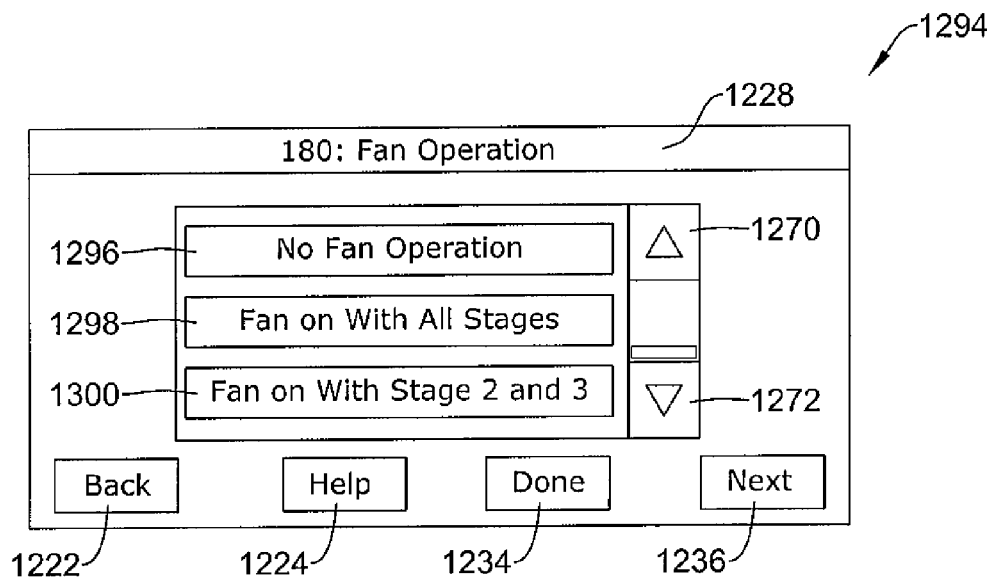

In some cases, pressing Next button 1236 may cause HVAC controller 20 to display an illustrative screen 1294, as shown in FIG. 134. Screen 1294 may include banner 1228, which provides the installer with an indication of menu location and in this case informs the installer that they are to provide data pertaining to fan settings. Screen 1294 may include, for example, one or more of a No Fan Operation button 1296, a Fan On With All Stages button 1298 and a Fan On With Stage 2 and 3 button 1300.

The installer may indicate their choice by pressing the appropriate fan setting button. While only three fan setting buttons are shown, it will be appreciated that in some instances there may be more fan setting buttons than can be displayed at one time. Screen 1294 may, therefore, include Up button 1270 and Down button 1272 that can be used to scroll up and/or down through the displayed fan setting buttons. Less fan setting buttons may also be displayed.

Back button 1222 permits the installer to revert to a previous screen while Help button 1224 may provide the installer with additional information or guidance pertaining to their options. Done button 1234, if pressed, may cause HVAC controller 20 to exit the installer setup process and revert to a previous screen such as screen 1212 (FIG. 125) while Next button 1236 may cause HVAC controller 20 to progress to a subsequent screen within the Create Setup menu.

Figure 135:
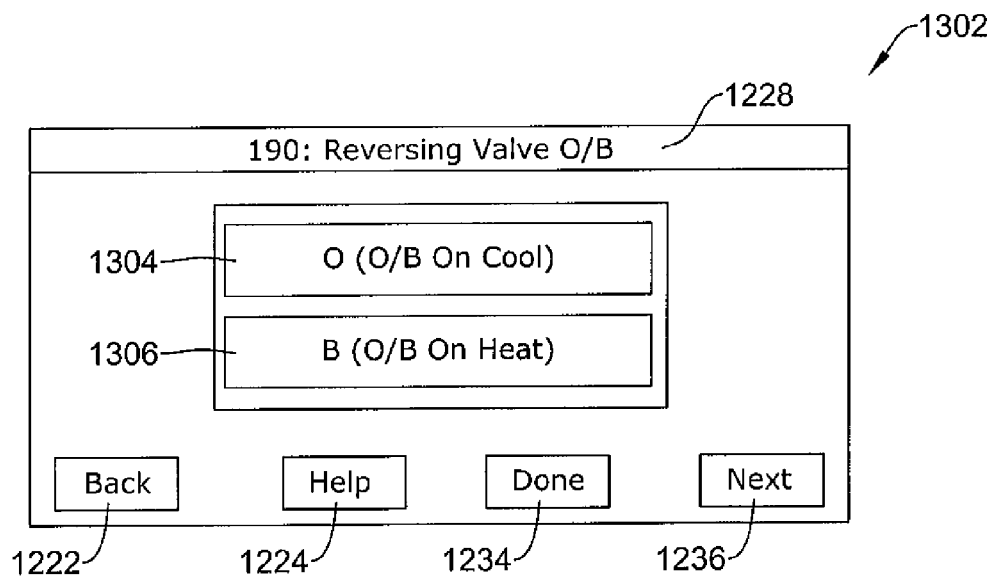

In some cases, pressing Next button 1236 may cause HVAC controller 20 to display an illustrative screen 1302, as shown in FIG. 135. Screen 1302 may include banner 1228, which provides the installer with an indication of menu location and in this case informs the user that they are to provide data pertaining to a reversing valve. In some cases, screen 1302 may only be displayed if HVAC controller 20 was previously instructed that there was a heat pump, with respect to screen 1262 (FIG. 13). Screen 1302 may include an O button 1304 and a B button 1306. The installer may, for example, press O button 1304 if they want the reversing valve to reverse on cooling or they may press B button 1306 if they want the reversing valve to reverse on heating.

Back button 1222 permits the installer to revert to a previous screen while Help button 1224 may provide the installer with additional information or guidance pertaining to their options. Done button 1234, if pressed, may cause HVAC controller 20 to exit the installer setup process and revert to a previous screen such as screen 1212 (FIG. 125) while Next button 1236 may cause HVAC controller 20 to progress to a subsequent screen within the Create Setup menu.

Figure 136:
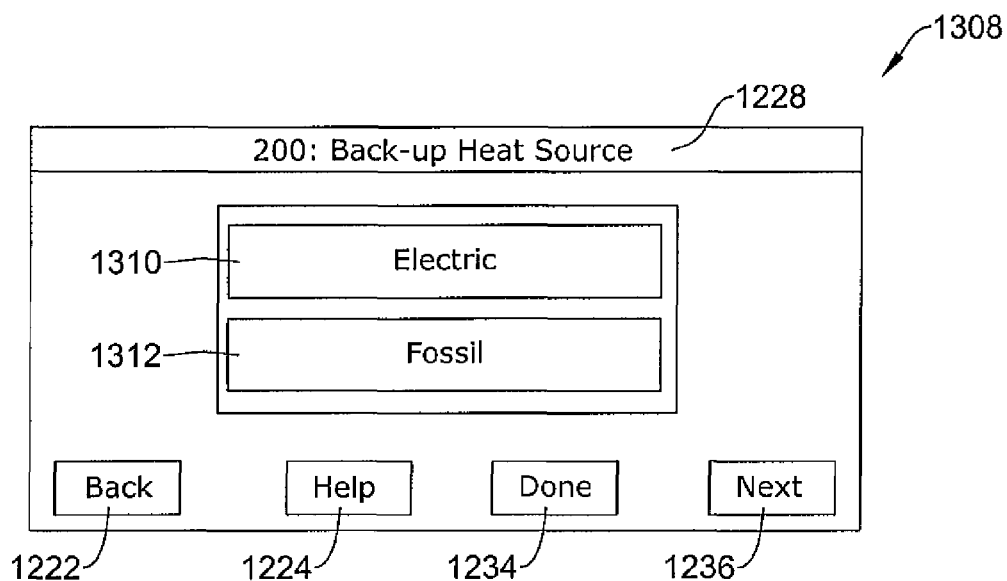

In some cases, pressing Next button 1236 may cause HVAC controller 20 to display an illustrative screen 1308, as shown in FIG. 136. Screen 1308 may include banner 1228, which provides the installer with an indication of menu location and in this case informs the installer that they are to provide information pertaining to a back-up heat source, if there is one. If there is no back-up heat source, HVAC controller 20 may not display screen 1308. Illustrative screen 1308 may include an Electric button 1310 and a Fossil button 1312. The installer may press one of Electric button 1310 or Fossil button 1312 to instruct HVAC controller 20 appropriately.

Back button 1222 permits the installer to revert to a previous screen while Help button 1224 may provide the installer with additional information or guidance pertaining to their options. Done button 1234, if pressed, may cause HVAC controller 20 to exit the installer setup process and revert to a previous screen such as screen 1212 (FIG. 125) while Next button 1236 may cause HVAC controller 20 to progress to a subsequent screen within the Create Setup menu.

Figure 137:
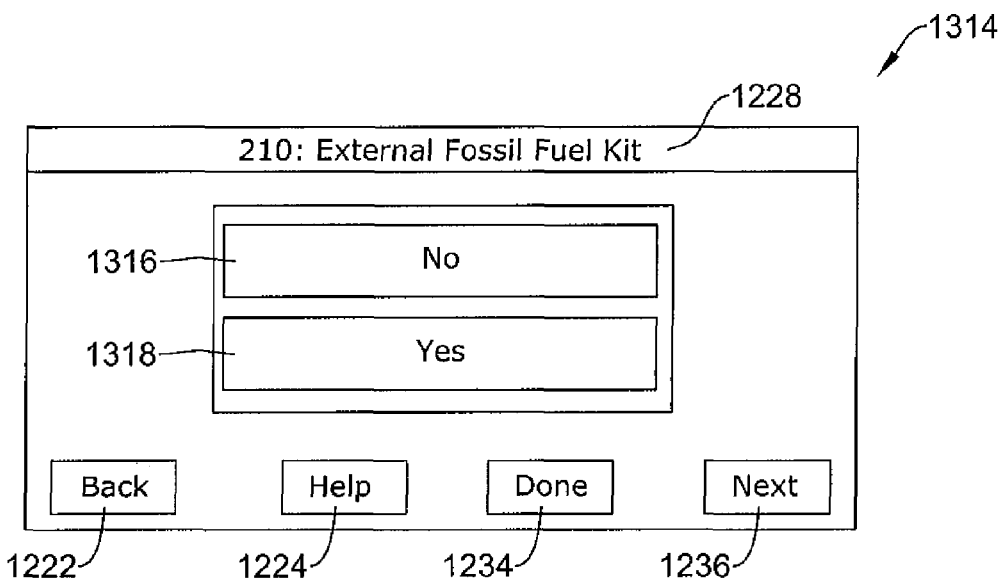

In some cases, pressing Next button 1236 may cause HVAC controller 20 to display an illustrative screen 1314, as shown in FIG. 137. Screen 1314 may, for example, only be displayed if the installer indicated with respect to screen 1308 (FIG. 136) that there was a fossil fuel back-up heat source. Screen 1314 may include banner 1228, which provides the installer with an indication of menu location and in this case informs the installer that they are to tell HVAC controller 20 whether or not there is an external fossil fuel kit. Screen 1314 may include a No button 1316 and a Yes button 1318. The installer may press No button 1316 if there is no external fossil fuel kit and may press Yes button 1318 if there is.

Back button 1222 permits the installer to revert to a previous screen while Help button 1224 may provide the installer with additional information or guidance pertaining to their options. Done button 1234, if pressed, may cause HVAC controller 20 to exit the installer setup process and revert to a previous screen such as screen 1212 (FIG. 125) while Next button 1236 may cause HVAC controller 20 to progress to a subsequent screen within the Create Setup menu.

Figure 138:
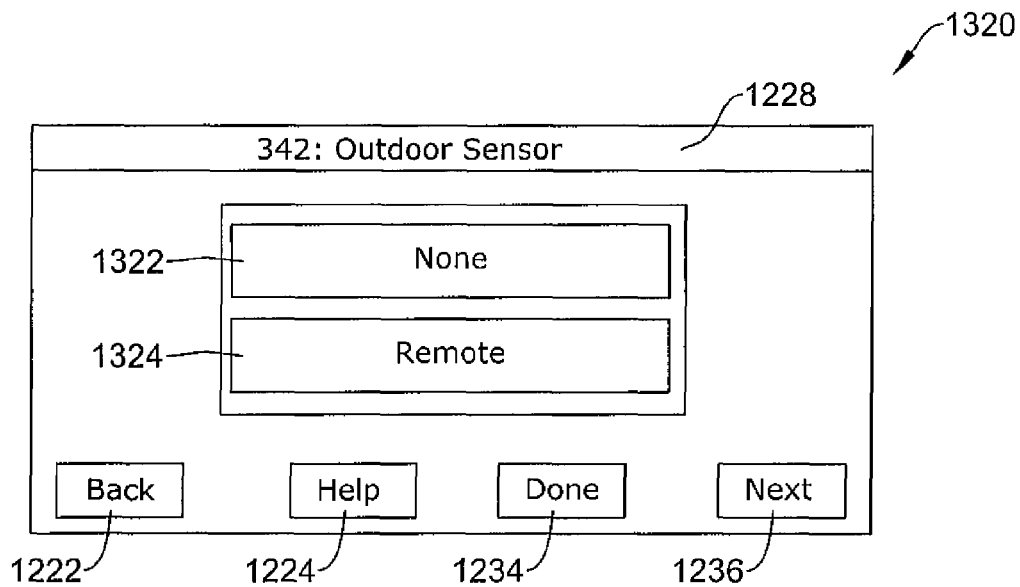

In some cases, pressing Next button 1236 may cause HVAC controller 20 to display an illustrative screen 1320, as shown in FIG. 138. Screen 1320 may include banner 1228, which provides the installer with an indication of menu location and in this case informs the installer that they are to tell HVAC controller 20 whether or not there is an outdoor sensor. Screen 1320 may include a None button 1322 and a Remote button 1324. The installer may press None button 1320 if there is no outdoor sensor and may press Remote button 1324 if there is. In some cases, None button 1322 may instead be labeled "No" while Remote button 1324 may be labeled as "Yes".

Back button 1222 permits the installer to revert to a previous screen while Help button 1224 may provide the installer with additional information or guidance pertaining to their options. Done button 1234, if pressed, may cause HVAC controller 20 to exit the installer setup process and revert to a previous screen such as screen 1212 (FIG. 125) while Next button 1236 may cause HVAC controller 20 to progress to a subsequent screen within the Create Setup menu.

Figure 139:
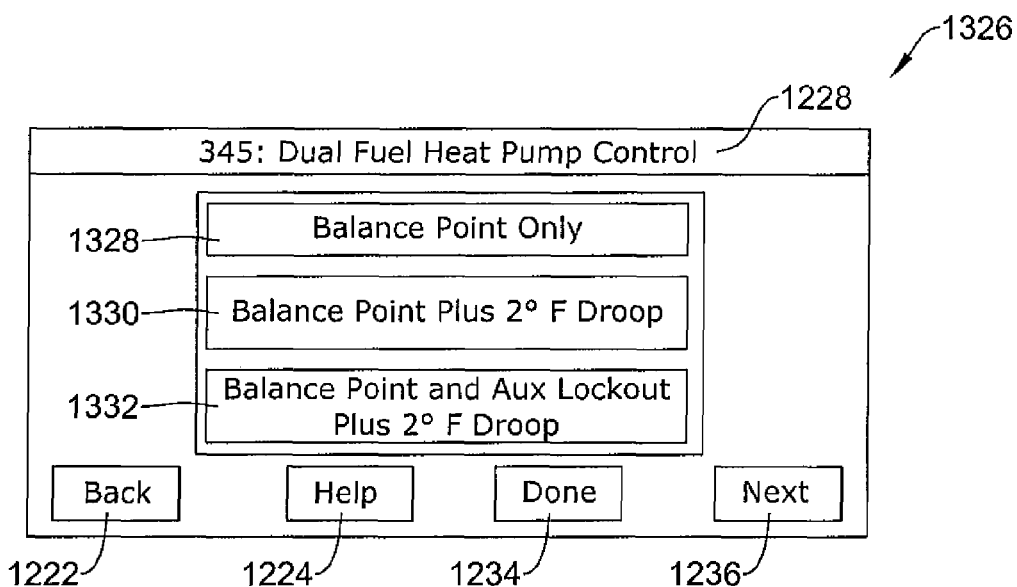

In some cases, pressing Next button 1236 may cause HVAC controller 20 to display an illustrative screen 1326, as shown in FIG. 139. Screen 1326 may, for example, only be displayed if the installer has previously indicated with respect to screen 1262 (FIG. 130) that there is a heat pump. Screen 1326 may include banner 1228, which provides the installer with an indication of menu location and in this case informs the installer that they are to provide information pertaining to duel fuel heat pump control. Screen 1326 may include, for example, one or more of a Balance Point Only button 1328, a Balance Point Plus 2° F. Droop button 1330 and a Balance Point and Aux Lockout Plus 2° F. Droop button 1332. The installer may press the appropriate button.

Back button 1222 permits the installer to revert to a previous screen while Help button 1224 may provide the installer with additional information or guidance pertaining to their options. Done button 1234, if pressed, may cause HVAC controller 20 to exit the installer setup process and revert to a previous screen such as screen 1212 (FIG. 125) while Next button 1236 may cause HVAC controller 20 to progress to a subsequent screen within the Create Setup menu.

Figure 140:
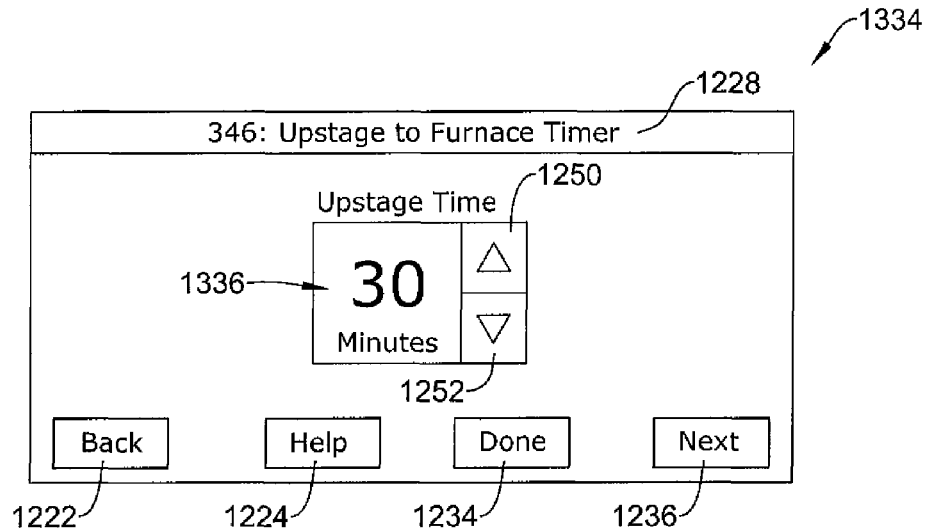

In some cases, pressing Next button 1236 may cause HVAC controller 20 to display an illustrative screen 1334, as shown in FIG. 140. Screen 1334 may include banner 1228, which provides the installer with an indication of menu location and in this case informs the installer that they are to provide information pertaining to the upstage to furnace timer. Screen 1334 may include an Upstage Time block 1336. Upstate Timer block 1336 may display a time and may also display the time units being used (minutes, in the illustrated example). Up arrow 1250 and/or Down arrow 1252 may be used to increase and/or decrease the upstage to furnace timer value.

Back button 1222 permits the installer to revert to a previous screen while Help button 1224 may provide the installer with additional information or guidance pertaining to their options. Done button 1234, if pressed, may cause HVAC controller 20 to exit the installer setup process and revert to a previous screen such as screen 1212 (FIG. 125) while Next button 1236 may cause HVAC controller 20 to progress to a subsequent screen within the Create Setup menu.

Figure 141:
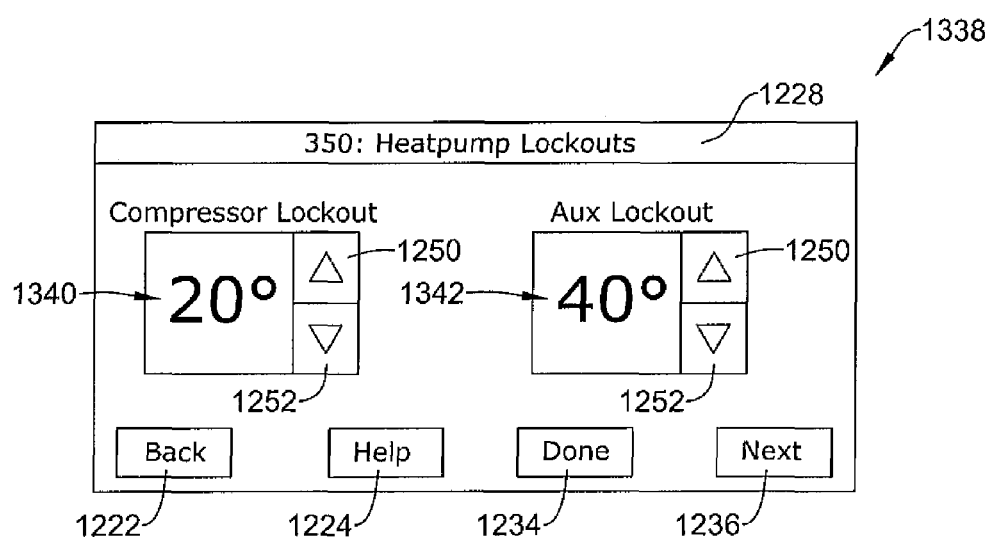

In some cases, pressing Next button 1236 may cause HVAC controller 20 to display an illustrative screen 1338, as shown in FIG. 141. Screen 1338 may, for example, only be displayed if the installer has previously indicated with respect to screen 1262 (FIG. 130) that there is a heat pump. Screen 1338 may include banner 1228, which provides the installer with an indication of menu location and in this case informs the installer that they are to provide information pertaining to heat pump lockouts.

Screen 1338 may include a Compressor Lockout block 1340 and an Aux Lockout block 1342. Compressor Lockout block 1340 may display a compressor lockout value such as a value given in degrees, which can be increased or decreased, as desired, using Up arrow 1250 and/or Down arrow 1252. Aux Lockout block 1342 may display an Aux lockout value such as a value given in degrees, which can be increased or decreased, as desired, using Up arrow 1250 and/or Down arrow 1252.

As noted above, HVAC controller 20 may be considered as displaying a first setup parameter in conjunction with a first descriptive text and a second, possibly related, setup parameter in conjunction with a second descriptive text. For example, and with respect to screen 1338, a first setup parameter may be the compressor lockout value, and the first descriptive text may be the text "Compressor Lockout" displayed immediately above Compressor Lockout block 1340. A second setup parameter may be the number of auxiliary lockout value, and the second descriptive text may be the text "Aux Lockout" displayed immediately above Aux Lockout block 1342. These related parameters may be organized into a common setup category and displayed on the same screen 1338.

Back button 1222 permits the installer to revert to a previous screen while Help button 1224 may provide the installer with additional information or guidance pertaining to their options. Done button 1234, if pressed, may cause HVAC controller 20 to exit the installer setup process and revert to a previous screen such as screen 1212 (FIG. 125) while Next button 1236 may cause HVAC controller 20 to progress to a subsequent screen within the Create Setup menu.

Figure 142:
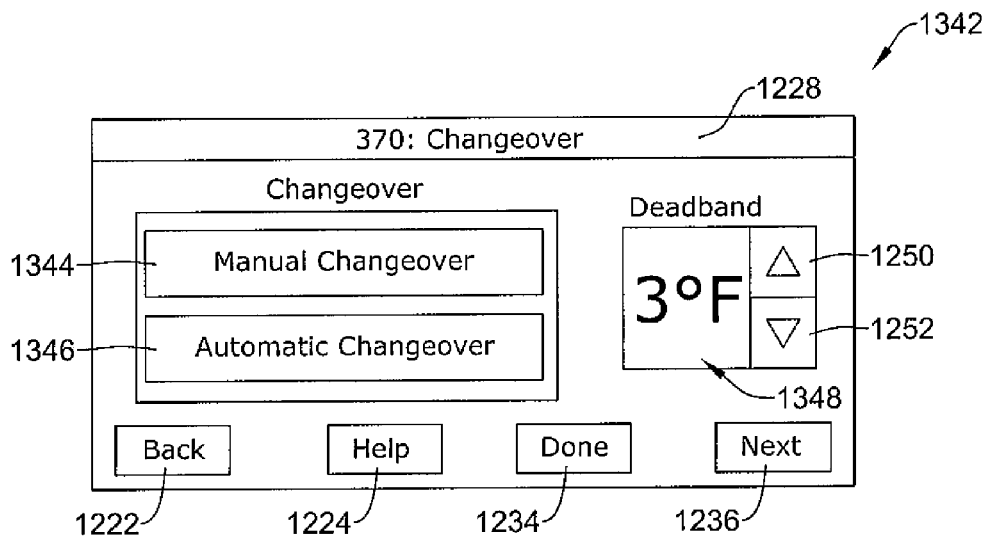

In some cases, pressing Next button 1236 may cause HVAC controller 20 to display an illustrative screen 1342, as shown in FIG. 142. Screen 1342 may include banner 1228, which provides the installer with an indication of menu location and in this case informs the installer that they are to provide information pertaining to changeover settings. The installer may, for example, use screen 1342 to instruct HVAC controller 20 how changeovers between heating and cooling are to be handled, as well as a dead band setting. In some cases, if the installer selects manual changeover, there may not be a dead band setting to make or adjust.

Screen 1342 may include a Manual Changeover button 1344 and an Automatic Changeover button 1346. If the installer wants the user to have to manually switch HVAC controller 20 between heating mode and cooling mode as shown with respect to screen 134 (FIG. 15), the installer will press Manual Changeover button 1344. However, if the installer wants HVAC controller 20 to automatically switch between heating and cooling, the installer will press Automatic Changeover button 1346. This may be useful, for examples, in environments that may undergo large temperature swings on a daily basis.

Screen 1342 may include a Dead band block 1348, which displays a dead band value. In the illustrated example, this is displayed in degrees Fahrenheit. Up arrow 1250 and/or Down arrow 1252 may be used to increase or decrease the dead band value, as desired. The dead band value represents a minimum difference between a heating temperature set point and a cooling temperature set point and may be particularly relevant if HVAC controller 20 is operating in accordance with automatic changeover between heating and cooling and vice versa.

Back button 1222 permits the installer to revert to a previous screen while Help button 1224 may provide the installer with additional information or guidance pertaining to their options. Done button 1234, if pressed, may cause HVAC controller 20 to exit the installer setup process and revert to a previous screen such as screen 1212 (FIG. 125) while Next button 1236 may cause HVAC controller 20 to progress to a subsequent screen within the Create Setup menu.

Figure 143:
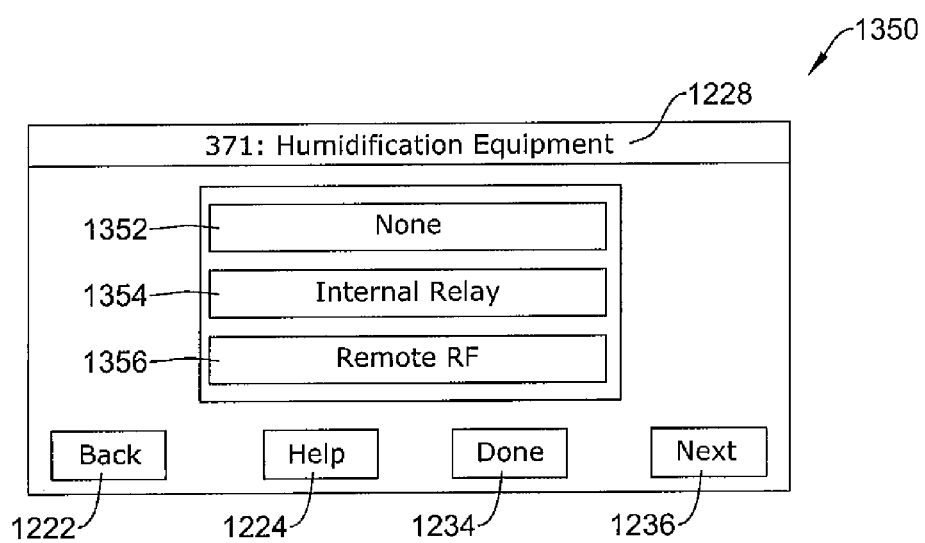

In some cases, pressing Next button 1236 may cause HVAC controller 20 to display an illustrative screen 1350, as shown in FIG. 143. Screen 1350 may include banner 1228, which provides the installer with an indication of menu location and in this case informs the installer that they are to provide information pertaining to humidification equipment. Screen 1350 may include, for example, one or more of a None button 1352, an Internal Relay button 1354 and a Remote RF button 1356. None button 1352 may be pressed if there is no humidification equipment. Internal Relay button 1354 and/or Remote RF button 1356 may be used if there is humidification equipment, and may specify how HVAC controller 20 will be communicating with the humidification equipment.

Back button 1222 permits the installer to revert to a previous screen while Help button 1224 may provide the installer with additional information or guidance pertaining to their options. Done button 1234, if pressed, may cause HVAC controller 20 to exit the installer setup process and revert to a previous screen such as screen 1212 (FIG. 125) while Next button 1236 may cause HVAC controller 20 to progress to a subsequent screen within the Create Setup menu.

Figure 144:
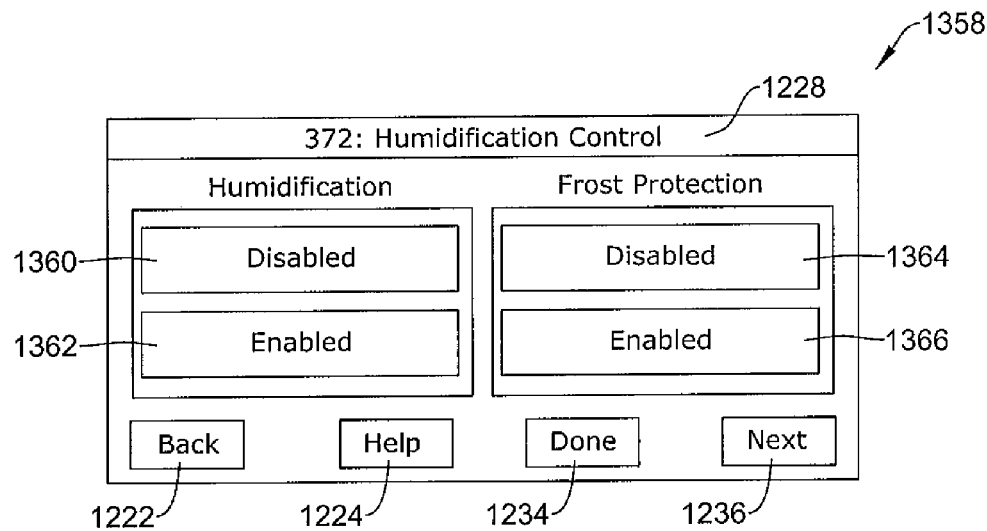

In some cases, pressing Next button 1236 may cause HVAC controller 20 to display an illustrative screen 1358, as shown in FIG. 144. Screen 1358 may include banner 1228, which provides the installer with an indication of menu location and in this case informs the installer that they are to provide information pertaining to humidification control. Screen 1358 may include, for example, a Disabled button 1360 and an Enabled button 1362 that can be used to specify if humidification is disabled or enabled as well as a Disabled button 1364 and an Enabled button 1366 that can be used to specify if frost protection is disabled or enabled. These settings may, for example, affect whether or not HVAC controller 20 provides particular options to the user.

Back button 1222 permits the installer to revert to a previous screen while Help button 1224 may provide the installer with additional information or guidance pertaining to their options. Done button 1234, if pressed, may cause HVAC controller 20 to exit the installer setup process and revert to a previous screen such as screen 1212 (FIG. 125) while Next button 1236 may cause HVAC controller 20 to progress to a subsequent screen within the Create Setup menu.

Figure 145:
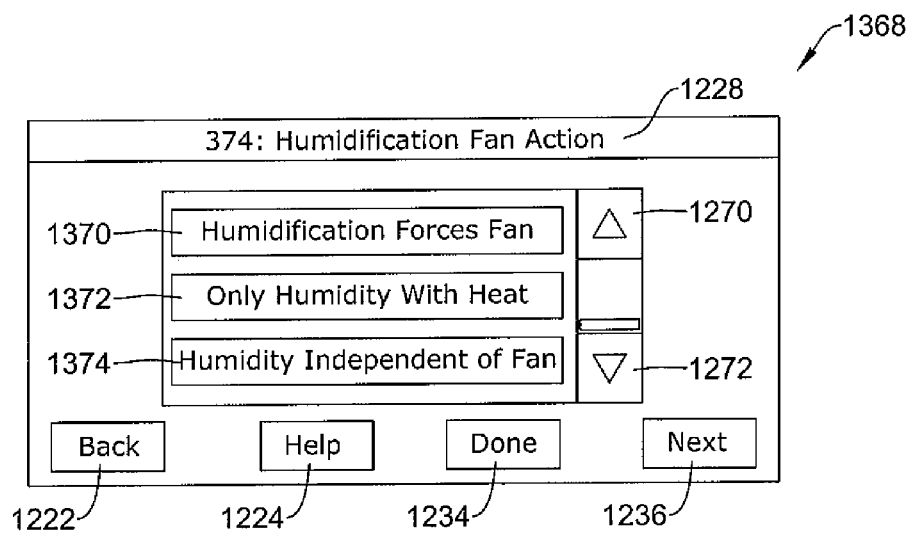

In some cases, pressing Next button 1236 may cause HVAC controller 20 to display an illustrative screen 1368, as shown in FIG. 145. Screen 1368 may include banner 1228, which provides the installer with an indication of menu location and in this case informs the installer that they are to provide information pertaining to humidification fan action. Screen 1368 may include, for example, one or more of a Humidification Force Fan button 1370, an Only Humidify With Heat button 1372 and a Humidify Independent of Fan button 1374. The installer may use screen 1368 to instruct HVAC controller 20 when and/or how to humidify by pressing the appropriate humidification button. While only three humidification buttons are shown, it will be appreciated that in some instances there may be more humidification buttons than can be displayed at one time. Screen 1368 may, therefore, include Up button 1270 and Down button 1272 that can be used to scroll up and/or down through the displayed humidification buttons.

Back button 1222 permits the installer to revert to a previous screen while Help button 1224 may provide the installer with additional information or guidance pertaining to their options. Done button 1234, if pressed, may cause HVAC controller 20 to exit the installer setup process and revert to a previous screen such as screen 1212 (FIG. 125) while Next button 1236 may cause HVAC controller 20 to progress to a subsequent screen within the Create Setup menu.

Figure 146:
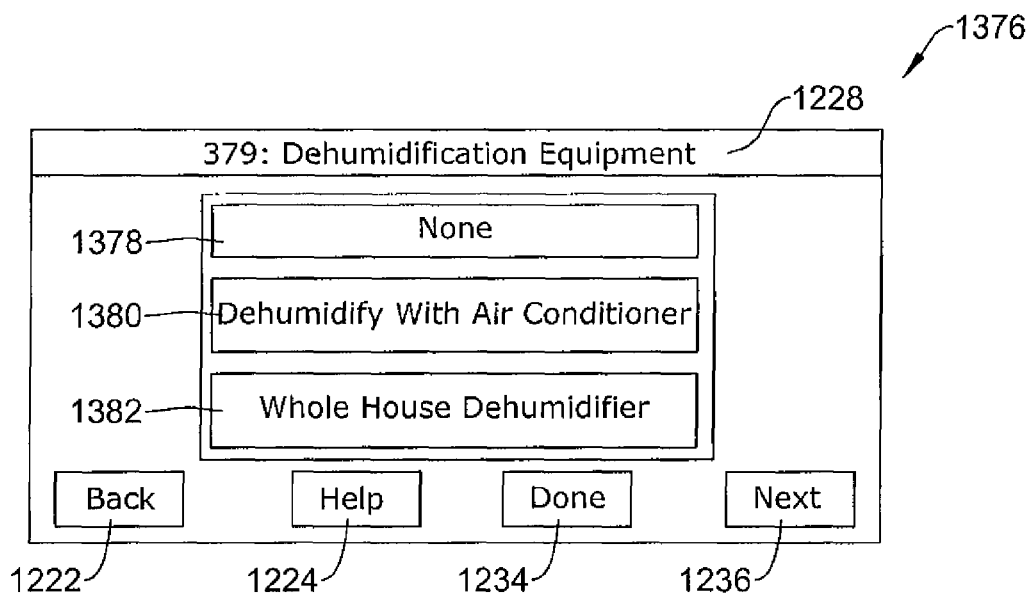

In some cases, pressing Next button 1236 may cause HVAC controller 20 to display an illustrative screen 1376, as shown in FIG. 146. Screen 1376 may include banner 1228, which provides the installer with an indication of menu location and in this case informs the installer that they are to provide information pertaining to dehumidification equipment. Screen 1376 may include one or more of a None button 1378, a Dehumidify With A/C button 1380 and a Whole House Dehumidifier button 1382. If there is no equipment provided for dehumidification, the installer may press None button 1378. If the only option is to use the air conditioning to dehumidify, the installer may press Dehumidify With A/C button 1380. However, if there is a separate dehumidifier, the installer may press Whole House Dehumidifier button 1382.

Back button 1222 permits the installer to revert to a previous screen while Help button 1224 may provide the installer with additional information or guidance pertaining to their options. Done button 1234, if pressed, may cause HVAC controller 20 to exit the installer setup process and revert to a previous screen such as screen 1212 (FIG. 125) while Next button 1236 may cause HVAC controller 20 to progress to a subsequent screen within the Create Setup menu.

Figure 147:
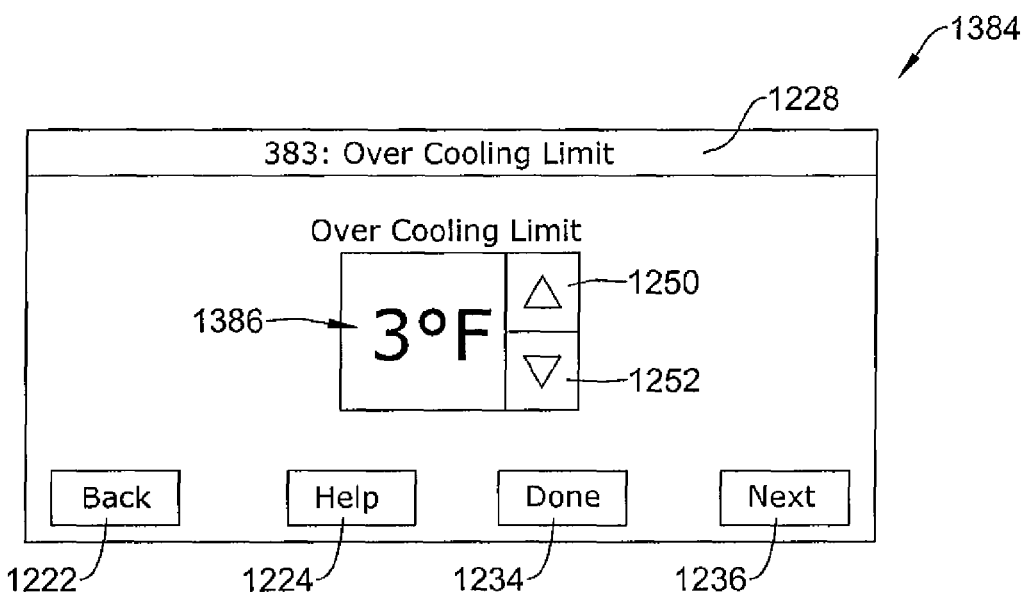

In some cases, pressing Next button 1236 may cause HVAC controller 20 to display an illustrative screen 1384, as shown in FIG. 147. Screen 1384 may include banner 1228, which provides the installer with an indication of menu location and in this case informs the installer that they are to provide information pertaining to the Over Cooling Limit.

Screen 1384 may include an Over Cooling Limit block 1386, which may display a setting value for the Over Cooling Limit. Up arrow 1250 and/or down arrow 1252 may be used to increase and/or decrease the displayed value, as desired.

Back button 1222 permits the installer to revert to a previous screen while Help button 1224 may provide the installer with additional information or guidance pertaining to their options. Done button 1234, if pressed, may cause HVAC controller 20 to exit the installer setup process and revert to a previous screen such as screen 1212 (FIG. 125) while Next button 1236 may cause HVAC controller 20 to progress to a subsequent screen within the Create Setup menu.

Figure 148:
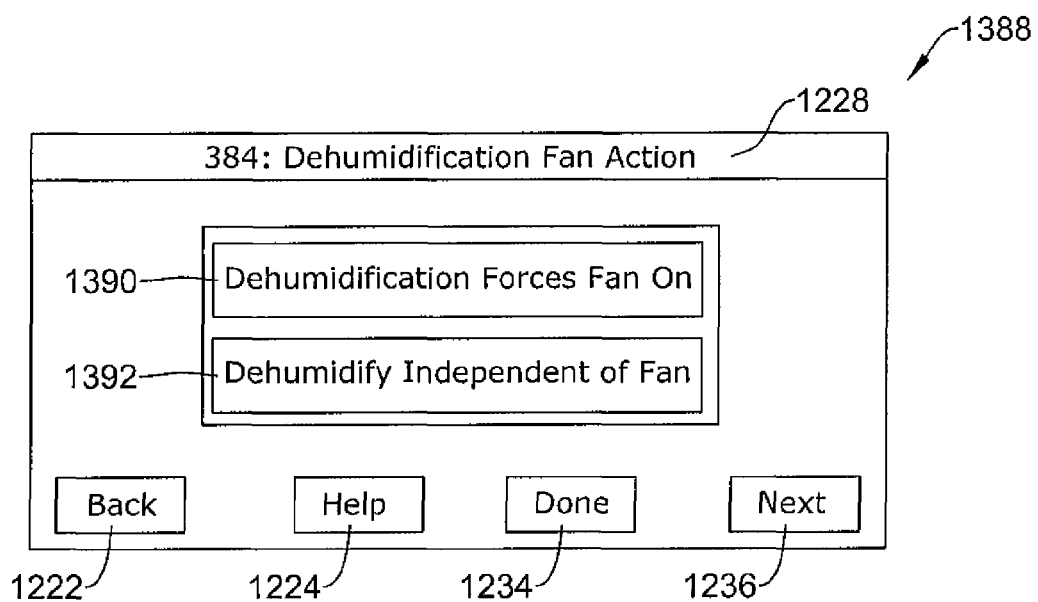

In some cases, pressing Next button 1236 may cause HVAC controller 20 to display an illustrative screen 1388, as shown in FIG. 148. Screen 1388 may include banner 1228, which provides the installer with an indication of menu location and in this case informs the installer that they are to provide information pertaining to dehumidification fan action. Screen 1388 may include one or more of a Dehumidification Forces Fan On button 1390 and a Dehumidify Independent of Fan button 1392. The installer may press the appropriate button to instruct HVAC controller 20 accordingly.

Back button 1222 permits the installer to revert to a previous screen while Help button 1224 may provide the installer with additional information or guidance pertaining to their options. Done button 1234, if pressed, may cause HVAC controller 20 to exit the installer setup process and revert to a previous screen such as screen 1212 (FIG. 125) while Next button 1236 may cause HVAC controller 20 to progress to a subsequent screen within the Create Setup menu.

Figure 149:
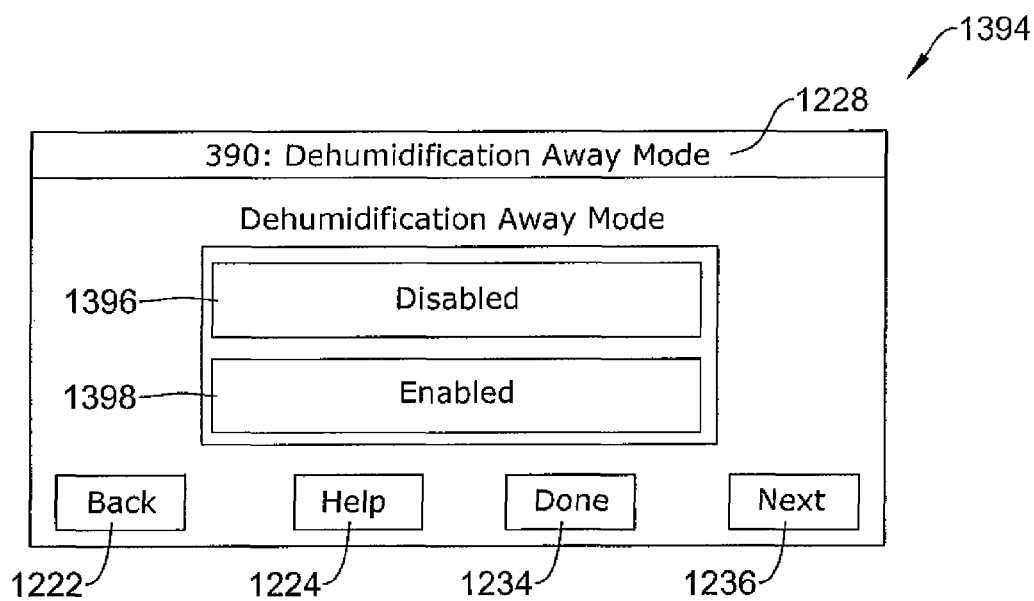

In some cases, pressing Next button 1236 may cause HVAC controller 20 to display an illustrative screen 1394, as shown in FIG. 149. Screen 1394 may include banner 1228, which provides the installer with an indication of menu location and in this case informs the installer that they are to provide information pertaining to the dehumidification away mode. Screen 1394 may include a Disabled button 1396 and an Enabled button 1398. The installer may press the appropriate button to specify whether the dehumidification away mode is enabled or disabled.

Back button 1222 permits the installer to revert to a previous screen while Help button 1224 may provide the installer with additional information or guidance pertaining to their options. Done button 1234, if pressed, may cause HVAC controller 20 to exit the installer setup process and revert to a previous screen such as screen 1212 (FIG. 125) while Next button 1236 may cause HVAC controller 20 to progress to a subsequent screen within the Create Setup menu.

Figure 150:
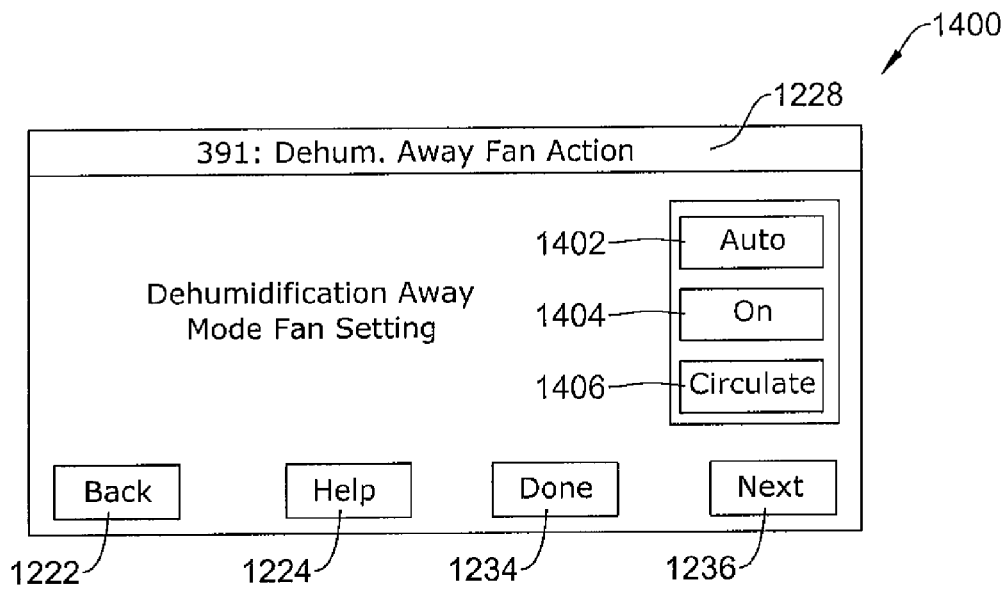

In some cases, pressing Next button 1236 may cause HVAC controller 20 to display an illustrative screen 1400, as shown in FIG. 150. Screen 1400 may include banner 1228, which provides the installer with an indication of menu location and in this case informs the installer that they are to provide information pertaining to dehumidification away fan action. Screen 1400 may include one or more of an Auto button 1402, an On button 1404 and a Circulate button 1406. The installer may press the appropriate button to specify how HVAC controller 20 should act during the dehumidification away mode.

Back button 1222 permits the installer to revert to a previous screen while Help button 1224 may provide the installer with additional information or guidance pertaining to their options. Done button 1234, if pressed, may cause HVAC controller 20 to exit the installer setup process and revert to a previous screen such as screen 1212 (FIG. 125) while Next button 1236 may cause HVAC controller 20 to progress to a subsequent screen within the Create Setup menu.

Figure 151:
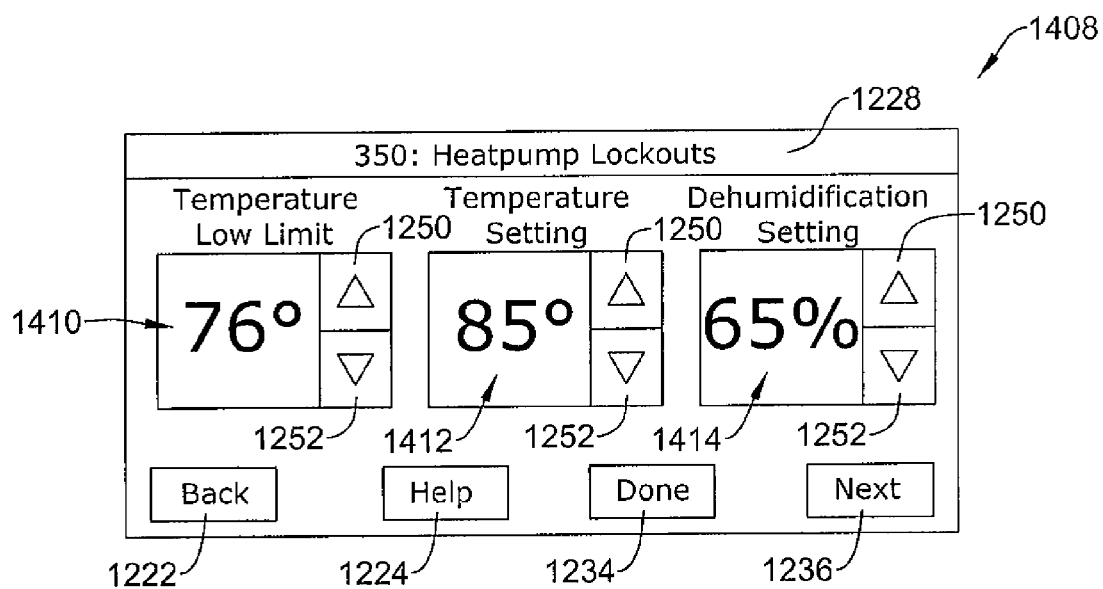

In some cases, pressing Next button 1236 may cause HVAC controller 20 to display an illustrative screen 1408, as shown in FIG. 151. Screen 1408 may include banner 1228, which provides the installer with an indication of menu location and in this case informs the installer that they are to provide information pertaining to heat pump lockouts. Screen 1408 may include one or more of a Temperature Low Limit block 1410, a Temperature Setting block 1412 and a Dehumidification Setting block 1414, each of which may include Up arrow 1250 and Down arrow 1252. The installer may adjust one or more of a temperature low limit, a temperature setting and/or a dehumidification setting by adjusting the displayed values up and/or down using Up arrow 1250 and/or Down arrow 1252.

Back button 1222 permits the installer to revert to a previous screen while Help button 1224 may provide the installer with additional information or guidance pertaining to their options. Done button 1234, if pressed, may cause HVAC controller 20 to exit the installer setup process and revert to a previous screen such as screen 1212 (FIG. 125) while Next button 1236 may cause HVAC controller 20 to progress to a subsequent screen within the Create Setup menu.

Figure 152:
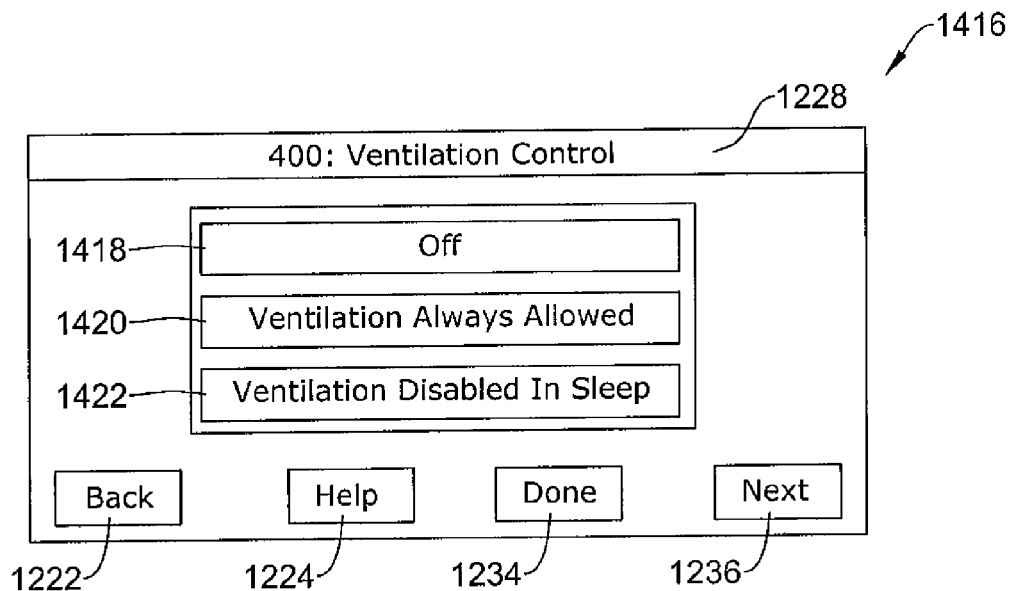

In some cases, pressing Next button 1236 may cause HVAC controller 20 to display an illustrative screen 1416, as shown in FIG. 152. Screen 1416 may include banner 1228, which provides the installer with an indication of menu location and in this case informs the installer that they are to provide information pertaining to ventilation control. Screen 1416 may include one or more of an Off button 1418, a Ventilation Always Allowed button 1420 and a Ventilation Disabled in Sleep button 1422. The installer may set the desired ventilation control by pressing one Off button 1418, Ventilation Always Allowed button 1420 and Ventilation Disabled in Sleep button 1422, as appropriate.

Back button 1222 permits the installer to revert to a previous screen while Help button 1224 may provide the installer with additional information or guidance pertaining to their options. Done button 1234, if pressed, may cause HVAC controller 20 to exit the installer setup process and revert to a previous screen such as screen 1212 (FIG. 125) while Next button 1236 may cause HVAC controller 20 to progress to a subsequent screen within the Create Setup menu.

Figure 153:
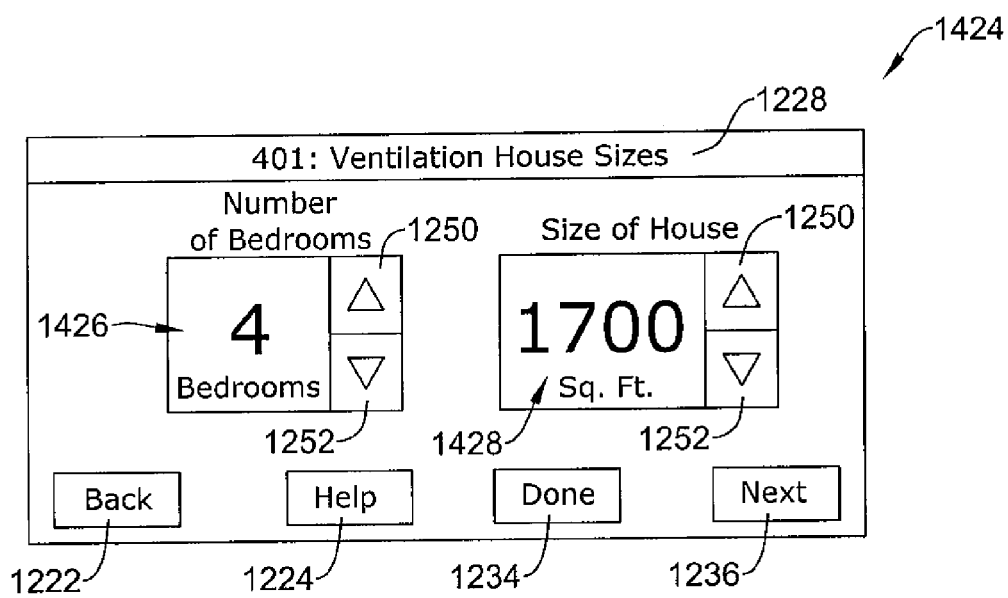

In some cases, pressing Next button 1236 may cause HVAC controller 20 to display an illustrative screen 1424, as shown in FIG. 153. Screen 1424 may include banner 1228, which provides the installer with an indication of menu location and in this case informs the installer that they are to provide information pertaining to ventilation house size. In some cases, ventilation rates may be determined based at least partially upon the number of bedrooms within a house and/or the physical size of the house. Other physical parameters related to the house or other structure are also contemplated.

In the illustrative embodiment, screen 1424 may include one or more of a Bedroom Number block 1426 and a House Size block 1428. Bedroom Number block 1426 may display a number of bedrooms that can be adjusted up and/or down, as desired, using Up arrow 1250 and/or Down arrow 1250. House Size block 1428 may display a house size (in square feet) that can be adjusted up and/or down, as desired, using Up arrow 1250 and/or Down arrow 1250.

As noted above, HVAC controller 20 may be considered as displaying a first setup parameter in conjunction with a first descriptive text and a second, possibly related, setup parameter in conjunction with a second descriptive text. For example, and with respect to screen 1424, a first setup parameter may be the number of bedrooms, and the first descriptive text may be the text "Number of Bedrooms" displayed immediately above Bedroom Number block 1426. A second setup parameter may be the house size, and the second descriptive text may be the text "Size of House" displayed immediately above House Size block 1428. These related parameters may be organized into a common setup category and displayed on the same screen 1424.

Back button 1222 permits the installer to revert to a previous screen while Help button 1224 may provide the installer with additional information or guidance pertaining to their options. Done button 1234, if pressed, may cause HVAC controller 20 to exit the installer setup process and revert to a previous screen such as screen 1212 (FIG. 125) while Next button 1236 may cause HVAC controller 20 to progress to a subsequent screen within the Create Setup menu.

Figure 154:
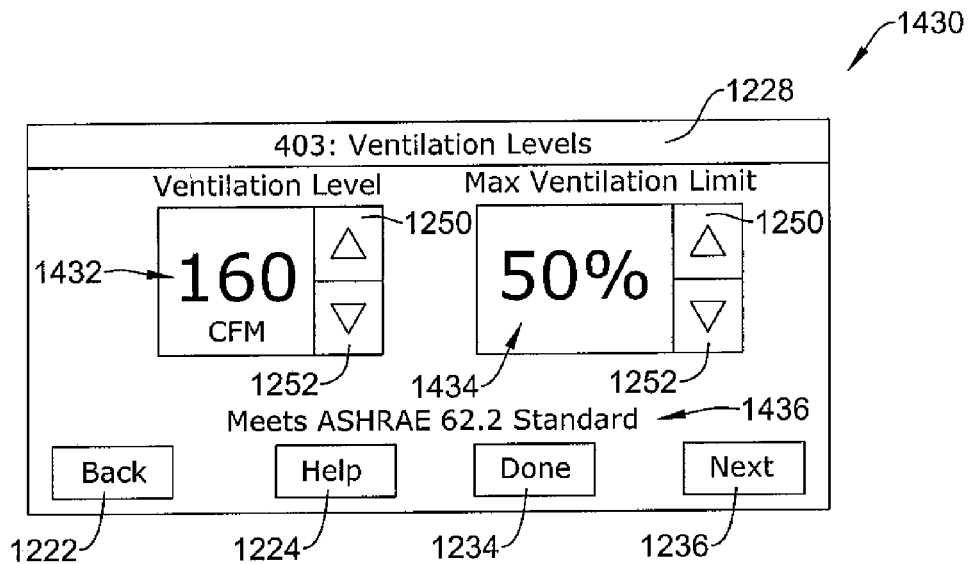

In some cases, pressing Next button 1236 may cause HVAC controller 20 to display an illustrative screen 1430, as shown in FIG. 154. Screen 1430 may include banner 1228, which provides the installer with an indication of menu location and in this case informs the installer that they are to provide information pertaining to ventilation levels. In some cases, ventilation rates may be determined based at least partially upon a ventilation level (in cubic feet per minute) and/or a percentage of a maximum ventilation rate. The ventilation rates may also, in some cases, depend on the parameters specified in FIG. 153 as well as other parameters, if desired.

In the illustrative embodiment, screen 1430 may include one or more of a Ventilation Level block 1432 and a Max Ventilation Limit block 1434. Ventilation Level block 1432 may display a ventilation rate that can be adjusted up and/or down, as desired, using Up arrow 1250 and/or Down arrow 1250. Max Ventilation Limit block 1434 displays a percentage value that can be adjusted up and/or down, as desired, using Up arrow 1250 and/or Down arrow 1250. In some instances, HVAC controller 20 may display text 1436, informing the installer that their settings satisfy (or do not satisfy) one or more standardized requirements or guidelines, such as the ASHRAE 62.2 standard.

As noted above, HVAC controller 20 may be considered as displaying a first setup parameter in conjunction with a first descriptive text and a second, possibly related, setup parameter in conjunction with a second descriptive text. For example, and with respect to screen 1430, a first setup parameter may be a ventilation level, and the first descriptive text may be the text "Ventilation Level" displayed immediately above Ventilation Level block 1432. A second setup parameter may be the ventilation rate, and the second descriptive text may be the text "Max Ventilation Limit" displayed immediately above Max Ventilation Limit block 1434. These related parameters may be organized into a common setup category and displayed on the same screen 1430.

Back button 1222 permits the installer to revert to a previous screen while Help button 1224 may provide the installer with additional information or guidance pertaining to their options. Done button 1234, if pressed, may cause HVAC controller 20 to exit the installer setup process and revert to a previous screen such as screen 1212 (FIG. 125) while Next button 1236 may cause HVAC controller 20 to progress to a subsequent screen within the Create Setup menu.

Figure 155:
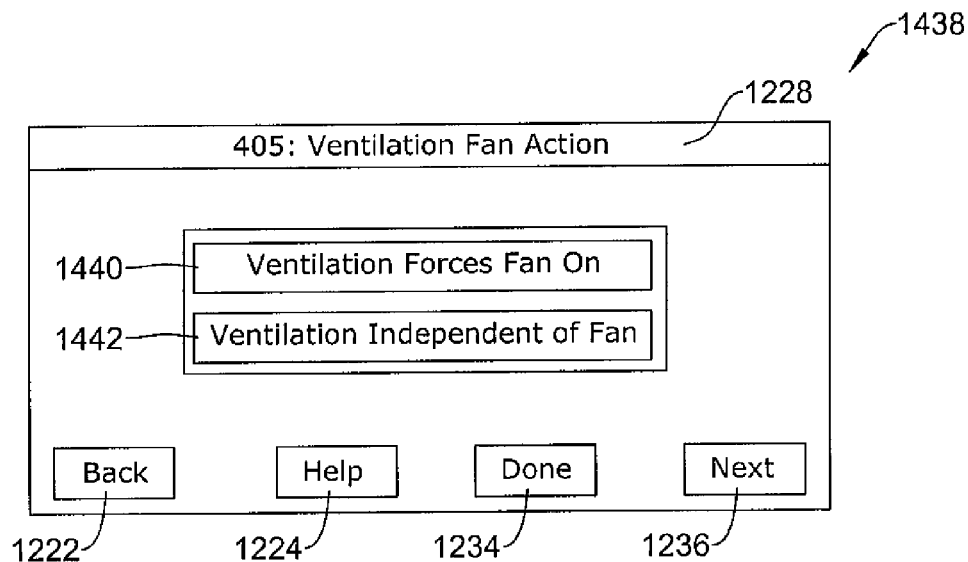

In some cases, pressing Next button 1236 may cause HVAC controller 20 to display an illustrative screen 1438, as shown in FIG. 155. Screen 1438 may include banner 1228, which provides the installer with an indication of menu location and in this case informs the installer that they are to provide information pertaining to ventilation fan action.

Screen 1438 may include one or more of a Ventilation Forces Fan On button 1440 and a Ventilate Independent of Fan button 1442. In some HVAC installations, for example, it may be beneficial for the furnace blower motor (fan) to run when the air exchanger operates. In some installations, the air exchanger may function properly without requiring the furnace blower motor to run. The installer may press the appropriate button.

Back button 1222 permits the installer to revert to a previous screen while Help button 1224 may provide the installer with additional information or guidance pertaining to their options. Done button 1234, if pressed, may cause HVAC controller 20 to exit the installer setup process and revert to a previous screen such as screen 1212 (FIG. 125) while Next button 1236 may cause HVAC controller 20 to progress to a subsequent screen within the Create Setup menu.

Figure 156:
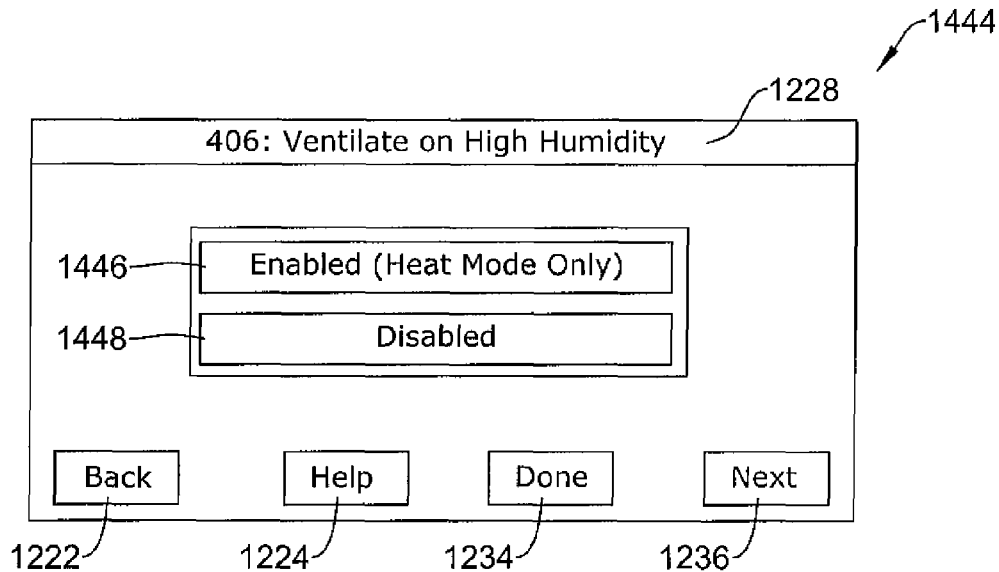

In some cases, pressing Next button 1236 may cause HVAC controller 20 to display an illustrative screen 1444, as shown in FIG. 156. Screen 1444 may include banner 1228, which provides the installer with an indication of menu location and in this case informs the installer that they are to provide information pertaining to whether to ventilate upon high humidity. Screen 1444 may include one or more of an Enabled button 1446 and a Disabled button 1448. The installer may press the appropriate button.

Back button 1222 permits the installer to revert to a previous screen while Help button 1224 may provide the installer with additional information or guidance pertaining to their options. Done button 1234, if pressed, may cause HVAC controller 20 to exit the installer setup process and revert to a previous screen such as screen 1212 (FIG. 125) while Next button 1236 may cause HVAC controller 20 to progress to a subsequent screen within the Create Setup menu.

Figure 157:
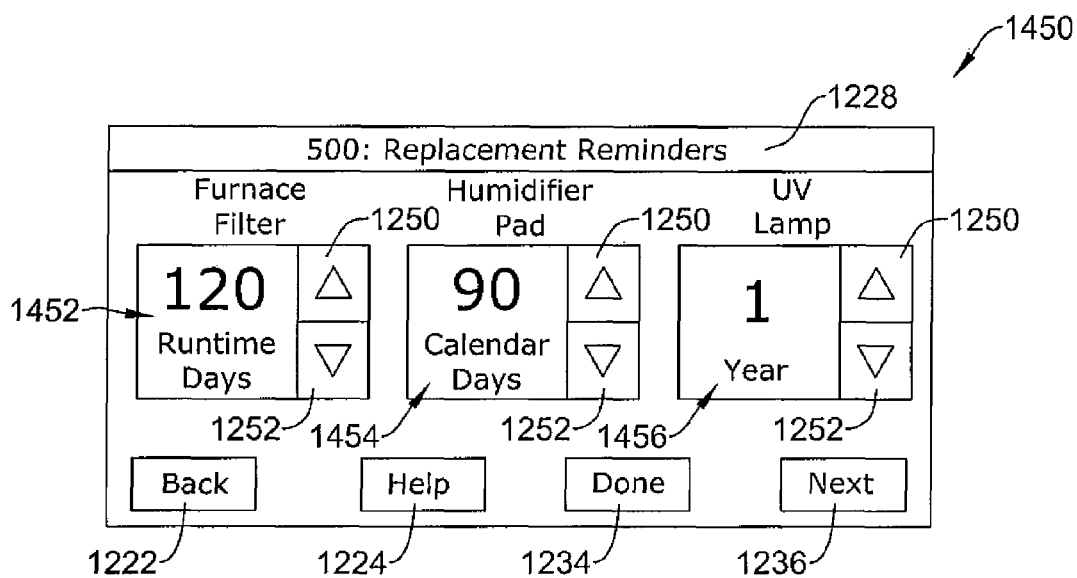

In some cases, pressing Next button 1236 may cause HVAC controller 20 to display an illustrative screen 1450, as shown in FIG. 157. Screen 1450 may include banner 1228, which provides the installer with an indication of menu location and in this case informs the installer that they are to provide information pertaining to replacement reminders. Screen 1450 may include one or more of a Furnace Filter block 1452, a Humidifier Pad block 1454 and a UV lamp block 1456. It will be recognized that these are merely illustrative, as more or fewer replacement reminders may be incorporated into HVAC controller 20.

In the illustrative example shown, Furnace Filter block 1452 may display a time period such as a number of runtime days that should elapse before HVAC controller 20 provides the user with a reminder to replace the furnace filter screen as previously shown with respect to screen 92 (FIG. 10). Up arrow 1250 and/or Down arrow 1252 may be used to increase or decrease the displayed value. Humidifier Pad block 1454 may display a time period such as a number of calendar days that should elapse before HVAC controller 20 provides the user with a reminder to replace the humidifier pad. UV lamp block 1456 may display a time period such as a number of years that should elapse before HVAC controller 20 provides the user with a reminder to replace the UV lamp.

As noted above, HVAC controller 20 may be considered as displaying a first setup parameter in conjunction with a first descriptive text and a second, possibly related, setup parameter in conjunction with a second descriptive text. For example, and with respect to screen 1450, a first setup parameter may be a replacement period for a furnace filter, and the first descriptive text may be the text "Furnace Filter" displayed immediately above Furnace Filter block 1452. A second setup parameter may be a replacement period for an humidifier pad, and the second descriptive text may be the text "Humidifier Pad" displayed immediately above Humidifier Pad block 1454. These related parameters may be organized into a common setup category and displayed on the same screen 1450.

Back button 1222 permits the installer to revert to a previous screen while Help button 1224 may provide the installer with additional information or guidance pertaining to their options. Done button 1234, if pressed, may cause HVAC controller 20 to exit the installer setup process and revert to a previous screen such as screen 1212 (FIG. 125) while Next button 1236 may cause HVAC controller 20 to progress to a subsequent screen within the Create Setup menu.

Figure 158:
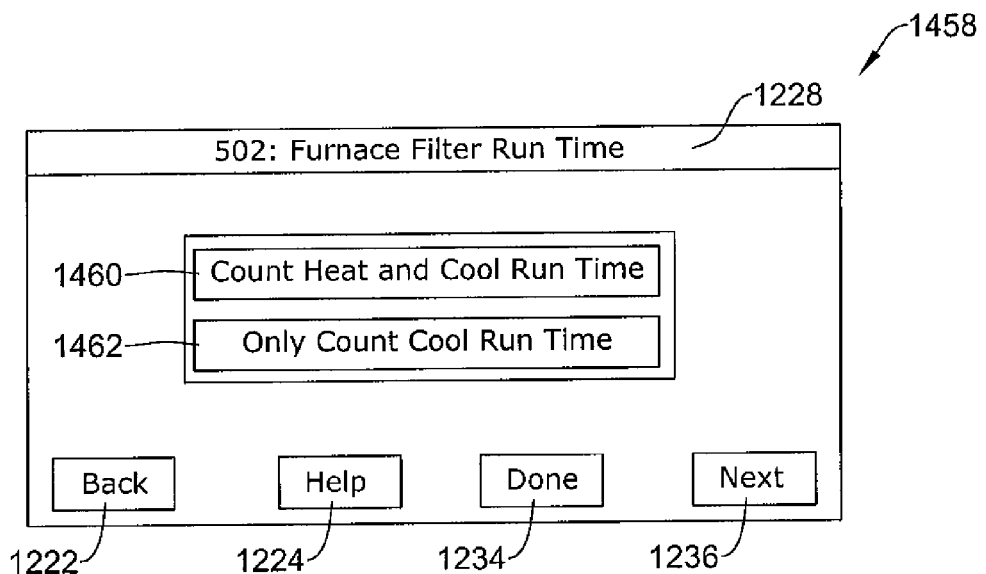

In some cases, pressing Next button 1236 may cause HVAC controller 20 to display an illustrative screen 1458, as shown in FIG. 158. Screen 1458 may include banner 1228, which provides the installer with an indication of menu location and in this case informs the installer that they are to provide information pertaining to furnace filter run time. Screen 1458 may include a Count Heat and Cool Run Time button 1460 and an Only Count Cool Run Time button 1462. In some cases, the installer may want to count both heating time and cooling time towards furnace filter replacement timing, and thus may press Count Heat and Cool Run Time button 1460. In some instances, the installer may only want to count cooling time, and thus may press Only Count Cool Run Time button 1462.

Back button 1222 permits the installer to revert to a previous screen while Help button 1224 may provide the installer with additional information or guidance pertaining to their options. Done button 1234, if pressed, may cause HVAC controller 20 to exit the installer setup process and revert to a previous screen such as screen 1212 (FIG. 125) while Next button 1236 may cause HVAC controller 20 to progress to a subsequent screen within the Create Setup menu.

Figure 159:
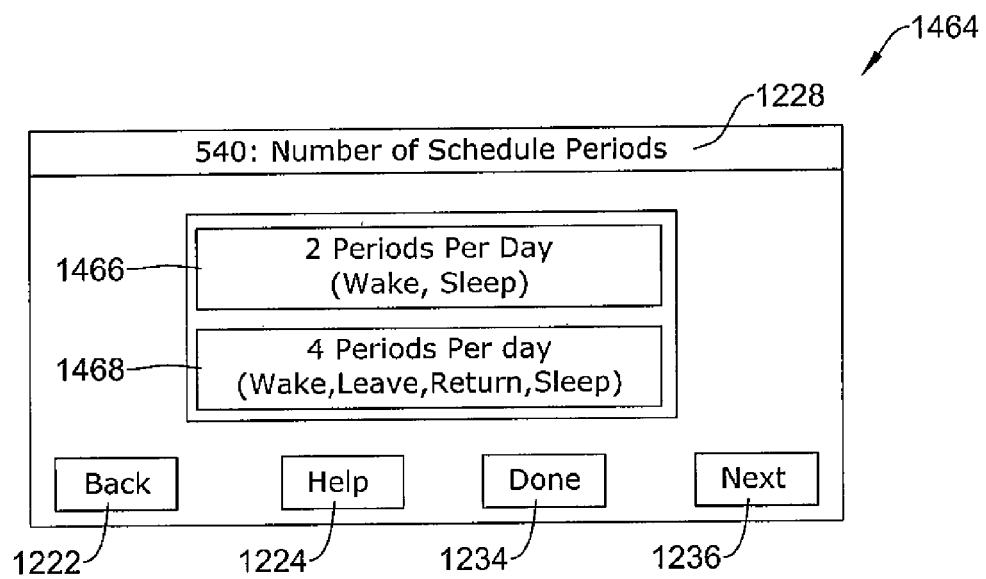

In some cases, pressing Next button 1236 may cause HVAC controller 20 to display an illustrative screen 1464, as shown in FIG. 159. Screen 1464 may include banner 1228, which provides the installer with an indication of menu location and in this case informs the installer that they are to provide information pertaining to a number of schedule periods per day. In some cases, the installer may want HVAC controller 20 to operate in accordance with four time periods per day, sometimes known as the Wake period, the Leave period, the Return period and the Sleep period, and thus may press a Four Periods Per Day button 1468. In some instances, such as if the space is occupied during the day every day, the installer may want HVAC controller 20 to only use the Wake period and the Sleep period, and thus may press a Two Periods Per Day button 1466.

Back button 1222 permits the installer to revert to a previous screen while Help button 1224 may provide the installer with additional information or guidance pertaining to their options. Done button 1234, if pressed, may cause HVAC controller 20 to exit the installer setup process and revert to a previous screen such as screen 1212 (FIG. 125) while Next button 1236 may cause HVAC controller 20 to progress to a subsequent screen within the Create Setup menu.

Figure 160:
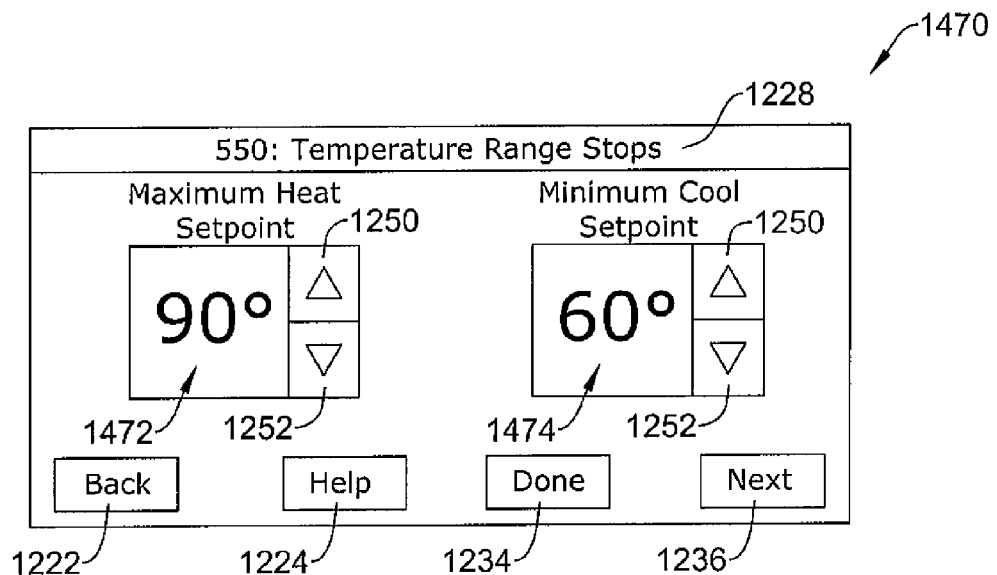

In some cases, pressing Next button 1236 may cause HVAC controller 20 to display an illustrative screen 1470, as shown in FIG. 160. Screen 1470 may include banner 1228, which provides the installer with an indication of menu location and in this case informs the installer that they are to provide information pertaining to temperature range stops. Screen 1470 may include one or more of a Maximum Heat Setpoint block 1472 and a Minimum Cool Setpoint block 1474.

Maximum Heat Setpoint block 1472 may display a temperature value that limits how high a user may raise a heating temperature set point. Up arrow 1250 and/or Down arrow 1252 may be used to adjust this value, as desired. Minimum Cool Setpoint block 1474 may display a temperature value that limits how low a user may drop a cooling temperature set point. Up arrow 1250 and/or Down arrow 1252 may be used to adjust this value, as desired.

As noted above, HVAC controller 20 may be considered as displaying a first setup parameter in conjunction with a first descriptive text and a second, possibly related, setup parameter in conjunction with a second descriptive text. For example, and with respect to screen 1470, a first setup parameter may be a maximum heat set point, and the first descriptive text may be the text "Maximum Heat Setpoint" displayed immediately above Maximum Heat Setpoint block 1472. A second setup parameter may be a minimum cool set point, and the second descriptive text may be the text "Minimum Cool Setpoint" displayed immediately above Minimum Cool Setpoint block 1474. These related parameters may be organized into a common setup category and displayed on the same screen 1470.

Back button 1222 permits the installer to revert to a previous screen while Help button 1224 may provide the installer with additional information or guidance pertaining to their options. Done button 1234, if pressed, may cause HVAC controller 20 to exit the installer setup process and revert to a previous screen such as screen 1212 (FIG. 125) while Next button 1236 may cause HVAC controller 20 to progress to a subsequent screen within the Create Setup menu.

Figure 161:
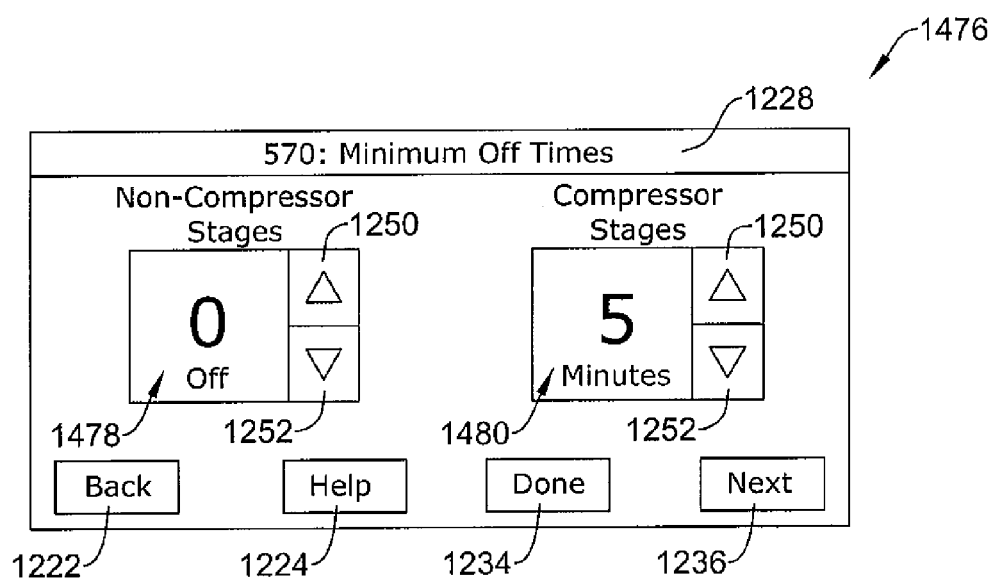

In some cases, pressing Next button 1236 may cause HVAC controller 20 to display an illustrative screen 1476, as shown in FIG. 161. Screen 1476 may include banner 1228, which provides the installer with an indication of menu location and in this case informs the installer that they are to provide information pertaining to minimum off times. Screen 1476 may include one or more of a Non-Compressor Stages block 1478 and a Compressor Stages block 1480. Each of Non-Compressor Stages block 1478 and Compressor Stages block 1480 may display a value that can be increased or decreased, as desired, using Up arrow 1250 and/or Down arrow 1252.

As noted above, HVAC controller 20 may be considered as displaying a first setup parameter in conjunction with a first descriptive text and a second, possibly related, setup parameter in conjunction with a second descriptive text. For example, and with respect to screen 1476, a first setup parameter may be a non-compressor minimum off time, and the first descriptive text may be the text "Non-Compressor Stages" displayed immediately above Non-Compressor Stages block 1478. A second setup parameter may be a compressor minimum off time, and the second descriptive text may be the text "Compressor Stages" displayed immediately above Minimum Cool Setpoint block 1474. These related parameters may be organized into a common setup category and displayed on the same screen 1476.

Back button 1222 permits the installer to revert to a previous screen while Help button 1224 may provide the installer with additional information or guidance pertaining to their options. Done button 1234, if pressed, may cause HVAC controller 20 to exit the installer setup process and revert to a previous screen such as screen 1212 (FIG. 125) while Next button 1236 may cause HVAC controller 20 to progress to a subsequent screen within the Create Setup menu.

Figure 162:
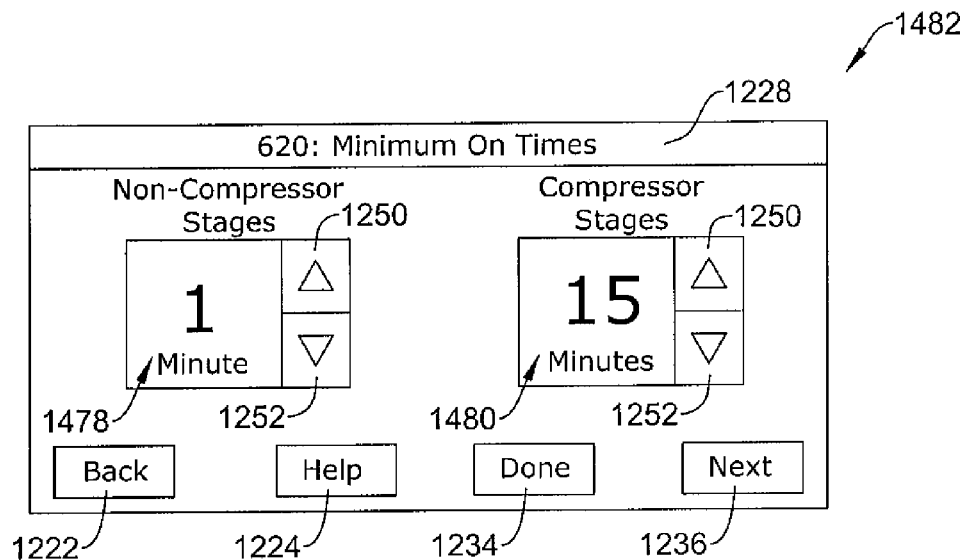

In some cases, pressing Next button 1236 may cause HVAC controller 20 to display an illustrative screen 1482, as shown in FIG. 162. Screen 1482 may include banner 1228, which provides the installer with an indication of menu location and in this case informs the installer that they are to provide information pertaining to minimum on times. Screen 1482 may include one or more of Non-Compressor Stages block 1478 and Compressor Stages block 1480, each of which may display a value that can be increased or decreased, as desired, using Up arrow 1250 and/or Down arrow 1252.

As noted above, HVAC controller 20 may be considered as displaying a first setup parameter in conjunction with a first descriptive text and a second, possibly related, setup parameter in conjunction with a second descriptive text. For example, and with respect to screen 1482, a first setup parameter may be a non-compressor minimum on time, and the first descriptive text may be the text "Non-Compressor Stages" displayed immediately above Non-Compressor Stages block 1478. A second setup parameter may be a compressor stages minimum on time, and the second descriptive text may be the text "Compressor Stages" displayed immediately above Compressor Stages block 1478. These related parameters may be organized into a common setup category and displayed on the same screen 1482.

Back button 1222 permits the installer to revert to a previous screen while Help button 1224 may provide the installer with additional information or guidance pertaining to their options. Done button 1234, if pressed, may cause HVAC controller 20 to exit the installer setup process and revert to a previous screen such as screen 1212 (FIG. 125) while Next button 1236 may cause HVAC controller 20 to progress to a subsequent screen within the Create Setup menu.

Figure 163:
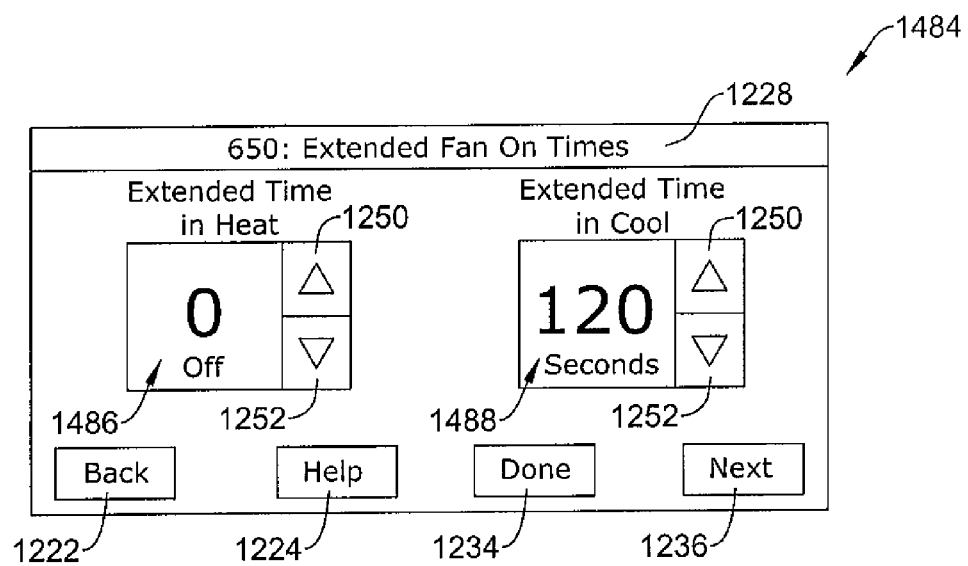

In some cases, pressing Next button 1236 may cause HVAC controller 20 to display an illustrative screen 1484, as shown in FIG. 163. Screen 1484 may include banner 1228, which provides the installer with an indication of menu location and in this case informs the installer that they are to provide information pertaining to extended fan on times. Screen 1484 may include one or more of an Extended Heat Time block 1486 and an Extended Cool Time block 1488. Each of Extended Heat Time block 1486 and Extended Cool Time block 1488 may display a value that can be increased or decreased, as desired, using Up arrow 1250 and/or Down arrow 1252.

As noted above, HVAC controller 20 may be considered as displaying a first setup parameter in conjunction with a first descriptive text and a second, possibly related, setup parameter in conjunction with a second descriptive text. For example, and with respect to screen 1476, a first setup parameter may be an extended heating fan time, and the first descriptive text may be the text "Extended Time in Heat" displayed immediately above Extended Heat Time block 1486. A second setup parameter may be an extended cooling fan time, and the second descriptive text may be the text "Extended Time in Cool" displayed immediately above Extended Cool Time block 1488. These related parameters may be organized into a common setup category and displayed on the same screen 1484.

Back button 1222 permits the installer to revert to a previous screen while Help button 1224 may provide the installer with additional information or guidance pertaining to their options. Done button 1234, if pressed, may cause HVAC controller 20 to exit the installer setup process and revert to a previous screen such as screen 1212 (FIG. 125) while Next button 1236 may cause HVAC controller 20 to progress to a subsequent screen within the Create Setup menu.

Figure 164:
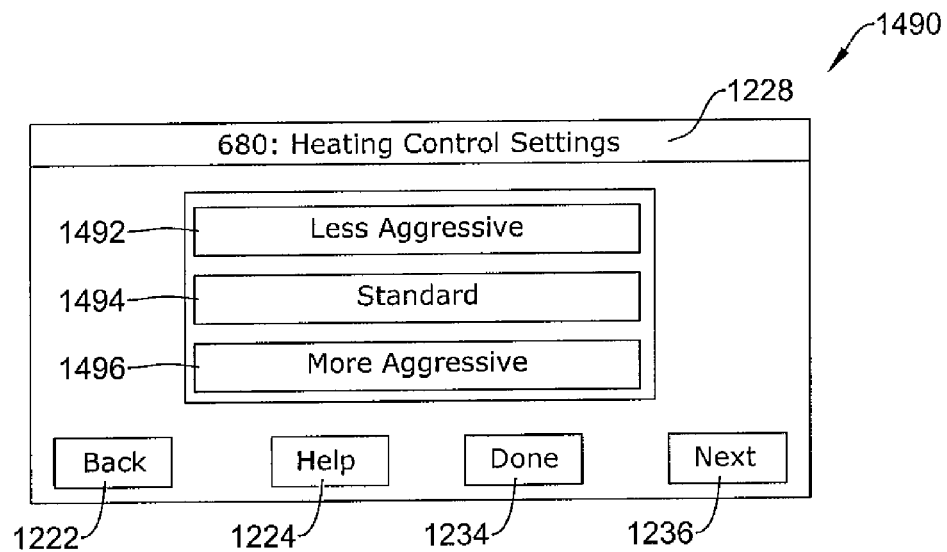

In some cases, pressing Next button 1236 may cause HVAC controller 20 to display an illustrative screen 1490, as shown in FIG. 164. Screen 1490 may include banner 1228, which provides the installer with an indication of menu location and in this case informs the installer that they are to provide information pertaining to heating control settings. In some cases, these control settings may influence parameters used in a PID (Proportional-Integral-Derivative) and/or other control. Screen 1490 includes a Less Aggressive button 1492, a Standard button 1494 and a More Aggressive button 1496. The installer may influence the performance of HVAC controller 20 by pressing one of these buttons.

Back button 1222 permits the installer to revert to a previous screen while Help button 1224 may provide the installer with additional information or guidance pertaining to their options. Done button 1234, if pressed, may cause HVAC controller 20 to exit the installer setup process and revert to a previous screen such as screen 1212 (FIG. 125) while Next button 1236 may cause HVAC controller 20 to progress to a subsequent screen within the Create Setup menu.

Figure 165:
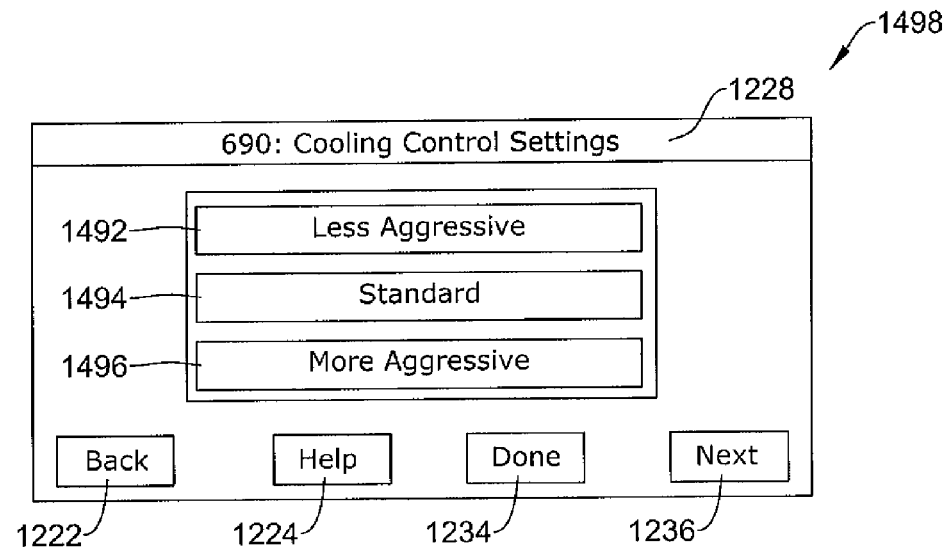

In some cases, pressing Next button 1236 may cause HVAC controller 20 to display an illustrative screen 1498, as shown in FIG. 165. Screen 1498 may include banner 1228, which provides the installer with an indication of menu location and in this case informs the installer that they are to provide information pertaining to cooling control settings. In some cases, these control settings may influence parameters used in a PID (Proportional-Integral-Derivative) and/or other control. Screen 1498 includes Less Aggressive button 1492, Standard button 1494 and More Aggressive button 1496. The installer may influence the performance of HVAC controller 20 by pressing one of these buttons.

Back button 1222 permits the installer to revert to a previous screen while Help button 1224 may provide the installer with additional information or guidance pertaining to their options. Done button 1234, if pressed, may cause HVAC controller 20 to exit the installer setup process and revert to a previous screen such as screen 1212 (FIG. 125) while Next button 1236 may cause HVAC controller 20 to progress to a subsequent screen within the Create Setup menu.

Figure 166:
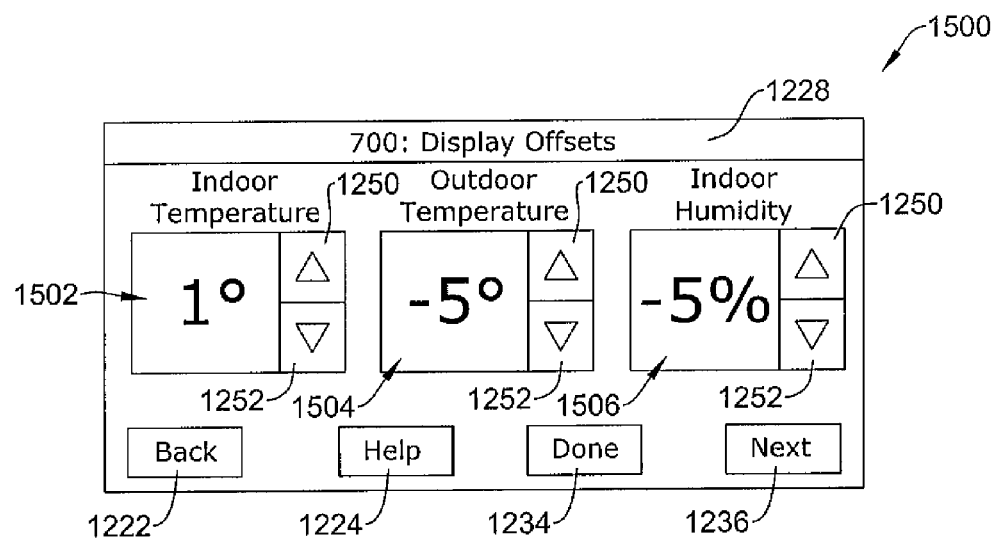

In some cases, pressing Next button 1236 may cause HVAC controller 20 to display an illustrative screen 1500, as shown in FIG. 166. Screen 1500 may include banner 1228, which provides the installer with an indication of menu location and in this case informs the installer that they are to provide information pertaining to display offsets. In some cases, the installer may want to have HVAC controller 20 display or otherwise operate in accordance with temperature values that are adjusted, or offset, from the detected temperatures.

Screen 1500 may include one or more of an Indoor Temperature block 1502, an Outdoor Temperature block 1504 and an Indoor Humidity block 1506. Indoor Temperature block 1502 may display an offset value in degrees that can be adjusted using Up arrow 1250 and/or Down arrow 1252, as desired. Outdoor Temperature block 1504 may display an offset value in degrees that can be adjusted using Up arrow 1250 and/or Down arrow 1252, as desired. Indoor Humidity block 1506 may display an offset value in percentage that can be adjusted using Up arrow 1250 and/or Down arrow 1252, as desired.

As noted above, HVAC controller 20 may be considered as displaying a first setup parameter in conjunction with a first descriptive text and a second, possibly related, setup parameter in conjunction with a second descriptive text. For example, and with respect to screen 1500, a first setup parameter may be an indoor temperature offset, and the first descriptive text may be the text "Indoor Temperature" displayed immediately above Indoor Temperature block 1502. A second setup parameter may be an outdoor temperature offset, and the second descriptive text may be the text "Outdoor Temperature" displayed immediately above Outdoor Temperature block 1504. A third setup parameter may be an indoor humidity offset, and a third descriptive text may be the text "Indoor Humidity" displayed immediately above Indoor Humidity block 1506. These related parameters may be organized into a common setup category and displayed on the same screen 1500.

Back button 1222 permits the installer to revert to a previous screen while Help button 1224 may provide the installer with additional information or guidance pertaining to their options. Done button 1234, if pressed, may cause HVAC controller 20 to exit the installer setup process and revert to a previous screen such as screen 1212 (FIG. 125) while Next button 1236 may cause HVAC controller 20 to progress to a subsequent screen within the Create Setup menu.

Figure 167:
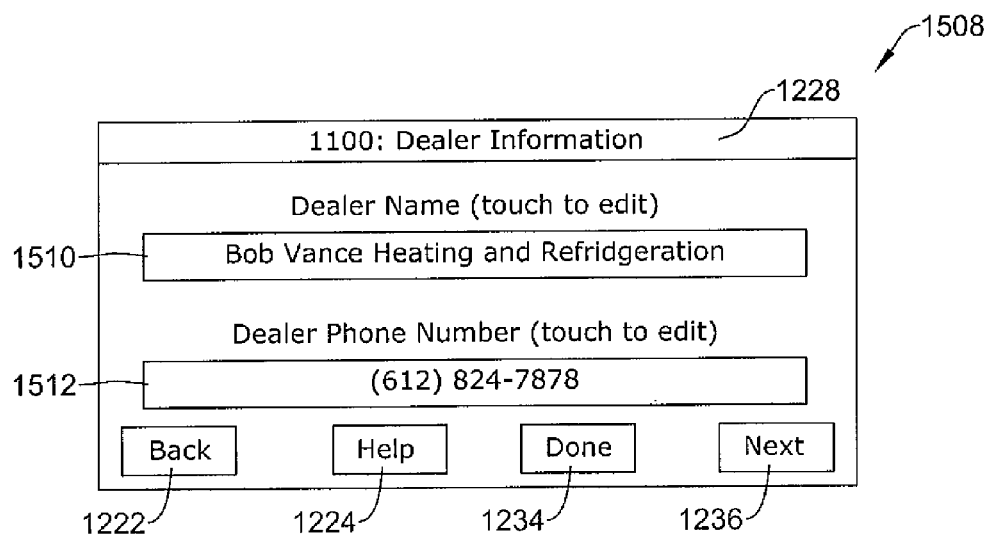
Figure 168:
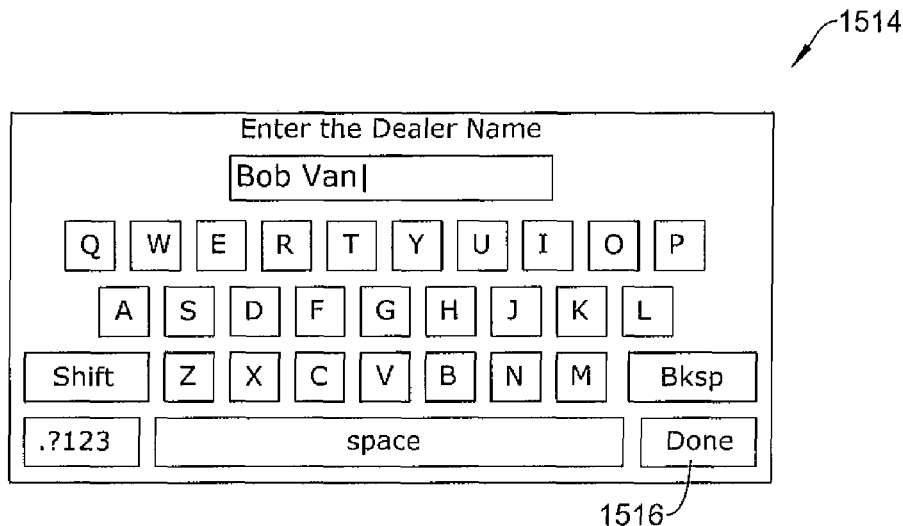

In some cases, pressing Next button 1236 may cause HVAC controller 20 to display an illustrative screen 1508, as shown in FIG. 167. Screen 1508 may include banner 1228, which provides the installer with an indication of menu location and in this case informs the installer that they are to provide dealer information. Screen 1508 may include a Dealer Name button 1510 and a Dealer Phone Number button 1512. Pressing Dealer Name button 1510, for example, may cause HVAC controller 20 to display an illustrative screen 1514, as shown in FIG. 168. Screen 1514 provides a touch-sensitive QWERTY keyboard that the user may use to enter the dealer name. Once the dealer name has been typed, pressing Done button 1516 may cause HVAC controller 20 to save the new name as well as to revert to screen 1508 (FIG. 167). A similar procedure may be used to enter the dealer's telephone number by touching Dealer Phone Number button 1512.

Referring briefly to FIG. 167, Back button 1222 permits the installer to revert to a previous screen while Help button 1224 may provide the installer with additional information or guidance pertaining to their options. Done button 1234, if pressed, may cause HVAC controller 20 to exit the installer setup process and revert to a previous screen such as screen 1212 (FIG. 125) while Next button 1236 may cause HVAC controller 20 to progress to a subsequent screen within the Create Setup menu.

Figure 169:
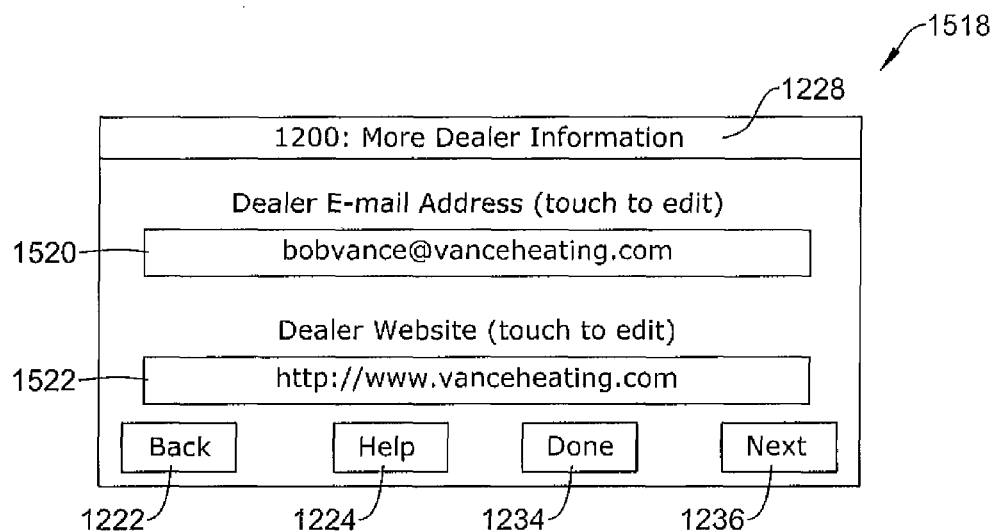
Figure 170:
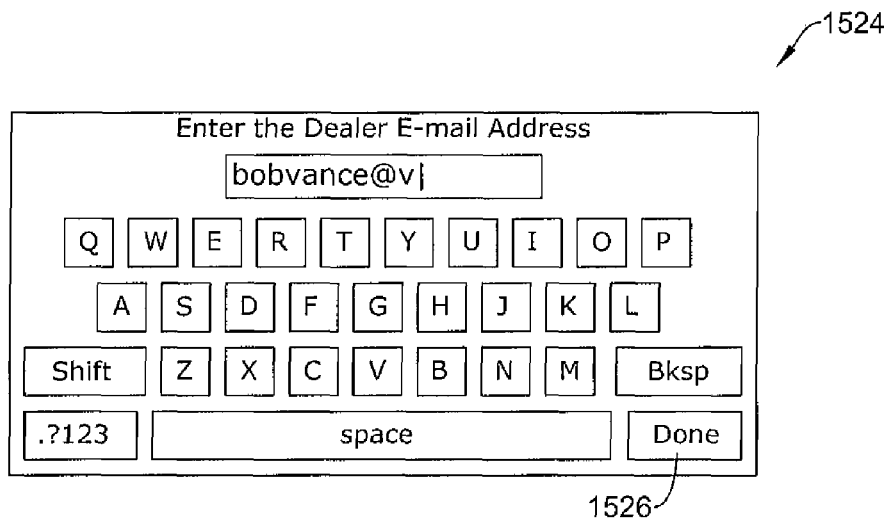

In some cases, pressing Next button 1236 may cause HVAC controller 20 to display an illustrative screen 1518, as shown in FIG. 169. Screen 1518 may include banner 1228, which provides the installer with an indication of menu location and in this case informs the installer that they are to provide additional dealer information. Screen 1518 may include a Dealer E-Mail button 1520 and a Dealer Website button 1522. Pressing Dealer E-Mail button 1520, for example, may cause HVAC controller 20 to display an illustrative screen 1524, as shown in FIG. 170. Screen 1524 provides a touch-sensitive QWERTY keyboard that the user may use to enter the dealer's email address. Once the dealer email address has been typed, pressing Done button 1526 may cause HVAC controller 20 to save the email address as well as to revert to screen 1518 (169). A similar procedure may be used the dealer's website by pressing Dealer Website button 1522.

Referring briefly to FIG. 169, Back button 1222 permits the installer to revert to a previous screen while Help button 1224 may provide the installer with additional information or guidance pertaining to their options. Done button 1234, if pressed, may cause HVAC controller 20 to exit the installer setup process and revert to a previous screen such as screen 1212 (FIG. 125) while Next button 1236 may cause HVAC controller 20 to progress to a subsequent screen within the Create Setup menu, or to revert to the first screen within the Create Setup menu.

Figure 171:
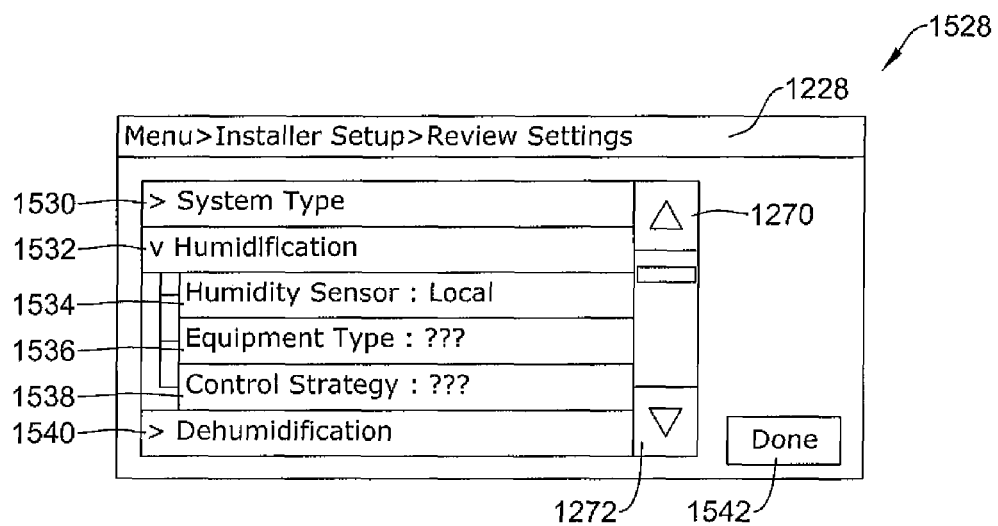

Referring briefly to FIG. 125, pressing View/Edit Current Installer Setup button 1214 may cause HVAC controller 20 to display an illustrative screen 1528, as shown in FIG. 171. Screen 1528 may include navigational bar 1228, which provides the installer with an indication of menu location. Screen 1528 may provide information pertaining to a number of settings, which may include more information than can be displayed at one time, and thus may include Up button 1270 and Down button 1272 so that the installer can scroll up and/or down through the displayed settings and settings categories.

As illustrated, screen 1528 explicitly shows a System Type button 1530, a Humidification button 1532 and a Dehumidification button 1540. Humidification button 1532 has been pressed to expand the sub-headings under humidification, as evidenced by the down arrow displayed within Humidification button 1532. The sub-headings include a Humidity Sensor button 1534, an Equipment Type button 1536 and a Control Strategy button 1538. It can be seen that some of this information has not yet been entered into HVAC controller 20. A Done button 1542, if pressed, may cause HVAC controller 20 to revert to a previous screen such as screen 1212 (FIG. 125). In some cases, the installer may touch one of the buttons, such as Equipment Type button 1536, and HVAC controller 20 may open the appropriate menu or menus to enter the desired information. A Back button may then return the installer to screen 1528. This may provide an efficient way for the installer to enter and/or change settings for HVAC controller 20.

Figure 172:
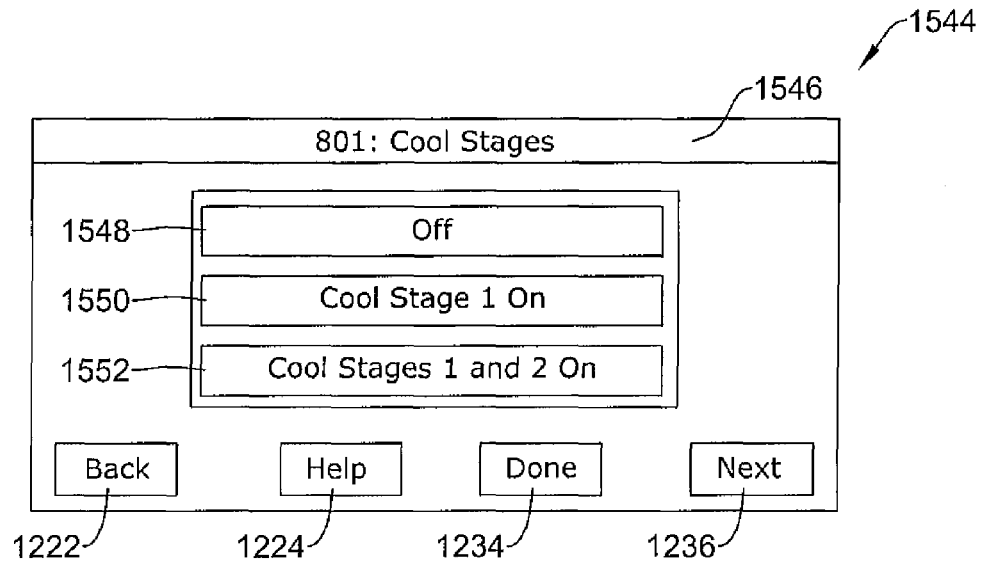

Returning briefly to FIG. 125, pressing Installer Test button 1218 may cause HVAC controller 20 to display an illustrative screen 1544, as shown in FIG. 172. Screen 1544 may include banner 1546, which reminds the user that they are at a screen in which they can test cooling stages. Screen 1544 may include one or more of an Off button 1548, a Cool Stage One button 1550 and a Cool Stages One and Two button 1552. The installer may press one or more of these buttons, and then ascertain if the HVAC equipment is responding properly.

Back button 1222 permits the installer to revert to a previous screen while Help button 1224 may provide the installer with additional information or guidance pertaining to their options. Done button 1234, if pressed, may cause HVAC controller 20 to exit the installer test process and revert to a previous screen such as screen 1212 (FIG. 125) while Next button 1236 may cause HVAC controller 20 to progress to a subsequent screen within the Installer Test menu.

Figure 173:
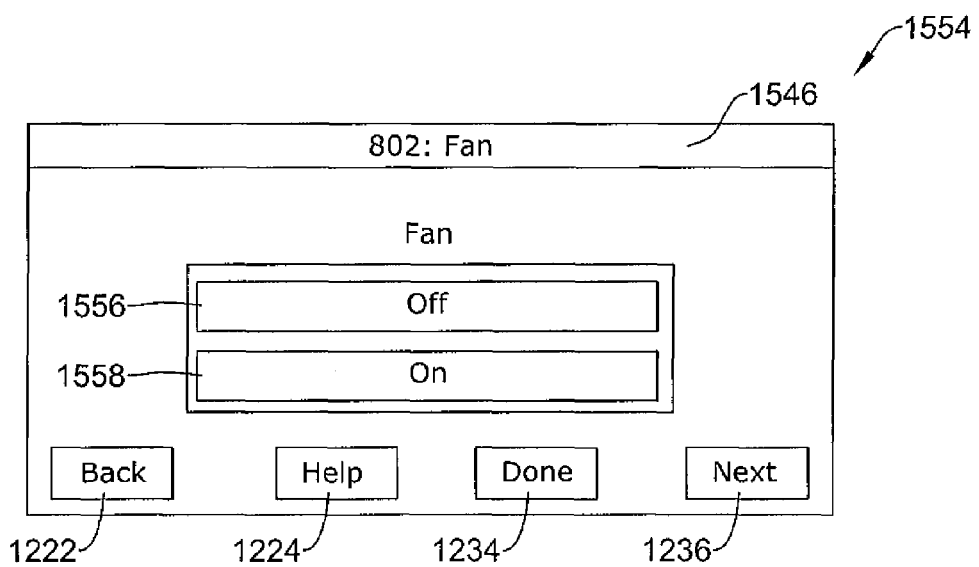

In some cases, pressing Next button 1236 may cause HVAC controller 20 to display an illustrative screen 1554, as shown in FIG. 173. Screen 1544 may include banner 1546, which reminds the user that they are at a screen in which they can test fan operation. Screen 1554 may include an Off button 1556 and an On button 1558. The installer may press one or more of these buttons, and then ascertain if the blower motor is responding properly.

Back button 1222 permits the installer to revert to a previous screen while Help button 1224 may provide the installer with additional information or guidance pertaining to their options. Done button 1234, if pressed, may cause HVAC controller 20 to exit the installer test process and revert to a previous screen such as screen 1212 (FIG. 125) while Next button 1236 may cause HVAC controller 20 to progress to a subsequent screen within the Installer Test menu.

Figure 174:
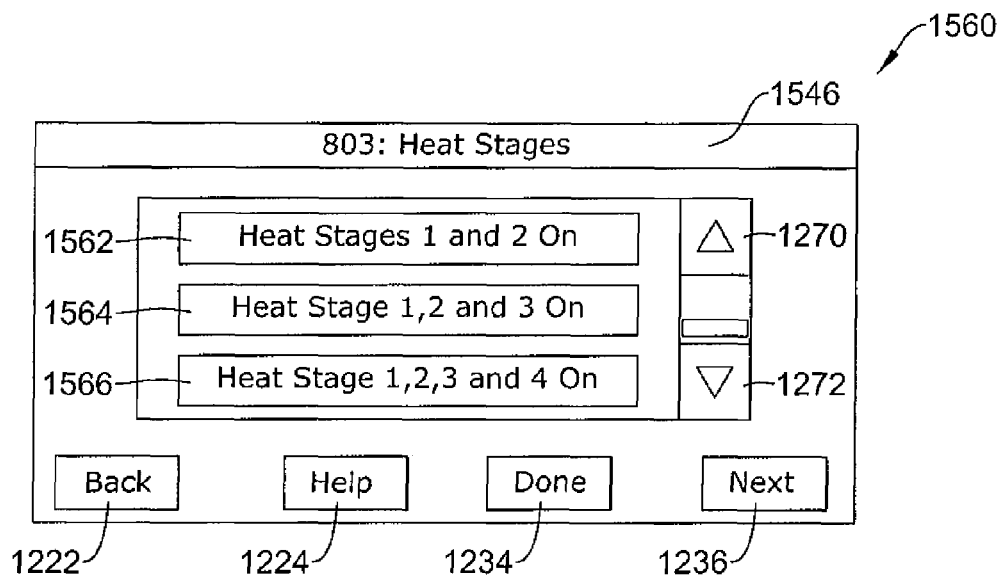

In some cases, pressing Next button 1236 may cause HVAC controller 20 to display an illustrative screen 1560, as shown in FIG. 174. Screen 1560 may include banner 1546, which reminds the user that they are at a screen in which they can test heating stages. Screen 1560 may permit more testing options than can be displayed at one time, and when so provided, screen 1560 may include Up button 1270 and Down button 1272 so that the installer can scroll up and/or down through the displayed testing options. Screen 1560 may include, for example, one or more of a Heat Stages One and Two On button 1562, a Heat Stages One, Two and Three On button 1564 and a Heat Stages One, Two, Three and Four On button 1566. The installer may press one or more of these buttons, and then ascertain if the furnace is responding properly.

Back button 1222 permits the installer to revert to a previous screen while Help button 1224 may provide the installer with additional information or guidance pertaining to their options. Done button 1234, if pressed, may cause HVAC controller 20 to exit the installer test process and revert to a previous screen such as screen 1212 (FIG. 125) while Next button 1236 may cause HVAC controller 20 to progress to a subsequent screen within the Installer Test menu.

Figure 175:
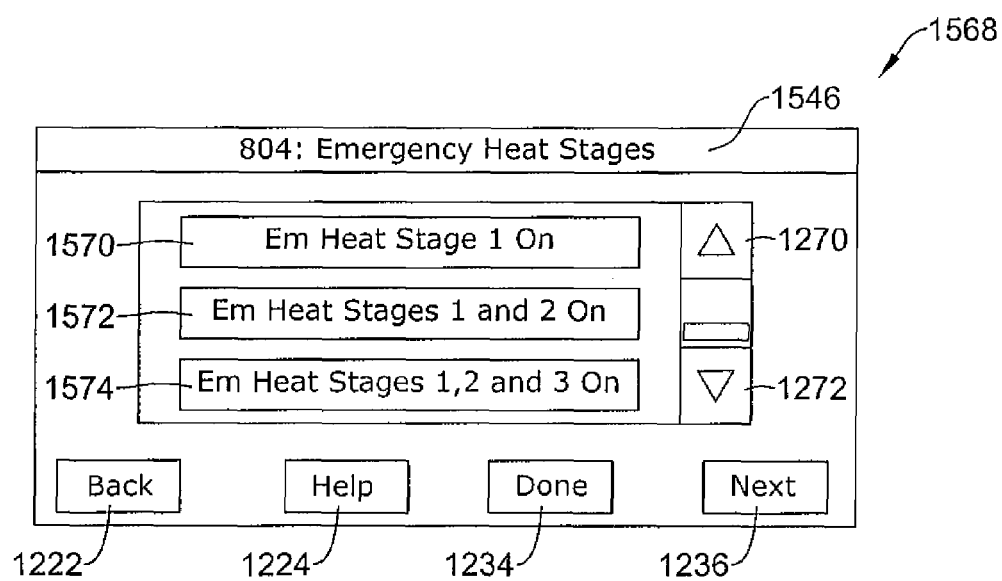

In some cases, pressing Next button 1236 may cause HVAC controller 20 to display an illustrative screen 1568, as shown in FIG. 175. Screen 1568 may include banner 1546, which reminds the user that they are at a screen in which they can test emergency heating stages. Screen 1568 may permit more testing options than can be displayed at one time, and thus may include Up button 1270 and Down button 1272 so that the installer can scroll up and/or down through the displayed buttons. Screen 1568 may include one or more of an EM Heat Stage One On button 1570, an EM Heat Stages One and Two On button 1572 and a Heat Stages One, Two and Three On button 1574. The installer may press one or more of these buttons, and then ascertain if the furnace is responding properly.

Back button 1222 permits the installer to revert to a previous screen while Help button 1224 may provide the installer with additional information or guidance pertaining to their options. Done button 1234, if pressed, may cause HVAC controller 20 to exit the installer test process and revert to a previous screen such as screen 1212 (FIG. 125) while Next button 1236 may cause HVAC controller 20 to progress to a subsequent screen within the Installer Test menu.

Figure 176:
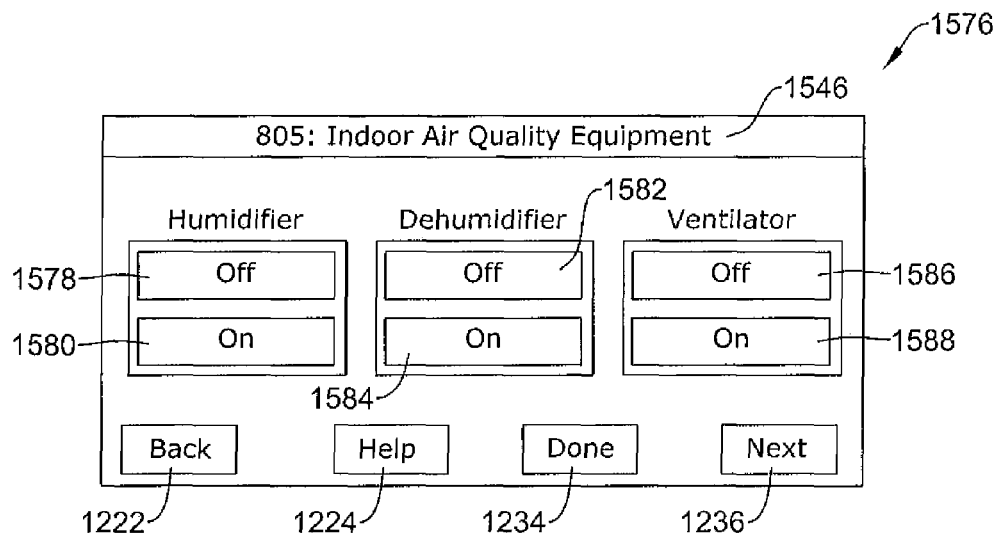

In some cases, pressing Next button 1236 may cause HVAC controller 20 to display an illustrative screen 1576, as shown in FIG. 176. Screen 1576 may include banner 1546, which reminds the user that they are at a screen in which they can test operation of the indoor air quality equipment. Screen 1576 may include one or more of a Humidifier Off button 1578, a Humidifier On button 1580, a Dehumidifier Off button 1582, a Dehumidifier On button 1584, a Ventilator On button 1586 and a Ventilator Off button 1588. The installer may press one or more of these buttons, and then ascertain if the indoor air quality equipment is responding properly.

Back button 1222 permits the installer to revert to a previous screen while Help button 1224 may provide the installer with additional information or guidance pertaining to their options. Done button 1234, if pressed, may cause HVAC controller 20 to exit the installer test process and revert to a previous screen such as screen 1212 (FIG. 125) while Next button 1236 may cause HVAC controller 20 to progress to a subsequent screen within the menu structure.

Figure 177:
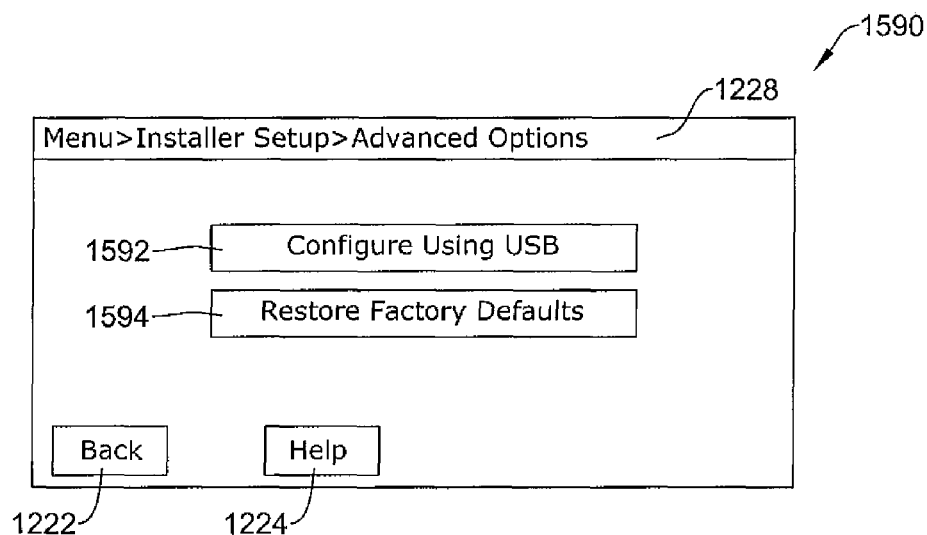

Returning briefly to FIG. 125, pressing Advanced Options button 1218 may cause HVAC controller 20 to display an illustrative screen 1590, as shown in FIG. 177. Screen 1590 may include Navigational bar 1228, which provides the installer with an indication of where they are within the hierarchical menu. Screen 1590 may include one or more of a Configure Using USB button 1592 and a Restore Factory Defaults button 1594. Back button 1222 permits the installer to revert to a previous screen while Help button 1224 may provide the installer with additional information or guidance pertaining to their options.

Figure 178:
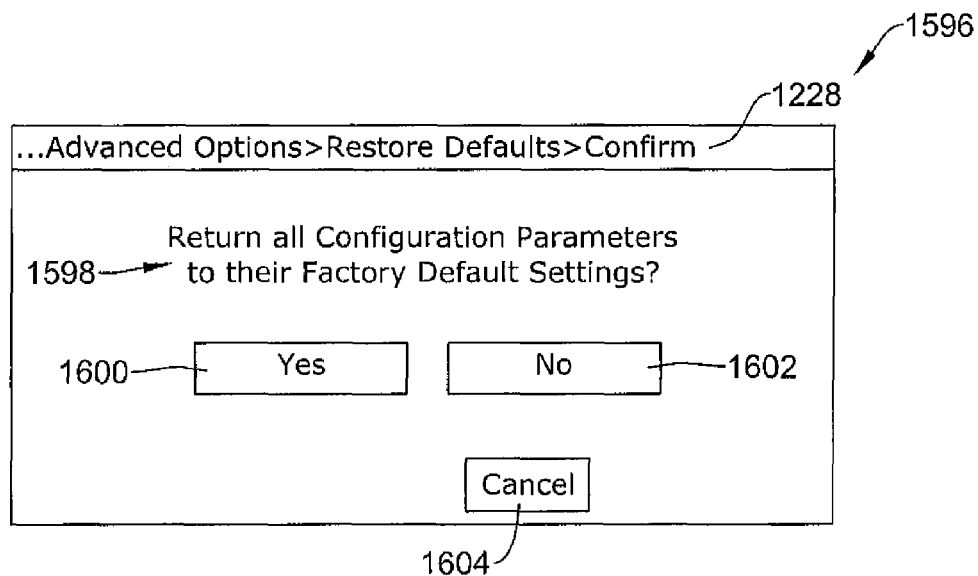

Pressing Restore Factory Defaults button 1594 may cause HVAC controller 20 to display an illustrative screen 1596, as shown in FIG. 178. Navigational bar 1228 provides the installer of an indication of where they are within the hierarchical menu structure. Screen 1596 may include an inquiry 1598, asking the installer if they wish to delete any and all parameter settings in favor of their factory default settings. A Yes button 1600 and a No button 1602 permit the installer to provide their answer. A Cancel button 1604, if pressed, may cause HVAC controller 20 to revert to a previous screen such as screen 1212 (FIG. 125) or screen 1590 (FIG. 177).

Figure 179:
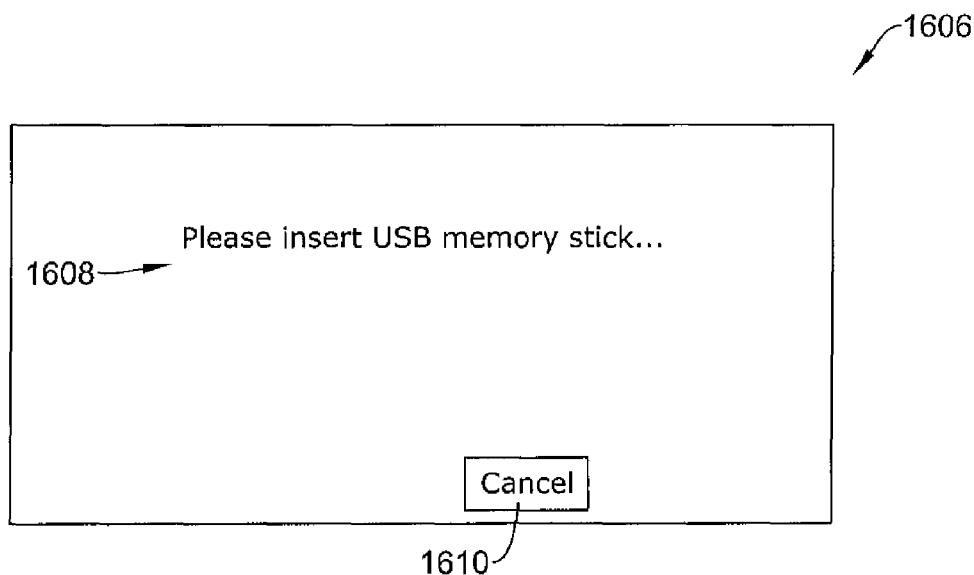

Returning briefly to FIG. 177, in some instances HVAC controller 20 may be configured to permit an installer to download a configuration file onto a USB device or other portable storage device so that the configuration file may be uploaded into another HVAC controller. This may make programming an HVAC controller much quicker, rather than having to go through the setup screens as discussed herein. In some cases, pressing Configure Using USB button 1592 may cause HVAC controller 20 display an illustrative screen 1606, as shown in FIG. 179.

Figure 180:
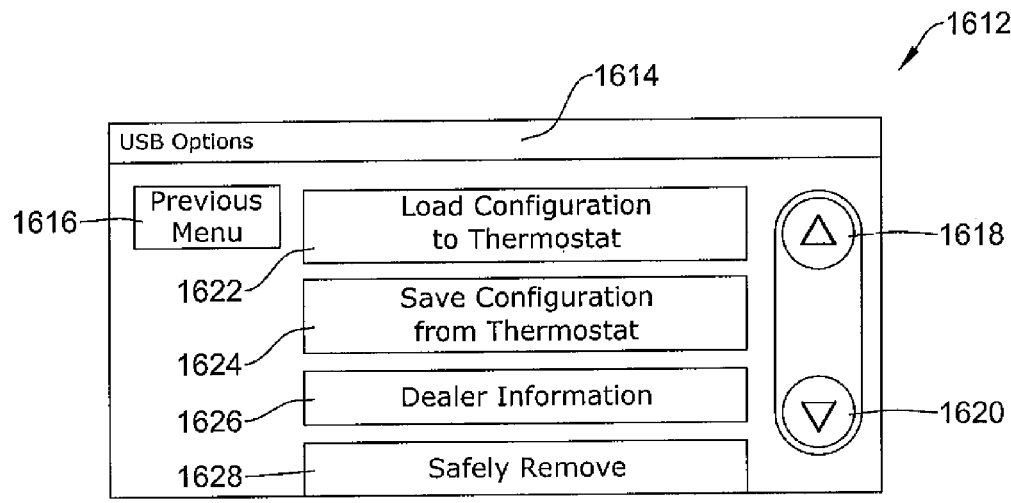

Screen 1606 includes text 1608, instructing the installer to insert the USB memory stick or related storage device. The memory stick or related storage device may be inserted into, for example, a compatible data port such as data port 18 (FIG. 1). A Cancel button 1610, if pressed, may cause HVAC controller 20 to revert to a previous screen such as screen 1590 (FIG. 177). If the installer inserts the USB device in response to screen 1606, HVAC controller 20 may display an illustrative screen 1612, as shown in FIG. 180. In some cases, with respect to FIG. 177, controller 20 may display screen 1612 upon insertion of a USB device even if the installer does not press Configure Using USB button 1592.

Screen 1612 may include a navigation bar 1614 that provides the installer with a reminder of where they are within the USB setup menu. A Previous Menu button 1616, if pressed, may cause HVAC controller 20 to revert to a previous screen. In some cases, HVAC controller 20 may display a screen (not illustrated) reminding the installer to remove the USB device when appropriate, although this is not required.

In some cases, screen 1612 may provide more option buttons than can be displayed at one time. An Up button 1618 and a Down button 1620 may be used, as desired, to scroll up and/or down through the displayed option buttons. Screen 1612 may include, for example, one or more of a Load Configuration to Thermostat button 1622, a Save Configuration From Thermostat button 1624, a Dealer Information button 1626 and a Safely Remove USB Device button 1628.

Figure 181:
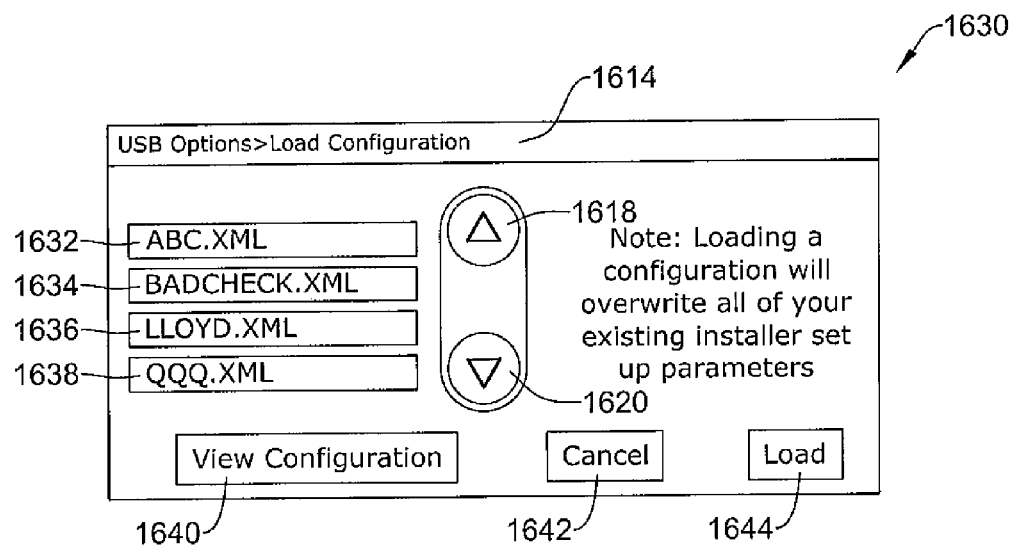

In some instances, pressing Load Configuration to Thermostat button 1622 may cause HVAC controller 20 to display an illustrative screen 1630, shown in FIG. 181. Navigation bar 1614 provides the installer with a reminder of where they are within the USB setup menu. Screen 1630 may provide a number of configuration buttons including a First Configuration button 1632, a Second Configuration button 1634, a Third Configuration button 1636 and a Fourth Configuration button 1638. As the USB device may include more configurations than can be displayed at one time, screen 1630 may include Up button 1618 and Down button 1620 so that the installer may scroll up and down, as desired.

In some instances, the USB device (not illustrated) may include a number of different configurations. In some cases, these configurations may be for different residential and/or light commercial environments but may be for a particular type of thermostat. In some cases, these configurations may also be for different types or models of thermostats. HVAC controller 20 may in some instances only display configurations that are appropriate for the HVAC controller being configured.

Figure 183:
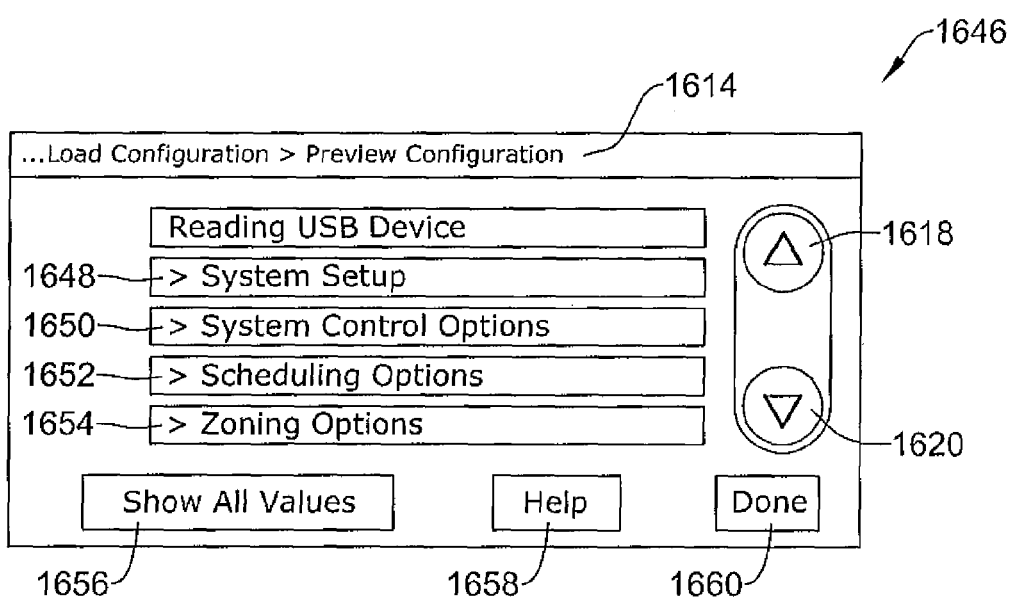

The installer may select one of the configurations by pressing the appropriate configuration button such as one of First Configuration button 1632, Second Configuration button 1634, Third Configuration button 1636 and Fourth Configuration button 1638. A View Configuration button 1640 may be pressed in order to obtain more information regarding a particular configuration including, for example, being able to preview a number of the operating parameters included in the selected configuration. These operating parameters may be organized in a hierarchical manner, and may be previewed through a hierarchical menu structure. If the configuration does not fit on the display, HVAC controller 20 may display scroll bars that may be used to scroll through the displayed information. As illustrated, First Configuration button 1632 (labeled ABC.XML) has been selected. Upon pressing View Configuration button 1638, HVAC controller 20 may display an illustrative screen 1646, as shown in FIG. 183.

Screen 1646 includes Navigation bar 1614, which provides the installer with a reminder of where they are within the USB setup menu. A particular configuration file may include more setup topics than can be displayed at one time, and thus screen 1646 may include Up button 1618 and Down button 1620 so that the installer may scroll up and down, as desired. Screen 1646 may include one or more of a System Setup button 1648, a System Control Options button 1650, a Scheduling Options button 1652, and a Zoning Options 1654, but are not limited to these. Other possible buttons (not displayed) may include one or more of Display Settings, Calendar Settings, Humidification Settings, Dehumidification Settings, Ventilation Settings, and Service Reminders; as well as things such as various wallpapers for home screens, screen savers, skins, etc., that might be used to customize the look and feel of the display, if desired.

A Show All Values button 1656, if pressed, may cause HVAC controller 20 to expand each of the options buttons such as System Setup button 1648, System Control Options button 1650, Scheduling Options button 1652, and Zoning Options 1654 and to display each of the parameters and parameter values pertaining to each of the options buttons. A Help button 1658 may provide the installer with additional information, guidance, options and the like. A Done button 1660, if pressed, may cause HVAC controller 20 to revert to a previous screen such as screen 1630 (FIG. 181).

Figure 182:
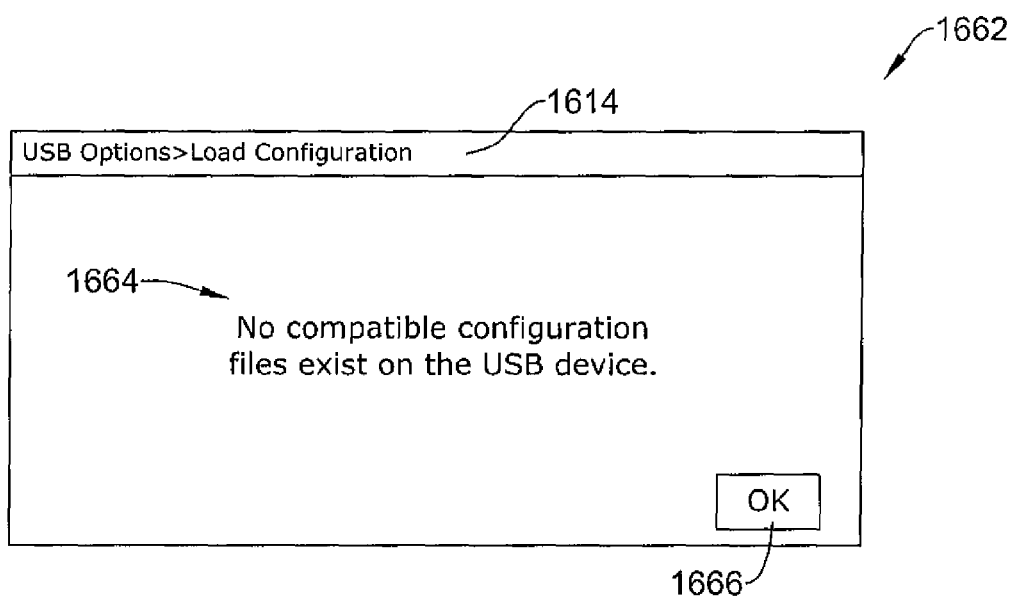

Returning briefly to FIG. 180, if the installer presses Load Configuration to Thermostat button 1622 and there are no compatible configuration files on the USB device, HVAC controller 20 may display an illustrative screen 1662, as shown in FIG. 182. Screen 1662 may include Navigation bar 1614, which provides the installer with a reminder of where they are within the USB setup menu. Screen 1662 may include text 1664 informing the installer that there are no compatible configuration files on the USB device. The installer may have to try a different USB device, or perform the setup process manually. An OK button 1666 may cause HVAC controller 20 to revert to a previous screen.

Figure 184:
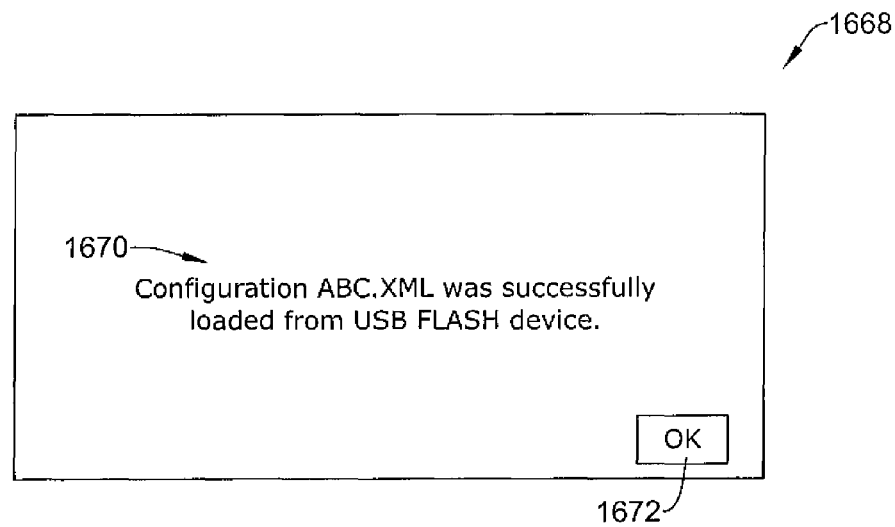

Returning briefly to FIG. 181, pressing Load button 1644 may cause HVAC controller 20 to upload the selected configuration from the USB device. If the upload is not successful, HVAC controller 20 may display a screen (not illustrated) providing an appropriate error message and/or a suggested way to correct the error. If the upload is successful, HVAC controller 20 may display an illustrative screen 1668, as shown in FIG. 184. Screen 1668 may include text 1670 informing the installer that the configuration was successfully loaded. An OK button 1672, if pressed, may cause HVAC controller 20 to revert to a previous screen such as screen 1612 (FIG. 180).

Figure 185:
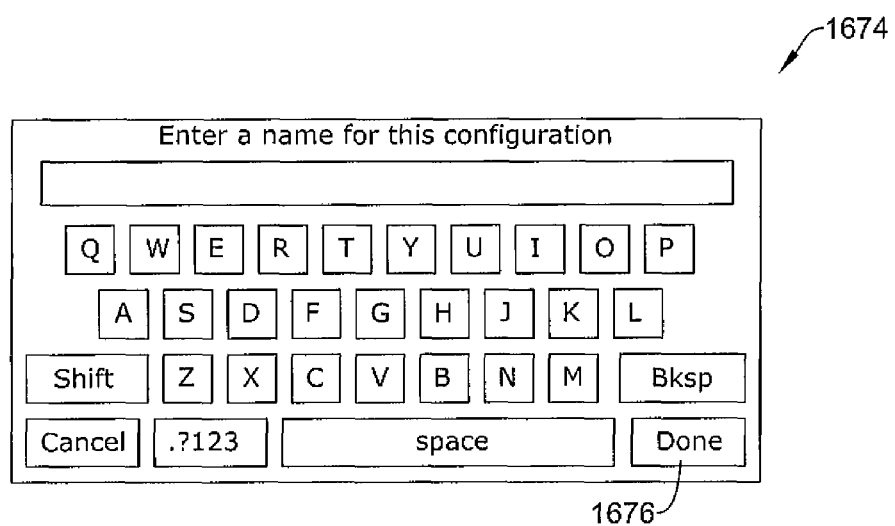
Figure 186:
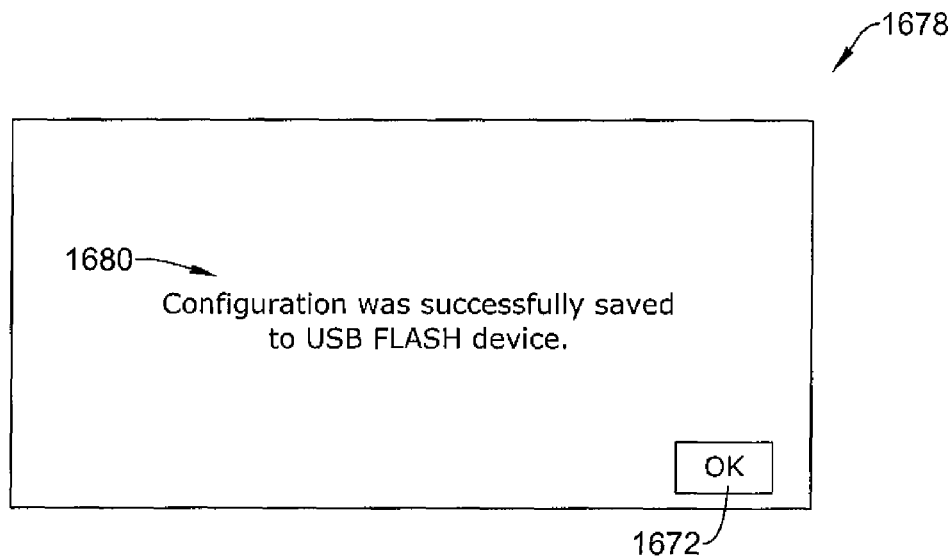

Returning briefly to FIG. 180, pressing Save Configuration From Thermostat button 1624 may cause HVAC controller 20 to display an illustrative screen 1674, as shown in FIG. 185. Screen 1674 provides a touch-sensitive QWERTY keyboard that the installer may use to enter a name for the configuration that will be downloaded from HVAC controller 20 to the USB device (not illustrated). A Done button 1676, if pressed, may cause HVAC controller 20 to attempt to upload the newly named configuration to the USB device. If the configuration is successfully uploaded, HVAC controller 20 may display an illustrative screen 1678, as shown in FIG. 186. Screen 1678 may include text 1680, informing the installer that the configuration was successfully saved to the USB device. OK button 1672, if pressed, may cause HVAC controller 20 to revert to a previous screen such as screen 1612 (FIG. 180).

In some instances, a current configuration may be saved as a file on the USB or other external memory device. The name of the current configuration may be used as the file name. It will be appreciated that if there are two or more configurations saved on the USB or other external memory device, each will have a unique configuration name and a corresponding unique file name.

Figure 187:
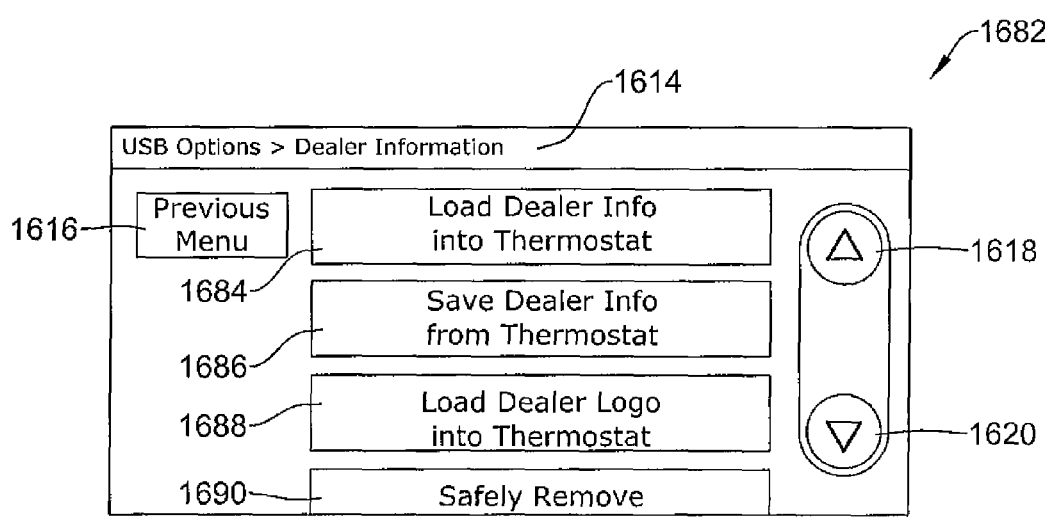

Returning briefly to FIG. 180, pressing Dealer Information button 1626 may cause HVAC controller 20 to display an illustrative screen 1682, as shown in FIG. 187. Screen 1626 may include Navigation bar 1614, which provides the installer with a reminder of where they are within the USB setup menu. Previous Menu button 1616, if pressed, may cause HVAC controller 20 to revert to a previous screen such as screen 1612 (FIG. 180). As there may include more options than can be displayed at one time, screen 1682 may include Up button 1618 and Down button 1620 so that the installer may scroll up and down, as desired. Screen 1682 may include, for example, one or more of a Load Dealer Info Into Thermostat button 1684, a Save Dealer Info From Thermostat button 1686, a Load Dealer Logo into Thermostat button 1688 and a Safely Remove USB Device button 1690.

Figure 188:
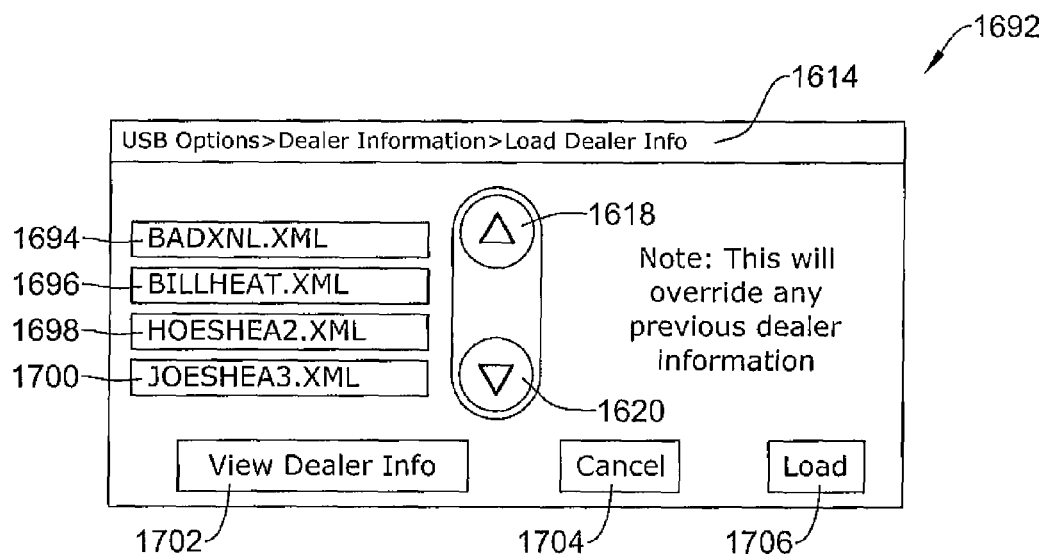

Pressing Load Dealer Info Into Thermostat button 1684 may cause HVAC controller 20 to display an illustrative screen 1692, as shown in FIG. 188. Screen 1692 may include Navigation bar 1614, which provides the installer with a reminder of where they are within the USB setup menu. As there may include more dealer information files than can be displayed at one time, screen 1692 may include Up button 1618 and Down button 1620 so that the installer may scroll up and down, as desired.

Screen 1692 may provide a number of dealer information buttons including a First Dealer File button 1694, a Second Dealer File button 1696, a Third Dealer File button 1698 and a Fourth Dealer File button 1700. The installer may select one of the dealer information files by pressing the appropriate button such as one of First Dealer File button 1694, Second Dealer File button 1696, Third Dealer File button 1698 and Fourth Dealer File button 1700.

A Preview Dealer Info button 1702 may be pressed in order to obtain more information regarding a particular configuration. A Cancel button 1704 may be pressed to return to a previous screen such as screen 1682 (FIG. 187). Pressing a Load button 1706 may cause HVAC controller 20 to attempt to upload the selected dealer information file from the USB device. In some cases, the file may be corrupted or may otherwise not be useable.

Figure 189:
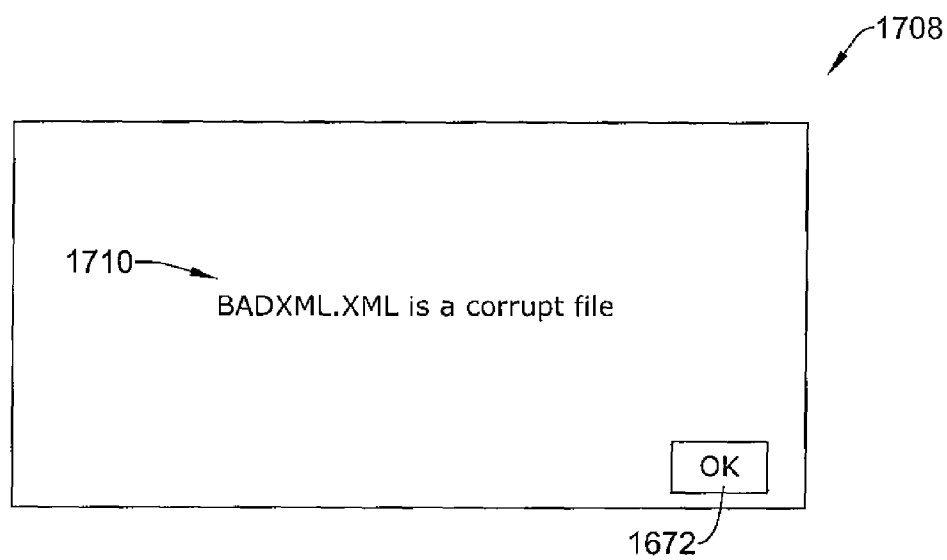

If the file is corrupt or otherwise not compatible with HVAC controller 20, and the installer presses either of Preview Dealer Info button 1702 or Load button 1706, HVAC controller 20 may display an illustrative screen 1708, as shown in FIG. 189. Screen 1708 may include text 1710, informing the installer that the selected dealer information file is corrupted or otherwise not compatible with HVAC controller 20. It should be noted that HVAC controller 20 may display a similar screen if, with respect to screen 1630 (FIG. 181), the selected configuration file is corrupted or otherwise not compatible with HVAC controller 20. Pressing OK button 1672 may cause HVAC controller 20 to revert to a previous screen such as screen 1692 (FIG. 188).

Figure 190:
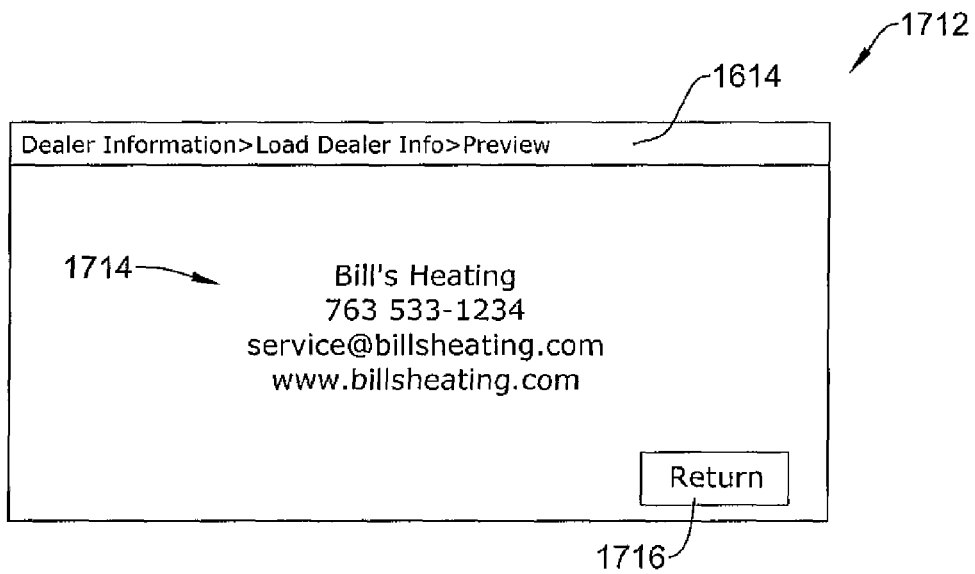

Returning briefly to FIG. 188, and if the selected dealer information file is intact, HVAC controller 20 may display an illustrative screen 1712, as shown in FIG. 190. Navigation bar 1614 may provide the installer with a reminder of where they are within the USB setup menu. Screen 1708 may include text 1714, providing contact information corresponding to the selected dealer information file. A Return button 1716, if pressed, may cause HVAC controller 20 to revert to a previous screen such as screen 1692 (FIG. 188).

Figure 191:
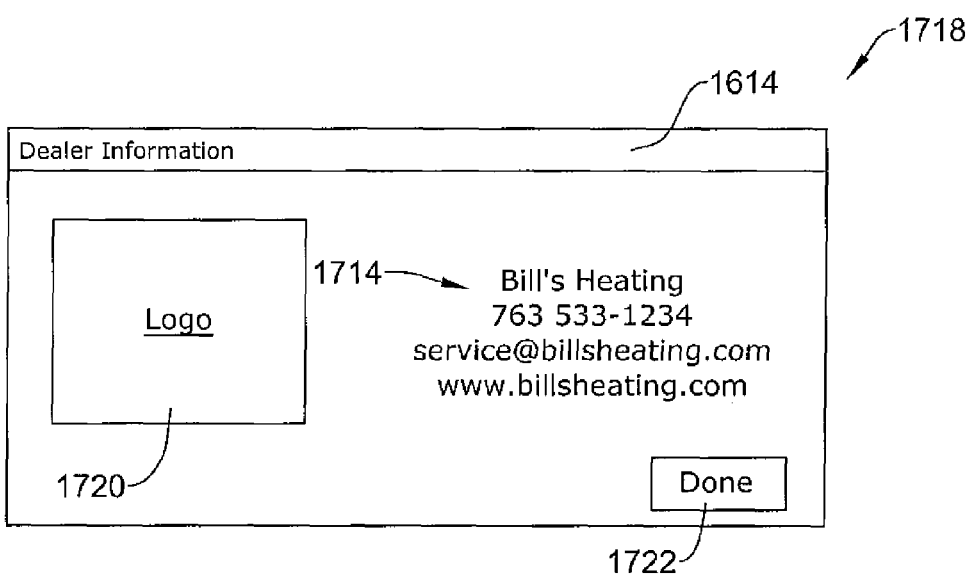

Pressing Load button 1706 (FIG. 188), assuming the selected dealer information file is correct and the selected file is successfully uploaded from the USB device, HVAC controller 20 may display an illustrative screen 1718, shown in FIG. 191. Navigation bar 1614 may provide the installer with a reminder of where they are within the USB setup menu. Screen 1718 may display the successfully uploaded dealer information, including one or more of text 1714 and/or a dealer logo 1720. A Done button 1722, if pressed, may cause HVAC controller 20 to revert to a previous screen such as screen 1682 (FIG. 187).

Figure 192:
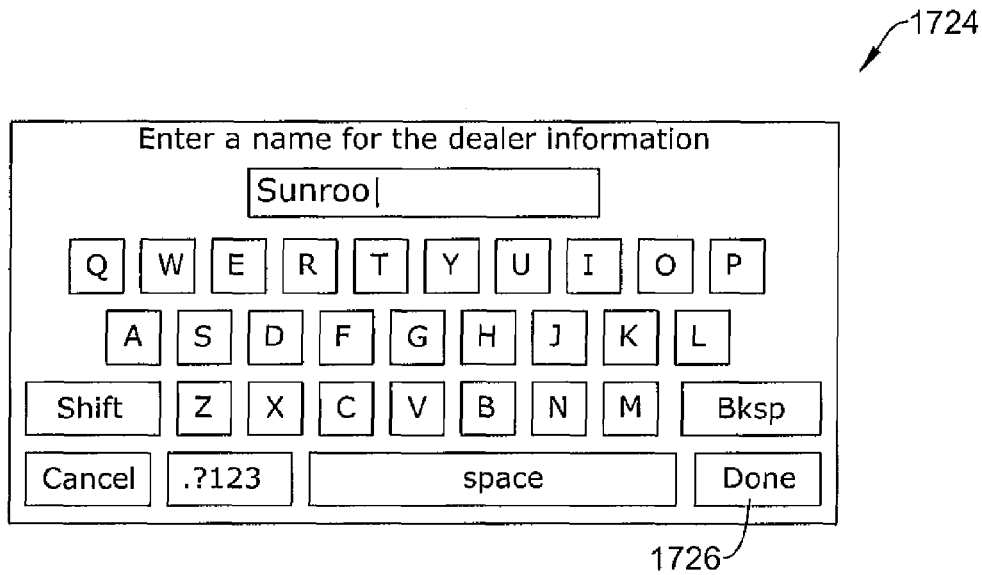

Returning briefly to FIG. 187, pressing Save Dealer Info From Thermostat button 1686 may cause HVAC controller 20 to display an illustrative screen 1724 as shown in FIG. 192, which provides a touch-sensitive QWERTY keyboard that the installer may use to enter a name for the dealer information file to be downloaded from HVAC controller 20 to the USB device (not illustrated).

Figure 193:
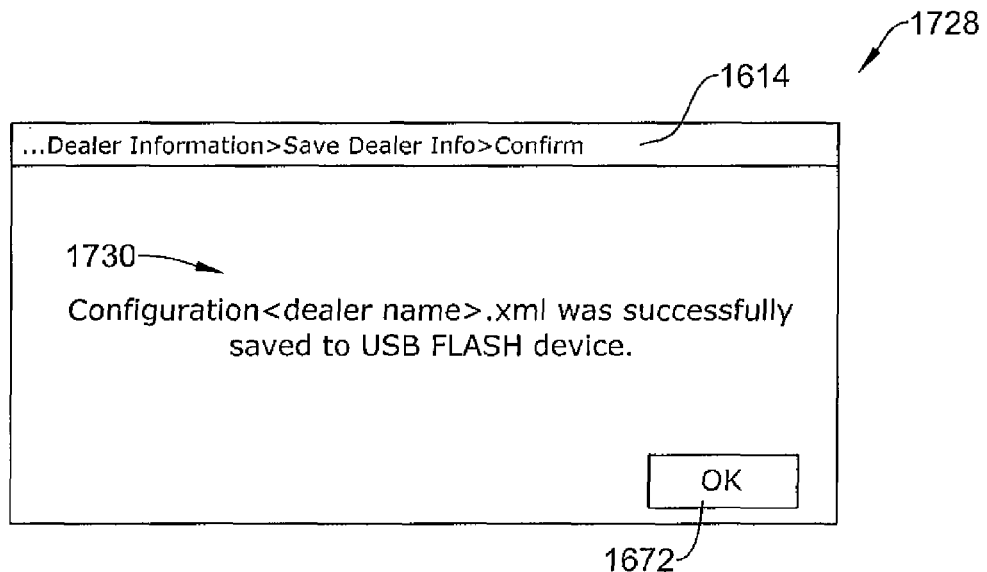

A Done button 1726, if pressed, may cause HVAC controller 20 to attempt to upload the newly named dealer information file to the USB device. If the configuration is successfully uploaded, HVAC controller 20 may display an illustrative screen 1728, as shown in FIG. 193. Navigation bar 1614 may provide the installer with a reminder of where they are within the USB setup menu. Screen 1728 may include text 1730, informing the installer that the dealer information file was successfully saved to the USB device. OK button 1672, if pressed, may cause HVAC controller 20 to revert to a previous screen such as screen 1682 (FIG. 187).

Figure 194:
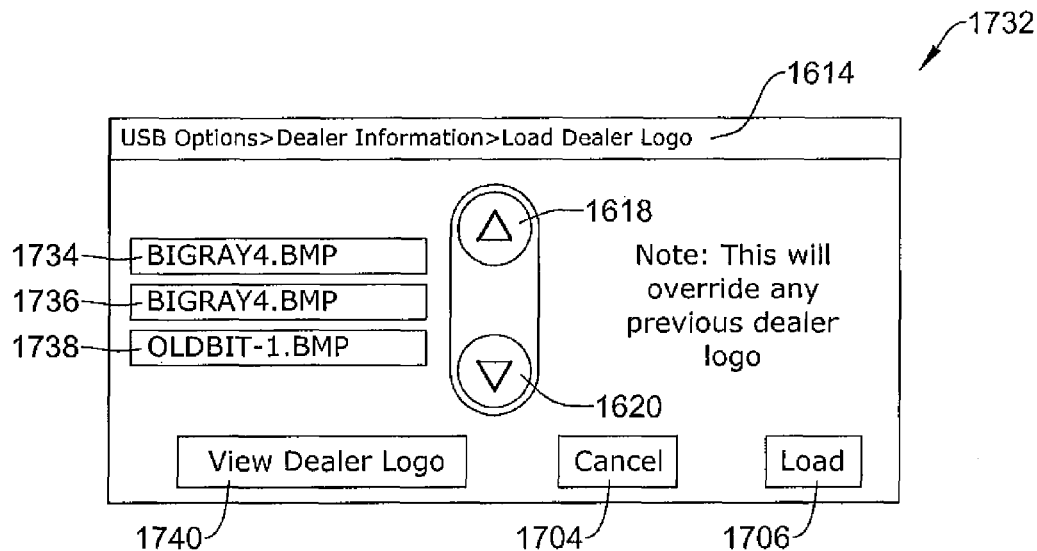

Returning briefly to FIG. 187, pressing Load Dealer Logo Into Thermostat button 1688 may cause HVAC controller 20 to display an illustrative screen 1732, as shown in FIG. 194. Because there may be more dealer logo files than can be displayed at one time, screen 1732 may include Up button 1618 and Down arrow 1620, so that the installer may scroll up and/or down through the listed dealer logo files, if desired. Screen 1732 may, as illustrated, include a First Dealer Logo file button 1734, a Second Dealer Logo file button 1736 and a Third Dealer Logo button 1738.

After selecting a dealer logo file by pressing the appropriate button, the installer may preview the logo by pressing a View Dealer Logo button 1740. Cancel button 1704 may be pressed to return to a previous screen such as screen 1682 (FIG. 187). Load button 1706 may be pressed to attempt to upload the selected dealer logo file from the USB device to HVAC controller 20. If the attempt is successful, HVAC controller 20 may display a screen (not illustrated) similar to screen 1668 (FIG. 184). If the dealer logo file is corrupted, as may be discovered when the installer attempts to preview the logo and/or tries to upload the dealer logo file, HVAC controller 20 may display a screen (not illustrated) similar to screen 1708 (FIG. 189).

Returning briefly to FIG. 187, pressing Safely Remove USB Device button 1690 may cause HVAC controller 20 to display an illustrative screen 1742, as shown in FIG. 195. Navigation bar 1614 may provide the installer with a reminder of where they are within the USB setup menu. Screen 1742 may include text 1744 informing the installer that it is safe to remove the USB device. Cancel button 1704, if pressed, may cause HVAC controller 20 to revert to a previous screen such as screen 1612 (FIG. 180).

The disclosure should not be considered limited to the particular examples described above, but rather should be understood to cover all aspects of the invention as set out in the attached claims. Various modifications, equivalent processes, as well as numerous structures to which the invention can be applicable will be readily apparent to those of skill in the art upon review of the instant specification.

What is claimed is:

1. An HVAC controller configured to control one or more components of an HVAC system, the HVAC controller comprising:
   a touch screen dot matrix display;
   a controller in communication with the touch screen dot matrix display and configured to operate an algorithm that at least partially controls the one or more components of the HVAC system, the controller is further configured to display a first image that includes a first set of information in a first display region of the touch screen dot matrix display and a second image that includes a second set of information in a second display region of the touch screen dot matrix display, the controller also configured to replace the second image in the second display region with a third image that indicates one or more system status conditions; and
   wherein the third image defines an information button on the touch screen dot matrix display, wherein when the information button is touched, more information is displayed on the touch screen dot matrix display that relates to the one or more system status conditions.

2. The HVAC controller of claim 1, wherein the more information is displayed, at least in part, in the first region of the touch screen dot matrix display.

3. The HVAC controller of claim 1, wherein when the information button is touched, a notification screen is displayed which provides the more information that relates to the one or more system status conditions.

4. The HVAC controller of claim 3, wherein the notification screen includes a scroll feature that allows a user to scroll through each of the one or more system status conditions.

5. The HVAC controller of claim 1, wherein the controller is configured to display a menu driven interface on the touch screen dot matrix display having a home screen, wherein the first image, second image and third image are all displayed on the home screen.

6. The HVAC controller of claim 1, wherein the first image in the first display region is unaffected by the second image being replaced with the third image in the second display region.

7. The HVAC controller of claim 1, wherein the controller replaces the second image in the second display region with the third image when the controller detects the occurrence of one or more system status events.

8. The HVAC controller of claim 1, wherein the one or more system status conditions includes an equipment warning message.

9. The HVAC controller of claim 8, wherein the equipment warning message informs a user that one or more components of the HVAC system is malfunctioning.

10. The HVAC controller of claim 1, wherein the one or more system status conditions includes an equipment maintenance message.

11. The HVAC controller of claim 10, wherein the equipment maintenance message pertains to one or more of an air filter change, an air filter cleaning, a humidifier pad change and a UV lamp replacement.

12. The HVAC controller of claim 1, wherein the second set of information includes one or more of a date, a time, an equipment status and an outdoor weather parameter.

13. The HVAC controller of claim 1, wherein the first set of information includes one or more of a current indoor temperature, a temperature set point, an indoor humidity reading and schedule information.

14. An HVAC controller configured to control one or more components of an HVAC system, the HVAC controller comprising:
   a touch screen dot matrix display; and
   a controller in communication with the touch screen dot matrix display, the controller configured to operate an algorithm that at least partially controls the one or more components of the HVAC system;
   the controller is further configured to display a menu driven interface on the touch screen dot matrix display having a home screen, wherein the controller displays a number of parameters on the home screen;
   the controller is also configured to detect the occurrence of a system status event, and in response, the controller replaces at least one of the parameters on the home screen with an information button, that when touched, causes information to be displayed on the touch screen dot matrix display that is related to the detected system status event.

15. The HVAC controller of claim 14, wherein when the information button is touched, the controller replaces at least a majority of the parameters on the home screen with a notification screen that includes at least some of the information related to the detected system status event.

16. The HVAC controller of claim 15, wherein the notification screen includes a scroll feature that allows a user to scroll through a number of detected system status events.

17. A method for alerting a user to a system status condition of a thermostat, comprising:
   displaying one or more parameters on a touch screen dot matrix display;
   detecting a system status condition; and
   replacing at least one of the parameters on the home screen with an information button.

18. The method of claim 17 further comprising:
   in response to a user touching the information button on the home screen, displaying information on the touch screen dot matrix display that is related to the detected system status condition.

19. The method of claim 18, wherein if more than one system status conditions have been detected, displaying a notification screen includes a scroll feature that allows a user to scroll through and view information related to a number of detected system status conditions.

* * * * *